United States Patent [19]

Marshall et al.

[11] Patent Number: 4,907,003

[45] Date of Patent: Mar. 6, 1990

[54] SATELLITE RECEIVER AND ACQUISITON SYSTEM

[75] Inventors: Darrell R. Marshall; Douglas O'Cull; Farid Mahani, all of Ocala, Fla.

[73] Assignee: Microdyne Corporation, Ocala, Fla.

[21] Appl. No.: 944,867

[22] Filed: Dec. 22, 1986

[51] Int. Cl.⁴ .............................................. H04B 7/188
[52] U.S. Cl. .................................. 342/352; 342/362; 455/12
[58] Field of Search ............... 342/352, 356, 359, 362; 343/786, 766; 455/12

[56] References Cited

U.S. PATENT DOCUMENTS

| | | | |
|---|---|---|---|
| 3,316,552 | 4/1967 | Reid | 455/12 X |
| 3,931,623 | 1/1976 | Sones et al. | 455/12 X |
| 4,263,539 | 4/1981 | Barton | 318/664 |
| 4,387,393 | 6/1983 | Nicholson | 380/17 |
| 4,538,175 | 8/1985 | Balbes et al. | 343/786 X |
| 4,625,235 | 11/1986 | Watson | 455/12 X |
| 4,675,732 | 6/1987 | Oleson | 358/349 |
| 4,743,909 | 5/1988 | Nakamura et al. | 342/359 |
| 4,796,032 | 1/1989 | Sakurai et al. | 342/359 |

FOREIGN PATENT DOCUMENTS

| | | | |
|---|---|---|---|
| 0242706 | 12/1985 | Japan | 342/352 |
| 179625 | 8/1986 | Japan . | |
| 219278 | 9/1986 | Japan . | |
| 219279 | 9/1986 | Japan . | |
| 2107539 | 4/1983 | United Kingdom | 455/12 |

OTHER PUBLICATIONS

"A Frequency Reuse K-Band 60-Foot Antenna System . . . "; C. J. Butts; ICC Conference; Jun. 1980.
GTE Lenkurt Demodulator; "Satellite Communications Update Part Two"; May/Jun. 1979.

Primary Examiner—Thomas H. Tarcza
Assistant Examiner—Tod Swann
Attorney, Agent, or Firm—Shlesinger & Myers

[57] ABSTRACT

The invention provides a master controller to store and call up on command a plurality of setups for numerous satellites. An antenna is directed to a desired satellite, the polarization of the feed horn is changed to that of the signal to be received and a receiver or receivers are switched to the proper band, C or Ku. A transponder is selected as are audio and/or video frequencies, half or full transponder modes in the Ku band, and video reverse. The setup is recalled by an operator or by a timer which can call or set up at prescribed periodic intervals or on a one-time basis. An operator can change one or more parameters of a specific setup. The controller can institute an antenna search routine for developing a new setup to maximize the signal strength by looking at a narrow band AGC signal whereby to permit an operator to acquire a new satellite and store all of the necessary parameters for the setup or to use a frequency controller of the receiver to define the audio and video frequencies to be employed while using the antenna control to acquire the satellite and peak the signals and then store a setup from the information generated by the two controlling elements.

8 Claims, 69 Drawing Sheets

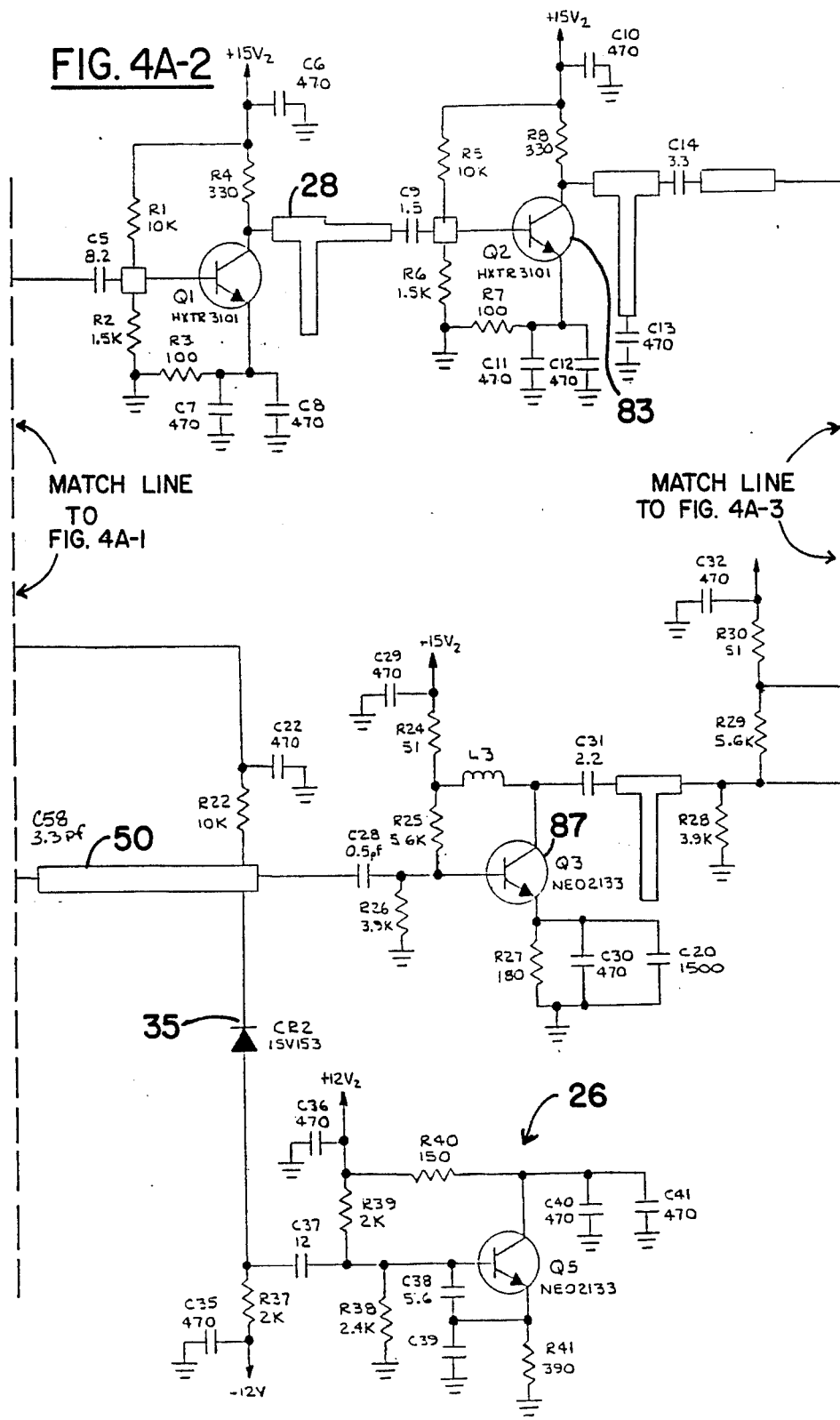

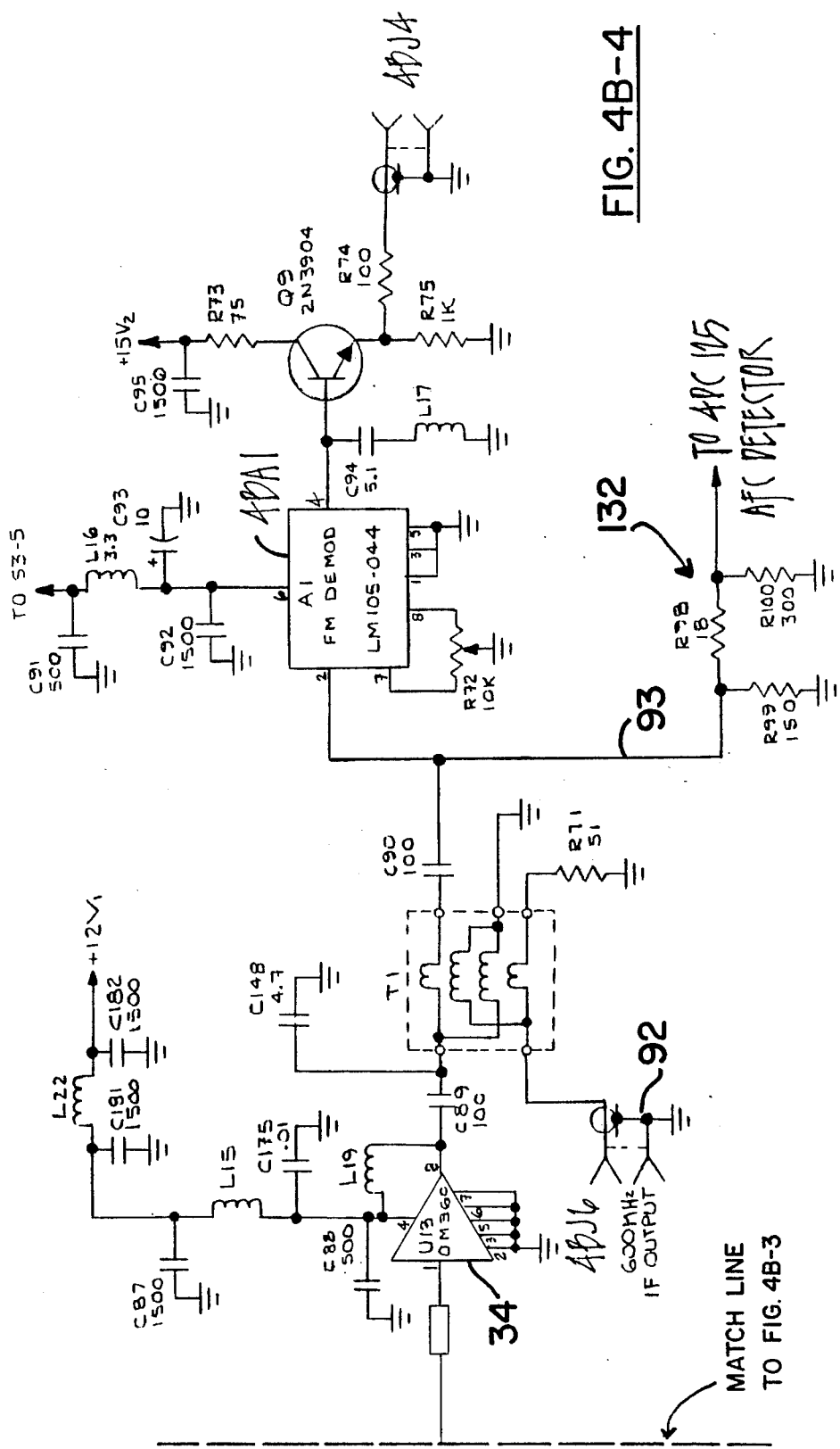

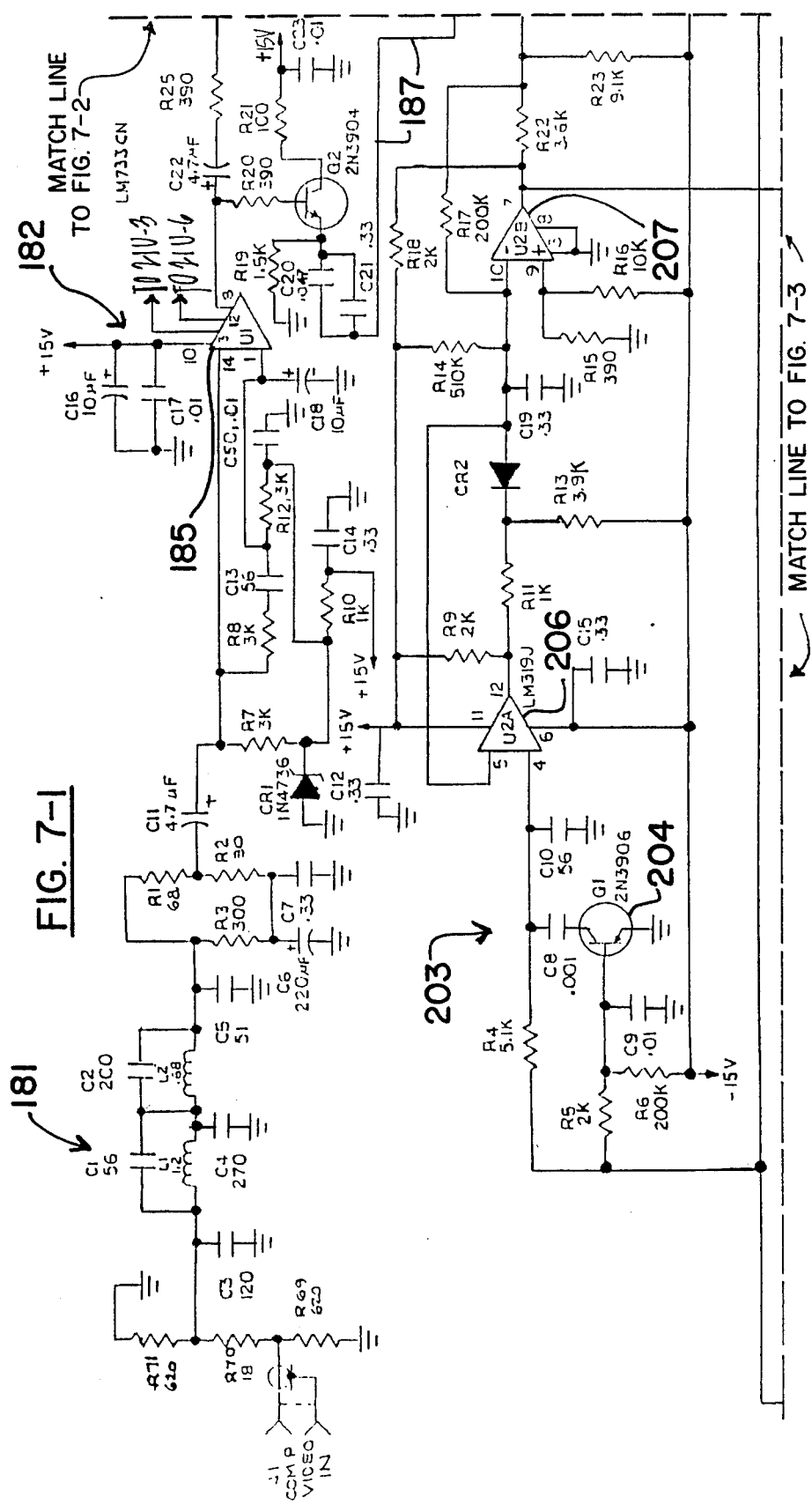

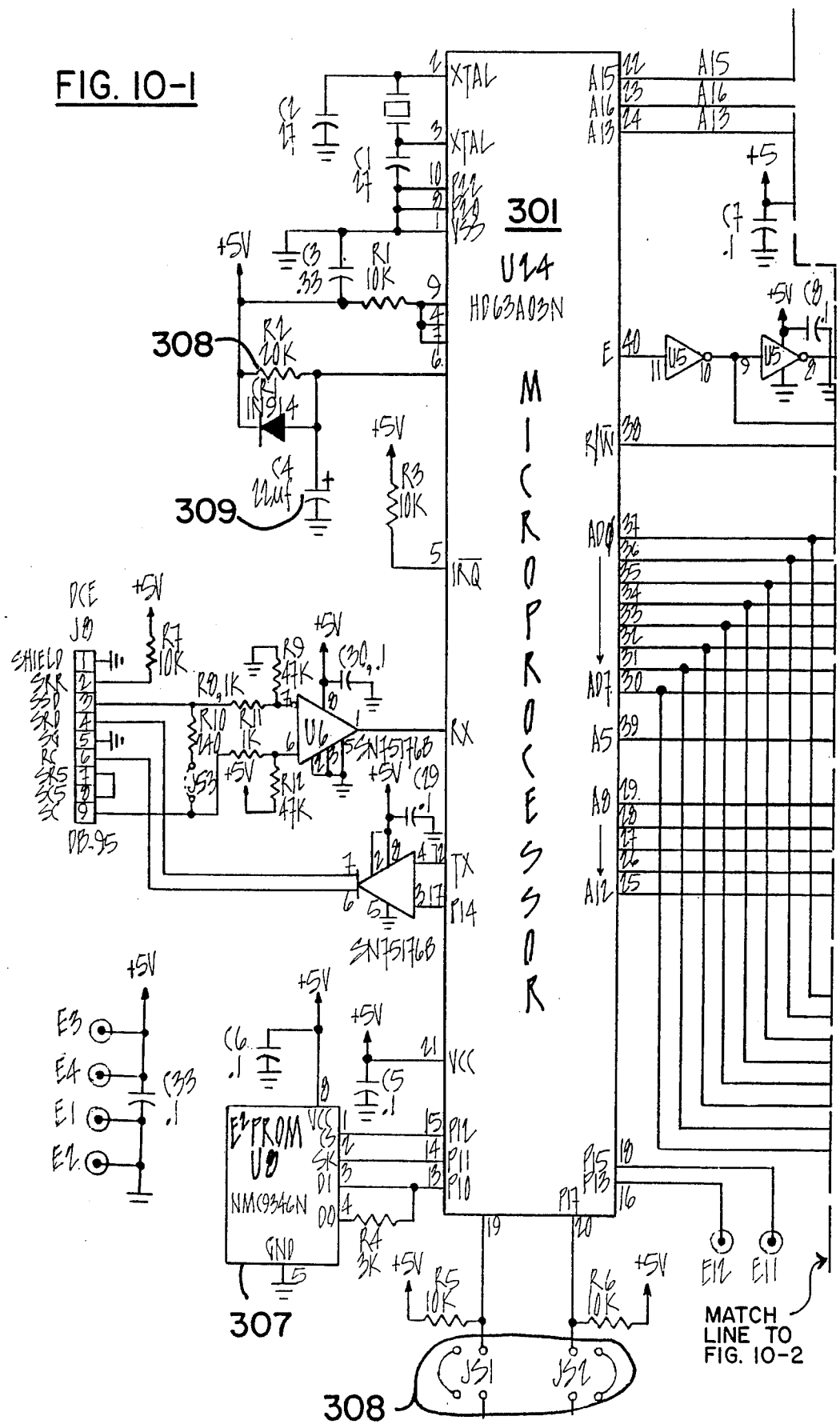

MATCH LINE TO FIG. 13B-2

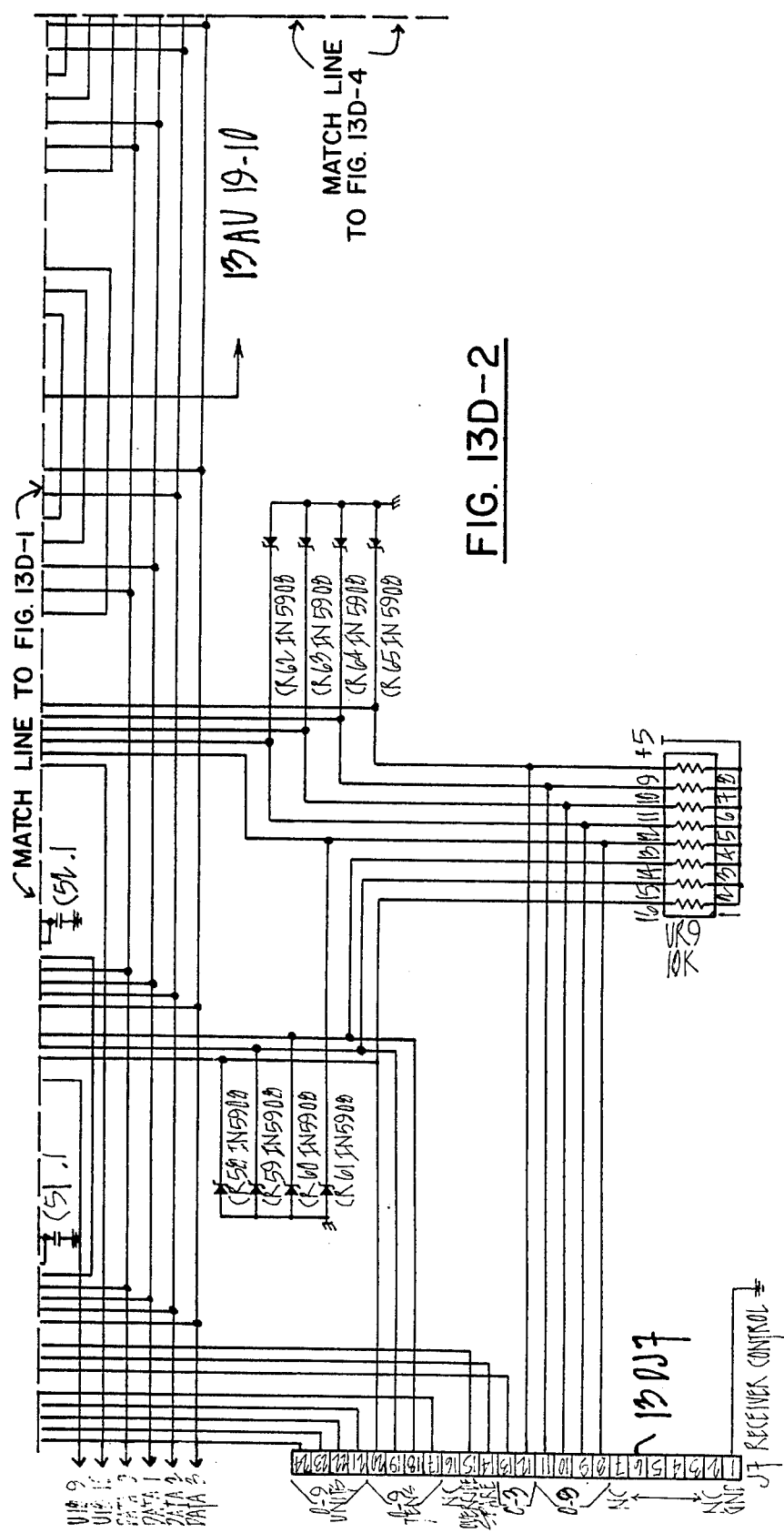

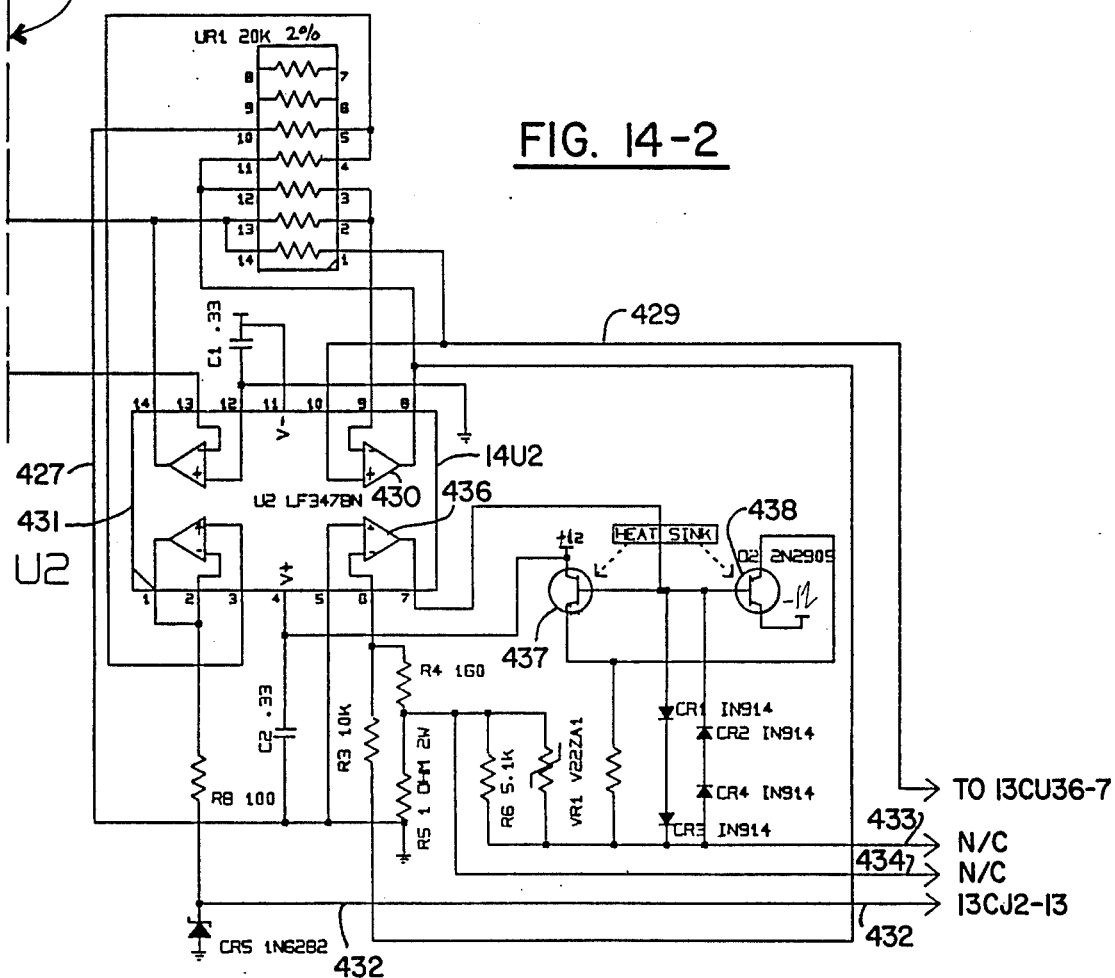

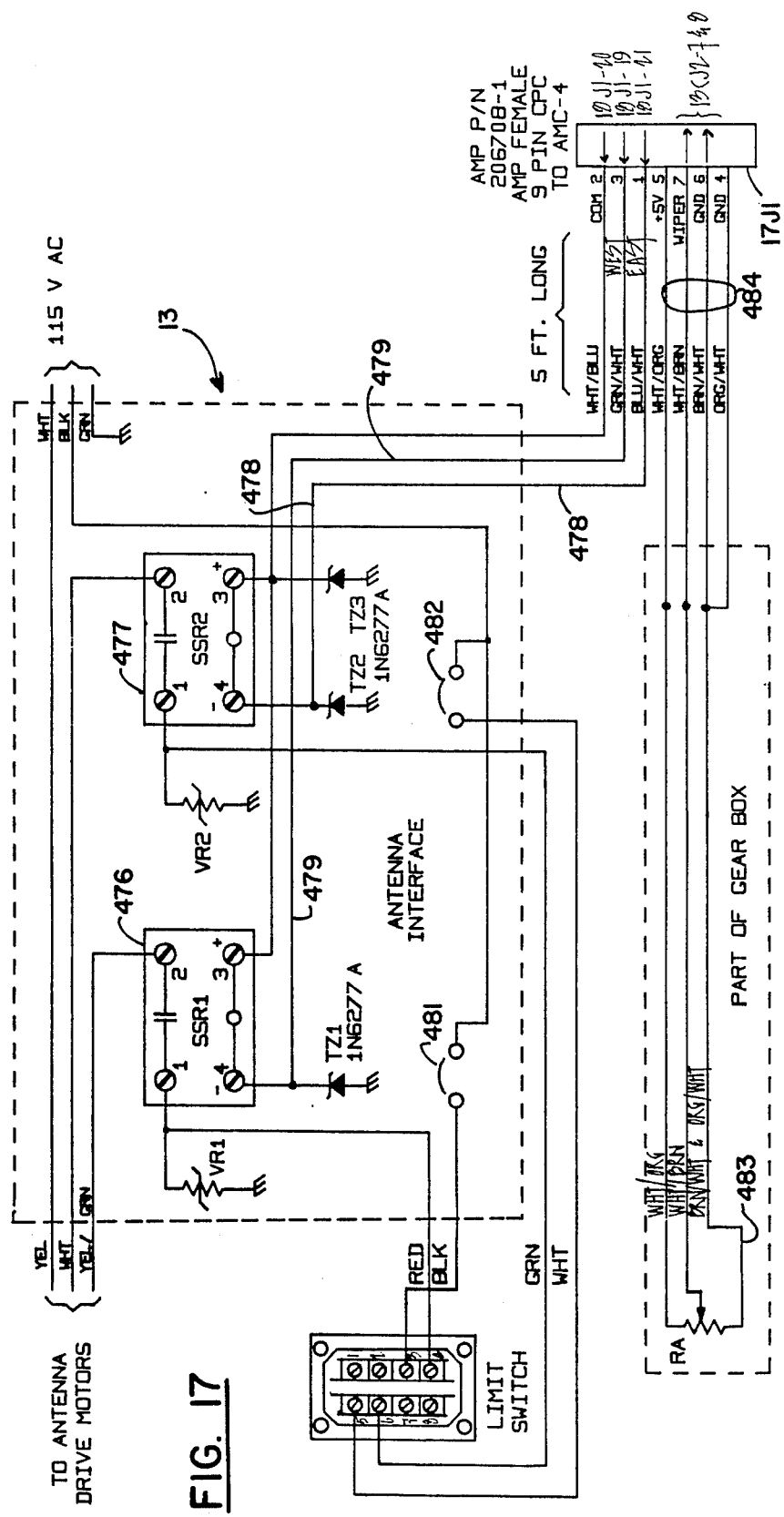

SATELLITE RECEIVER AND ACQUISITON SYSTEM

REFERENCE TO MICROFICHE APPENDIX

A microfiche appendix of 7 microfiche and 409 total frames, containing computer program listings of the computer programs described in this application, has been submitted as part of this application and is incorporated herein by reference.

The present invention relates to earth satellite ground stations and, more particularly, to a fully automated ground station in which all functions necessary to acquire a satellite and select the proper transponder to polarization may be achieved by entering a proper code into a keyboard.

BACKGROUND OF THE INVENTION

There are presently over 23 communication satellites in orbit above the earth's equator. The satellites, each with multiple transponders and many with two polarizations, provide over 1,000 possible video signals and over 100 pure audio channels. In order to select a specific channel of a specific transponder of a specific satellite, the operator must control the position of the antenna in azimuth (and in elevation if the antenna is not a polar mount) to select the proper satellite; he must select the proper transponder; the polarization of the signal to be received; the proper band, C or Ku; (full or half transponder format); the proper video and audio frequencies and he must peak the AGC signal to insure the best reception. Also he must do all of this while attempting to minimize time delays in transmission particularly in systems used in commercial broadcasting where a system has to be switched to a different satellite, etc., to pick up specific programs on a tight time schedule. Further, the various steps must be executed in the proper sequence. The performance of these functions in the time frames allowed is often quite difficult.

BRIEF DESCRIPTION OF THE INVENTION

It is an object of the present invention to provide a system in which each of the above functions is performed in the proper sequence in response to the touch of a button(s) or automatically at specific prescheduled times.

The system of the present invention stores a number of parameters (setups) relating to each channel to be received, up to a maximum of 200; each setup providing information pertinent to such parameters as satellite location, transponder and channel frequencies, C or Ku band, feed horn polarization, full or half band operation in the Ku band, video reversal, etc., and in response to operation of a keypad or at a preprogrammed time on the system, calls forth a specified setup, aim the antenna at the desired satellite, select the proper band and transponder frequency, the proper polarization of the feed horn, tune the receiver to the proper video and audio frequencies within the transponder frequency range, control the format of the receiver for full or half band operation and video reverse, if required.

The system is comprised of six main elements, a motorized antenna which may be polar mounted or otherwise, an antenna motor control, dual feed and downconverter systems and control for Ku and C bands, an antenna control unit which stores the setups and maintains control of the antenna, an RF and audio frequency controller and a receiver. The antenna, dual feed and block downconverters and the receiver are basically commercially available elements, the dual feed system and low noise block downconverters for both Ku and C bands being purchasable from both Seavey and Panasonic, with the other two items being purchasable from the assignee of the present invention.

The antenna controller, recently put on the market by the assignee of the present invention under the trademark MAPS-4, accepts data concerning the various parameters required to acquire a specific satellite, and stores such data in a setup for subsequent use, from controls located on its front panel or from a remote front panel of the device via a serial port, a hardwired remote, a computer via an RS232 port, an RS422 port and/or the frequency controller for the receiver. The antenna control unit includes a microprocessor with associated circuits, in which information relating to satellite position, band, polarization, video and audio frequencies, etc. is stored together with antenna motor control signals which control movement of the antenna to the desired satellite. Upon acquisition of a new satellite, the antenna control unit jitters the antenna while interrogating an AGC peak signal detector to locate the optimal antenna position for peak signal. It should be noted that a single transponder may carry several audio signals, some related to TV, stereo TV, radio, data, etc. All such information is stored along with the transponder frequency and the video frequency, if any. The microprocessor also accepts information relating to up to 16 programs which can be selected each week or each day such as a soap opera or courses of instruction, etc. The antenna control unit also provides for 16 additional program memories for one time selections.

The antenna control unit may be programmed initially by a keypad on its front panel or from a remote program control device such as the receiver frequency controller. A stored program may always be selected by keying in a numerical code or if appropriately stored in the setup by an abbreviation of the name of the desired program.

The antenna may also be directly controlled from the keypad which provides up, down, side to side and polarization controls for the antenna. During an initial acquisition procedure, the antenna is rotated to the approximate satellite location and then goes into a limited antenna sweep routine to maximize the signal strength (peak) of the received signal (AGC); such peaking routine also involving sweep of the elevation of the antenna for AZEL antenna systems, i.e., non-polar mount antennas. During initial acquisition of the satellite a peaking function is also performed on the polarization of the horn.

The hard wired remote provides sixteen lines of parallel entry of binary coded decimal. Six lines are dedicated to selection of one of twenty transponders. Actually the system permits selection of 39 transponders (4 lines; 0–9 and 7 lines; 0–3) providing for future expansion of transponders per satellite. Nine of the lines are dedicated to selection of setups (199 BCD) and one line is dedicated to provide override of local control.

A receiver control of the MAPS-4 (antenna control unit) provides direct control of a Microdyne receiver HDR Model 1100 (or the like) not modified [HDR(M) Model 1100] to operate in conjunction with the frequency controller.

The receiver control is not often used for such purpose and is usually employed to control other external events, such as turning on a sprinkler in case of fire and also an alarm if desired.

The antenna control unit includes eight internal relays for controlling external functions programmable to suit a user. Uses include cutting in a descrambler (HBO), selecting, or specific audio routing (see below) and the like.

In the subsequent detailed description it will be noted that the antenna control unit can control several (up to four) different frequency controller-receiver combinations. The internal relays may be used to select the one of four or three or two combinations to be selected.

The receiver frequency controller provides for direct control of the receiver, receiving signals from the antenna control unit for such purpose. The frequency controller on the other hand may also control the receiver directly. In a typical setup, because of ease of operation, the frequency controller is employed in initially acquiring a satellite and selection of the various parameters necessary to acquire a specific transponder and channel. This information is then stored in the antenna controller.

The frequency controller also serves as a partial backup to the antenna controller in that if the antenna controller is out of service various programs on the last selected satellite may be selected.

The frequency controller is somewhat easier to use in acquiring a satellite than MAPS-4 that it has thumb wheel switches with visual display to provide binary coded decimal signals to the controller to select frequency both audio and video and separate controls for polarity, transponder selection, full or half transponder selection and video reversal. Also it provides a narrow AGC loop to provide more precise tuning; that is, signal peaking.

The frequency controller also includes a microprocessor which, as indicated above, permits the frequency controller to perform certain backup functions to the antenna controller. In addition, the microprocessor of the frequency control is employed as the oscillator frequency controller in a phase locked loop to control the frequency of the receiver.

The block downconverters at the antenna are utilized to convert the Ku and C band frequencies to a common IF frequency for low loss transmission to the receiver. The block downconverters are located on the antenna so that only a short length of a single and flexible wire guide is required. Standard cable may be utilized for all other transmissions both to and from the antenna.

In summary, the present invention provides a master controller, herein the antenna control unit, to store and call up on command a plurality of setups for numerous satellites; to control an antenna to direct it to the desired satellite, to control the polarization of the feed horn to that of the signal to be received, to control a receiver or receivers to receive the proper band, C or Ku, transponder, and audio and/or video frequencies, half or full transponder in the Ku band, and video reverse, if desired, the setup being recalled by an operator or by a timer which can call or set up at prescribed periodic intervals or on a one-time basis, to permit an operator to selectively change one or more parameters of a specific setup, to control an antenna search routine for developing a new setup to maximize the signal strength by looking at a narrow band AGC signal, to permit an operator through the antenna control unit to acquire a new satellite and store all of the necessary parameters for the setup or to use the frequency controller of the receiver to define the audio and video frequencies to be employed while using the antenna control unit to acquire the satellite and peak the signals and then store a setup from the information generated at the two controlling elements; i.e., the antenna and the frequency controller and to further permit manipulation of the antenna and polarization controls at the antenna while observing the AGC signal.

BRIEF DESCRIPTION OF THE DRAWINGS

FIG. 17 is a schematic diagram of the antenna control box;

Figure 1:
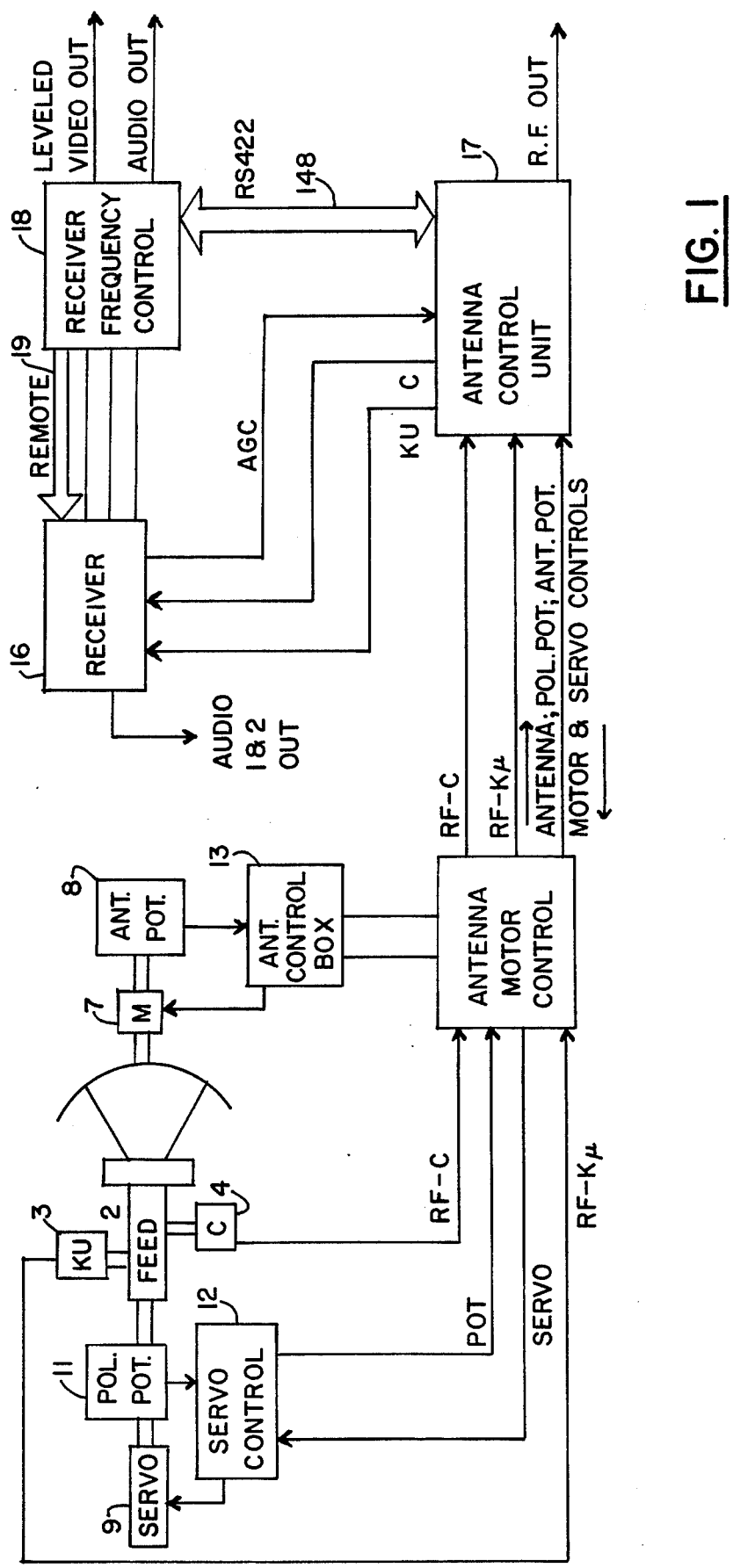
FIG. 1 is a block diagram of the main elements of the system of the present invention.

Appendix A is the microfiche of the program.

DETAILED DESCRIPTION OF THE INVENTION

An unorthodox numbering system is employed in this description relative to components that appear in one figure but interface with or are referred to or designated in another figure. In these cases, the designation of the element starts with the number of the drawing followed by "U", "R", "L", "C" or "J" standing for chip, resistor, inductor, capacitor and terminal or connector respectively. These designations are then followed by designations of the specific element.

Referring now specifically to FIG. 1 of the accompanying drawings, there is illustrated a block diagram of the entire system of the present invention. This system comprises an antenna 1 having a dual feed for receiving both Ku and C band signals. The feed is designated by the reference numeral 2 and is provided with a low noise downconverter for the Ku band, designated by reference numeral 3, and a low noise down converter 4 for the C band. Both of these signals are fed to an antenna motor control 6.

The antenna itself is illustrated as a polar mount dish, driven by a motor 7 which also drives a potentiometer 8 to provide signals for indicating position of the antenna. These signals are processed to determine the degree of rotation of the antenna when a desired satellite has been designated. The feed 2 is adapted to receive signals of both bands and polarities. A polarity determining element for the feed is rotated by a servo motor 9 which also drives a potentiometer 11 indicating the position of the polarizing elements at any given moment. A servo motor control 12 controls the servo motor 9 and receives a signal indicating the position of the polarity from the potentiometer 11. The servo motor control is also controlled from the antenna motor controller 6 and also applies the voltage from the potentiometer 11 to the motor control. Similarly, an antenna control box 13 controls rotation of the motor 7 and receives a signal indicating the position of the antenna at any given moment from the potentiometer 8. The motor control signals are supplied to box 13 from the antenna motor control 6 and the antenna control box supplies the potentiometer signal to the control 8.

The downconverters 3 and 4, which are available from Panasonic and Seavey, provide signals in the frequency range of 950 to 1,700 MHz depending upon the frequency of the signals received from the satellite. These signals, both the Ku and C band, are provided to an antenna control unit 17 together with the potentiometer signals. The Ku and C band signals are provided directly to a high-side downconverter receiver 16. The motor control 6 receives, from the antenna control unit 17, the signals for control of all functions of the antenna. The receiver 16 is under the control of a receiver frequency control unit 4AJ5 which receives a 600 MHz signal and demodulated video signals from the receiver 16. The unit 4AJ5 controls the frequency of reception for both video and audio of the receiver 16 over a bus designated by the reference numeral 19. The frequency controller 4AJ5 is controlled by its own front panel controls or by the antenna control unit 17. A leveled video output and audio output are derived from the frequency control unit 4AJ5 and an RF output is provided from the antenna control unit 17.

The antenna control unit receives the receivers AGC signal which is uses to assist in acquiring a satellite. The AGC signal is derived in the frequency controller from the 600 MHz signal fed to it from the receiver 16. The acquisition of a satellite may be accomplished by use of the frequency controller 4AJ5 in conjunction with the antenna control unit 17 or it may be acquired simply by the antenna control unit 17. If the frequency control unit 4AJ5 is employed, the desired audio and video frequencies, transponder-half transponder, video reverse and polarization operations are conveyed to the receiver 16 from a front panel control on the frequency controller and the antenna position is controlled by antenna control unit 17. Control unit 17 causes the antenna motor to rotate the antenna in the direction of the desired satellite. When the receiver 16 begins to receive signals as the desired satellite is approached, an AGC signal from the receiver is applied to the antenna control unit 17 and a peaking routine is initiated by the antenna control unit which eventually causes the antenna to be positioned such that the receiver provides a maximum AGC signal to the antenna control unit 17. At that point the search routine terminates and the information concerning that particular satellite is stored in an EEPROM in the control unit 17. Stored along with the frequencies involved are the polarity voltage from the polarity potentiometer 11, the antenna voltage from the antenna potentiometer 4AJ5 and such things as whether, in the case of the Ku band, full or half transponder operation is to be employed, and in the case of both bands such things as whether video reversal is required and whether it is a Ku band or C band satellite. Two hundred such setups may be stored in the antenna control unit and in conjunction with a timer may be automatically called up as desired, i.e., can be programmed, or can be keyed in from a front panel control on the antenna controller.

If the antenna control unit 17 is used to acquire a satellite essentially the same information that is provided by the frequency controller 4AJ5 is provided from the antenna control unit. As will become apparent subsequently such operation is not as convenient and, therefore, in normal practice the frequency control unit 4AJ5 is employed for frequency determination, etc. during acquisition of a satellite. Other than the initial acquisition of a satellite subsequent acquisition of satellites are wholly under control of the antenna control unit 17.

The antenna itself may be controlled from the antenna motor control 6, having switches at the control as will be explained more fully subsequently, to permit rotation of the antenna. Such control, however, cannot in any way control the receiver or the antenna control unit 17; it merely provides an on-sight capability for moving the antenna and changing polarities for whatever purpose is appropriate. The antenna control box 13 has relays and similar circuitry which are responsive to inputs from the antenna motor control to actually send the proper signals to the motor 7 in response to actuation of the controls in the motor control box 6.

Referring again to the receiver 16 and the receiver frequency controller 47 the communication between the two comprises a remote control line 19 which permits a certain amount of control from a remote location through the HFC. The 600 MHz signal provided by the receiver to the receiver frequency control is directed to a detector for producing an AGC signal that is fed back via lead 20 from the receiver frequency control to the receiver for use as the internal AGC and also for use in the control unit 17. The demod video, as it is labelled, is supplied from the receiver to the receiver frequency control and is processed in the receiver frequency control to provide the levelled video output and the audio output. Spare audio output circuits are provided from the receiver 16 for use in additional systems.

Figure 2:
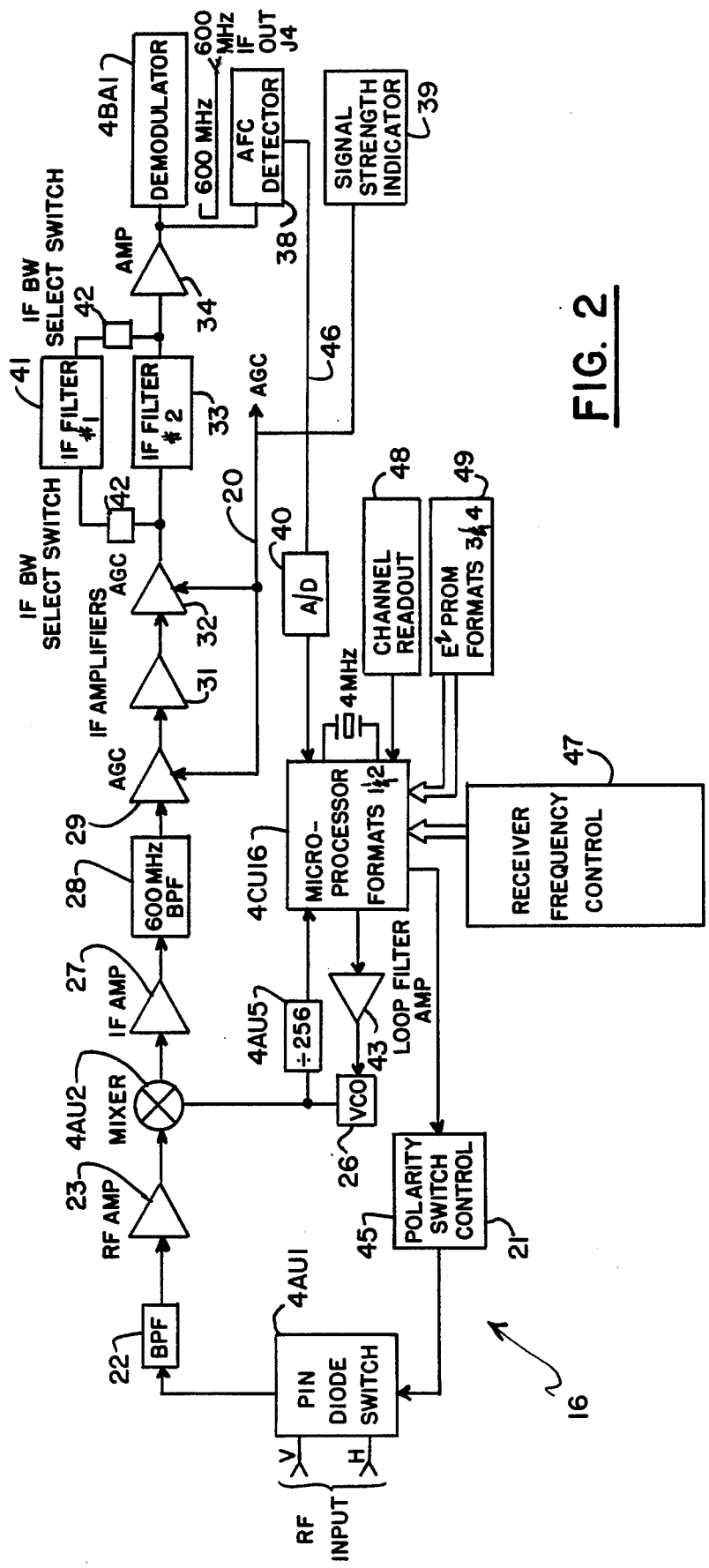
FIG. 2 is a block diagram of the receiver of the present invention illustrating also its interface with its frequency controller.

Referring now specifically to FIG. 2 of the accompanying drawings, there is illustrated a detailed block diagram of the receiver 16 of the present invention which unit is a standard HDR Model 1100 of the assignee of the present invention modified to cooperate with the frequency controller 47. The modified receiver is sold by Microdyne Corporation of Ocala, Fla. under the name HDR Model 1100(M) and the receiver frequency controller is sold under the designation HFC Model 1100.

The receiver 16 has at its front end a pin diode switch 4AU1 which selects, under the control of a polarity switch control 21, the Ku band or the C band RF signals. The signals are passed through a bandpass filter 22 which passes a band of signals in the range of 950 to 1700 MHz. The signals next pass through an RF amplifier 23 and thence to a mixer 4AU2 where they are mixed with a signal from a local voltage-controlled oscillator 26 via amplifier 25. The intermediate frequency output which is the high frequency side band, is passed through an IF amplifier 27 then through a 600 MHz bandpass filter 28 to a first AGC amplifier 29. The signal after passing through the AGC IF amplifier passes through another IF amplifier 31 and a further AGC-controlled IF amplifier 32. The output signal from the amplifier 32 is passed through a first IF filter 33 and thence to a further amplifier 34 and eventually to a demodulator 4BA1.

The output of the amplifier 34 is also applied to an AFC detector 38. The AGC voltage from the frequency controller 47 is applied over the lead 20 to analog the digital converter 46. A signal strength indicator 39 is driven from the AGC lead 20 which also supplies AGC DC control voltages to the AGC IF amplifiers 29 and 32.

It is noted that a second IF filter 41 is also provided and is selected by bandwidth select switches, both designated by the reference numeral 4CU16. The IF filter 41 is used in conjunction with Ku band half transponder signals to reduce the bandwidth of the IF filter to accommodate the half transponder narrower frequency band.

The VCO 26 is part of a phase locked loop including a microprocessor 4CU16 which provides through a loop filter amplifier 43 the control voltage to the VCO 26. A feedback divide-by-256 circuit 4AU5 completes the phase locked loop to the microprocessor 4CU16. The microprocessor 4CU16 receives a fine tuning voltage from the AFC detector 38 via a lead 46 and an analog-to-digital converter 40. This voltage provides a voltage indicative of minor deviations from desired IF frequency. The microprocessor accepts this information and changes the input voltage to the VCO to attempt to reduce the voltage on the lead 46 to zero. As indicated in FIG. 2, the microprocessor 4CU16 receives a frequency control input signal from the HFC controller 47 and is asso provided with channel, format and frequency information from the channel read-out 48 and the EEPROM 49 respectively.

Figure 3:
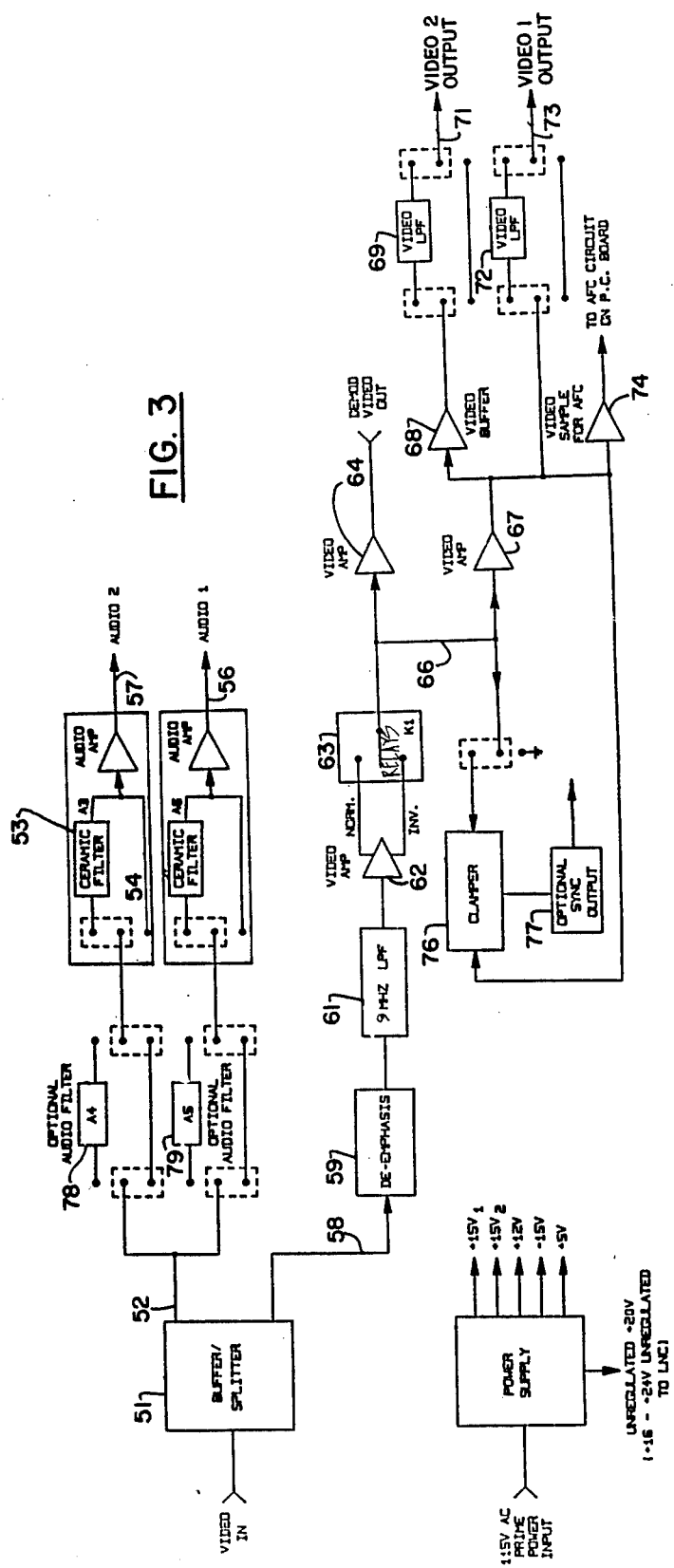
FIG. 3 is a block diagram of the major video and audio processing circuits of the present invention.

Referring now specifically to FIG. 3 of the accompanying drawings, the remainder of the block diagram of the receiver is illustrated. The demodulated video produced by the demodulator 4BA1 of FIG. 2 is applied to a buffer splitter 51 which produces the audio frequencies on an output lead 52 where they are directed to a pair of ceramic filters 53 and 54. These filters separate the two audio channels and produce audio outputs indicated as audio 1 and audio 2 on leads 56 and 57, respectively. The splitter 51 produces the video signals on lead 58 and they are applied to a deemphasis circuit 59 and thence to an 8 MHz low pass filter 61 to video amplifier 62. A switch 63 selects normal video or inverted video produced by the video amplifier 62 and directs it to a further video amplifier 64. The output signal from the amplifier 64 is the demodulated video that is applied from the receiver 16 to the receiver frequency controller 4AJ5 of FIG. 1. The output signal from the switch 63 is also applied via a lead 66 to a further video amplifier 67 and a further buffer 68 through a video low pass filter 69 to an output lead 71 on which a second video receiver signal appears. The signal produced by the video amplifier 67 is also supplied through a video low pass filter 72 to the video 1 output lead 73. A video sampling amplifier 74 is employed to produce a signal that is applied to the AFC circuit of the system.

The signal on leads 66 may also be applied optionally through a clamper 76 to an optional sync output circuit 77.

It should be noted that in the circuit between lead 52 and the filters 53 and 54, there are optional non-tunable audio filters 78 and 79 which, if appropriate signals are generated at the sending station, are employed to strip off one or two such signals to supply audio signals 1 and/or 2 as seen in FIGS. 2 and 3.

The details of the circuits of FIG. 3 are not provided since all of the elements thereof are totally conventional.

Figure 4A:
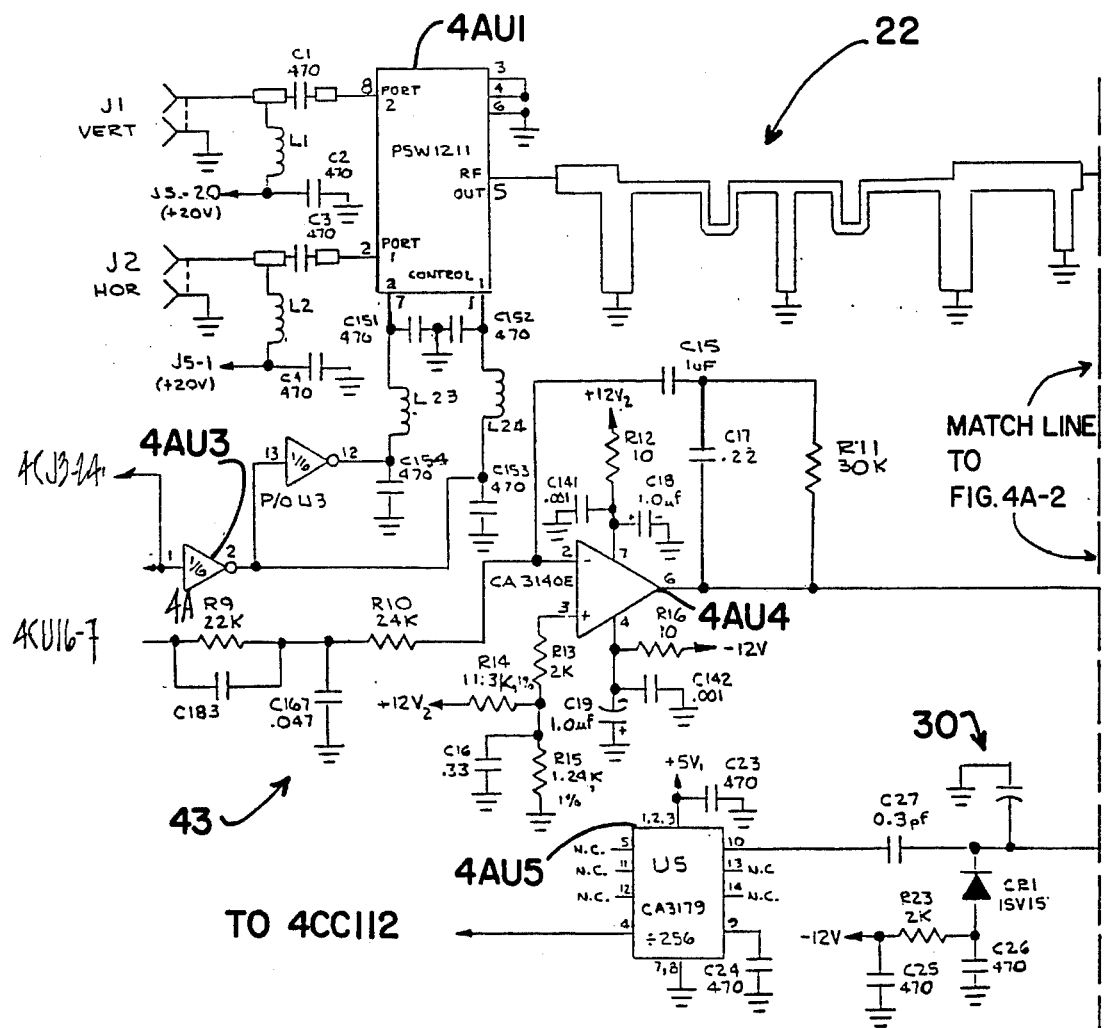
FIGS. 4A to 4D in composite provide a schematic electrical diagram of the major elements of the receiver.
Figure 1:
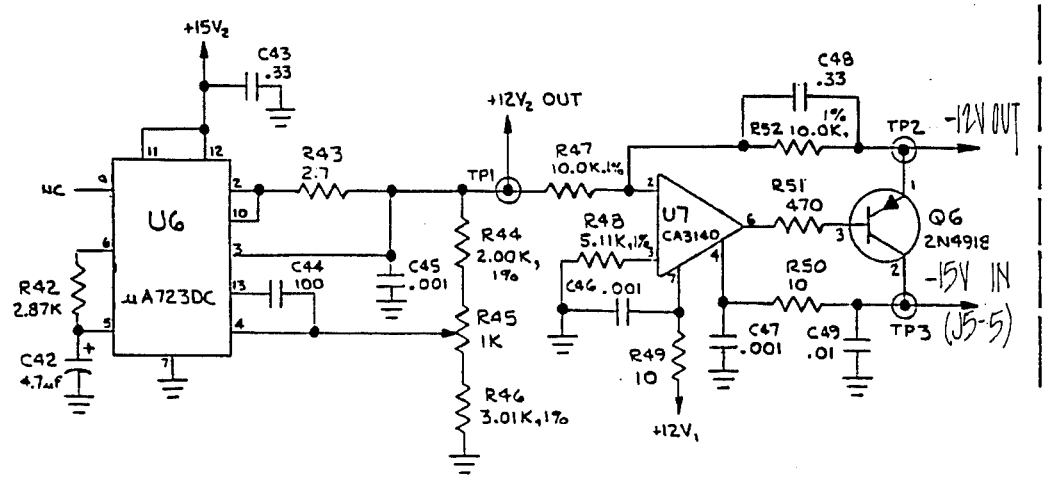
Figures 3, 4A:
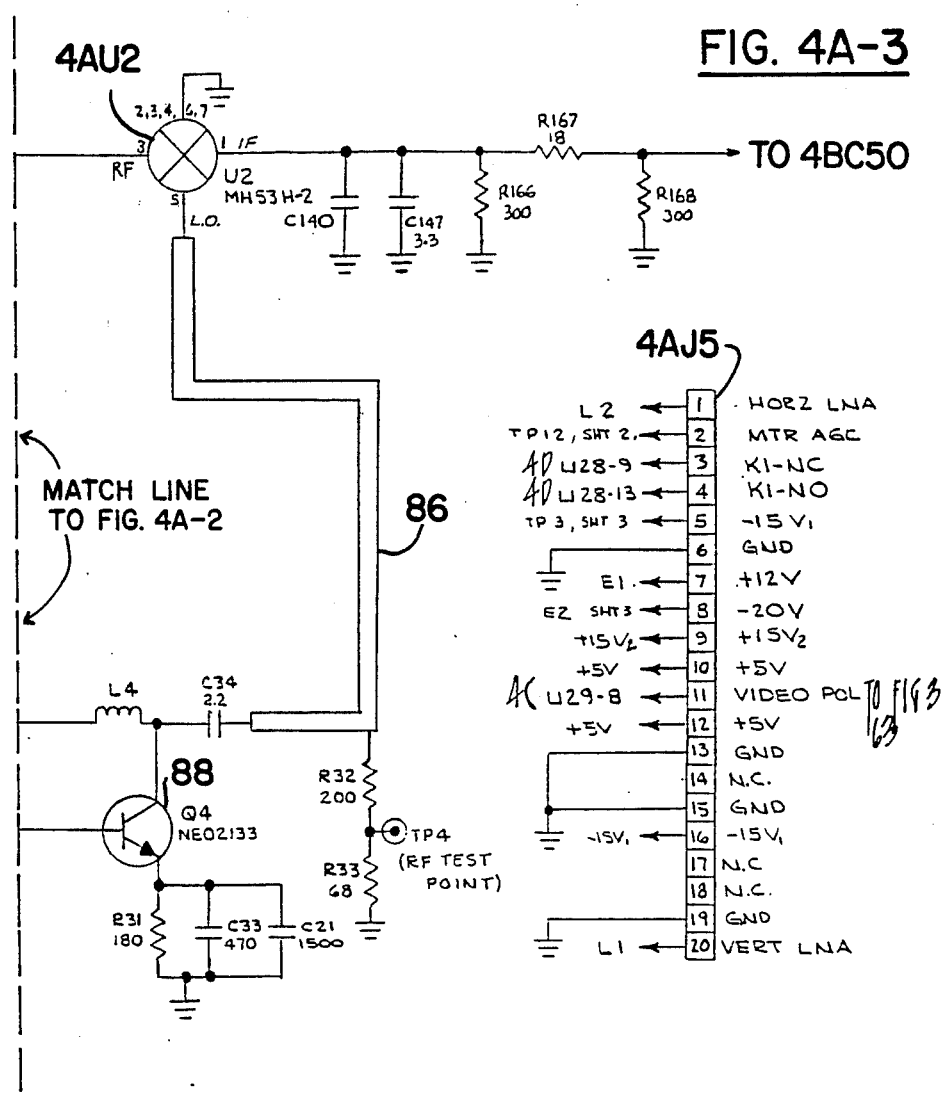

Referring now specifically to FIG. 4A, the pin diode switch 4AU1 feeds the bandpass filter 22. The switch 4AU1 is controlled via the polarity switch control 21 in turn controlled by a microprocessor 256 found in FIG. 9A, as will be discussed in more detail subsequently.

Turning to the information flow, the band pass filter 22 drives the RF amplifier 23 comprising transistors 82 and 83 which in turn supply signals to the mixer 4AU2. The local oscillator input to the mixer is provided over a strip line 86 from the amplifier 25 comprising transistors 87 and 88. Loop filter 43 which includes amplifier 4AU4 is driven from pin 7 of the microprocessor 4CU16 and interacts with the divide-by-256 circuit 4AU5 and the local oscillator 26 to provide the necessary frequency control of the local oscillator. It will be noted that the divide-by-256 circuit 4AU5 provides the necessary feedback information to the microprocessor via pin 11 as illustrated in FIG. 4C; the loop filter 43 being driven from pin 7 of the microprocessor 4CU16. The microprocessor provides a pulse train to the loop filter 43 that is integrated to produce a voltage for control of the VCO. The frequency of the pulse train is determined by the frequency of the signal provided by the divide-by-256 circuit 4AU5 to the microprocessor 4CU16 on pin 11. The divide-by-256 circuit 4AU5 is required since the frequency of the local oscillator 26 is greater than that which is desired to be processed by the microprocessor.

The oscillator 26 is a Colpitts oscillator, the tank circuit consisting of two varactors 30 and 35 and an inductor which is a strip line 50. A signal is taken off of both ends of the strip line 50, the signal into the element 4AU5 from the left end of the strip line or inductor 50, as viewed in the figure, and from the right end of the strip is the supply to amplifier 87. The tank circuit provides a plus 7 dB gain in signal strength.

Figures 1, 4B:
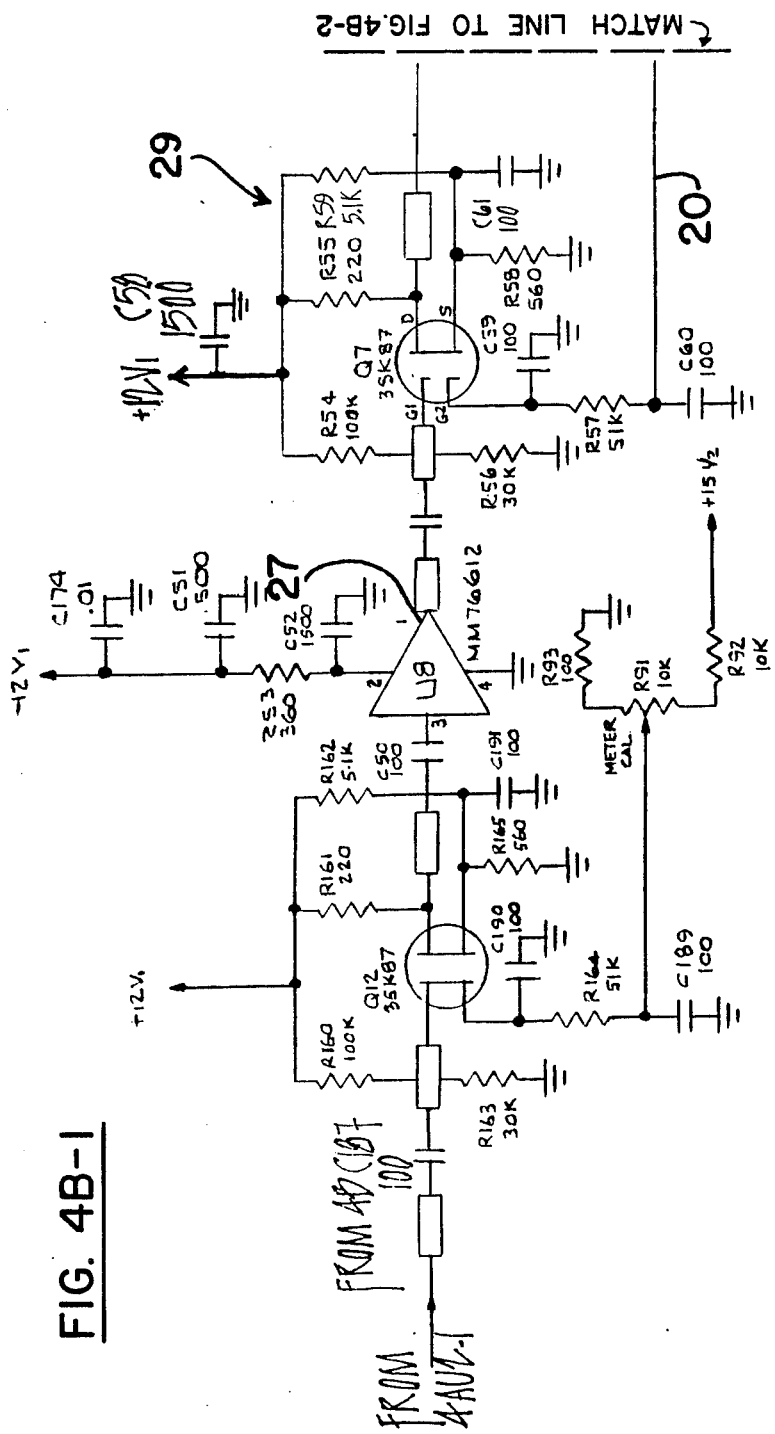
Figures 2, 4B:
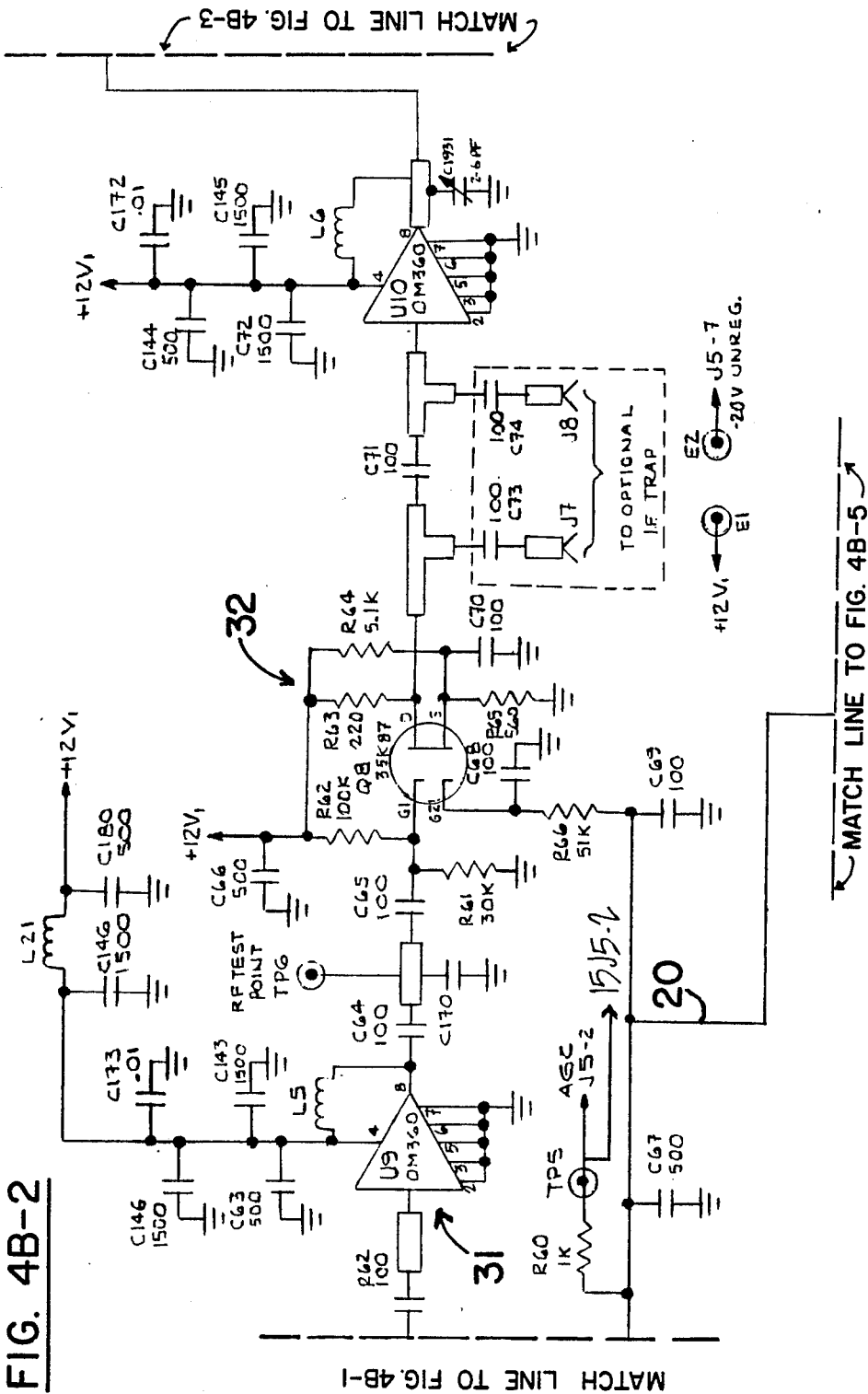
Figures 3, 4B:
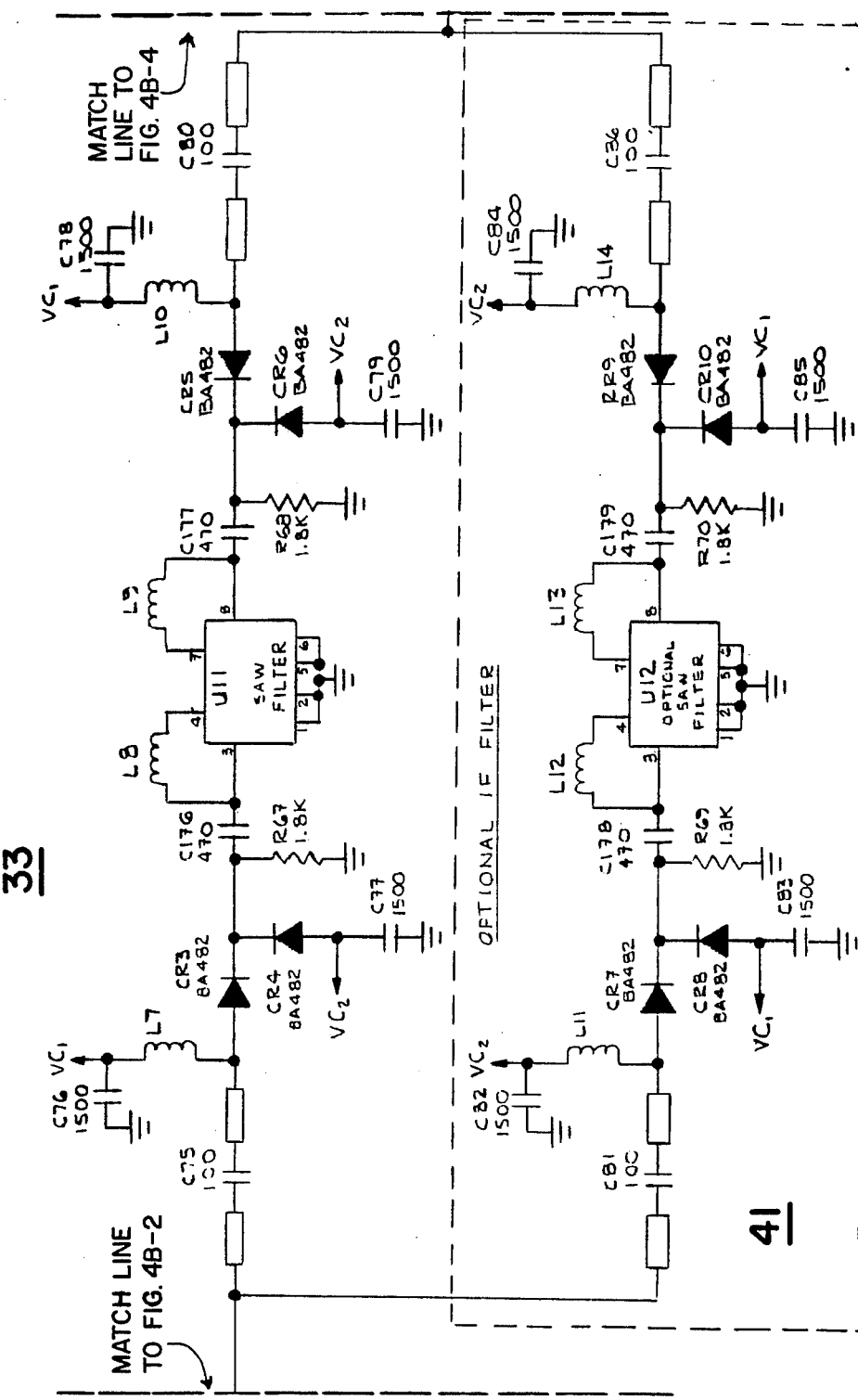

Referring now specifically to FIG. 4B, the IF signal from the mixer 4AU2 is supplied to an IF amplifier 27 and thence through IF amplifiers 29, 31 and 32. The amplifiers 29 and 32 receiving AGC feedback signals on lead 20 via pin 2 of connector 4CJ3 (FIG. 4C) from the frequency control 47 as will be described subsequently. After additional amplification the signals are fed in the alternative to the IF filter 41 or IF filter 33 (transponder; half transponder, respectively) and thence through amplifier 34 to FM demodulator 4BA1. The output signal from amplifier 34, after appropriate filtering and a tapoff of a 600 MHz IF output at terminal 92 for use in the AGC circuit in the frequency controller 4AJ5, is supplied via a lead 93 and thence via a 3 dB pad 132 to the AFC detector 38.

Figures 4, 4B, 5:
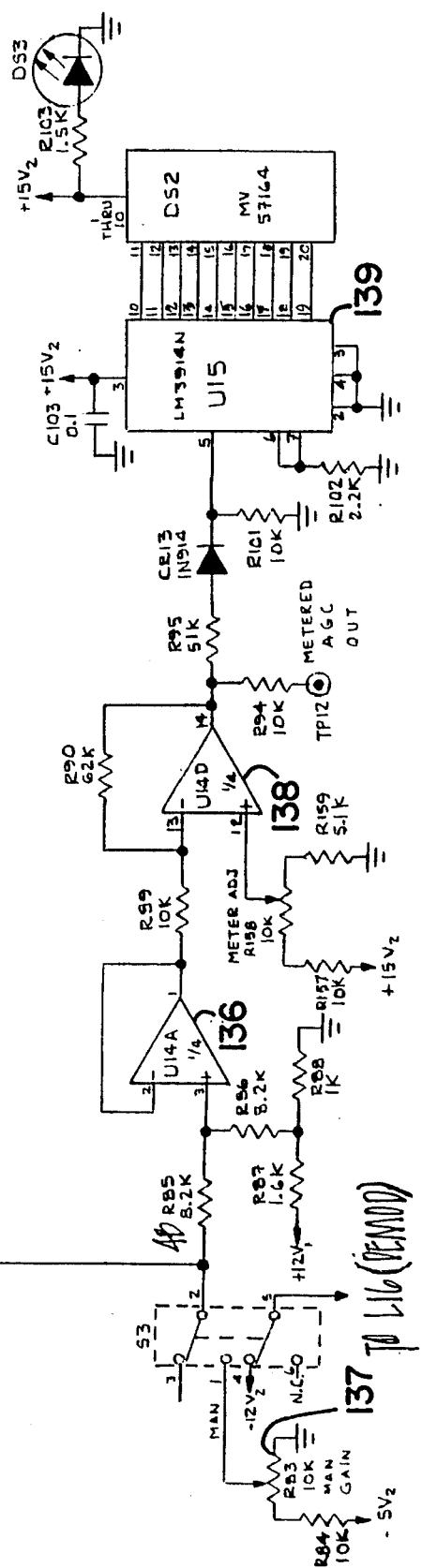
FIG. 5 is a block diagram of the major components of the frequency controller for the aforesaid receiver.
Figures 1, 4C:
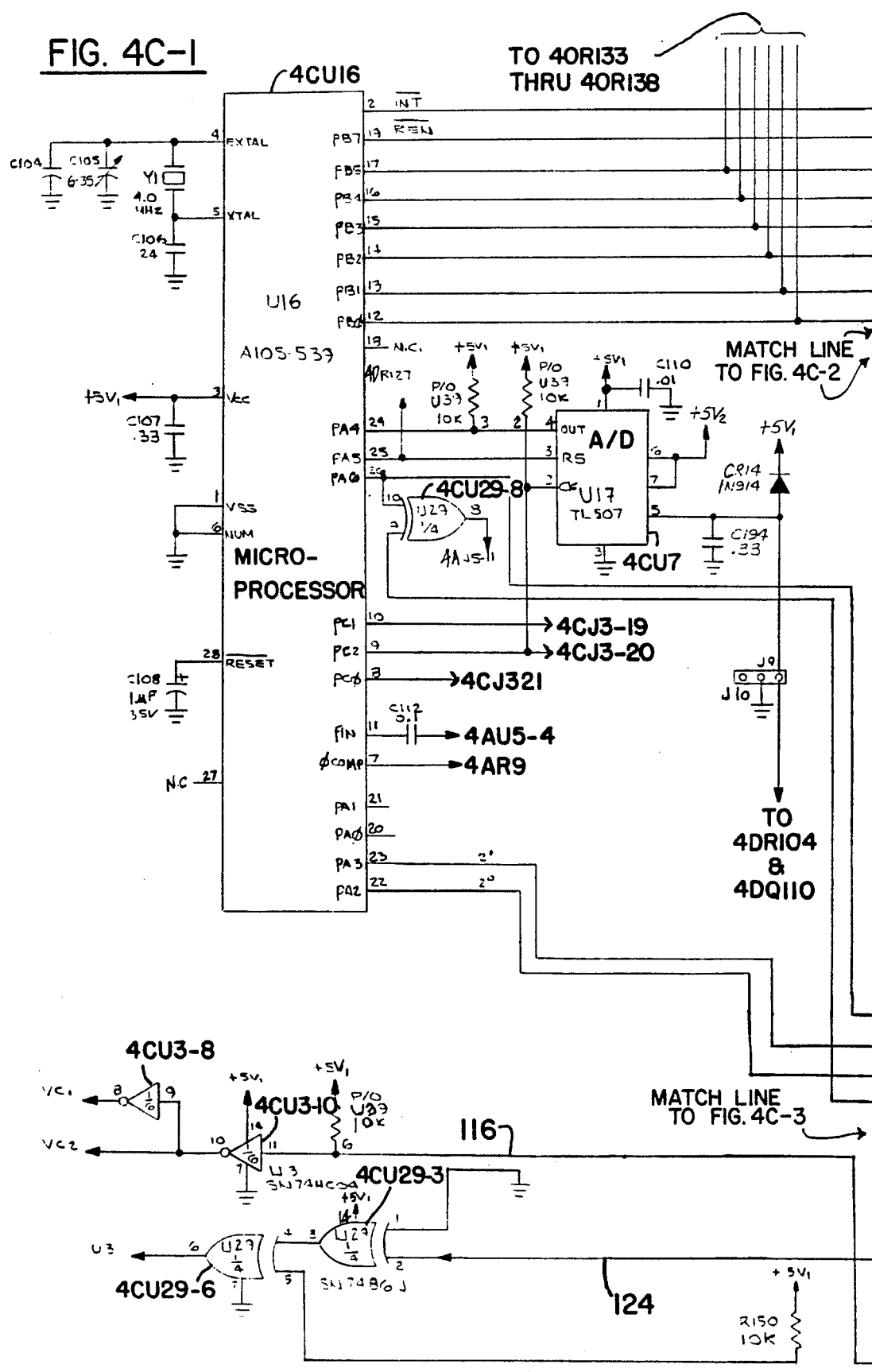
Figures 2, 4C:
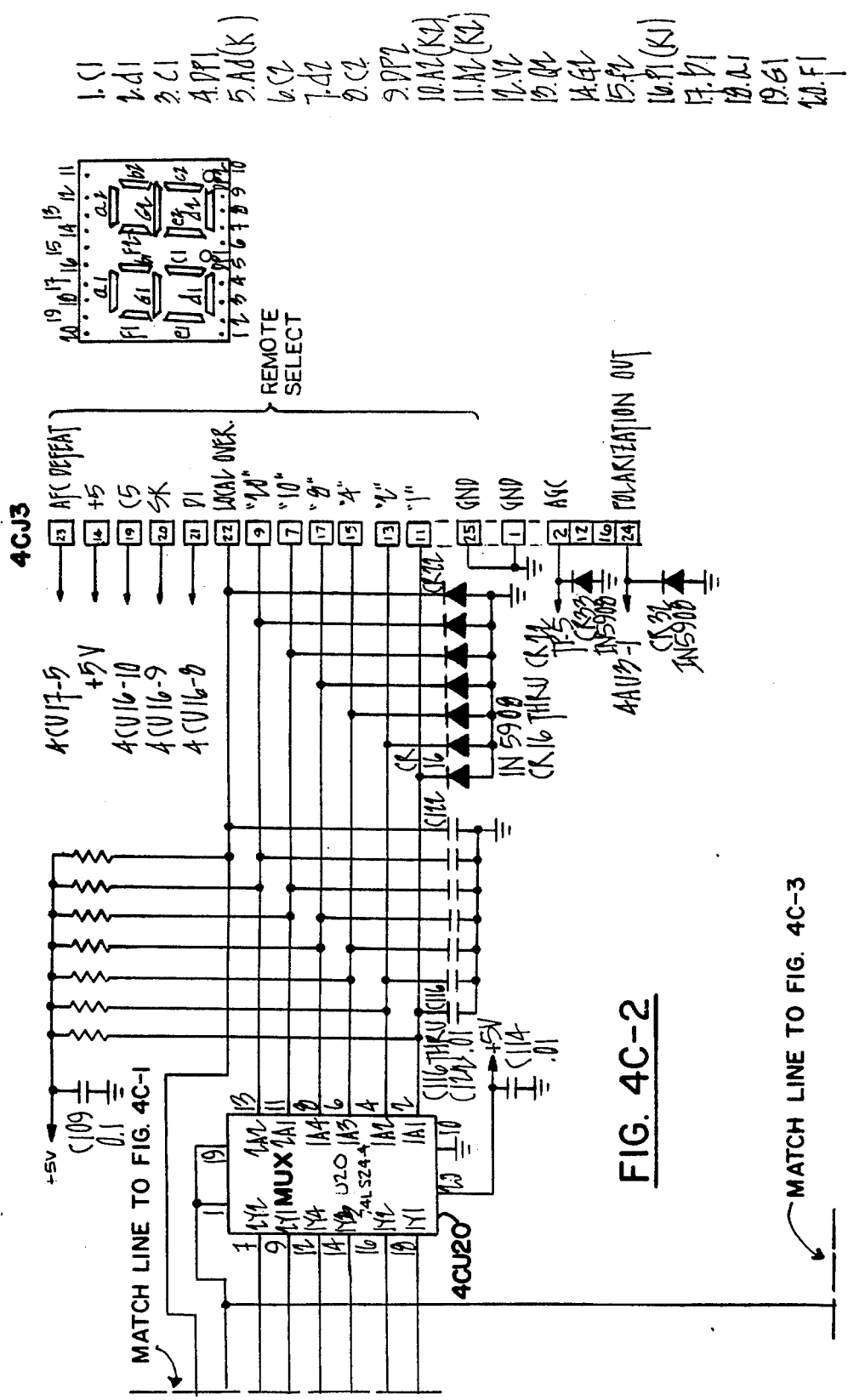
Figures 3, 4C:
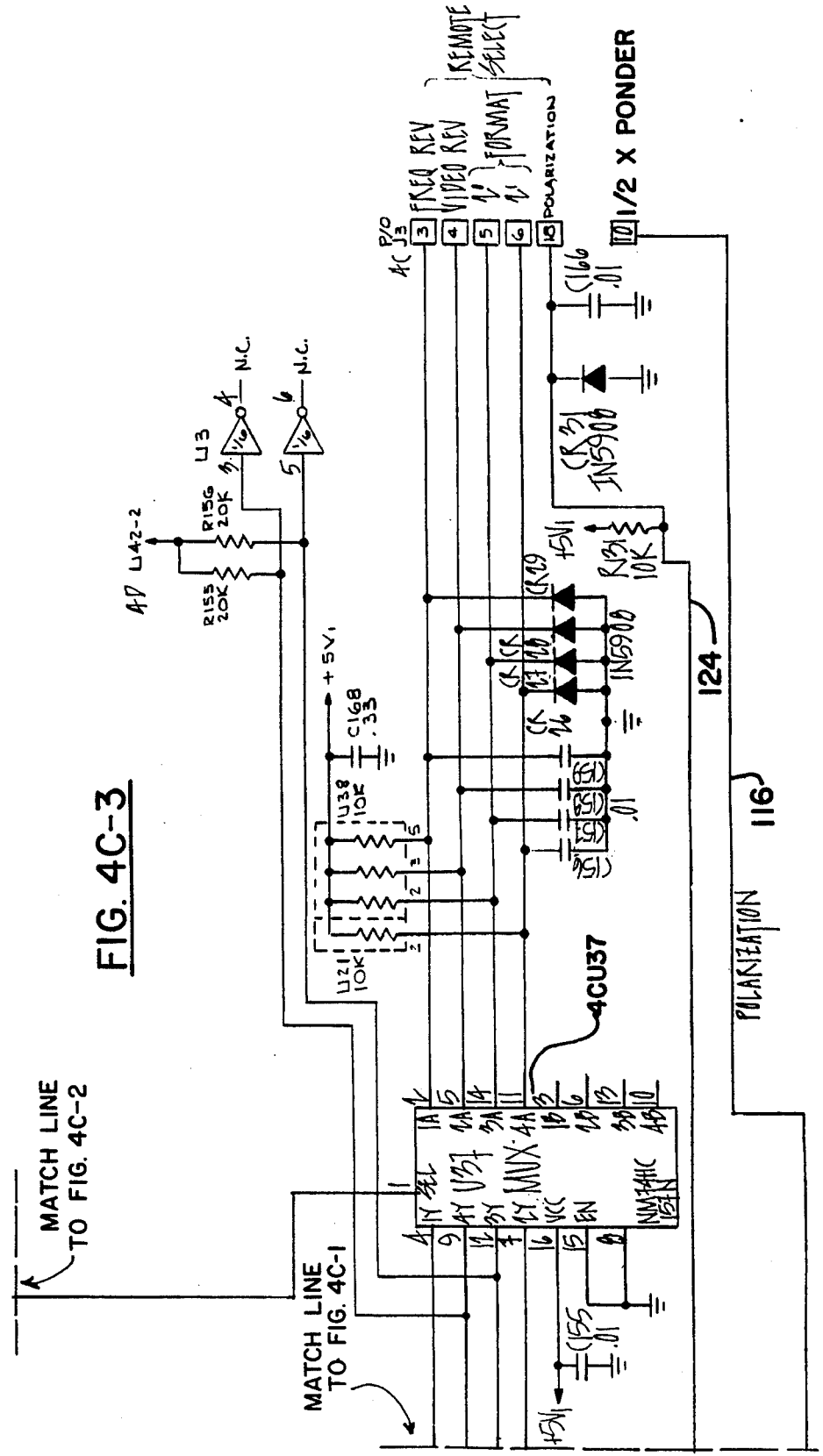
Figures 1, 4D:
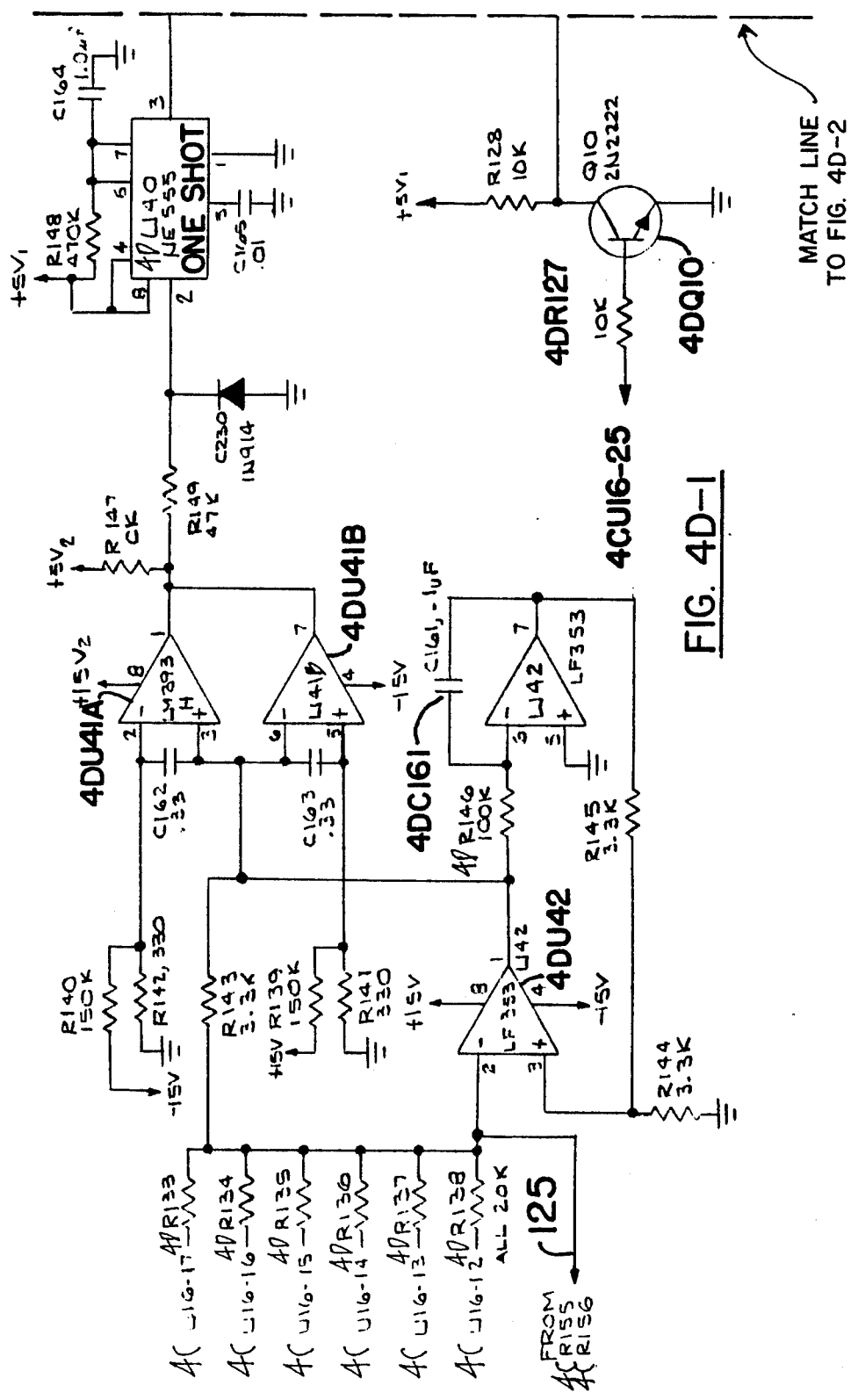
Figures 2, 4D:
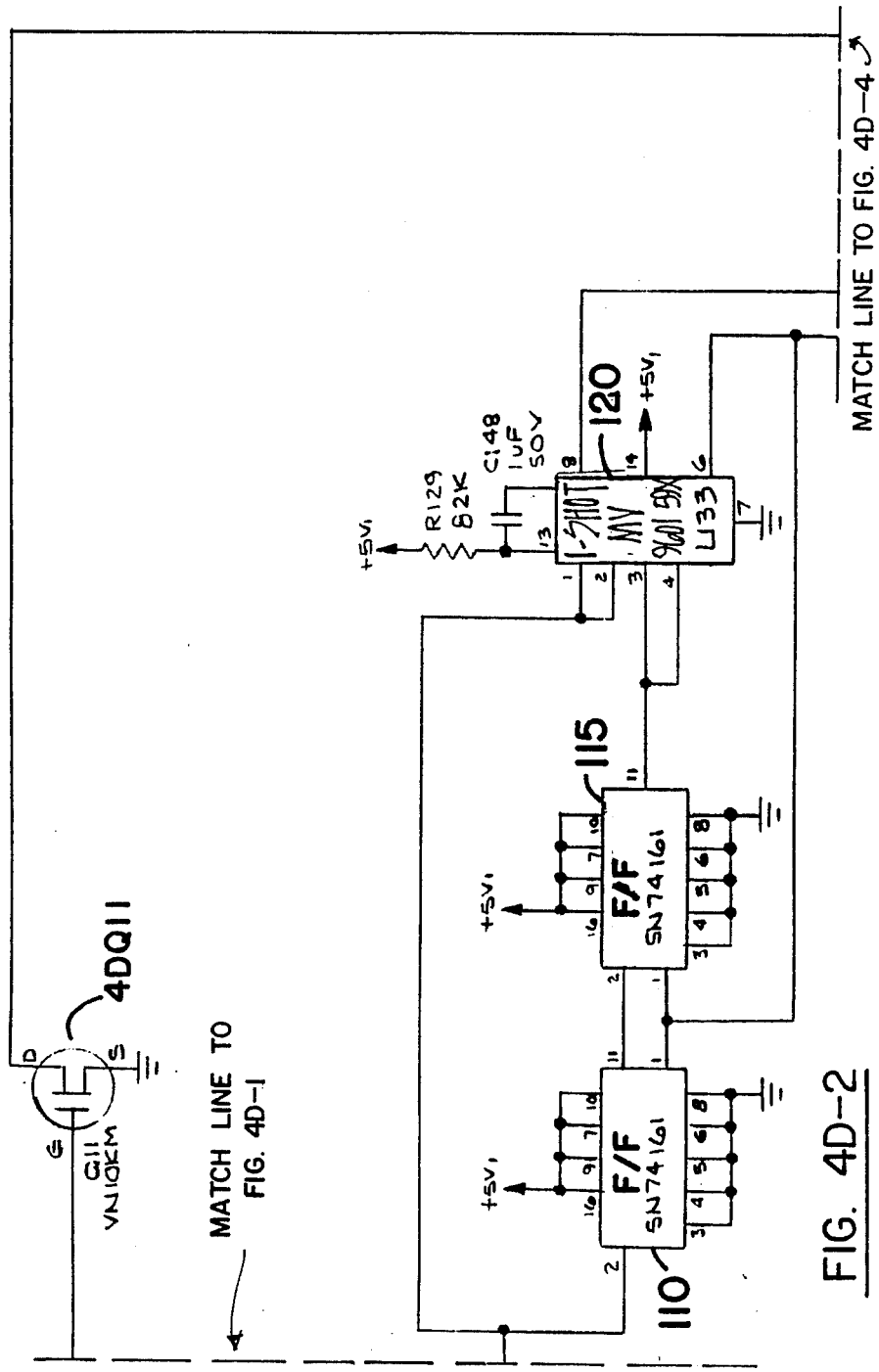
Figures 3, 4D:
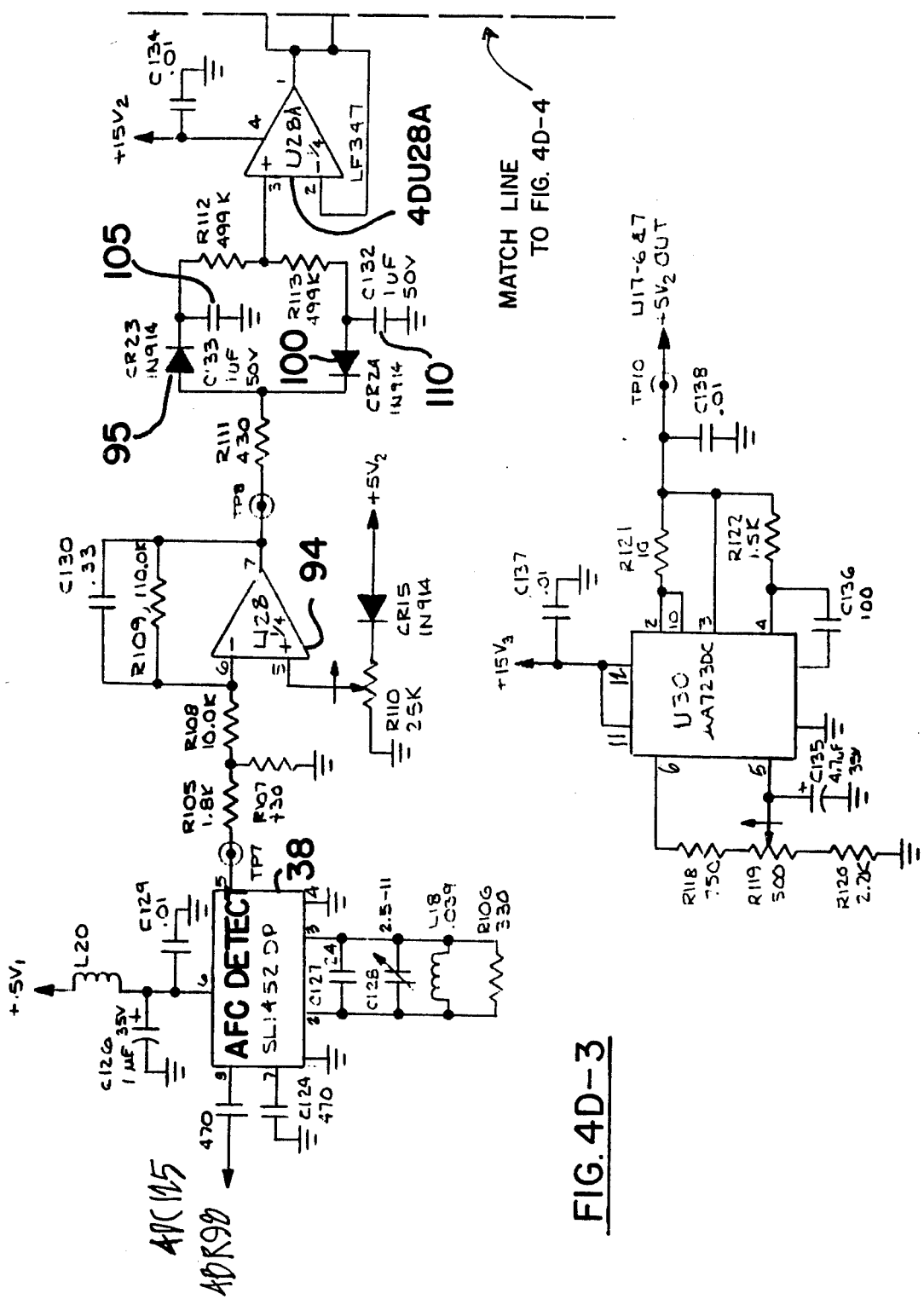
Figures 4, 4D:
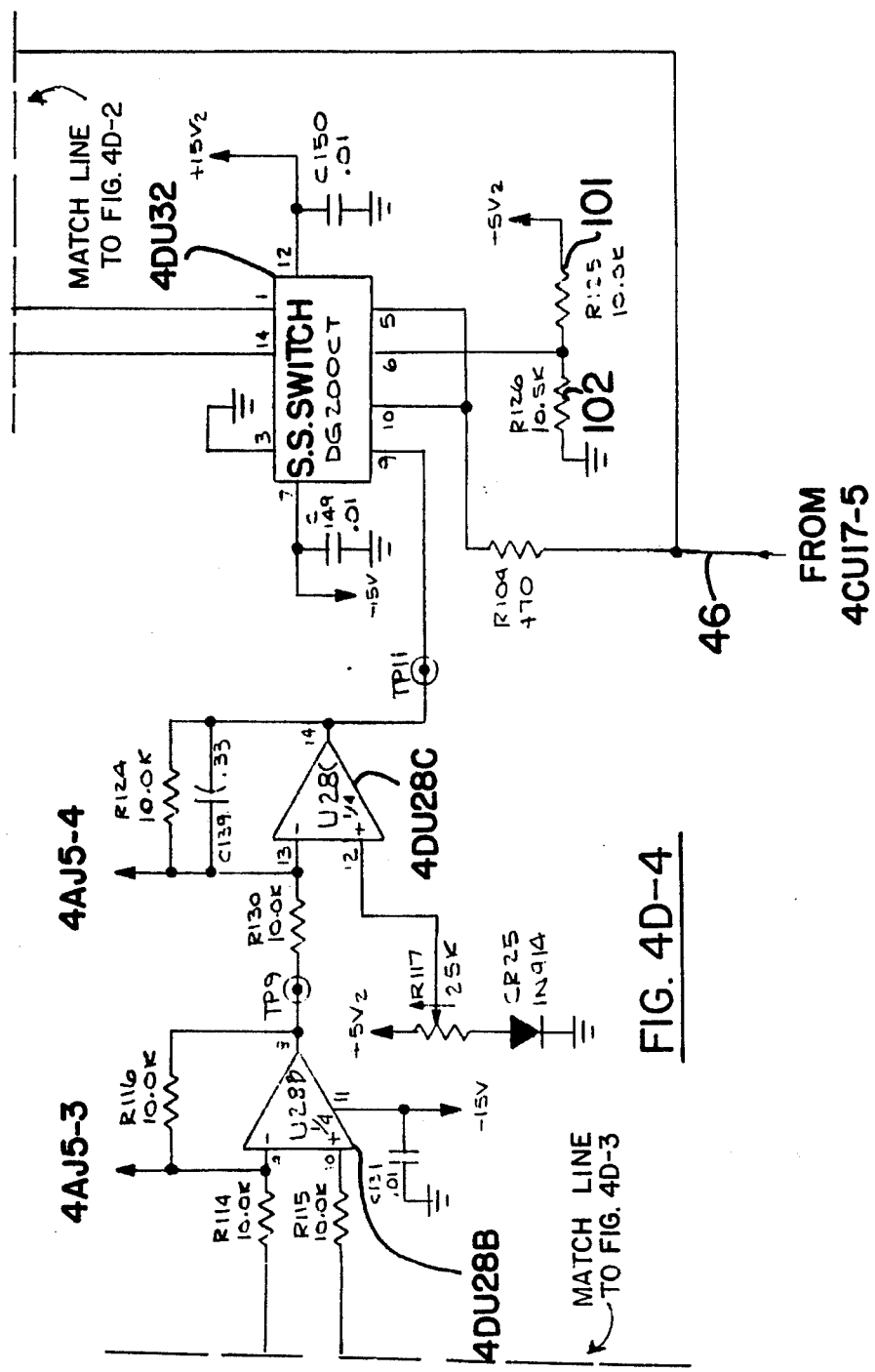
Figures 1, 5:
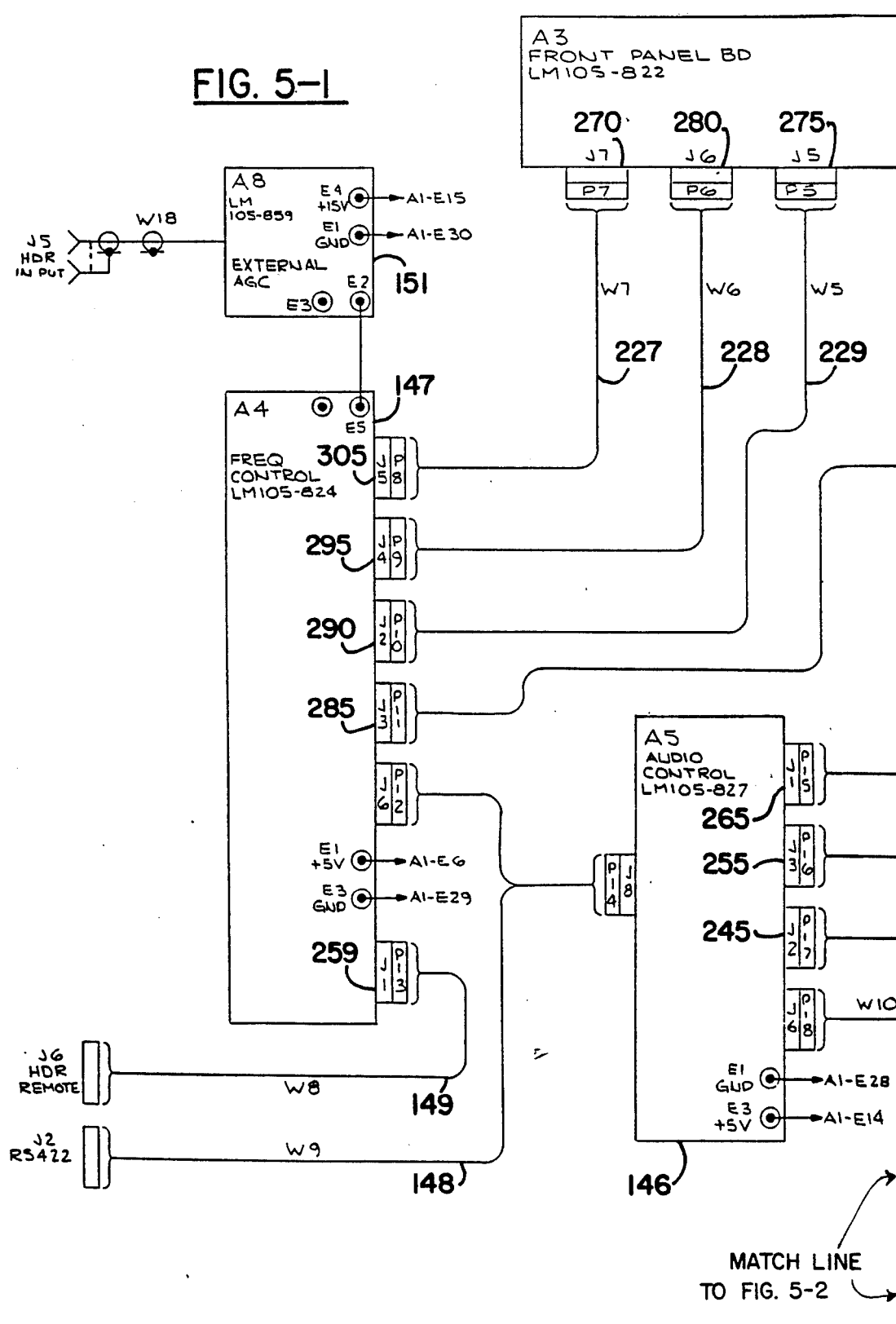
Figures 2, 5:
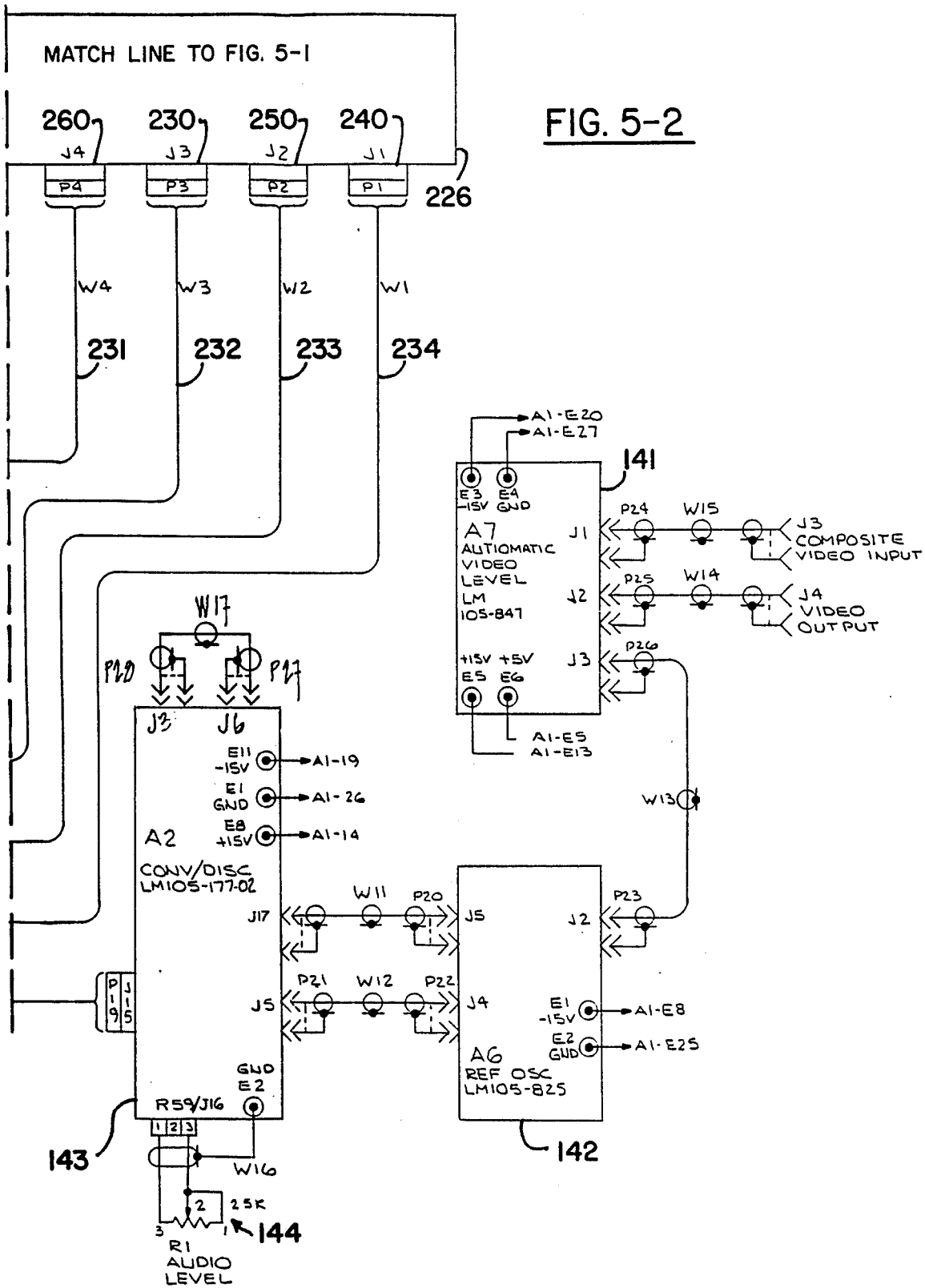
Figures 3, 5:
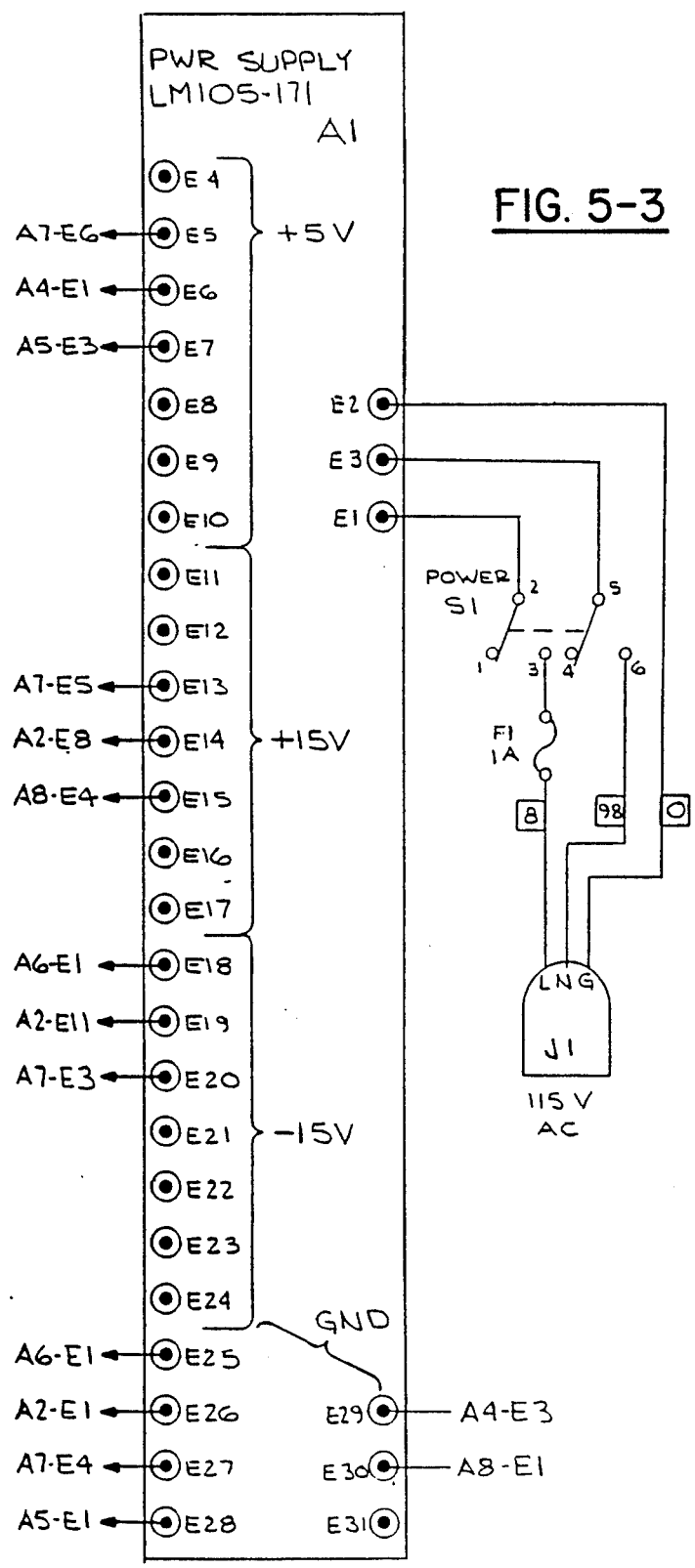

Reference is now made to FIG. 4D for further discussion of the AFC detector circuit. The AFC detector 38 produces a DC output signal which is passed through a number of stages of amplification 4DU28 A-D to a field effect transistor switch 4DU32. The amplifier 94 feeds the amplifier 4DU28A through a plus/minus detector comprising diodes 95 and 100. These diodes are employed to strip away the modulation on the signal to leave substantially only the front porch of the signal thereby to determine the energy thereof. It is desired to track only the energy level and to eliminate the white levels, the bursts and the other information as such that would be in the signals and to respond again only to the energy. Thus, there is obtained a peak-minus-peak effect with heavy filtering provided by capacitors 105 and 110.

The tracking provided is a slow track since the changes to be corrected are long-term changes; such as changes in operation of the downconverters. The down-converters are located on the feed horn on the antenna and the frequency may shift due to changes in temperature from morning to afternoon by as much as a megahertz but the changes are slow. Therefore the large capacitors provide the slow response necessary in this type of system and prevent changes due to the signal information, per se. Rapid changes are accomplished by the microprocessor when switching from one channel to another; the circuit under discussion not being employed for such purposes. The correction by this circuit cannot be greater than plus or minus 6 MHz since the AFC detector does not accommodate wider swings.

The AFC pulls in at the rate of about ½ MHz per second, so if the maximum deviation of 6 MHz is encountered it would take 12 seconds approximately for the AFC to pull the system back into complete registry. The DC signal provided by the final operational amplifier stage 4DU28C is compared with a signal derived from the center tap on resistor string 101, 102 to provide a reference signal of approximately 2.5 volts. The output signal from this switch is a plus or minus voltage which is processed in analog-to-digital converter 4CU17 to provide a positive or negative digital signal to the microprocessor and is provided via the lead 46 to analog-to-digital converter 4CU17 found in FIG. 4C.

The solid state switch 4DU32 is timed from the microprocessor 4CU16, pin 25, through transistor 4DQ10 flip-flops 4DU35 and 115 and one-shot multivibrator 120. The flip-flops count down the pulses from the microprocessor to provide about a one second cycle time for the AFC circuit.

The analog-to-digital converter 4CU17 provides a digital output signal to pin 24 of microprocessor 4CU16 from which is derived the necessary control signal to the VCO 26 to maintain the phase of the VCO locked to the desired frequency signal. As will be apparent from the study of the program for the microprocessor 4CU16, the frequency information provided to the microprocessor from EEPROM 261 of central unit 47, as will be described in more detail subsequently, provides the necessary frequency control for the receiver. It is sufficient to say here that the microprocessor provides the basic frequency control of the VCO, a more or less coarse control, from the information provided by the EEPROM and processed in the microprocessor. The fine control is provided via the AFC detector input via lead 46 and A/D 4CU17 to the microprocessor. The microprocessor only accommodates a range of frequency deviations of 6 MHz, plus or minus, so that if that range is exceeded, the microprocessor holds the frequency at the extreme of plus or minus 6 MHz.

The automatic frequency can be defeated by grounding pin 5 on the analog-to-digital converter 4CU17. The circuit is by-passed when switching channels, the AFC or automatic frequency control line being grounded momentarily during channel switching or format changes. This effect is accomplished by means of the FET 4DQ11, which when activated grounds the lead 46 for approximately 20 milliseconds. The FET 4DQ11 is activated whenever signals appear on the pins 12-17 of the microprocessor 4CU16 or a format change occurs and a signal is developed on the pins 9 and 12 of the MU 112 of FIG. 4C. Specifically, whenever there is a change of transponder or format a one shot multivibrator 4DU40 is fired for about 20 milliseconds to cause FET 4DQ11 to conduct. Resistors 4D133-138 in conjunction with operational amplifier 4DU42 sums the transponder signal level which is normally at zero signal level output. A change in the signal input level produces a spike on pin 1 of 4DU42; capacitor 4DC161 and resistor 4D156 providing the necessary integrator effect. The one shot multivibrator 4DU40 is fired by action of differentially driven amplifiers 4DU41A and 4DU41B, each detecting a spike of different polarity from the other. A change of format is sensed by amplifier 4DU42 via a lead 125.

Referring again to the connector 4CJ3, it will be noted that pin 22 is connected to pin 2 of the microprocessor 4CU16. If that pin goes low it automatically transfers control of the receiver to a remote control which is provided on other pins of the connector 4CJ3. The multiplex element 4CU2 is now rendered active and processes the information coming in on pins 11, 13, 15, 17, 7 and 9. The microprocessor will process that information thus providing remote control of the receiver which will be used for instance by the frequency controller designated by the reference numeral 4AJ5 in FIG. 1.

In the diagram of FIG. 4C there is another multiplexer 4CU37 which also receives a series of inputs from the connector 4CJ3 and is illustrated in the lower right-hand part of the drawing. These pins receive the frequency reverse, if used, the video reverse and the format designations on pins 3, 4, 5 and 6, respectively. The format designations are applied to the pins 22 and 23 of the microprocessor 4CU16. The video reverse enable is applied to pin 9 of exclusive OR gate 4CU29-8 via the MUX 4CU37. The output of the exclusive OR gate 4CU29-8 drives a transistor which in turn energizes or deenergizes a relay to control the switch 63 of FIG. 3. The remote half-transponder control comes in on pin 10 of the connector 4CJ3 and is provided via a lead 116 to inverter 4CU3-10 and thence to the diodes 118 and 119, on FIG. 4B, which select the filter 33. The output of the inverter 4CU3-10 is applied to a second inverter 4CU3-8 connected to diodes 122 and 123, again in FIG. 4B, to select the optional IF filter 41 which is used with half transponder signals. The pin 4AJ5 of the connector 4CJ3 of FIG. 4C is connected via a lead 124 to exclusive OR gate 4CU29-3; the output of which is connected or applied to a second exclusive OR gate 4CU29-6. The output of the OR gate 4CU29-6 is applied to inverter amplifier 4AU3 of FIG. 4A to control the pin diode switch 4AU1 to select horizontal or vertical polarization.

Returning now to drawing 4B, the AGC signal appears on lead 91. The lead 91 is also connected via resistor 119/4BCR6 to pin 3 of voltage follower amplifier 136 and to contact 2 of switch 134. In the up position of contact 2 the automatic AGC is effective. In the down position of the contact 2, manual control of AGC is provided by a potentiometer 137. The voltage follower 136 is followed by an amplifier 138 to supply an LED driver 139 to provide a front panel display 141 to indicate that the AGC circuit is operating. In the down position of the switch, terminal 5 is not connected, removing +12 volts from the demodulator pin 6 and thereby disabling it during manual adjustment of the AGC voltage. The AGC voltage is also supplied to pins 1 and 2 of connector TB3 of control unit 17, FIG. 15.

Referring now specifically to FIG. 5 of the accompanying drawing, there is illustrated a block diagram of the main functional units of the frequency controller 47 for the receiver of FIGS. 4A-4D. The output from the amplifier 64 of FIG. 3, the demodulated video out, is provided to an automatic video level controller 141 which receives the demodulated video on pin J1 and provides video output to a TV monitor on pin J2. The levelled demodulated video is applied to a circuit designated by reference numeral 142, which includes a 12 MHz trap, a 5 to 9 MHz band pass filter for audio and a 2.5 megacycle reference oscillator. The composite video is supplied via pin J4 of the element 142 to a converter/discriminator 143 via its pin J5. The 2.5 MHz signal is applied to the converter/discriminator 143 via its pin E13. Audio level control is determined by a potentiometer 144 connected to pins 1 and 3 of the element 143.

A dual audio control 146 provides binary coded decimal signals to the converter/discriminator for control of the audio discriminator. It also provides the EEPROM for storage of the audio frequency of the receiver. Frequency control in the audio band is determined by frequency control element 147 which receives remote signals over an RS422 bus via leads 148 and supplies control signals to the receiver via lead 149. An external AGC circuit 151 is provided and is employed by control unit 147 since the AGC circuit normally found in the receiver is too wide band for purposes of the AGC control required during initial satellite acquisition by the present system.

Figure 6:
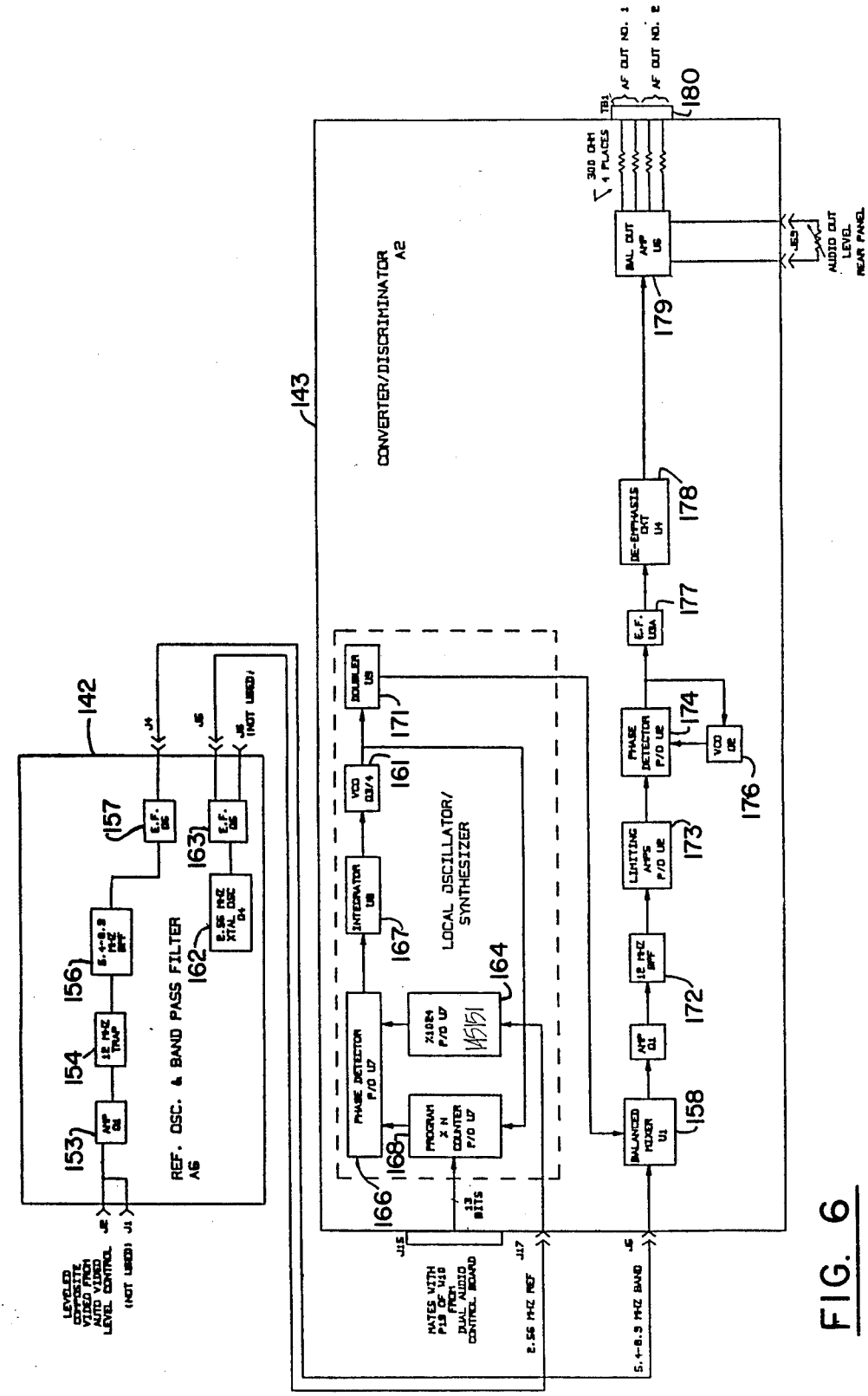
FIG. 6 is a block diagram of the reference oscillator, bandpass filter and converter and discriminator of the frequency controller.

A detailed block diagram of the elements 141 and 142 of FIG. 5 are found in FIG. 6 of the accompanying drawing. Referring specifically to FIG. 6, the composite video from the amplifier 64 of FIG. 3 is applied to an amplifier 153 and is then passed through a 12 MHz trap 154. The 12 MHz trap 154 is used in an abundance of caution to filter out this frequency since the local oscillator/synthesizer of the converter/discriminator provides 12 MHz signal to a balanced mixer 158 also found in the converter/discriminator 143. The mixer 158 receives a local oscillator signal via a frequency doubler 171 and a lead 159 from a VCO 161.

Returning to the circuit 142, a 2.56 MHz crystal-controlled oscillator 162 is provided to an emitter-follower 163 to drive a divide-by-1024 circuit 164 in the converter/discriminator circuit 143. This signal is applied to phase detector 166 forming part of a phase lock loop including an integrater 167, the VCO 161 and a program divide-by-N counter 168. It is noted that the program divide-by-N counter 168, the divide-by-1024 circuit 164, the integrator 167 and the phase detector 166 serve as the FM detector for the audio. The program divide-by-N counter receives a 13 bit binary code from the audio control board 146 to provide the frequencies of the audio signals to be detected; the "N" being variable. Thus, the VCO 161 is controlled in accordance with the selected audio frequencies which are programmed in the dual audio control 146 and stored temporarily in the EEPROM section of the frequency controller. The desired local oscillator frequency is applied to the lead 159 via a voltage doubler 171. The output of the balanced mixer 158 is amplified and applied through a 12 MHz band pass filter 172 through a limiting amplifier 173 to another phase lock loop including a phase discriminator 174 and a VCO 176. An emitter-follower 177 drives a deemphasis circuit 178 to provide a balanced output of desired 1 or 2 audio frequencies on a connector 180.

Discussing the converter/discriminator 143 in greater detail, the incoming signals from the emitter-follower into the balanced mixer 158 are in the range of 5.4 to 8.9 MHz. It is desired to increase the frequency of those signals into the 12 MHz band for processing by the 12 MHz band pass filter 172. The phase discriminator 166, as previously indicated, receives as an input signal, the 2.56 MHz signal, from the crystal oscillator. The program divide-by-N counter receives the desired frequency from the dual audio control board. The signals received are not provided in the form of a continuously variable spectrum but are provided in 5 KHz increments so that, in effect, in the 5.4 to 8.9 MHz range the determination of a given frequency is never off by more than 2.5 KHz which is more than ample for the purposes of this system. Thus, the output of the phase detector 166 is stepped in 5 KHz increments through a range which when mixed in the balanced mixer provides a high-side side band in the 12 MHz range which is stepped in 5 KHz increments. The output of the phase detector and subsequently integrator of 167 is fed to the VCO to provide a frequency which when doubled produces the signals in the 12 MHz band.

The spread of the signals of the channels within the 12 MHz band depends to a great extent on the type of signal being received. If it is an audio signal associated with a TV broadcast, it is probably at about 6.8 MHz and has about a 50 KHz bandwidth. If it is data, it may fall say at 6.2 MHz and may have only a 10 KHz bandwidth. The reason for the 12 MHz trap 154 in the reference oscillator and band pass filter 142 is now apparent since it is desired to trap out any frequency that might pass through the 12 MHz band pass filter in the converter/discriminator. The bandwidth of the 12 MHz band pass filter is selected either to be 300 KHz or 500 KHz depending upon the particular system with which it is to be utilized.

Figures 2, 7:
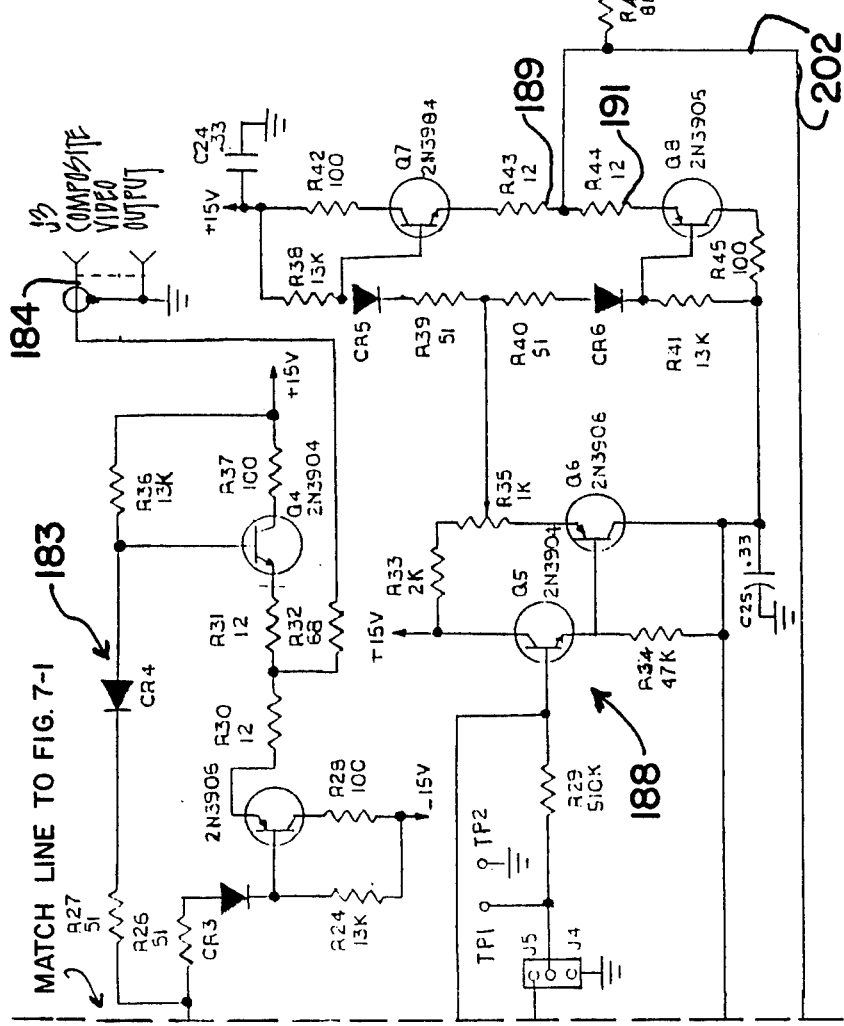
FIG. 7 is a schematic circuit diagram of the automatic video level control of the frequency control.
Figures 3, 7:
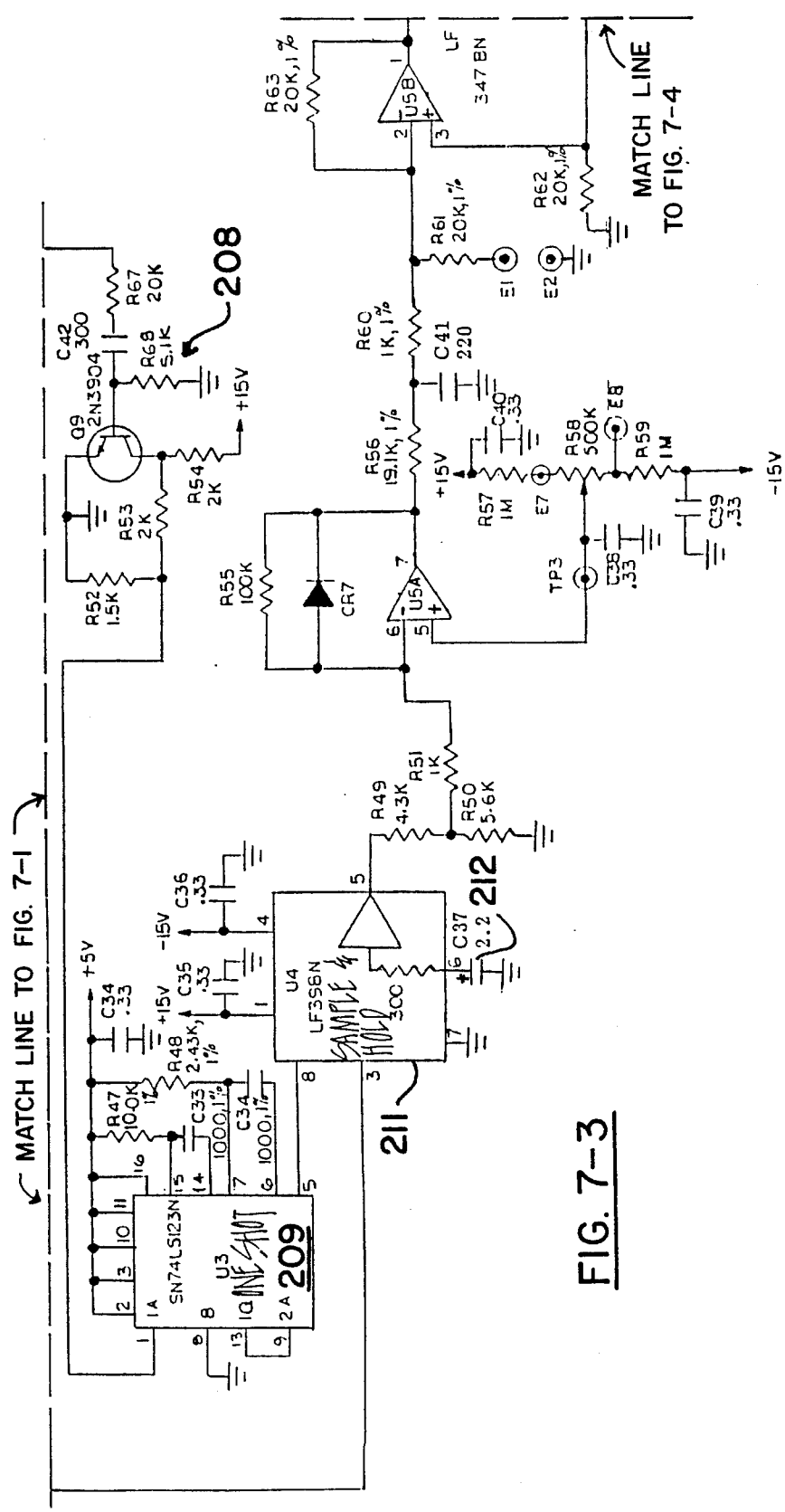
Figure 7:
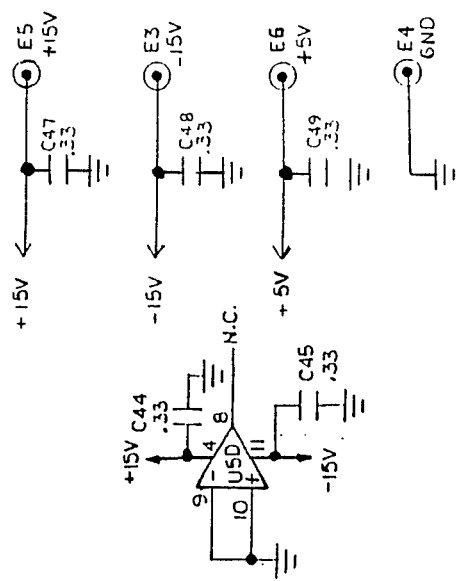
Figure 4:
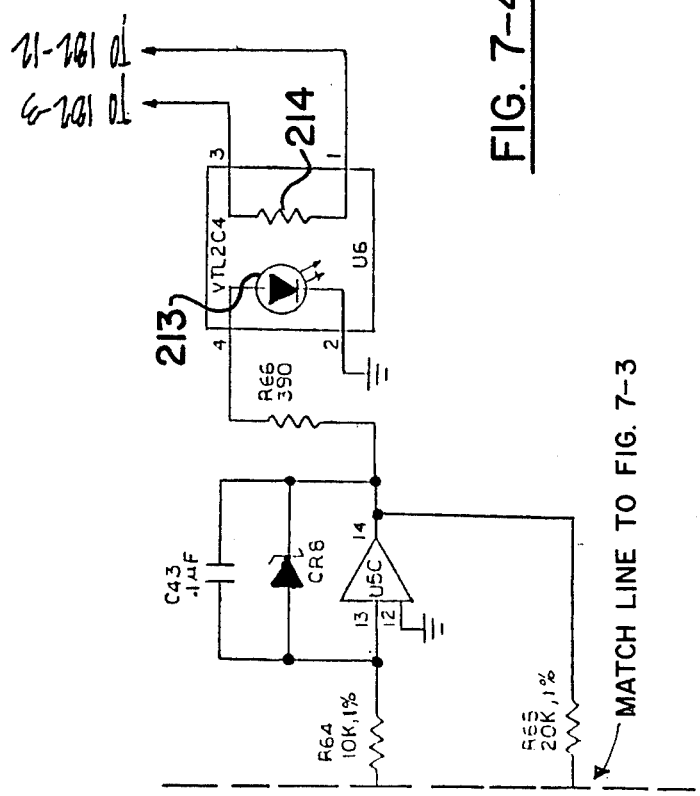

Referring now specifically to FIG. 7 of the accompanying drawings, there is illustrated a schematic diagram of the automatic video level circuit designated as element 141 in FIG. 5. The input signal to this circuit, as indicated in the discussion of FIG. 5, is the composite video output from the receiver. Also, as previously indicated, the signal covers the band from DC to approximately 9 MHz; 0-5 MHz video, 5-9 MHz audio. The composite video signal that is supplied eventually to the reference oscillator and band pass filter 142 is not processed to any great extent in this circuit. The signal is passed through a band pass filter 181 amplified in a circuit generally designated by the reference numeral 182 and supplied through another filter circuit 183 to output terminal 184 which is supplied to the reference oscillator and band pass filter circuit 142. The levelled video output signal appears on an output lead 186 and the video signal which is supplied to the levelling circuit is supplied via a lead 187 taken off from the amplifier section 182, discussed above.

The basis for providing a levelled video output is to accommodate the use of half transponders in the Ku band. Therefore, the circuit is discussed only in connection with Ku band, half transponder operation. The signal level in a half transponder signal is considerably below that which is received from a full transponder transmission. Therefore, it is necessary to boost this signal. This signal is supplied to a local TV monitor to ensure that the boosting is sufficient to provide a normal or certainly acceptable level of signal as represented by the picture on the monitor.

In the amplifier section 182 there is provided an amplifier which is designated by the reference numeral 185. This amplifier receives on its pins 3 and 12 a balanced signal to vary its gain in accordance with the signal level to maintain a desired signal level for purposes which are discussed immediately above.

The signal appearing on the lead 187 is passed through a two-stage amplifier designated by the reference numeral 188 to drive an output section; the signal being taken off between resistors 189 and 191. This signal is supplied through a low pass filter designated by reference numeral 201 to the levelled video output signal lead 186. The signal supplied to the filter 201 is also supplied via lead 202 to a clamper circuit, generally designated by the reference numeral 203, consisting of transistor 204 and amplifiers 206 and 207, to provide a signal, referenced to some reference point; ground in this particular instance; thus providing a reference point for the leveled video output. The output of the amplifier 207 is also applied to a sync stripper 208 which provides the signal to a dual one-shot multivibrator 209.

The signal on lead 202 is also supplied to a sample and hold circuit 211. The sampling rate is determined by the dual one-shot multi-vibrator 209 and operates from the front porch of the video signal. The time constant of the sample and hold circuit is about one second as determined by the 100 microfarad capacitor 212. This output signal, which provides an indication of the level of the video signal being processed, is amplified in several stages of amplification to drive a light emitting diode 213. The light emitted by the diode is detected by a light-sensitive resistor 214 to provide the gain control to the amplifier 185. Basically, the difference between the signal appearing on lead 184 and the signal on lead 186 is in the bandwidth of the signals, the composite video output on 184 containing all materials received from the receiver, whereas the output on the lead 186 has been clamped and the bandwidth restricted to 5 or 8 MHz depending upon the particular system in which it is to be employed. In any event, both signals have been compensated to maintain a relatively constant output even when a half transponder signal is received.

Reference is again made to FIG. 5 of the accompanying drawings. There is illustrated a front panel 226 connected through leads 227, 228, 229 and 231 to the video frequency controller 147 and through leads 232, 233 and 234 to the dual audio control.

Figures 1, 8:
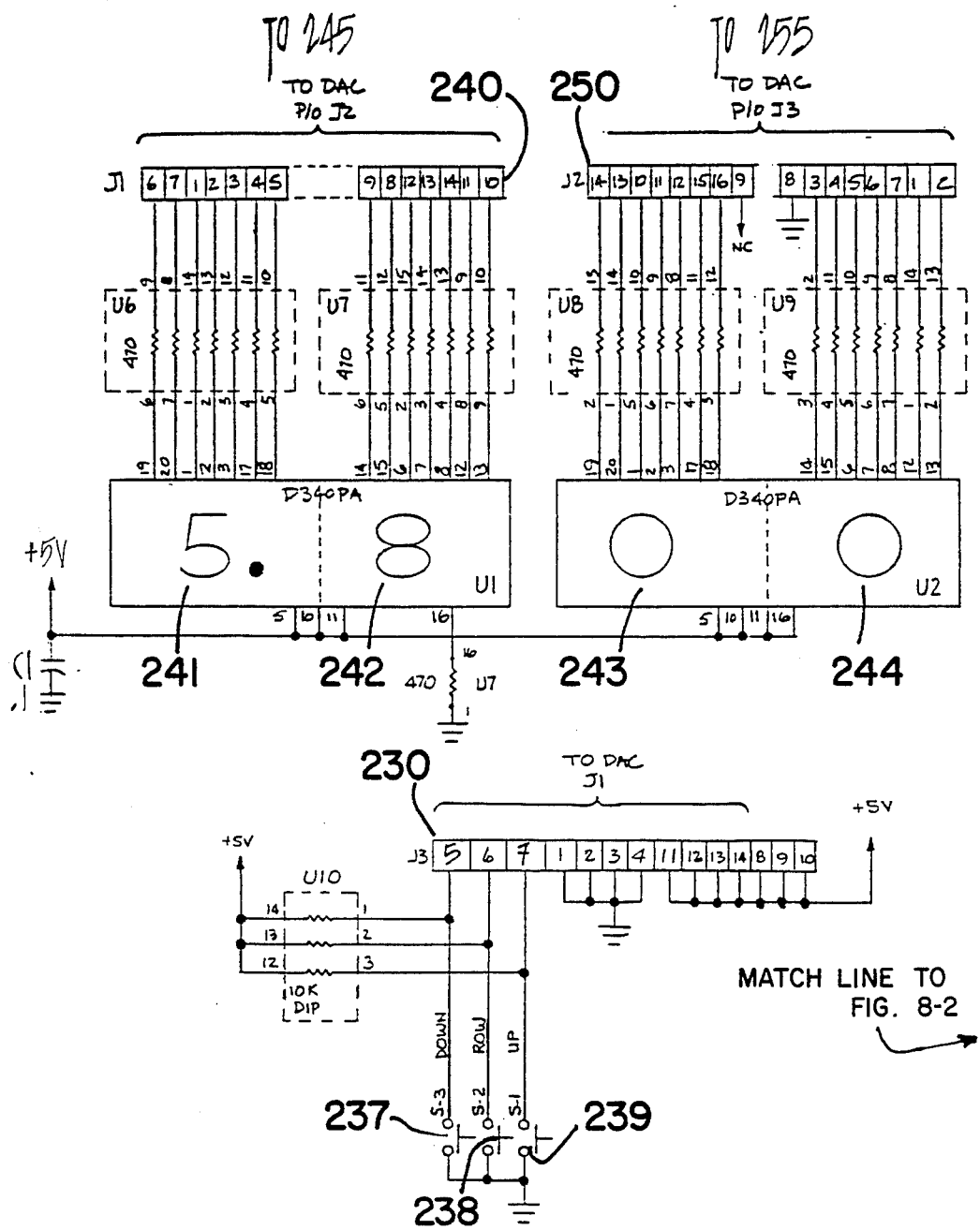
FIG. 8 is a partial pictorial view of the front panel of the frequency controller and some of its associated circuits.
Figures 2, 8:
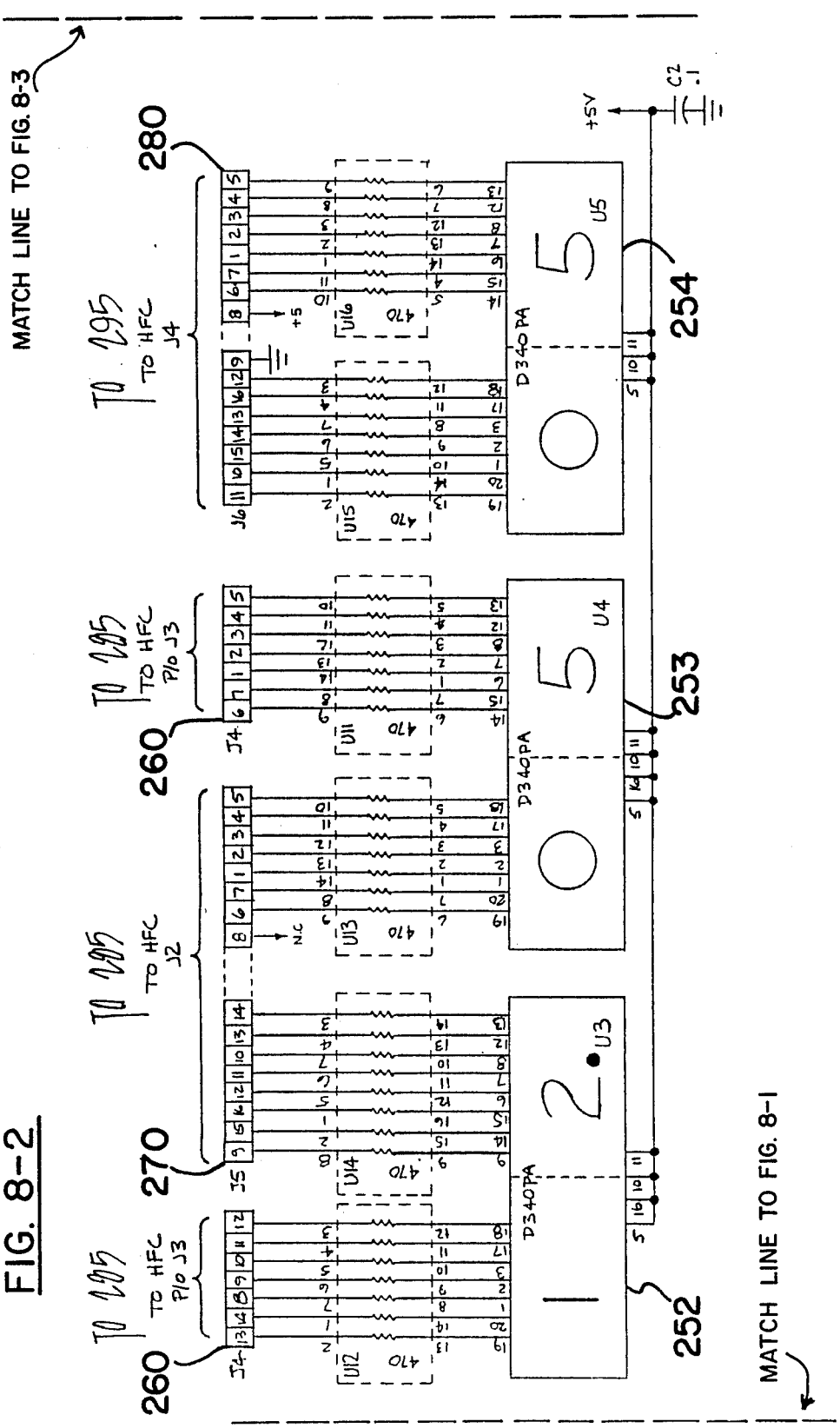
Figures 3, 8:
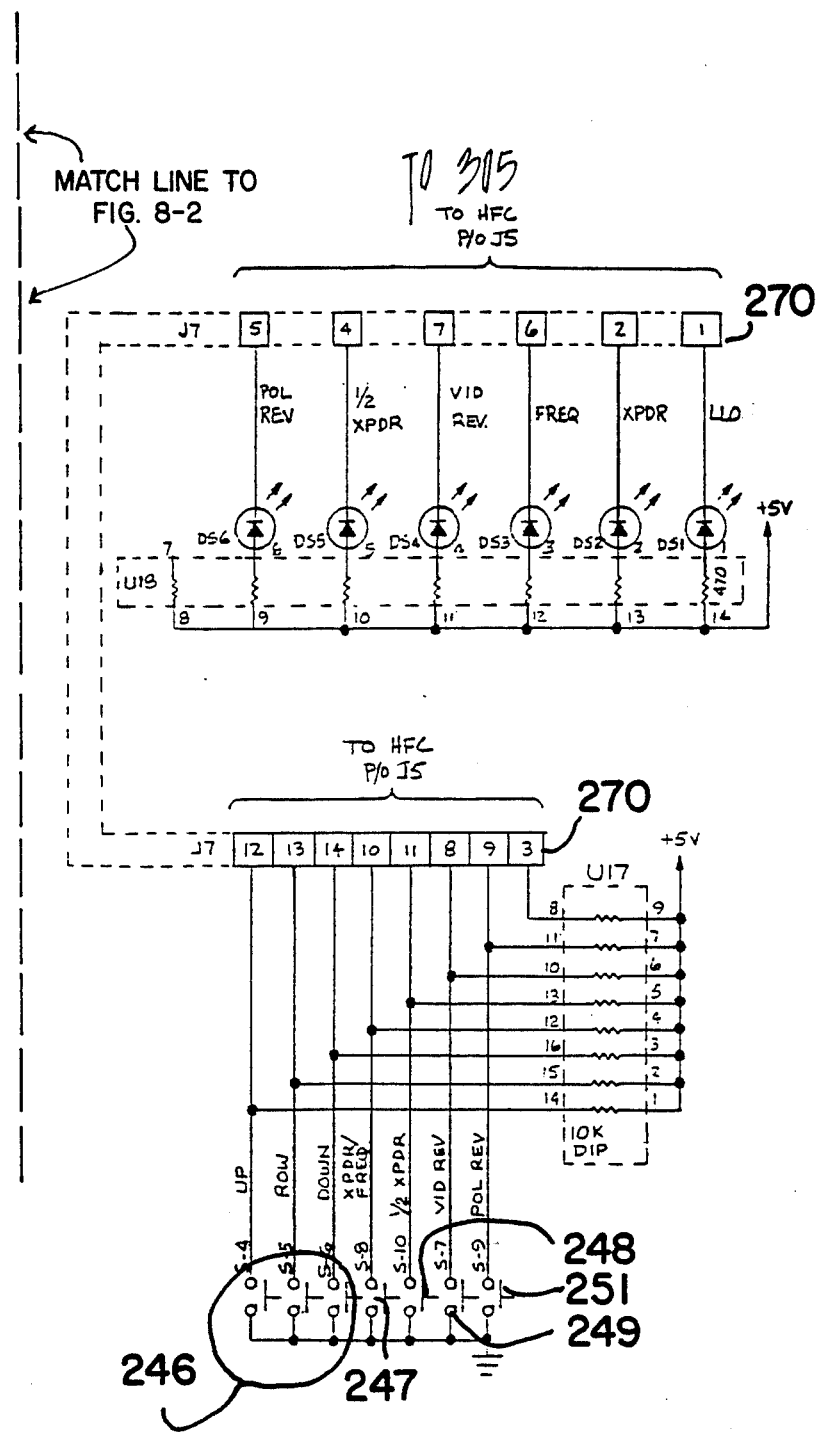

Referring now specifically to FIG. 8 of the accompanying drawings, there is an illustration of the front panel of the frequency controller for the receiver and of the controls thereon. Also included in the drawing is an indication of the interconnection between the various elements of FIG. 8 and the major blocks as illustrated in FIG. 5. All transmission are in BCD format. The leads 232, 233 and 234 which are connected to connectors 265, 255 and 245, respectively, of the dual audio control 146, control the audio sub-carrier frequency to which the receiver is to respond. A connector 230 has connected to pins 5, 6 and 7, three switches 237, 238 and 239. The switch 238 selects the row in the display, that is to be changed and the switches 237 and 239 are used to decrease and increase, respectively, the frequency selected. The audio frequency is displayed at visual indicators, which may be LEDs or liquid crystals, displays 241, 242, 243 and 244 in descending order of importance. Initially when a display is to be selected, the display 241 which displays the most significant digit blinks and can then be stepped up or down. The row button 238 if now depressed causes the display 242 to blink and its number can be changed and so on through 243 and 244. It is noted that the hundreds and thousands display 242 to 241, respectively, are connected from terminal 240 on the front panel to connector 245 of the dual audio control whereas the display members 243 and 244 are connected from connector 250 of the front panel to 255 of the dual audio control. The connector 230 of the front panel, to which the switches 237 to 239 are connected, is connected to the dual audio control 146 via its connector 265. Connector 270 of the front panel is connected to connector 275 of the video frequency control 147 and provides seven different functions to the frequency controller. Again, the front panel provides up/down and row selection switches which are grouped under the reference numeral 246; a transponder/frequency selection switch 247, a half transponder selection switch 248, a video reverse switch 249 and a polarity reverse control switch 251. The transponder mode of the transponder/frequency switch is used only with C band and causes the system to be locked onto a specific transponder by transponder designation rather than frequency designation. Since transponders are arranged in 20 MHz steps, in this mode, the receiver is stepped in 20 MHz increments. In frequency mode the steps are in ½ MHz increments. These local switches enable the operator to quickly and easily set up the receiver properly to receive signals from a specified transponder. The connector 270 also receives on its pins 5, 7, 4, 6, 2, 1 signals for display of the various functions. The six functions controlled by the switches 246, 247, 248, 249 and 251, are as indicated on the drawing. Also provided are frequency and an LLO indicators; the latter indicating that the front panel is locked out. The front panel is provided with the R.F. frequency displays 252, 253, 254, which are connected respectively from connectors 260, 275, 280 and 270 to various of the connectors on the frequency controllers 27, 285, 290, 295 and 305 respectively, as indicated in the drawings.

Figures 1, 9A:
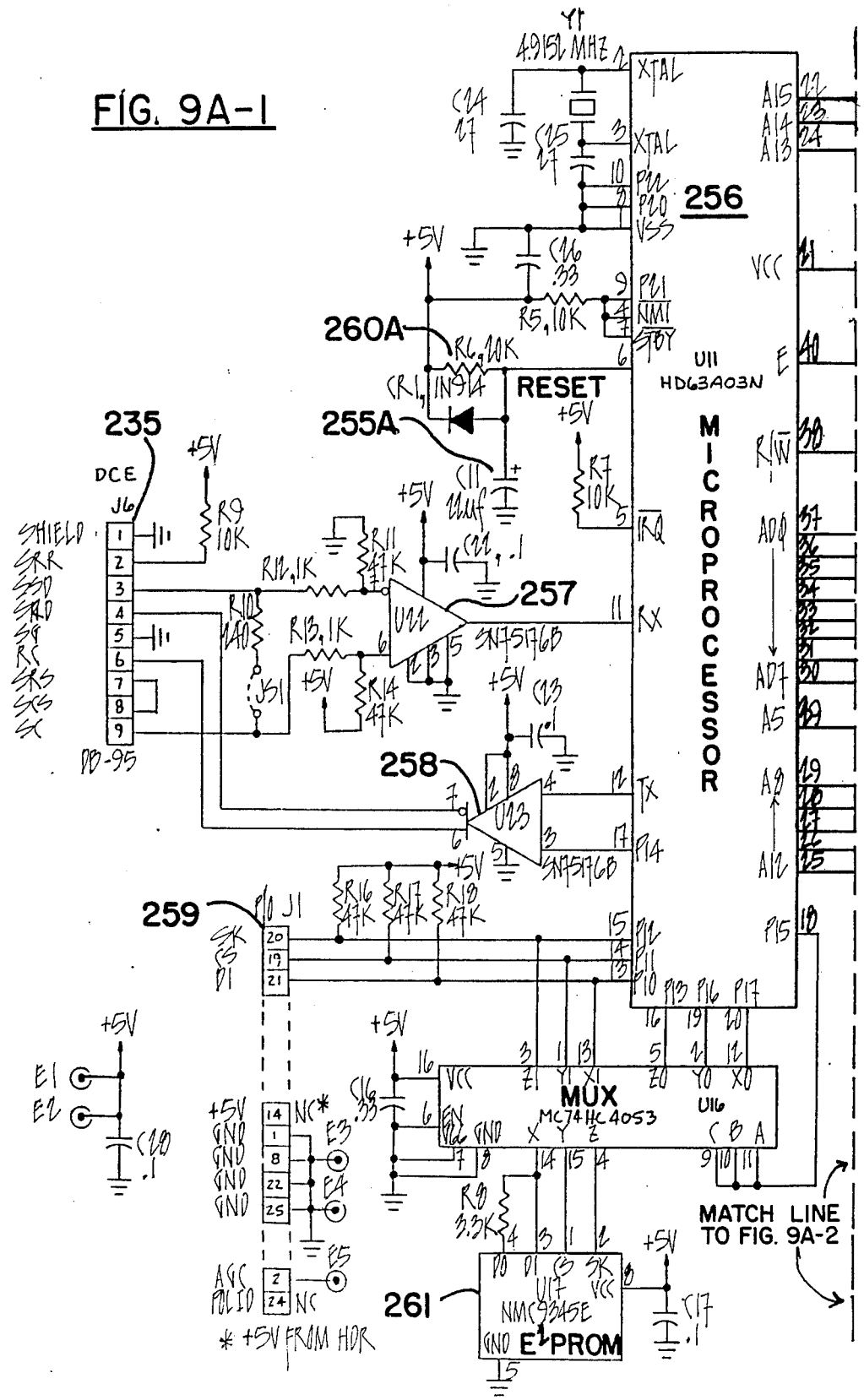
FIGS. 9A and 9B combine to provide a schematic electrical diagram of the video frequency control of the frequency control.
Figures 2, 9A:
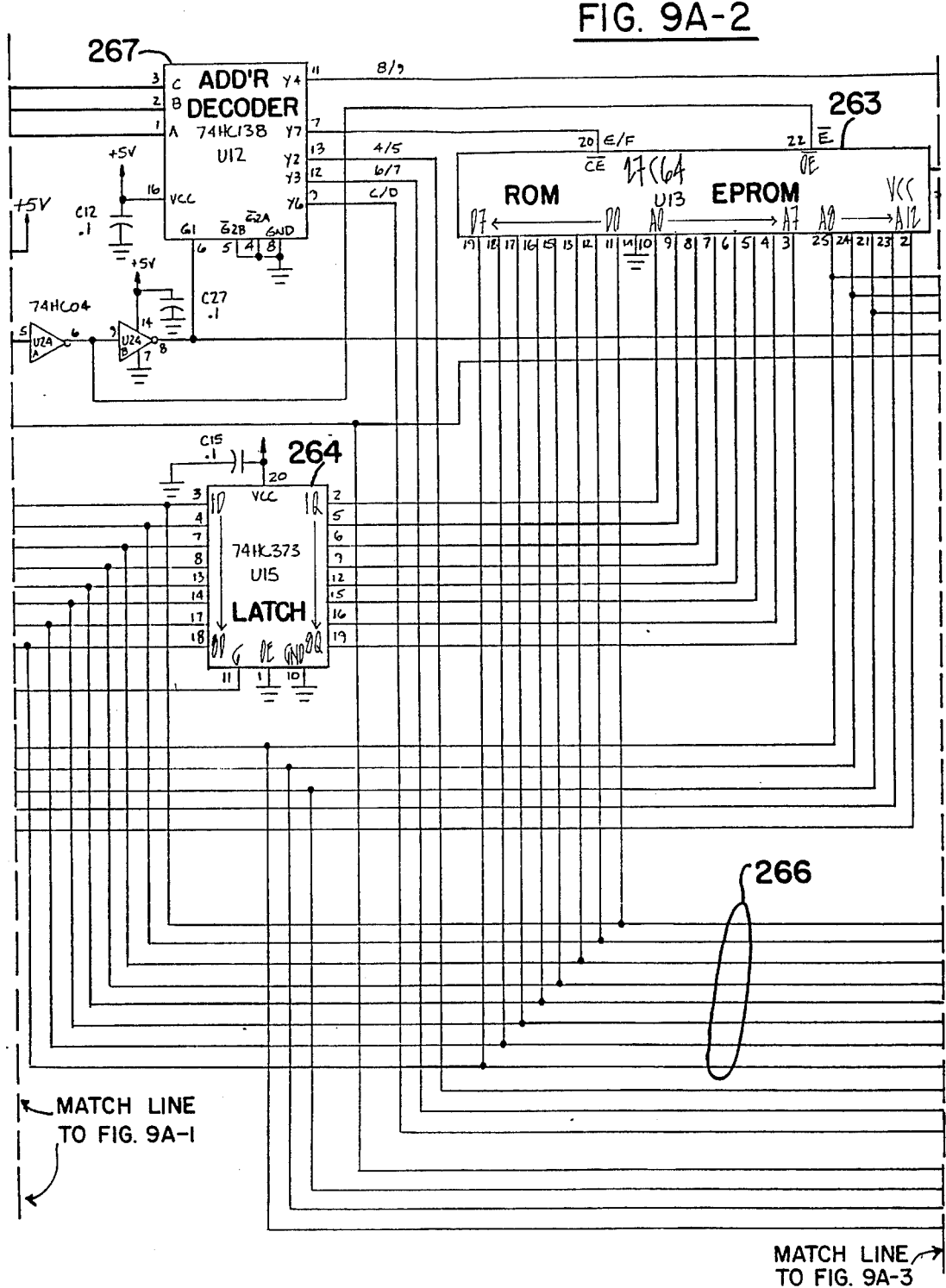
Figures 3, 9A:
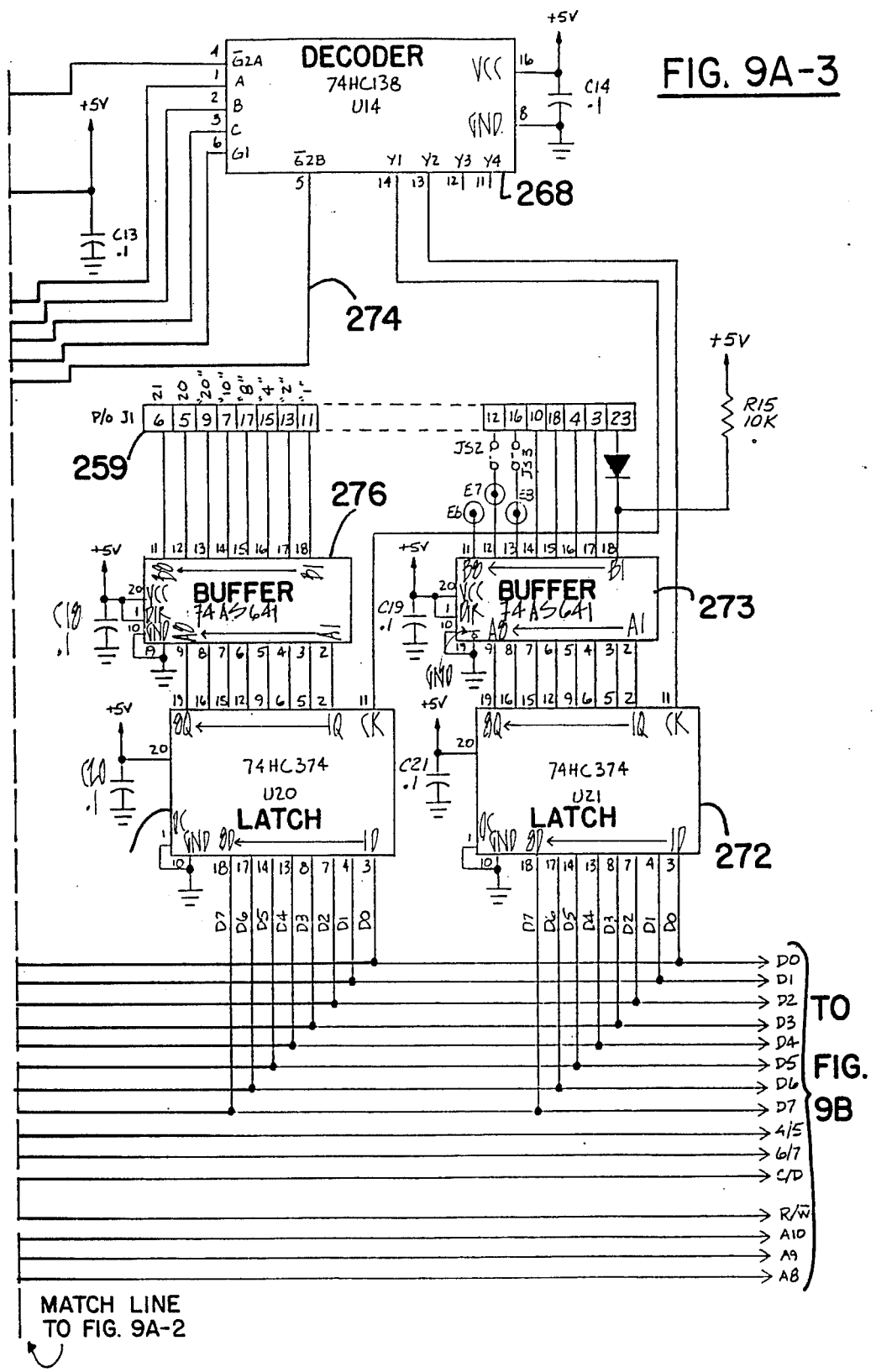

Referring now specifically to FIG. 9A of the accompanying drawings, there is illustrated one-half of the frequency controller 147 of FIG. 5. The frequency controller includes a microprocessor 256 which may be controlled from the front panel, as indicated relative to FIG. 8 and which will be discussed in greater detail both in discussion of this Figure and in the description of the programs. The microprocessor also may be controlled directly from the antenna control unit 17 of FIG. 1 via a connector 259 from an RS422 bus 148, which is also used to transmit information to the control unit 17. Specifically, information to be provided to the microprocessor 256 is supplied on pin 11 from an amplifier 257 connected across pins 3 and 9 of the connector 235. The information comes in as a binary digital stream switching between plus and minus 5 volts. Transmission is via the pin 12 and amplifier 258 with transmission being controlled via pin 17. Pin 17 must be enabled before transmission can occur from the pin 12. The amplifier 258 provides a balanced pair, plus or minus 5 volts, on pins 6 and 4 of connector 235.

The output control to the receiver is via a bus which is designated 149 in FIG. 5 and which is applied via a connector 259 in FIG. 9A. The handshake between the frequency control 147 and the receiver during normal operation is via an EEPROM which in FIG. 9A is designated by the reference numeral 261 and is a National 9345 chip. As will be apparent from the various programs subsequently, the receiver looks at the EEPROM for the frequency information every 17 milliseconds so that the current frequency must be stored in the EEPROM. The communication into and out of the EEPROM 261 is via a MUX 262. It should be noted that on a scan to acquire a new frequency, the communication is directly from the microprocessor 256 to the receiver. If there is no change in the frequency for two seconds, then the information is stored in the EEPROM and the communication thereafter is between the receiver and the EEPROM 261.

The program for running the microprocessor 256 is found in E-PROM 263 which is a read-only-memory. The lower portion of the address to be accessed in the E-PROM 263 is received from a latch 264 in turn fed from the pins 30-37 of the microprocessor 256. Thus the microprocessor selects the lower portion of the address through the latch. The upper portion of the address is not latched and is provided from pins 25-29 of the microprocessor 256. The digital output signals from the E-PROM are gated out through pins 11-19 which connect with data buses D0-D7 generally represented by the reference numeral 266. The data buses feed the microprocessor 256 also through the pins 30-37. It is apparent the pins 30-37 are multiplexed; that is, during the addressing cycle of the ROM, and other elements of the system these pins are output terminals and during the data cycle they may be either input or output terminals. Address and control lines fed from pins 25-29 do not feed a latch since they are not multiplexed. The multiplexing is controlled internally of the microprocessor Control of input from the ROM is through a decoder 267 which receives coding and addressing information from pins 22-24 of the microprocessor and supplies a $\overline{CE}$ on pin 20 and a $\overline{OE}$ on its pin 22. When the signal on pin 20 is low the ROM can be addressed. When the signal on pin 20 is high the E-PROM can read out to the D0-D7 buses 266 at the proper phasing of the signal on pin 22, as will be apparent subsequently upon discussion of the program. The addresses that may be addressed in the ROM are from E000 to FFFF (hexadecimal). The $\overline{CE}$ (chip enable) signal on pin 20 of the E-PROM 263 is enabled whenever there is an address between E000 and FFFF, thus the addressing levels and the enable codes are synchronized by this function.

The frequency controller is provided with a further decoder 268 which controls the output through output connector 259 pins 10, 18, 3 and 23 to the receiver, the pins in the order recited providing the half transponder, polarity reverse, video reverse, frequency reverse and AFC defeat functions. Specifically, the decoder 268 receives addresses from pins 27-29 of the microprocessor 256, decodes them and supplies them to control latches 271 and 272, the latter of which actually controls the output to the receiver through buffer 273 to the aforesaid output pins 12, 16, 10, 18, 4, 3 and 23. The decoder 268 is enabled over a lead 274 from pin 38 which is the read-write enable. The decoder 268 is enabled when the address to the E-PROM is in the range of 8000-9FFF. It is a write only function and takes the data appearing on buses D0-D7 as appropriate and gates it out to the receiver. It should be noted that the information gated through the latch 271 via a buffer 276 is address information provided to the receiver. The frequency information that is to be utilized is residing in the EEPROM 261, and is gated through 272-273. The information on pins 5 and 6 of the terminal 259 is the format information which is also required by the receiver.

A circuit to disable the microprocessor on startup, a timing and hold-off circuit is connected to pin 6 of microprocessor 256; the circuit comprising capacitor 255A and resistor 260A.

Figures 1, 9B:
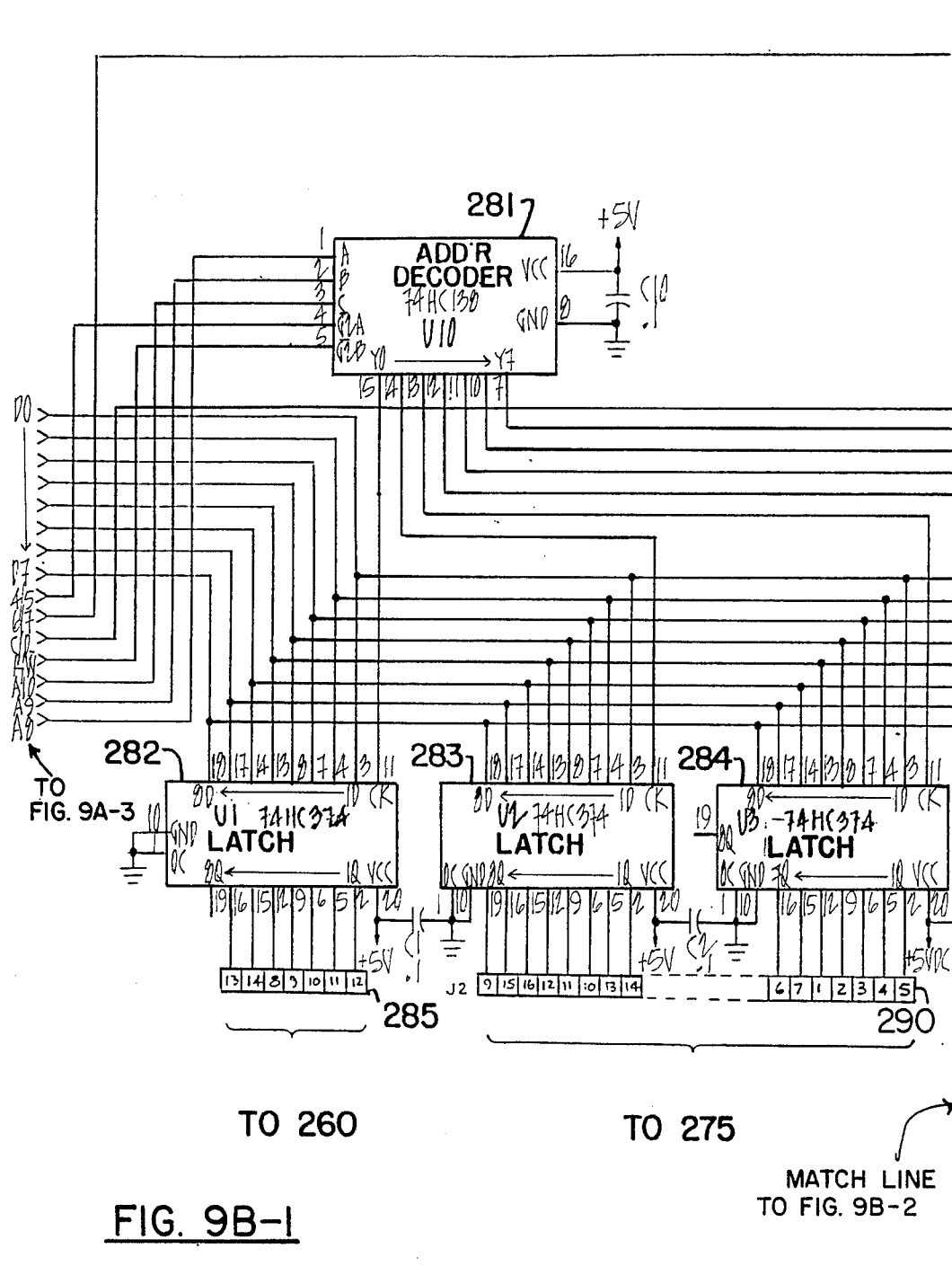
Figures 2, 9B:
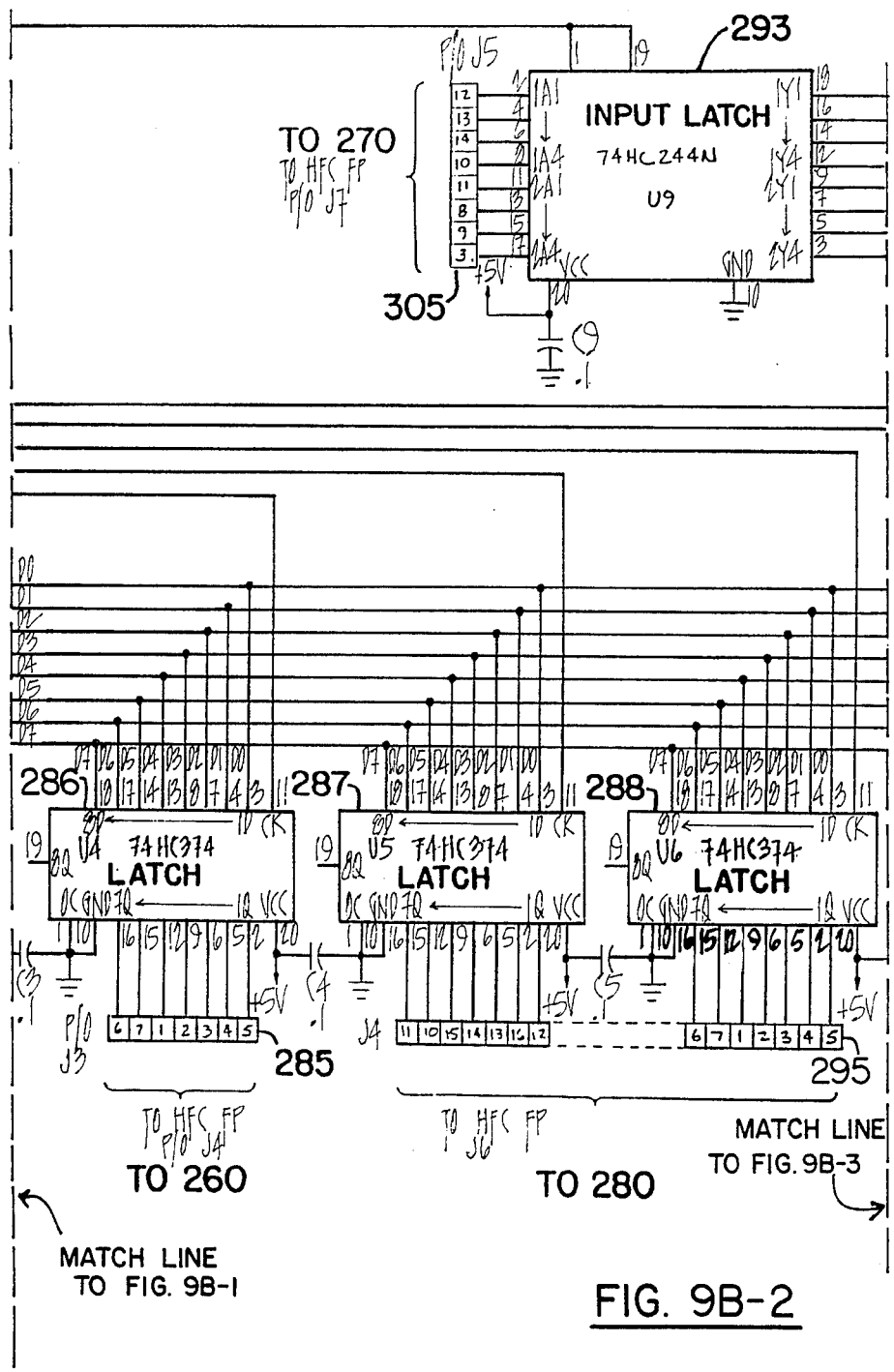
Figures 3, 9B:
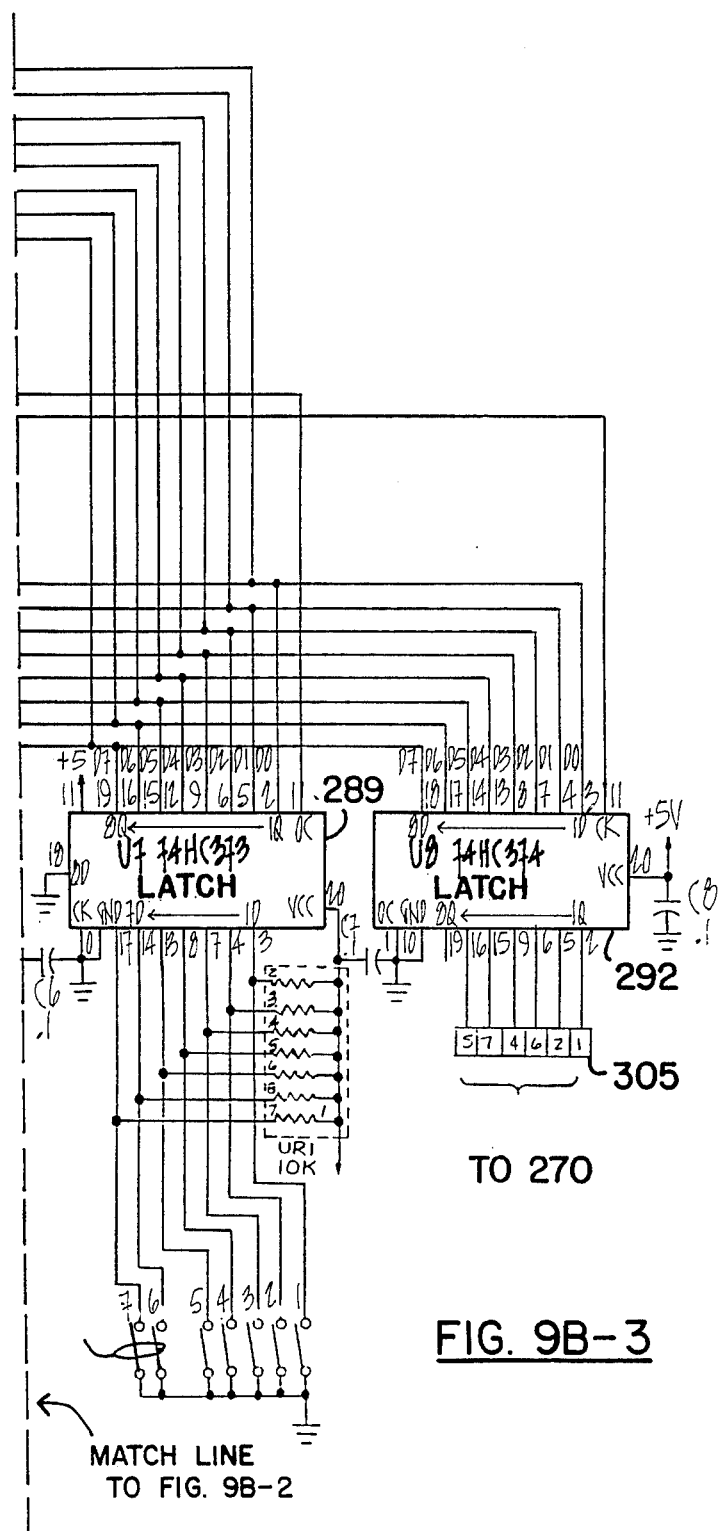

Referring now specifically to FIG. 9B of the accompanying drawings, there is illustrated the interfacing between the front panel 226 and the frequency controller 147. Specifically the interfacing with the frequency control 147 is through the terminals illustrated in FIG. 9B and 290, 285, 295 and 275, interfacing, respectively, with front panel connectors 275, 260, 280 and 270 as illustrated in FIG. 5. Again there are provided the address signals on the leads A8-A10 of the microprocessor, the read-write bar R/$\overline{W}$ signal, the C/D or enable signal and the address signals on leads 4/5 and 6/7, respectively, and the data leads D0-D7. The address and various enable leads go to a decoder 281 which selects the various latches bearing reference numerals 282, 283, 284, 286, 287 and 288. These latches control the displays 252-254 which are the radio frequency displays on the front panel as viewed in FIG. 8.

A latch 289 is employed to read data in the switches designated by the reference numeral 291 and enter into the microprocessor, the address of the specific frequency controller with which this set of switches is associated. The system as previously indicated can control up to four different receivers-frequency controllers from one master control unit 17. A latch 292 reads the condition of data buses 295 to determine such things as video reverse, polarization reverse, half-transponder frequency, transponder/frequency and displays these conditions on front panel LEDs. The element 293 is employed to read the front panel switches, FIG. 8, the up-down and row control and provides the information to the frequency control panel.

Reference is now made to control of the pin diode switch 4AU1 of FIGS. 2 and 4A. As previously indicated the switch 4AU1 is controlled by switch 4CC112 driver from exclusive OR gate 12F of FIG. 4C. the polrity control signals are derived from two sources; the switch 251 of FIG. 8 and the control unit 17. The switch 251 via pin 9 of connector 220 is connected through pin 9 of connector 275, FIG. 9B to latch 293 and to the microprocessor 256 via the output of the latch 293 and data buses 295. Control from the control unit 17 is via the RS422 bus to the microprocessor 256. The microprocessor outputs polarization control on pin 18 of connector 259 to pin 18 of connector 100 of FIG. 4C which drives the exclusive OR gate 127 via exclusive OR 126.

Figures 2, 10:
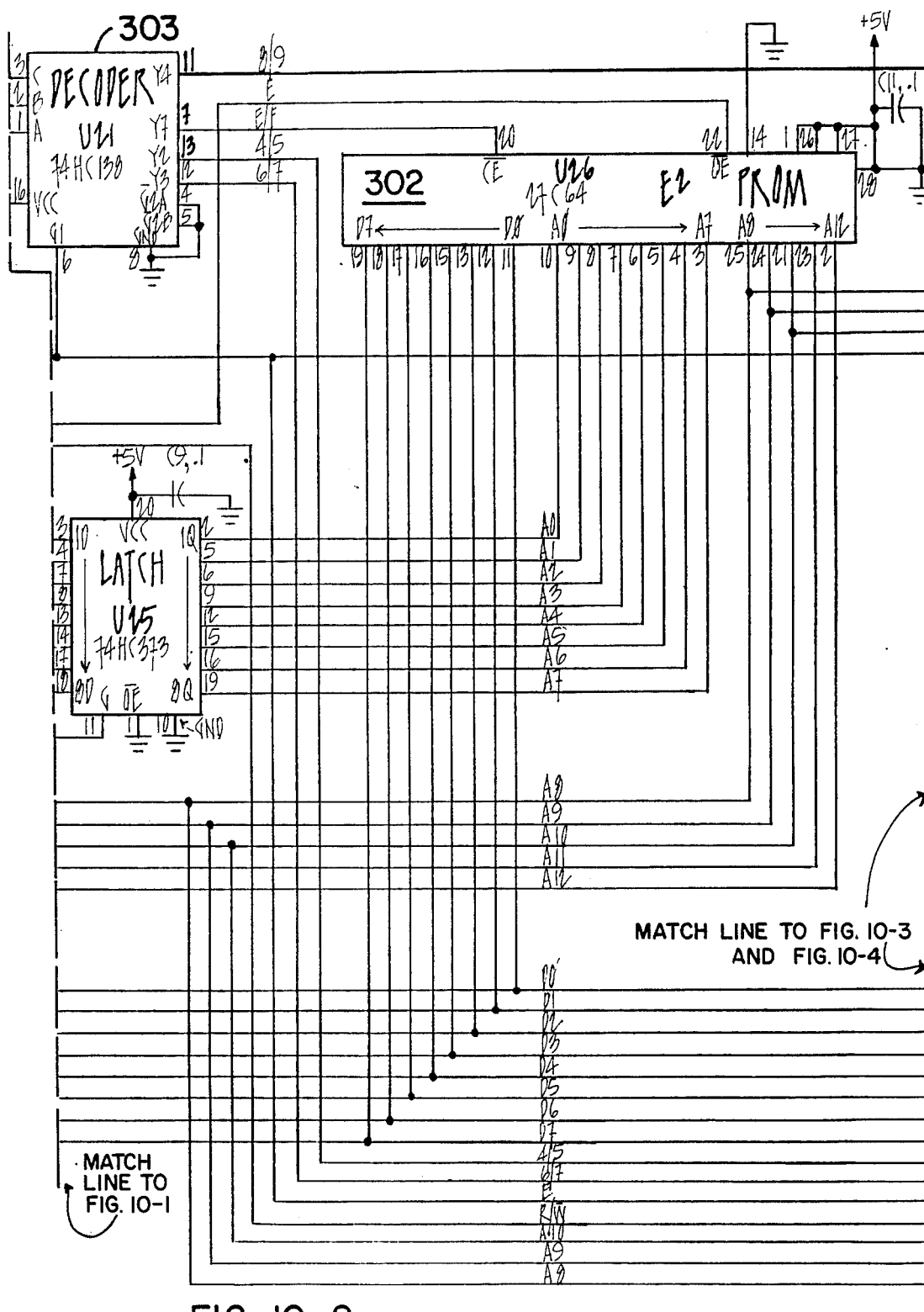
FIG. 10 is a schematic electrical diagram of the audio frequency controller of the frequency control.
Figures 3, 10:
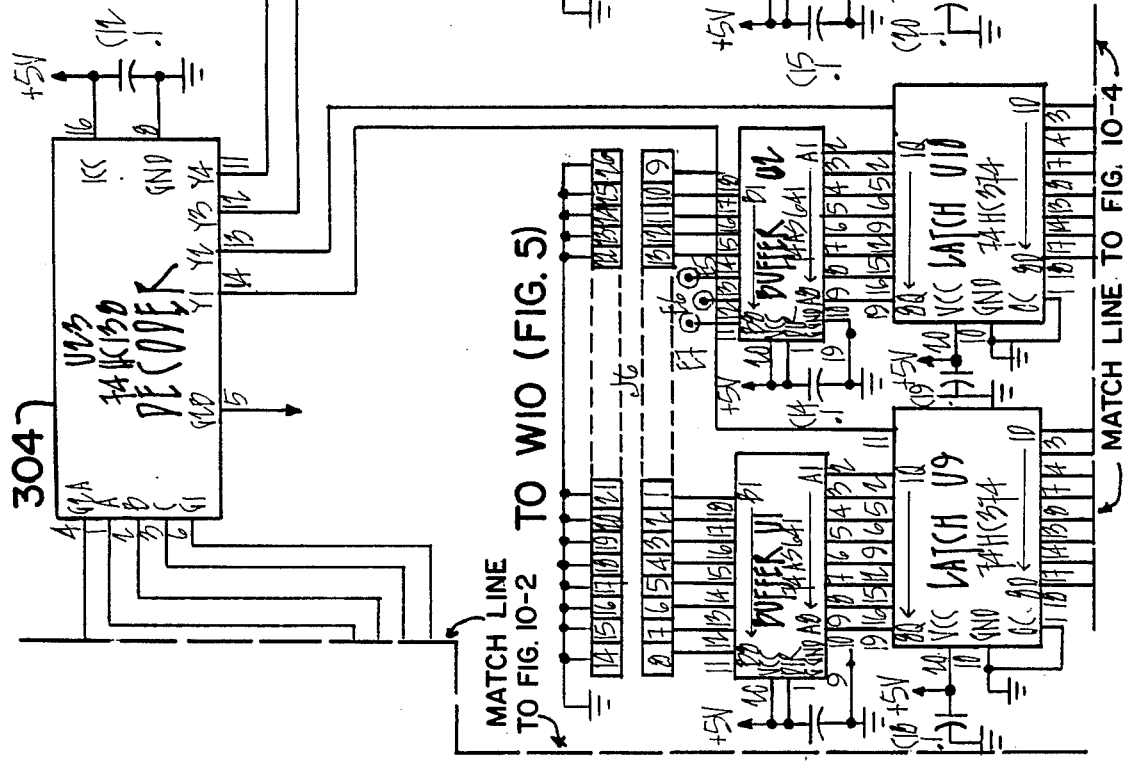
Figures 4, 10:
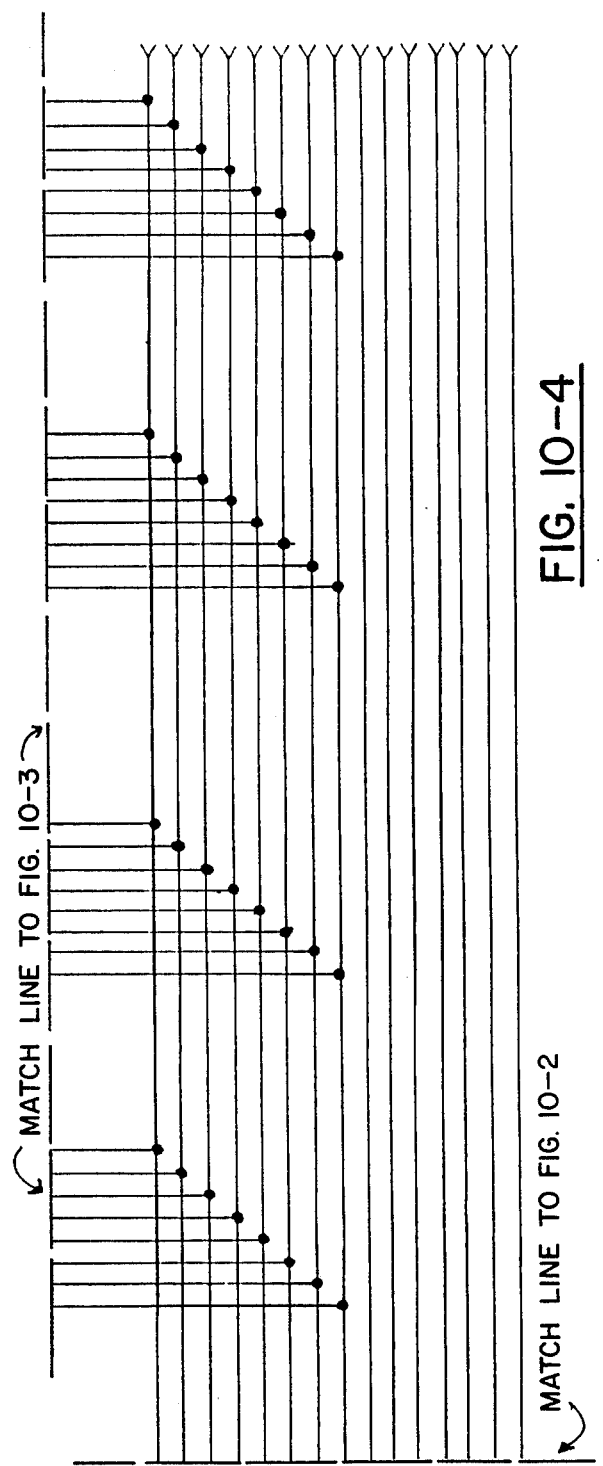

Referring now specifically to the audio control board, reference is made to FIG. 10 of the accompanying drawings. There is illustrated the dual audio control represented by reference numeral 146 in FIG. 5. It will be noted that the control here is essentially identical with that provided by the frequency controller. A microprocessor 301 performs the same functions relative to audio frequency selection as the microprocessor 256 in the rf board. E-PROM 302 has stored therein the program and decoders 303 and 304 perform the same functions as decoders 267 and 268 in the frequency controller. Latch 306 provides the same functions as latch 264 in the frequency controller and the serial EEPROM 307 performs the same memory functions as EEPROM 261 in the frequency controller. Again there is provided the same transmit and receive functions from pins 11, 12 and 17 of the microprocessor 301. The same timing hold-off circuit comprising the resistor 308 and capacitor 309 is found on this microprocessor to permit full voltage to develop when the system is turned on. There are however, a few differences in the circuits in that the EEPROM 307 communicates directly with microprocessor 301 and does not have an intervening MUX such as the MUX 262 in FIG. 9. Also in FIG. 9A, note that there is just one set of controls feeding the connector 269, these comprising the latch 272, buffer 273 and latch 271 and buffer 276. In the audio section there are two sets of these latches and buffers in that the device may be programmed for dual audio control for stereo functions or for two languages related to a single program or data or what have you so that data and voice can be received simultaneously. Two switches designated by common reference numeral 308 perform the same address function as found in FIG. 9B and designated as switches 291. The remainder of the audio controller that corresponds with the displays and front panel controllers as illustrated in FIG. 9B are identical in all respects except for the number of system elements involved.

There is one additional element in the frequency controller 18 and that is the external AGC circuit which is designated by the reference numeral 151 in FIG. 5. This circuit is illustrated in block diagram detail in FIG. 11 and is utilized to provide a narrower AGC circuit then is normally found in this type of receiver. The broad band AGC circuit found in most receivers and in fact in the receiver of the present invention for internal receiver control is so broad that when attempting to provide the proper polarization, horizontal or vertical, the AGC is so insensitive that it is not possible to truly distinguish a changeover from one to the other polarization; the signals overlapping. By narrowing the band from 36–40 MHz down to 20 MHz, the signal is sufficiently well defined that a good gap is provided in the AGC signals, when changing polarizations. Thus, in order to be able to properly control polarization it was necessary to decrease the width of the AGC band.

Specifically, the 600 MHz IF frequency is applied via a lead 12A3 to a RF monolithic 20 MHz band-pass filter 11AU1 which is a saw filter. An AGC integrator circuit 11AU1 includes an amplifier 334 and a capacitor 376; at 1500 picofarads, providing the integrating capacitor of the system. The output of the system goes through dual op-amps 337 to produce the AGC output on pin 7 thereof. The pin 7 is connected to pin 2 of connector 4CJ3 of FIG. 4C.

Reference is now directed to the antenna control unit which is designated by the reference numeral 17 in FIG. 1. Reference is initially made to FIG. 12A of the accompanying drawings which illustrates the control front panel, including a keyboard 325 of the antenna control unit. The antenna control unit has a front display controlled through the keypad so that the operator can follow the instructions being inserted and respond to requests for information from the resident programs. Detailed examples of the use of the keypad are described subsequently.

The antenna control unit can store up to 200 setups. To recall a setup the key which is marked TIM in the upper part and SAT in the bottom part, is depressed once which means satellite. The operator then keys in, on the number keypad, for instance 001, which will call up the information (setup) necessary to acquire the satellite that has been designated in this particular setup as 001. If desired the operator could also dial it in by letters, in other words, if the operator wanted the ESPN station, the sports station, he keys in ESPN. In order to use the name function in addition to the assigned setup number to call the setup, the stored setup must contain the desired name. This entry will recall from internal memory of the control unit all of the information necessary to acquire that satellite. It will cause the antenna to be rotated to point to the specified satellite, it will cause the proper polarization to be introduced into the feed, it will cause the receiver to be tuned to the proper transponder frequency, video and audio frequencies, it will also control whether the video is to be reversed, and all the other functions that are necessary to acquire a particular transponder on a particular satellite. It will also designate whether C or Ku band is to be received and in the event it is a Ku band whether a full or half transponder is involved.

A setup can be stored in the memory of the control unit 17 through the keypad 325 illustrated in FIG. 12A by pressing the key MOV, moving the satellite to the general location of the satellite, keying in the frequencies desired, keying in the proper polarization. Keying in Program 2 will cause the antenna to go through a search routine to maximize the AGC signal on the particular satellite that is wished to be acquired. When all of this information, including the frequencies, etc., has been set up, the store, STO, then SET keys are struck to actually store the information with a system assigned number and a name designation if desired. Greater detail on the use of the keypad is provided subsequently.

As has been previously indicated during initial acquisition of a satellite or acquisition of a satellite other than by a setup it is simpler to key the frequencies in at the frequency controller 18 and only do the antenna control directly from the antenna control unit, again, utilizing the narrow band AGC signal. It should be remembered that not only does the frequency controller provide direct control of audio and video frequency but also of the video reverse or nonreverse; polarity, vertical or horizontal; formats and transponder and half transponder functions. Thus, as indicated above, the only functions necessary at the antenna controller 17 are the movement of the antenna, and of course, when the entire setup has been completed, storing the information under a given number and if desired, name. In the operation of the keys that have dual indications, the lower function is selected by pressing the key once. By pressing it a second time, the upper function is selected. All the various other functions on the keypad are explained below. It should be noted however that the user is stepped through a program, for instance, if the satellite were to be acquired from the keypad of the antenna controller it will prompt the operator by asking questions concerning frequency, video frequency, audio frequency, polarization, video reverse, C band, Ku band, etc., so that the information is provided in a specific sequence under control of the internal program of the control unit.

It will be noted from FIG. 12A that there are six display lights, the top one indicating when the polarization is counterclockwise, the one immediately below indicating a polarization is clockwise, the two next lights indicating whether the antenna is moving west or east and the lower two indicating whether the elevation is being controlled and whether the antenna is moving down or up. In the system to be discussed herein and the program subsequently discussed, a polar mount antenna is employed and therefore there will be no elevation up or down control although this is an available function with a modified program used in other systems with which this antenna control unit is employed. An "off sat" indicator 326 is also provided as an indication that for some reason or another a satellite has been lost or not acquired. This situation may occur particularly in the Ku band as a result of weather interference but it is available as an indicator to the operator regardless of the cause of the loss of the satellite. A cluster of five holes 327 in the middle of the panel immediately below display panel 328 permits the emission of sound from an alarm energized on selected functions as was described above. Various functions available at the keypad are now described.

TO MOVE THE ANTENNA EAST OR WEST

1. Depress MOV and (arrows) for West movement, and MOV and (arrows) for East movement. Display will indicate "MOVING EAST" or "MOVING WEST" and the proper LED will light.
2. To stop movement, depress the arrow button a second time. Display will indicate "ANTENNA STOPPED".
3. To move polarity, depress MOV then AZ,EL,PL until the display indicates "POLARITY". Then depress (arrows) for counterclockwise or (arrows) for clockwise movement. To stop polarity, depress the arrow button a second time.

KEYBOARD FUNCTIONS

To access any character on the keyboard, for alphanumeric entering, depress the button on which the desired character appears, then depress the (arrows) button repeatedly until the desired character appears on the screen.

Example: To enter the letter F. First, depress the DEF2 button. Display will indicate "D". Depress the (arrow) button, display will indicate "E". Depress the (arrows) again, and the display will indicate "F". Now go on to the next letter to be entered.

INITIAL SETUP

1. If there are setups in the unit, the E-PROM must be cleared by the following procedure:
   a. Make sure there is a picture.
   b. Depress SET 5.
   c. Display will indicate "CLEAR E-PROM? Y/N", enter Y.
   d. Wait approximately one minute until display indicates "SYSTEM OFF SAT".
2. E-PROM is now clear.
3. Enter PGM 1. Display will indicate "LONGITUDE?". Enter correct longitude. (Must enter 4 characters.) NOTE: This is the longitude of the earth station.
4. Display will indicate "LATITUDE?". Enter correct latitude. (Must enter 3 characters.) Display will indicate "SYSTEM OFF SAT". NOTE: This is the latitude of the earth station

SET CLOCK

1. Depress SET.
2. Display will indicate "SET?".
3. Depress CLK twice.
4. Display will indicate "DAY hh:mm PM/AM MM/DD/YY".
5. Enter HOUR/MINUTES/A or P/MONTH/DAY/YEAR.

Now you are ready to proceed and begin programming the MAT system.

The following is an example of how to program a satellite and a setup for Galaxy 1 (G1) Transponder 09.
1. Depress the XPDR/FREQ mode switch on the Frequency Controller (18) to the XPDR mode.
2. Depress the UP/DOWN switch on the Frequency Controller (18) to XPDR 09.
3. Set VID REV, ½ XPDR and POL REV to the OFF position on HFC.
4. Set the audio frequency on the Frequency Controller (18) to 6.800 MHz by using the UP/DOWN and ROW keys.
5. Manually move the antenna East or West until you find ESPN on Galaxy 1 (134° XPDR 09. NOTE: You may have to adjust the polarity to find ESPN.
6. After you have found ESPN, adjust the polarity manually for the best picture quality.
7. Manually move the antenna East and West for the best picture quality.
8. Proceed to next three sections for storing a satellite, relay functions and setups.

STORING A SATELLITE

1. Depress RCL/STO twice. Display will indicate "STORE?".
2. Depress TIM/SAT. Display will indicate "SATELLITE?".
3. Enter a two character alphanumeric; Example G1. NOTE: Do not designate the same alphanumeric code for two or more satellites.
4. Display will indicate "LONGITUDE G1 NNN.N". NOTE: You must enter a four-digit number.
5. Enter 134.0. NOTE: This is the longitude for G1.
6. Display will indicate "I'M THINKING". NOTE: The computer is calculating the hour angle for G1 at your location.
7. Display will indicate "POLARITY H/V?".
8. Look up in a current satellite guide what polarity XPDR 09 is on Galaxy 1. It is horizontal.

9. Depress H.
10. Display will indicate "G1-----58.4". NOTE: 58.4 is the hour angle for location for Galaxy 1.
11. Depress PGM, 2. NOTE: PGM 2 provide a very fine auto peak of the antenna system.

SETTING ALL EIGHT RELAYS

1. Depress RLY twice.
2. Display will indicate "SET RELAY #?".
3. Depress 0. (the number 0)
4. Display will indicate "OPEN/CLOSED RELAY 1?X". NOTE: The X will be either 0 or C denoting Relay #1 is O (open) or C (closed).
5. If you wish to change Relay #1 to a different state, depress O (the letter) or C.
6. The display will automatically scroll to Relay #2.
7. If you want to change the display, depress 0 or C.
8. Continue to Relay #8.

SETTING ONE RELAY 1 TO 8

1. Depress RLY twice.
2. Display will indicate "SET RELAY #?".
3. Depress the Relay # you want.
4. Display will indicate "OPEN/CLOSE RELAY $X_1$?$X_2$". note; $X_1$ is the number you entered in step 3; $X_2$ is O (open) or C (closed) relay.
5. Depress O (open) or C (closed).

STORING A SETUP

1. Depress RCL/STO twice. Display will indicate "STORE?".
2. Depress RLY/SET. Display will indicate "ENTER REC PAIR?".
3. If you have one receiver, depress 1,1.
4. If you have two receivers, depress 1,2.
5. Display will indicate "STORING SETUP".
6. Display will indicate "SETUP NAME?".
7. Enter a four-digit alphanumeric; example ESPN. NOTE: Do not designate the same alphanumeric code for two or more setups.
8. Depress MOV.
9. Display will indicate the setup number you are storing. Example: "SETUP #-------".
10. Depress (arrows).
11. Display will indicate the satellite and the hour angle you are on for your location. Example: "G1-----58.4".

PROGRAMMING THE MICRODYNE AUTOMATED TERMINAL (KU BAND)

The following is an example of how to program a satellite and a setup for RCA-K2, 11.7290 H or 11.8765 V, or both.
1. Manually move the antenna East or West until you have an OFF SAT alarm on the front panel of the control unit 17.
2. Depress the XPDR/FREQ mode switch on all HFCs to the FREQ mode.
3. Set the RF frequency on the first Frequency Controller to 11.7290 by using the UP/DOWN and ROW keys.
4. If you have a second Frequency Controller, set the RF frequency to 11.8765 by using the UP/DOWN and ROW keys.
5. Depress the VID REV on all Frequency Controllers to the ON position.
6. Depress the ½ XPDR and POL REV on all HFCs to the OFF position.
7. Set the audio frequency on all the Frequency Controllers to 6.200 MHYz by using the UP/DOWN and ROW keys.
8. Depress REC. The display will indicate "ENTER REC ADDR?".
9. Enter 1.
10. The display will indicate "LLO Y/N?".
11. Enter N.
12. The display will indicate "REC POL REV Y/N?".
13. Enter N.
14. The display will indicate "VIDEO REVERSE Y/N?".
15. Enter Y.
16. The display will indicate "C/KU?".
17. Enter K.
18. Depress CLR.
19. Manually move the antenna East or West until you find NBC on RCA-K2 (081). NOTE: You may have to adjust the polarity to find NBC.
20. After you have found NBC, adjust the polarity manually for the best picture quality.
21. Manually move the antenna East and West for the best picture quality.
22. Refer to above four sections for storing the satellite, relay functions and setups.

PROGRAMMING A NEW SETUP ON AN EXISTING SATELLITE PROGRAMMED IN MEMORY

1. Depress MOV. Display will indicate "MOVE?".
2. Depress SET. Display will indicate "SETUP#?".
3. Enter a three-digit number that corresponds to the satellite you want to store a setup on. Example: Setup 001 is G1.
4. Select, if necessary, VID REV, ½ XPDR for your new program material you want to store on the HFC.
5. Select the new transponder (XPDR) or frequency you want to store on the HFC.
6. Adjust the polarity if necessary.
7. Refer to paragraphs entitled SETTING ALL EIGHT RELAYS, SETTING ONE RELAY 1 TO 8 and STORING A SETUP to finish.

STORING NON-REPETITIVE TIMER

The non-repetitive timer is used only for a special event you want to program once. You may program up to 16 non repetitive events. After the MAT System has executed that event, it will be erased from memory.
1. Depress SET.
2. Display will indicate "SET?".
3. Depress TIM twice.
4. The display will indicate "REPETITIVE(Y/N)?".
5. Enter N.
6. Display will indicate "SETUP#?".
7. Enter the setup # you want to store NNN. NOTE: If an error is made, such as NN, depress (arrows) and re-enter the setup number.
8. Display will indicate "DATE?".
9. Enter the date you want to store MM/DD/YY. NOTE: If an error is made, such as MM/DD/Y, depress (arrows) and re-enter the date.
10. Display will indicate time "(hh:mm)?".
11. Enter the time you want the event to come on. (hh:mm) NOTE: If an error is made, such as hh:m, depress (arrows) and re-enter the time.

STORING REPETITIVE TIMER

The repetitive timer is used for an event that you want to program that comes on every week. For example, every Thursday at 10:01 A.M. you want to go to setup 001. You may program up to 16 repetitive events.
1. Depress SET.
2. Display will indicate "SET?".
3. Depress TIM twice.
4. The display will indicate "REPETITIVE(Y/N)?".
5. Enter Y.
6. Display will indicate "SETUP#?".
7. Enter the setup #you want to store NNN. NOTE: If an error is made, such as NN, depress (arrows) and re-enter the setup number.
8. Display will indicate time "(hh:mm)?".
9. Enter the time you want the event to come on (hh:mm). NOTE: If an error is made, such as hh:m, depress (arrows) and re-enter the time.
10. Enter A (A.M.) or P (P.M.).
11. Display will indicate "SUNDAY(Y/N)?".
12. Enter Y if you want the event programmed on Sunday or N (no) if you do not.
13. The display will continue to scroll through the week.
14. Continue until you find the day of the week you want to store.
15. Enter Y on the day or days you want to store the event.
16. The display will indicate "TIME $X_1X_1$ SETUP XXX". NOTE: $X_1X_1$ is one of the 16 repetitive events stored.
17. Scroll to right (arrows) to check time and the day or days you programmed the event.
18. Depress (arrows).

TO CLEAR A SETUP

1. Depress RCL/STO. Display will indicate "RECALL?"
2. Enter S. Display will indicate "CLR SETUP#?".
3. Enter the setup number you want to clear. Example: Enter 003.

TO CLEAR A SATELLITE

1. Depress RCL.
2. Display will indicate "RECALL?".
3. Depress SAT.
4. Display wil indicate "PRINT(Y/N)?".
5. Enter N.
6. Display will indicate "CLEAR SAT (Y/N)?".
7. Enter Y.
8. Display will indicate "SATELLITE".
9. Enter the satellite you want to clear. Example: G1.
10. Display will indicate "I'M THINKING".

CLEARING A REPETITIVE TIMER EVENT

1. Depress RCL.
2. Display will indicate "RCL?".
3. Depress TIM twice.
4. Display will indicate "PRINT(Y/N)?".
5. Enter N.
6. Display will indicate "REPETITIVE(Y/N)?".
7. Enter Y.
8. Scroll (arrows) or (arrows) until you find the event you want to clear.
9. Depress C, then TIM twice, quick.

CLEARING A NON-REPETITIVE TIMER EVENT

1. Depress RCL.
2. Display will indicate "RECALL?".
3. Depress TIM twice, quick.
4. Display will indicate "PRINT(Y/N)?".
5. Enter N.
6. Display will indicate "REPETITIVE(Y/N)?".
7. Enter N.
8. Display will indicate "NON-REPETITIVE TIME $x_1x_1$ SETUP XXX---".
9. Scroll (arrows) or (arrows) until you find the event you want to clear.
10. Depress C, then TIM twice, quick.
11. Display will indicate "TIME CLEARED". Depress Y to return.

MANUAL RF FREQUENCY SCAN KU BAND

1. Depress REC.
2. Display will indicate "ENTER REC ADDR?".
3. If you have one HFC enter 1; if you have two Frequency Controllers, enter 1 or 2.
4. Display will indicate "LLO(Y/N)?X".
5. Enter N.
6. Display will indicate "REC POL REV (Y/N)?X".
7. Enter N.
8. Display will indicate "VIDEO REV (Y/N)?X".
9. Enter Y.
10. Display will indicate "C/KU BAND (C/K)?X".
11. Enter K.
12. Display will indicate "HALF XPDR (Y/N)?X".
13. Enter the appropriate one.
14. Display will indicate "MODE DIR/AUTO/MAN?".
15. Enter M.
16. Display will indicate "FREQUENCY XX.XXXX".
17. Enter 11.7000. NOTE: You will be slewing up from this frequency.
18. Display will indicate select "UP/DWN/CLR".
19. Depress (arrows).
20. Display will indicate "SLEWING UP".
21. If you want to stop the slewing, depress (arrows).
22. If you want to slew down, depress (arrows).
23. If you want to stop, depress (arrows).
24. To exit the slewing mode, stop the slewing by depressing (arrows) or (arrows) until you have the display UP/DWN/CLR, then depres CLR.

MANUAL AUDIO SCAN

1. Depress REC.
2. Display will indicate "ENTER REC ADDR?".
3. If you have one HFC, enter 1; if you have two HFCs, enter 1 or 2.
4. Display will indicate "LLO(Y/N)?".
5. Enter A.
6. Display will indicate select "DIR/MANUAL".
7. Enter M.
8. Display will indicate "AUDIO FREQ.?X.XXX".
9. Enter 5.000. NOTE: You will be slewing up from this frequency.
10. Display will indicate select "UP/DWN/CLR".
11. Depress (arrows).
12. To stop the slewing, depress (arrows).
13. To slew down, depress (arrows).
14. To stop the slewing, depress (arrows).

15. To exit the slewing mode, stop the slewing by depressing (arrows) or (arrows) until you have the display UP/DWN/CLR, then depress CLR.

TO MOVE TO A SETUP

1. Depress MOV.
2. Display will indicate "MOVE?".
3. Depress SET.
4. Display will indicate "SETUP#?".
5. Enter setup number.

TO MOVE TO 4-DIGIT ALPHANUMERIC

1. Depress MOV.
2. Display will indicate "MOVE?".
3. Enter 4-digit alphanumeric. Example: ESPN.
4. Depress MOV.

RECALL TIME CLOCK

1. Depress RCL.
2. Display will indicate "RECALL".
3. Depress CLK twice.
4. Display will indicate the current day, time, A.M. or P.M. and date in memory.
5. Depress CLR to return.

TO PRINT ALL SATELLITES STORED IN MEMORY

1. Connect a printer to the RS-232 output of the MAPS-4.
2. Depress the SEL button on the printer to OFF, then ON.
3. Depress RCL/STO. Display will indicate "RECALL?".
4. Depress TIM/SAT. Display will indicate "RECALL SAT PRINT? Y/N".

TO PRINT ALL SETUPS IN MEMORY

1. Connect a printer to the RS-232 output of the MAPS-4.
2. Depress the SEL button the printer to OFF, then ON.
3. Depress RCL/STO. Display will indicate "RECALL?".
4. Depress RLY/SET. Display will indicate "PRINT-(Y/N)?".
5. Enter Y if you want a printout.

PRINTING NON-REPETITIVE AND REPETITIVE TIMER SETUPS

1. Connect a printer to the RS-232 output of the MAPS-4.
2. Depress the SEL button on the printer to OFF, then ON.
3. Depress RCL.
4. Display will indicate "RECALL?".
5. Depress TIM twice.
6. Display will indicate "PRINT? (Y/N)".
7. Enter Y for yes.

FREQUENCY CONTROLLER (18) DIRECT ENTRY PROGRAMMING VIA THE ANTENNA CONTROL UNIT 17 (KU BAND)

1. Depress REC.
2. Display will indicate "ENTER REC ADDR?".
3. Enter the receiver you want to address. Example 1.
4. Display will indicate "LLO(Y/N)?X".
5. Enter N.
6. Display will indicate "REC POL REV (Y/N)?X".
7. Enter N.
8. Display will indicate "VIDEO REV (Y/N)?X".
9. Enter Y.
10. Display will indicate C/KU BAND (C/K)?X".
11. Enter K.
12. Display will indicate "HALF XPDR (Y/N)?X".
13. Enter the appropriate on efor the programming content.
14. Display will indicate "MODE DIR/AUTO/MAN?".
15. Enter D.
16. Display will indicate "FREQUENCY? XX.XXXX".
17. Enter frequency. Example: 12.0535.
18. Display will indicate "SELECT DIR/MANUAL".
19. Enter D.
20. Display will indicate "AUDIO FREQ? X.XXX".
21. Enter audio frequency. Example: 6.800.
22. Display will indiacate "SYSTEM OFF SAT".

FREQUENCY CONTROLLER (18) DIRECT ENTRY PROGRAMMING VIA THE ANTENNA CONTROL UNIT 17 (C BAND)

1. Depress REC.
2. Display will indicate "ENTER REC ADDR?".
3. Enter the receiver you want to address. Example: 1.
4. Display will indicate "LLO(Y/N)?X".
5. Enter N.
6. Display will indicate "REC POL REV (Y/N)?X".
7. Enter N.
8. Display will indicate "VIDEO REV (Y/N)?X".
9. Enter N.
10. Display will indicate "C/KU BAND (C/K)?X".
11. Enter C.
12. Display will indicate "FREQ OR XPDR?X".
13. Enter X.
14. Display will indicate "TRANSPONDER?".
15. Enter transponder. Example: 09.
16. Display will indicate "IDR/MANUAL".
17. Enter D.
18. Display will indicate "AUDIO FREQ? X.XXX".
19. Enter audio frequency. Example:6.800.
20. Display will indicate "SYSTEM OFF SAT".

Figure 12:
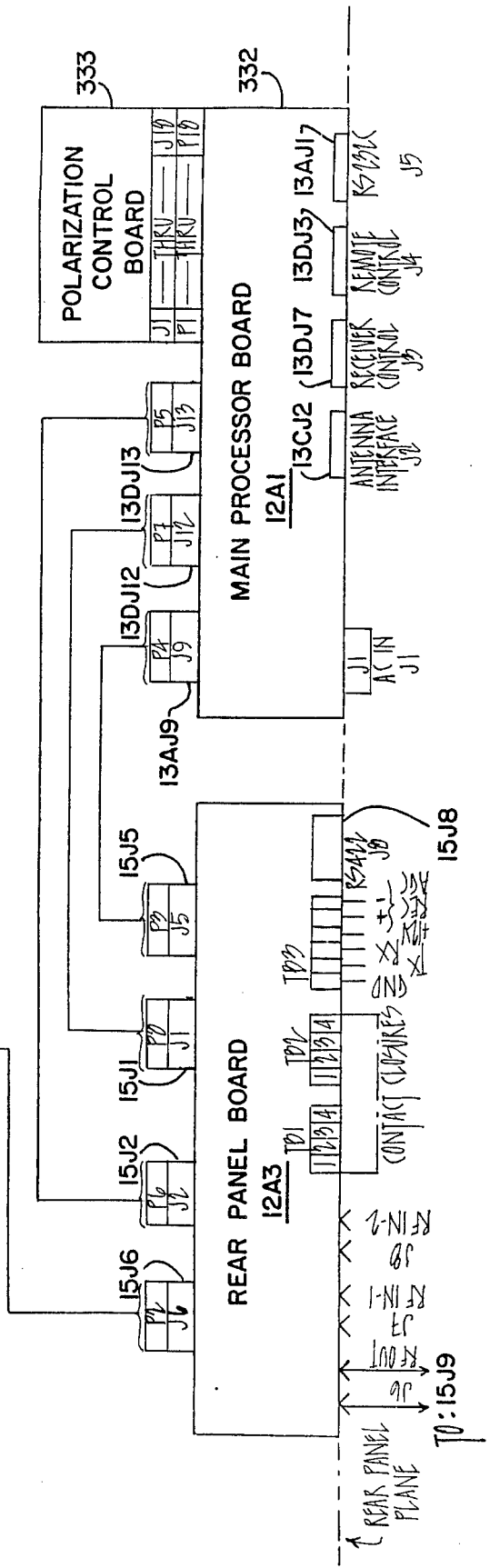
FIG. 12 is a diagram of the major components of the antenna control unit.
Figure 12A:
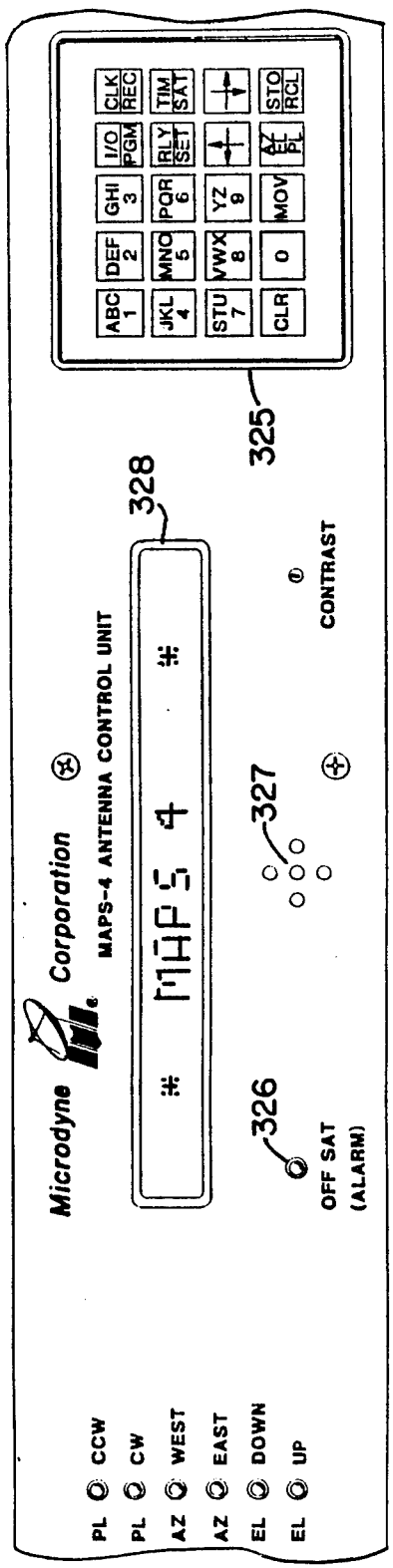
FIG. 12A is an illustration of the front panel of the antenna control unit.

Referring now specifically to FIG. 12 of the accompanying drawings there is illustrated a layout of the main boards of the control unit 17. There is a front panel control board 12A4, a rear panel control board 12A3, a main control board 12A1 and a polarization control board 12A2, which for purposes to be described subsequently is a separate plug-in unit; all the other boards being fixed boards. Referring to the rear panel control board 12A3, it is provided with an RS422 bus 15J8 for communication with the frequency controller 18. A further bus TB3 is employed to permit a remote front panel to control the unit. The bus provides transmit and receive lines, and a ground for balanced transmission, as previously indicated, the AGC from the receiver is applied to the control unit through the two left pins of connector TB3, FIG. 15, AGC input which as viewed in is required during initial acquisition of a satellite. The rear panel control board 12A3 also provides for radio frequency signal in, radio frequency signal out, and a second radio frequency signal in, contact closures of various relays are outputted through the rear panel at 337. The main panel 12A1 also has direct rear panel connections having an antenna interface 13CJ2 which connects directly to the antenna controller, a receiver control 13DJ7 for controlling a remote receiver, a remote control input 341 which permits a remote unit to control the antenna unit. The input 341 can accept 199 setups and 24 transponders election (C band only). There is also provided an RS232 port 342 which permits remote terminals to interface with the antenna controller. The frequency controller 18 is, as indicated above, controlled via the RS422 port 15J8. The receiver control 13DJ7 is utilized to permit control of other types of receivers manufactured by the assignee of the present invention, or in fact, by others. These other receivers may not have serial bus inputs but they do have hard wired inputs and these types of controls can be provided via the port 13DJ7.

It should be noted that the RS422 port has the ability as opposed to an RS232 to control more than one device. The apparatus of the present invention is capable of controlling up to four different receivers concurrently, giving four different instructions to four different receivers, but all of them over the RS422 port. As indicated relative to FIG. 9B, the switches 291 provide the receiver address. The RS422 port can control up to as many as 32 different devices but in the system of the present invention it is being used only to drive at the most four different receivers which the system can accommodate. Returning to terminals 337 which are marked internally TB1 and TB2, these permit, as indicated previously, remote control of various external functions from the front panel by the RLY (relay) key or by setups. The fact that each one has four output pairs or terminals which permits eight different user defined functions such as a discrambler or other desired functions such as audio outing.

Figure 13A:
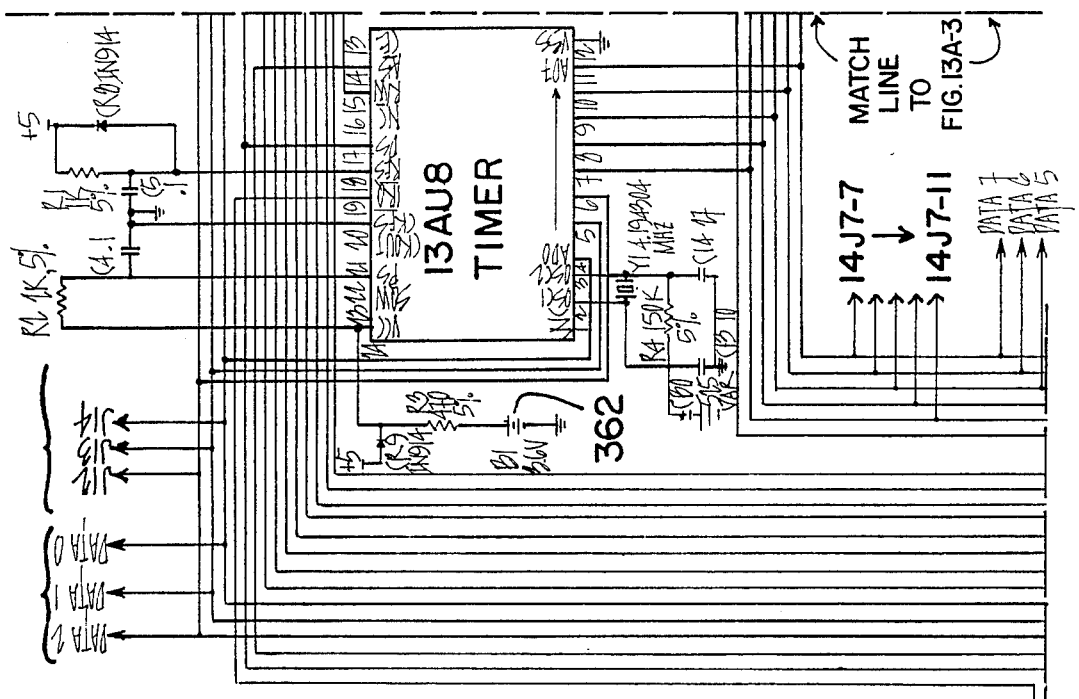
FIGS. 13A to 13D in composite provide an electrical schematic of the main control board of the antenna control unit.
Figure 1:
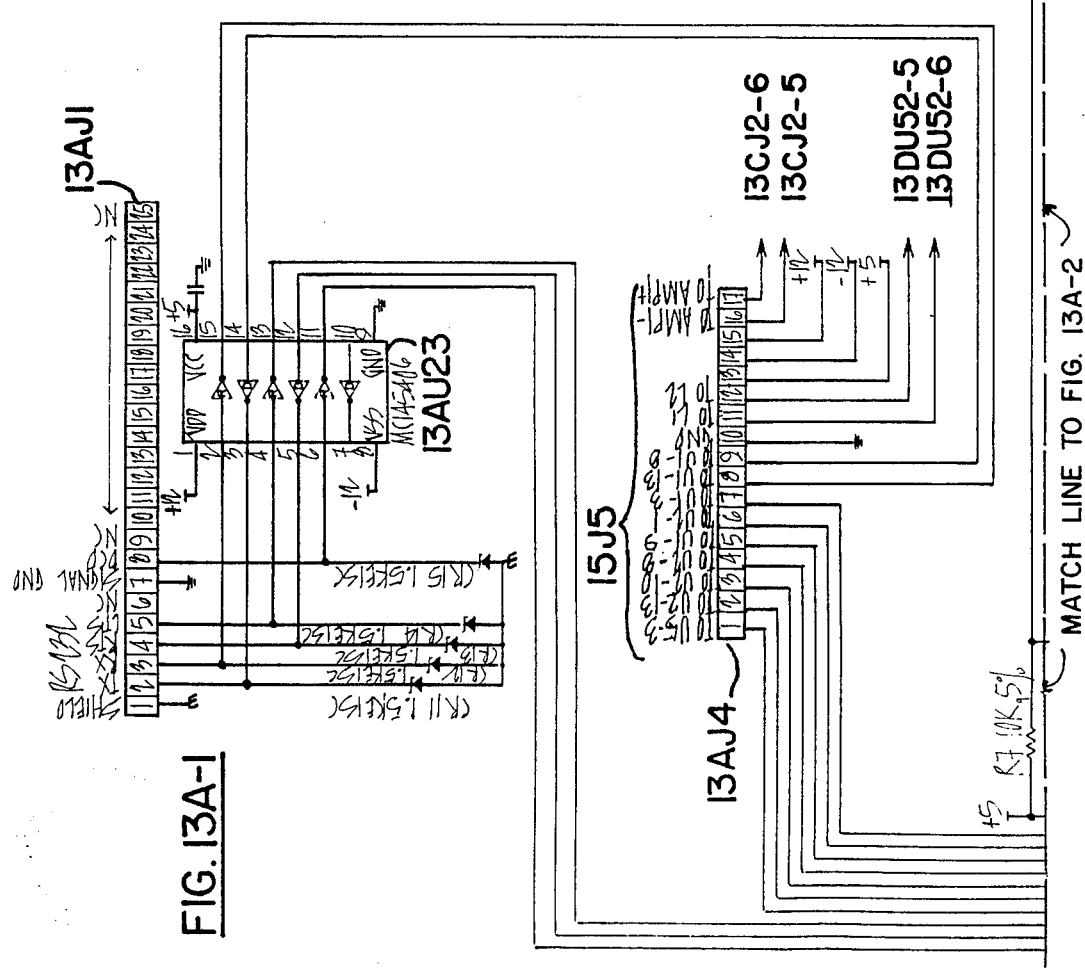
Figures 2, 13A:
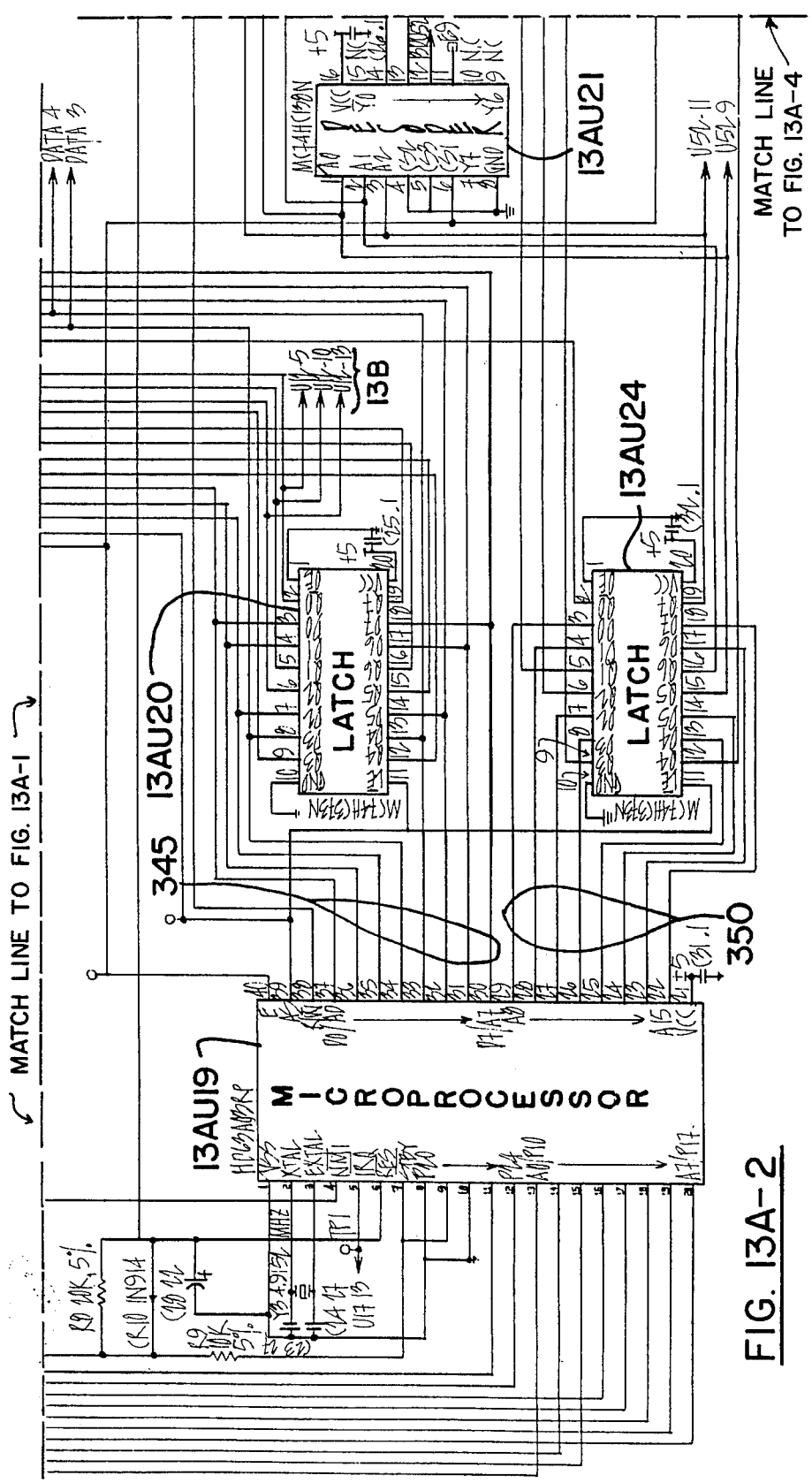
Figures 3, 13A:
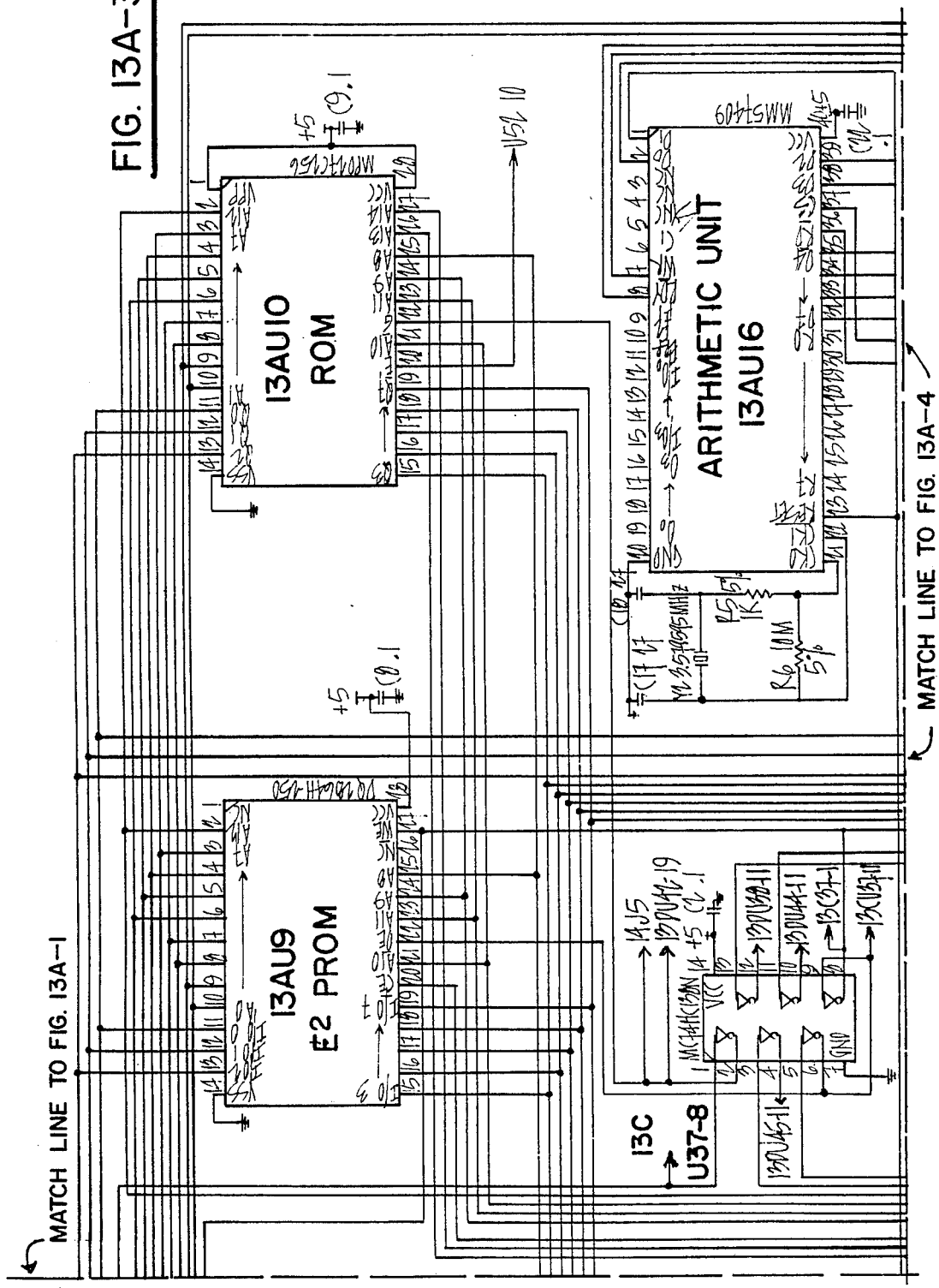
Figures 4, 13A:
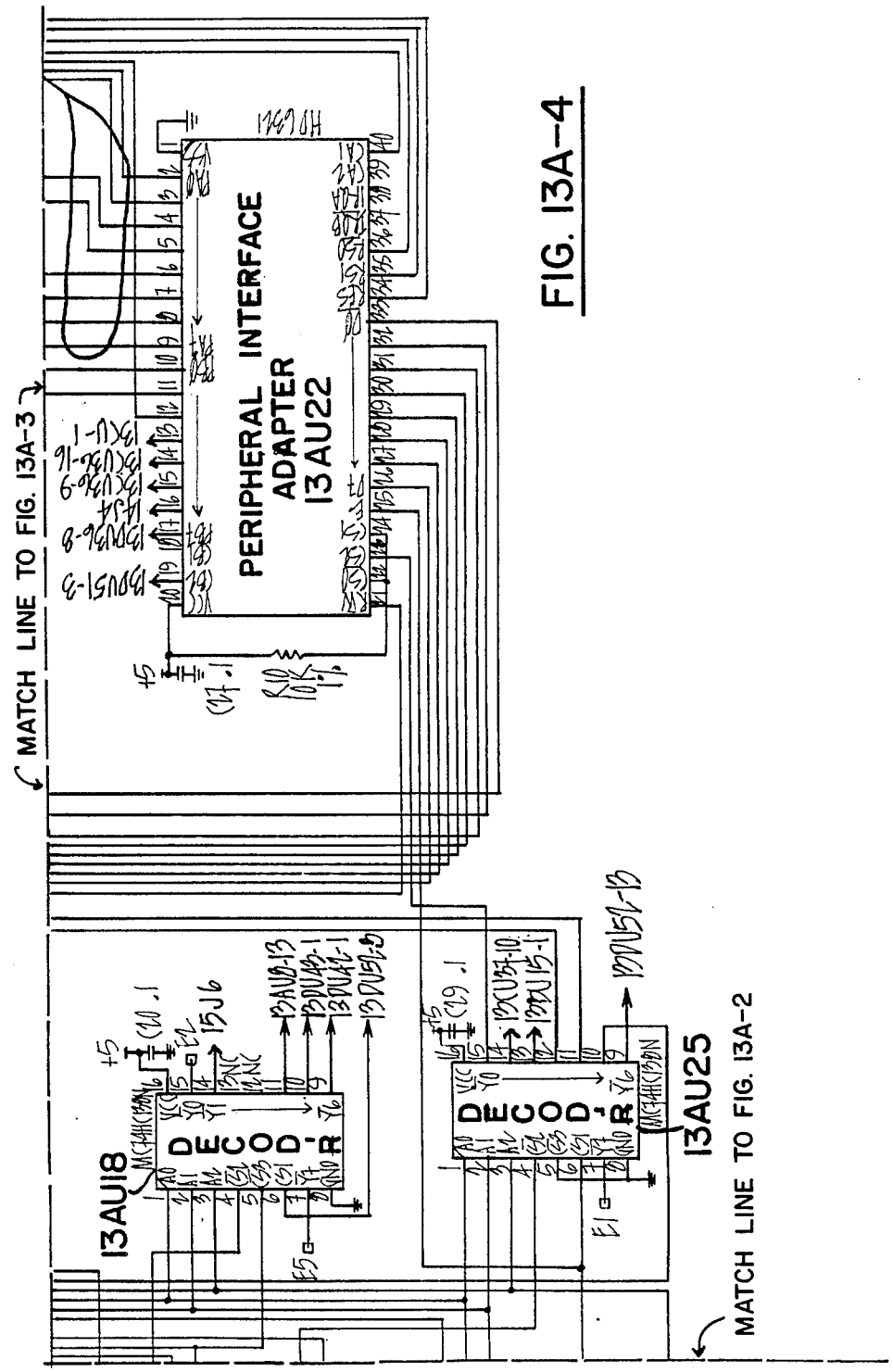

Referring now specifically to FIG. 13A, there is illustrated a portion of the antenna control unit containing the main microprocessor 13AU19, which may be a Hitachi 63A03 or a Motorola MC688C03 having an internal RAM of 128K bytes and 64K of addressable memory. The program is contained in a ROM 347 which is a 27C256 and holds 32K of memory in the one chip, actually 32 times 1,024. The ROM is an E-PROM. Elements 13AU20 and 13AU24 are latches for the address buses 345 and 350, respectively. Referring again to the microprocessor 13AU19 the pins 30-37 (buses 345) are multiplexed address and data buses as in the microprocessor used in the frequency controller. The latch 13AU20 abstracts the lower address portion of these buses, the address strobe being supplied from the pin 39 of the microprocessor. The pin 39 is marked AS for address strobe and is applied to pin 11 of latches 13AU20 and 13AU24 which is the chip enable terminal. The latch 13AU20 abstracts the lower portion of the address, the upper portion being abstracted by the latch 13AU24. The latches being enabled during the period when the leads 30-37 have addresses applied thereto. It will be noted that the latches 13AU20 and 13AU24 address the ROM 13AU10, EEPROM 13AU9 and timer 13AU8. The EEPROM is an 8K by 8 memory. A decoder 13AU21 is enabled by the enable pulse on pin 40 of the microprocessor 13AU19. This pulse runs at one quarter of the input frequency which is 4.9152 MHz. This frequency is defined by crystal 354 located between pins 2 and 3 of the microprocessor 13AU19. The crystal frequency was chosen since it supports baud rates of 300, 1200, 9600 and 76, 800 for use at the front panel as well as the frequency controller.

Additional decoders 13AU25 and 13AU16 together with the decoder 13AU21 provide decoding of special blocks of memory. For instance, one block of memory is used to select the polarization, another block is used to select a particular analog-to-digital converter or a super number cruncher; that is, a high speed arithmetic processor 13AU16, as well as a peripheral interface adaptor 13AU22, the function of which will be described subsequently. The analog-to-digital converter is designated as element 13CU37 in FIG. 13C. Element 13AU4 is a series of six inverter amplifiers to provide NOT functions for signals received from the input.

The timer 13AU8 is also controlled by a crystal at 4.9152 MHz. The timer is provided with a battery 862 to maintain the timer when power is otherwise off for a period of up to about 24 hours. The EEPROM 13AU9 stores all of the two hundred setups for satellite acquisition. From the arrangement thus far described it is apparent that the microprocessor 13AU19 is basically serving as a traffic controller, the arithmetic calculations being performed by the arithmetic unit 13AU10, the ROM storing the program, the EEPROM storing all the setups, and much of the timing functions. The timing functions for programs to be acquired at certain times on a repetitive or nonrepetitive basis are performed by the timer 13AU8. The latches 13AU20, 13AU24 serve to call out addresses at appropriate periods, the decoders selecting the various elements to be exercised at a given moment.

The latches 13AU20 and 13AU24 also serve as power boosters. Since the microprocessor is driving into many different elements it is necessary at least on the lower addresses, i.e., latch 13AU20, to abstract the lower addresses and insure that sufficient power is available. At the various locations where the upper addresses must be utilized, the latch 13AU24 is not essential but in abundance of caution it is also used to boost the power available from the microprocessor 13AU19.

Referring now to the peripheral interface adaptor 13AU22 this element is necessitated in the system since the microprocessor 13AU19 and the arithmetic unit 13AU16 are manufactured by different suppliers and cannot directly interface. The adaptor 13AU22 makes necessary adaptations to permit the two chips to communicate with one another.

Referring now specifically to the element 13AU23 this is an interface for the RS232 port. It is a leveler device since RS232 operates off normally ±12 volts. The ±12 volts are supplied to the interface 13AU23 on pins 1 and 8, respectively. The elements designated by the reference numeral 13BU5, which are seen throughout the diagrams of this application, are known as transorbs and are lightning arrestors to protect the equipment from lightning strikes.

Returning for the moment to the arithmetic unit 13AU16, numerous trigometric calculations may be required in acquiring the satellites particularly with non-polar mounts. Since a polar mount is utilized in this description of this application, the only calculation that must be made is the hour angle; that is, longitude.

Referring again to microprocessor 13AU19 the pins 13-20 are input/output data buses. The pin 20 provides an enable signal via pin 1 of connector 13AU19 to pin of connector 15J5, FIG. 15 to pin 3 of the RS422 transmitter 15U5 of FIG. 15, the totality of the pins 17-20 providing the control for the RS422 bus. The serial output port is on pin 12. The incoming information on the RS422 port is processed through receiver 15U3, and gates 15U2 and 15U1 to pin 11 of the microprocessor 13AU19.

Figures 1, 13B:
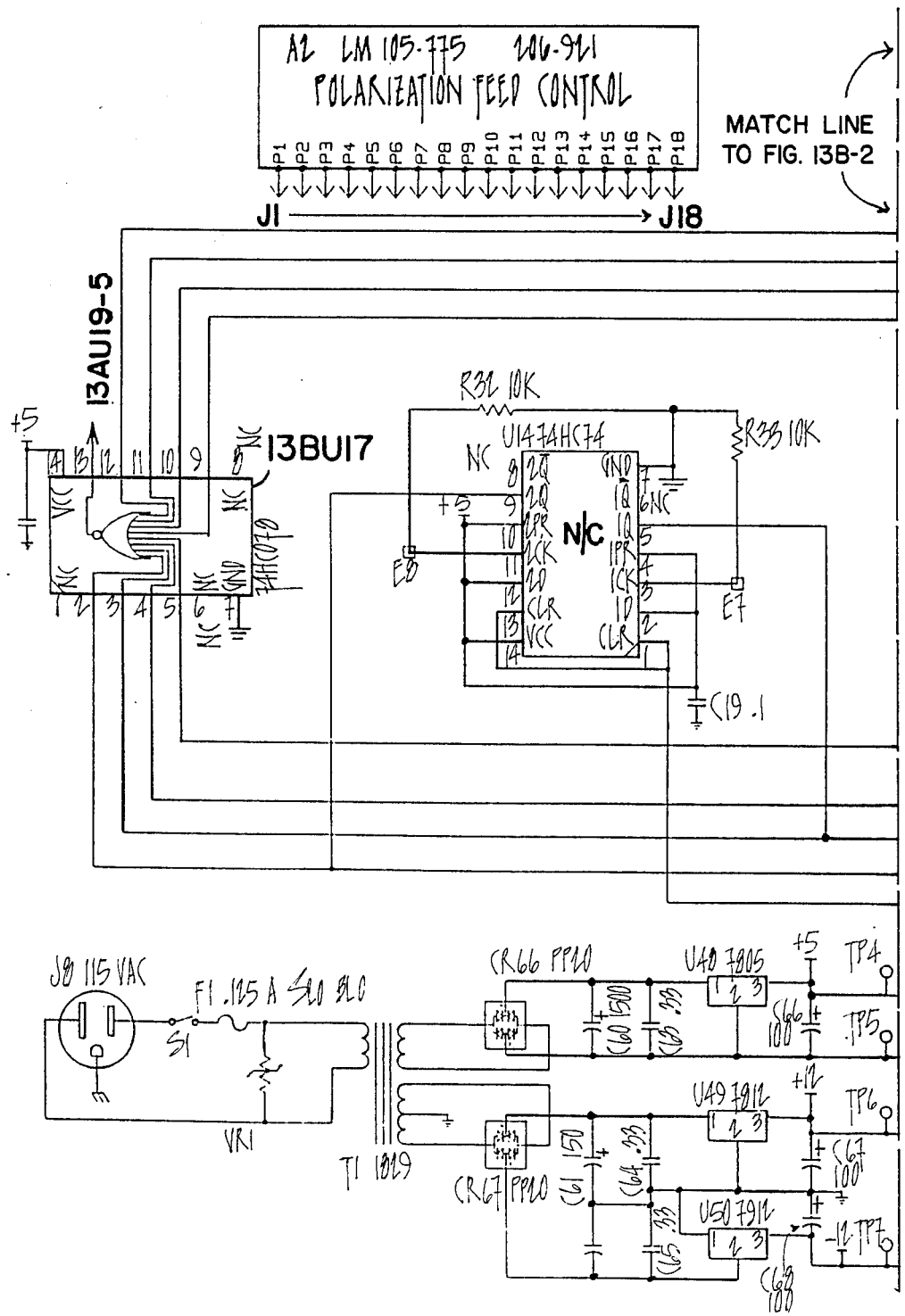
Figures 2, 13B:
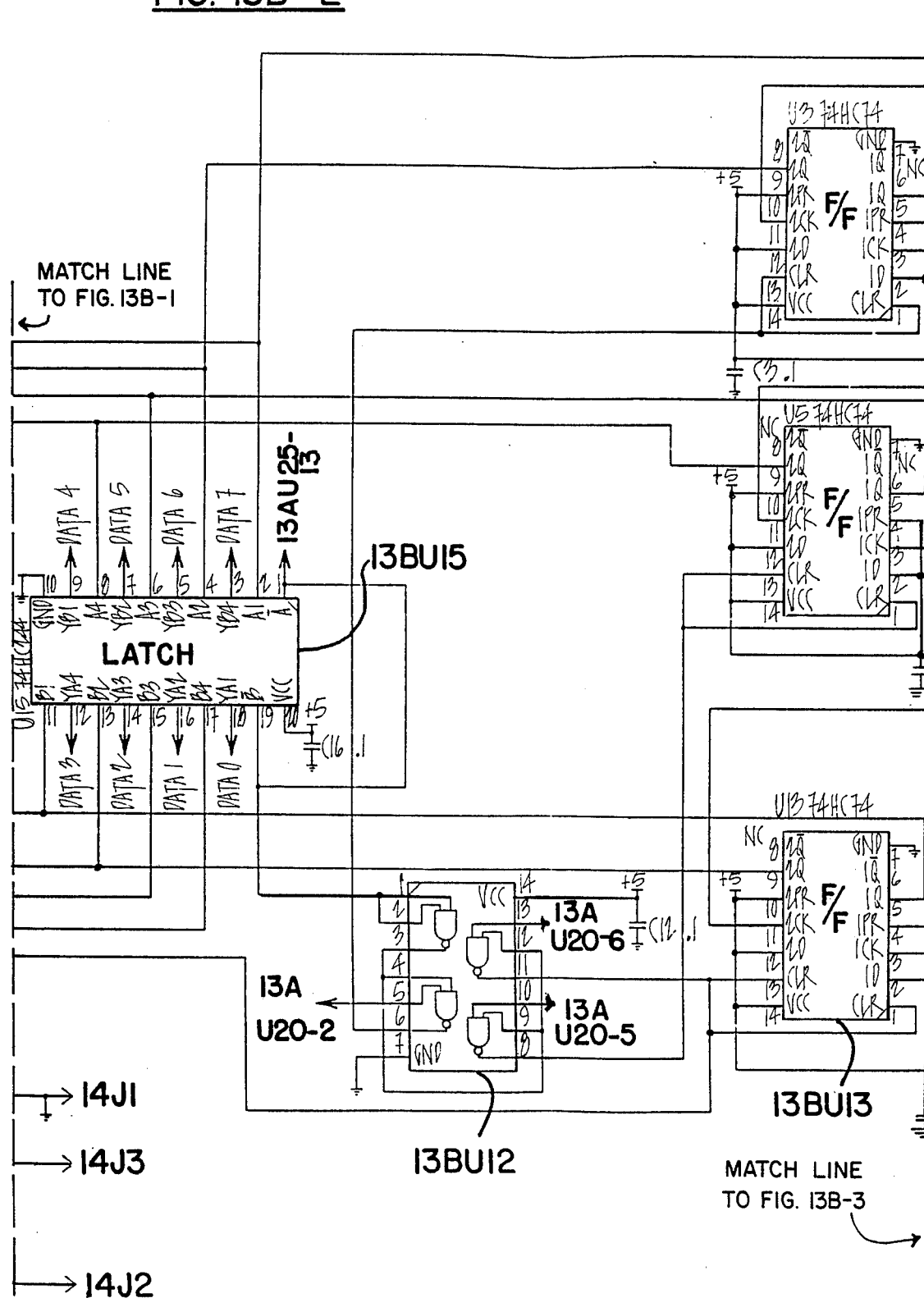
Figures 3, 13B:
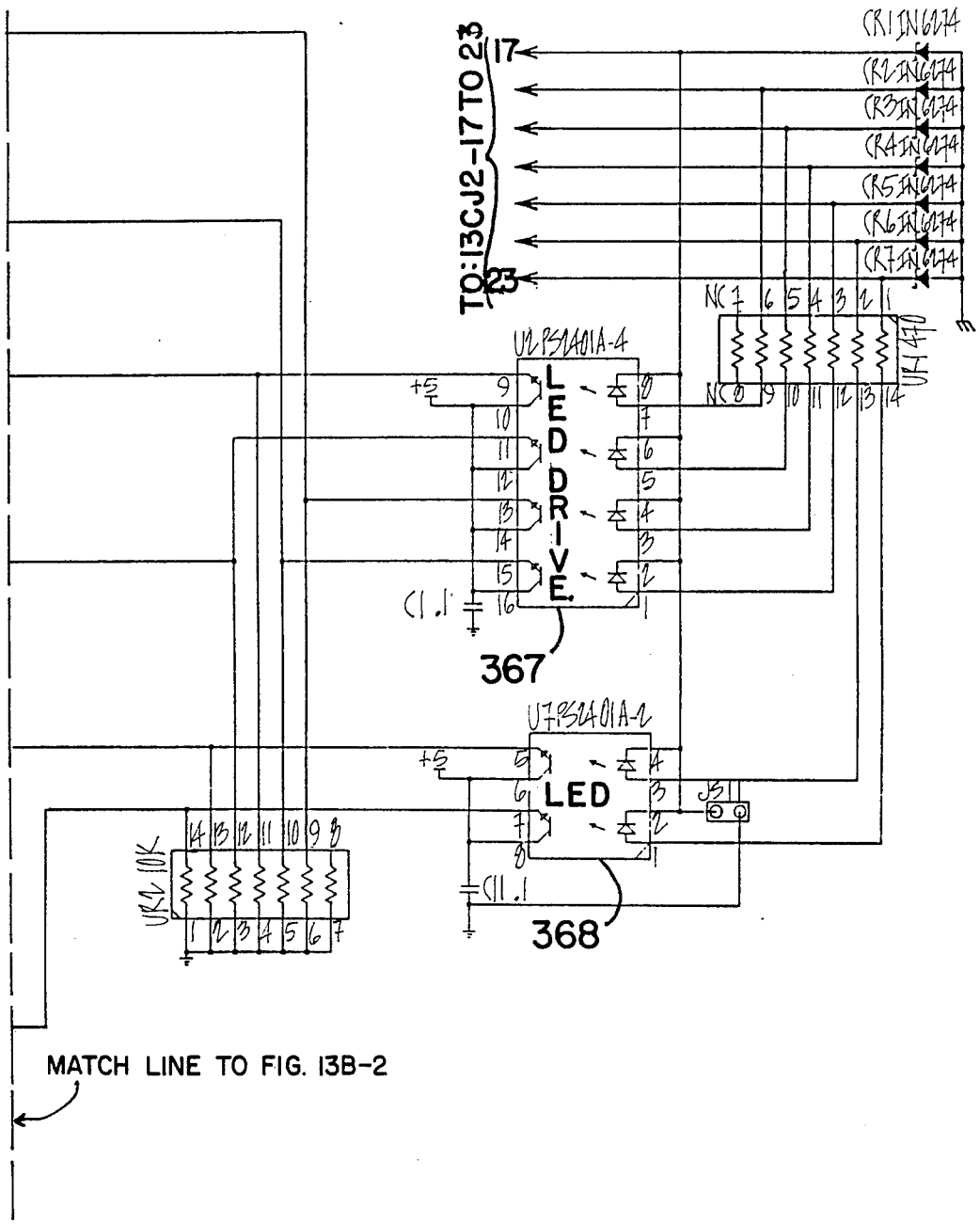
Figures 1, 13C:
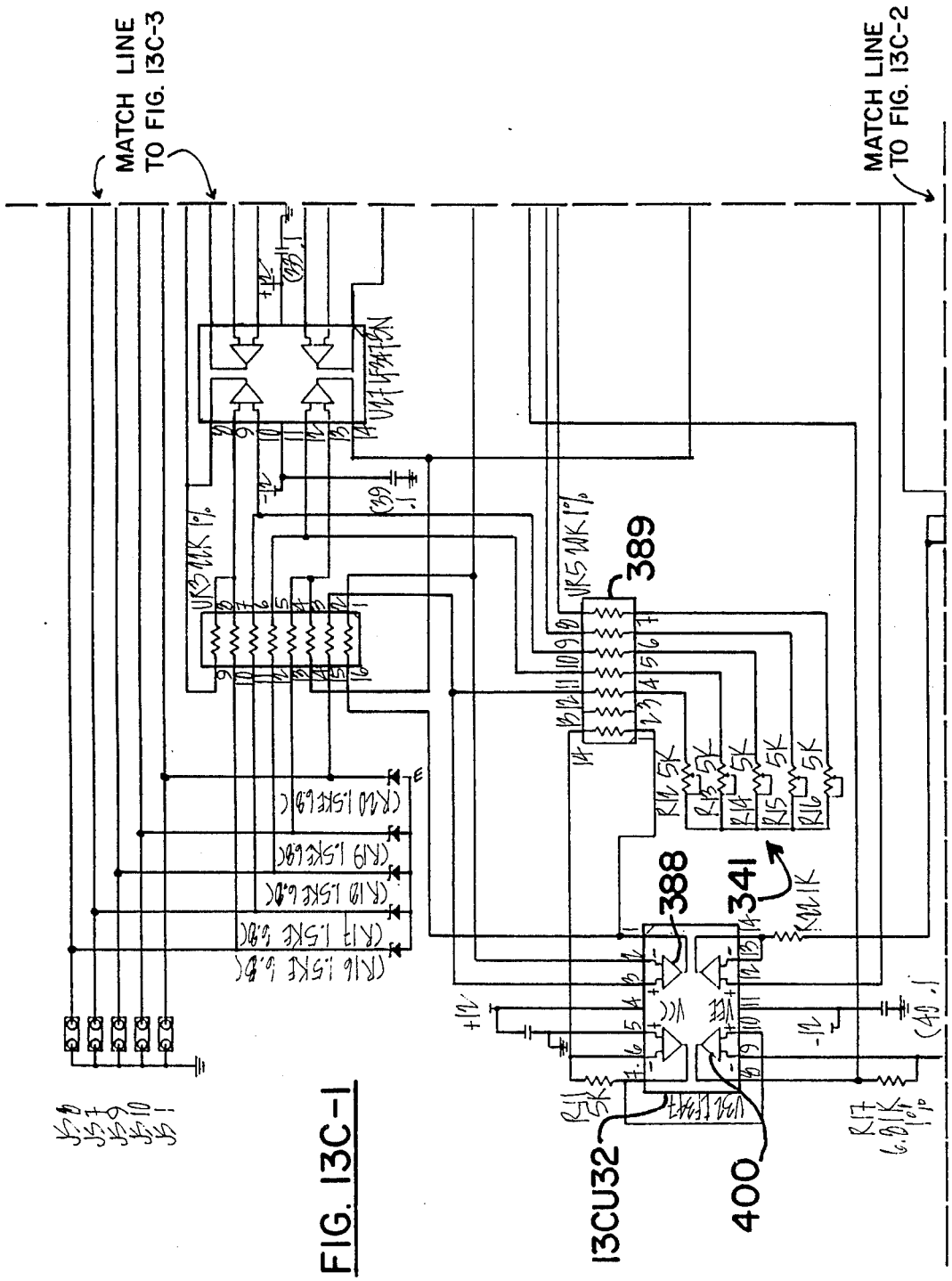
Figures 2, 13C:
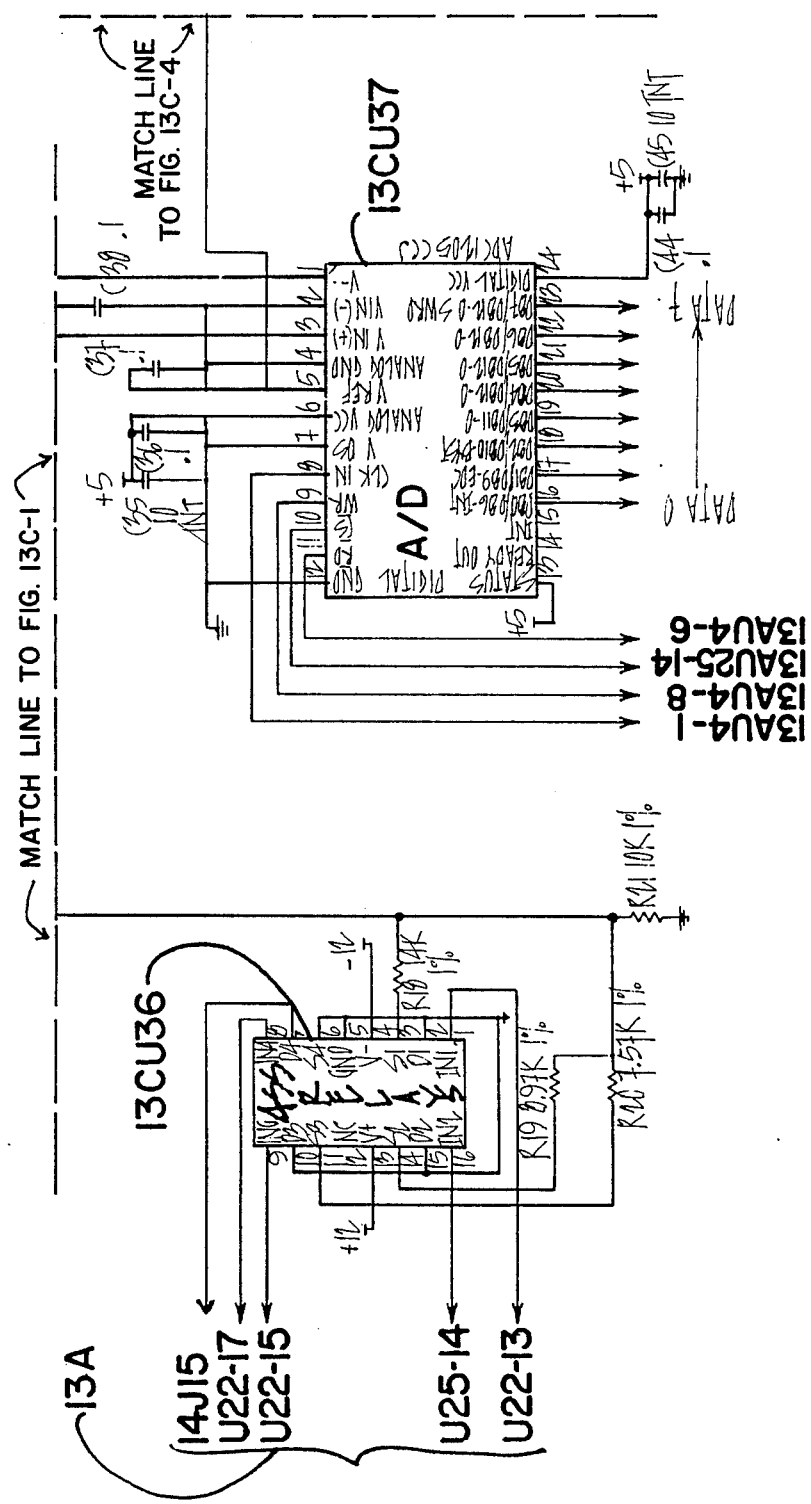
Figures 3, 13C:
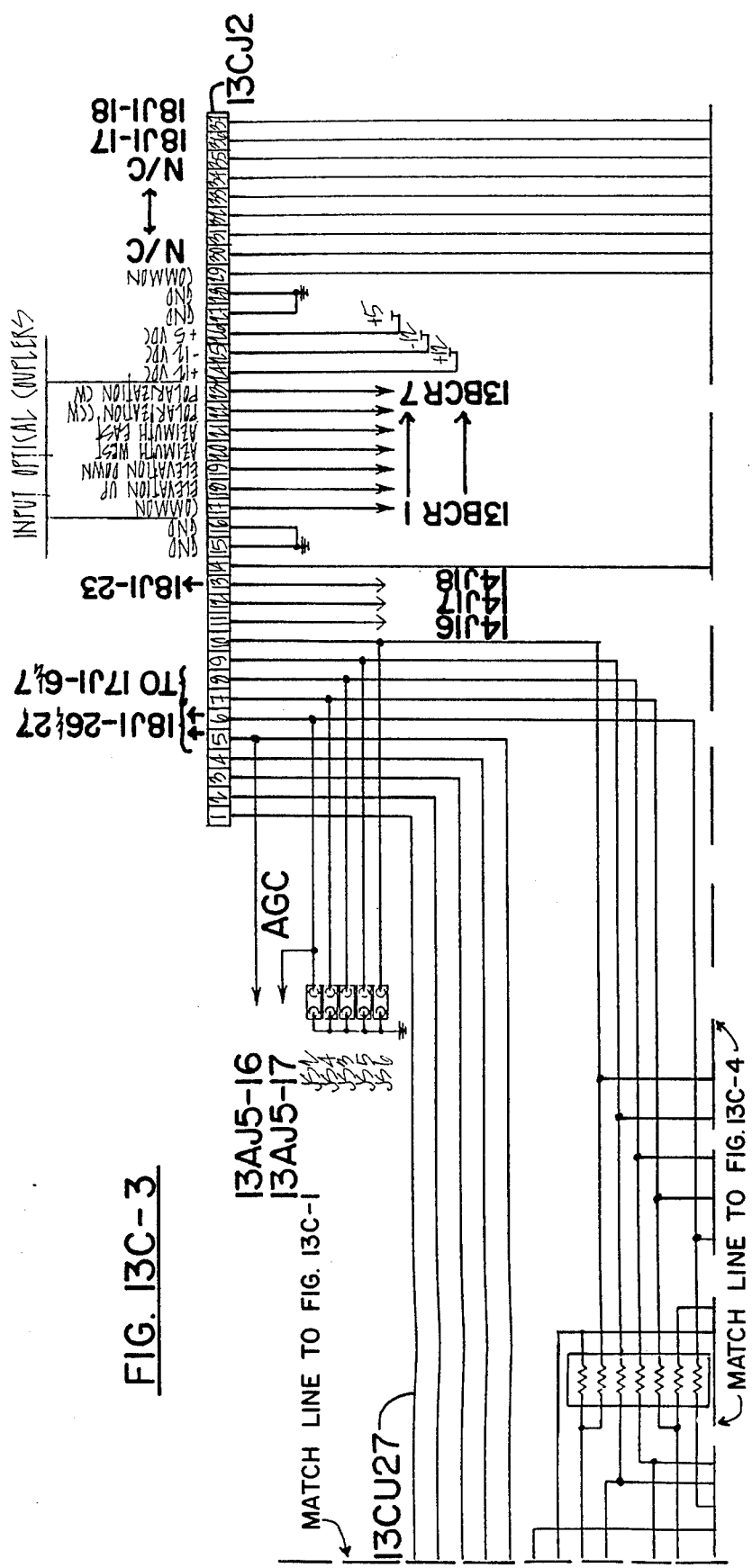
Figures 4, 13C:
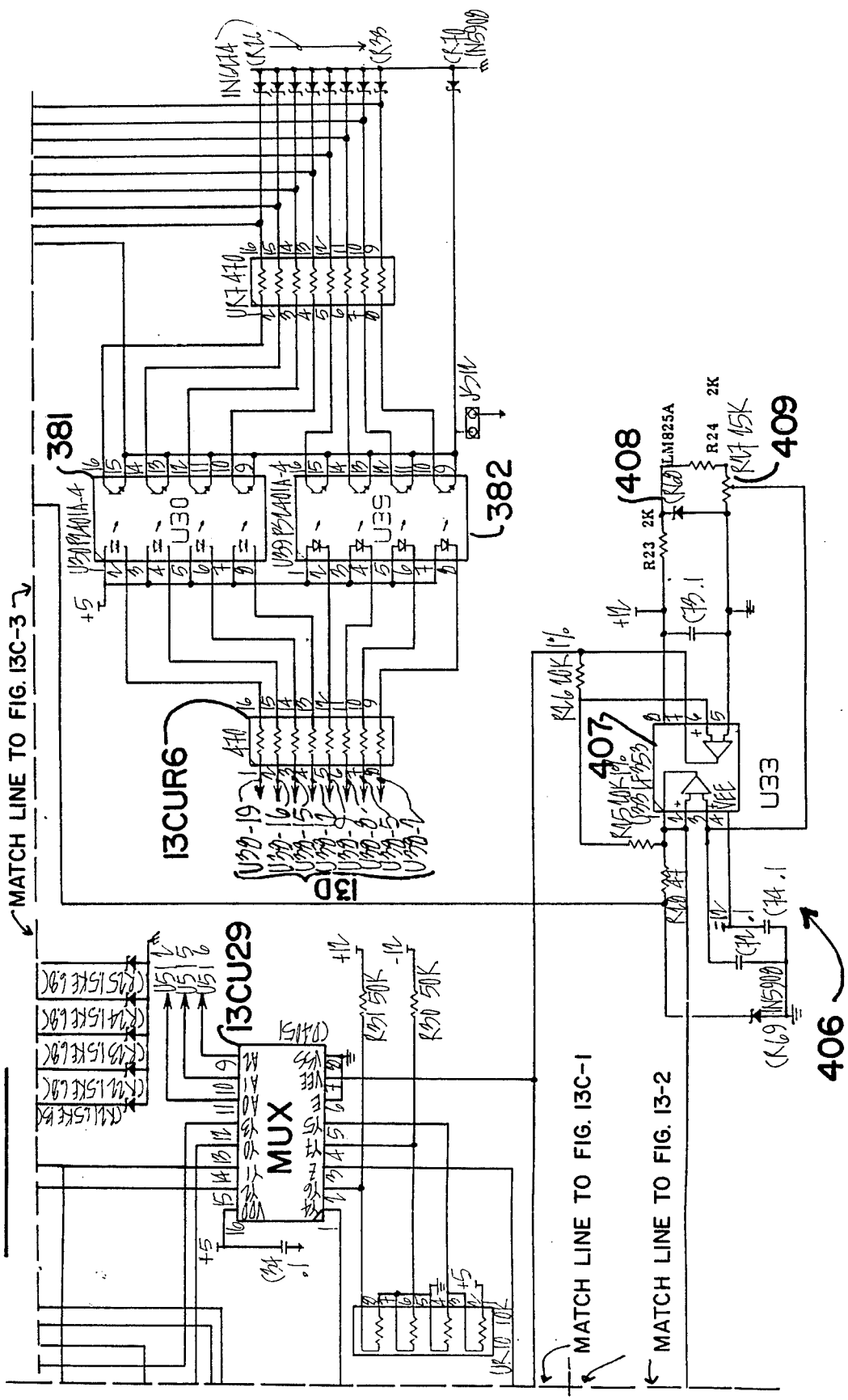

Referring now to FIG. 13B there are provided two optical couplers 367 and 368. Referring to FIG. 13C, these devices are fed through pins 17-23 of connector 13CJ2 but are not used in the present invention. However the couplers when used are employed as isolation devices to isolate the internal circuitry from the input jack 13CJ2 in case of problems with the transorbers 371. It should be noted that if the isolation effect is not desired a shorting strap 372 may be employed in the systems to jump the isolation feature. In any event, the pins 17-23 of the connector 13CJ2 are intended to receive pulsed-inputs from such things as an optical encoder on an antenna, although in the present invention a potentiometer is employed. The output from the devices 367 and 368 are impressed on flip-flops 13BU3, 13BU13 and the multiple flip-flop 13BU5, i.e., two flip-flops per chip. The flip-flops serve as temporary stores remaining in whatever memory state they are set until reset by external control. It will be noted that the flip-flops 13BU5, 13BU3, 13BU13 all feed a NOR gate 13BU17 which provides an output to the microprocessor pin 5. Pin 5 of the microprocessor is the interrupt input which causes the microprocessor to look at various peripheral devices to determine the nature or cause of the interrupt; IRQ standing for interrupt request. It will be noted that each of the flip flops 13BU5, 13BU3, 13BU13 provide input information to a latch 13BU15 which provides output to the data buses.

Upon interrupt, the microprocessor interrogates the data buses on which data is now supplied by latch 13BU15 to determine which of the flip-flops or other devices have caused the interrupt and thus can determine whether the data relates to azimuth, elevation, polarization, etc. When the latch 13BU15 is interrogated it sends out a signal on its pin 19 to a four NAND gate chip 13BU12 which sends clear pulses to each of the flip-flops 13BU5, 13BU3 and 13BU13.

Referring now specifically to FIG. 13C reference is again made to the connector 13CJ2. All interface with the antenna is made through this connector. The pins 30-37 although not employed in this particular system, provide information relating to elevation of the antenna, its rotation, polarization, etc., to the antenna and feed controls. The motor drive is accomplished through pins 36 and 37; elevation control not employed herein, is on pins 34 and 35, polarization drive on pins 32 and 33 and a common on pin 29. The antenna potentiometer reading appears on pins 7 and 8 and an AGC signal out to the motor control at the antenna is provided on pins 5 and 6, so that the motor can be operated at the antenna with peaking control. Pin 14 supplies voltage to one side of the antenna potentiometer, pin 15 providing ground. Returning now to pins 32-37 of the connector 13CJ2, to provide lightning protection they are coupled to the system through optical isolation devices 381 and 382 being fed from latch 383 in FIG. 13D.

Figures 1, 13D:
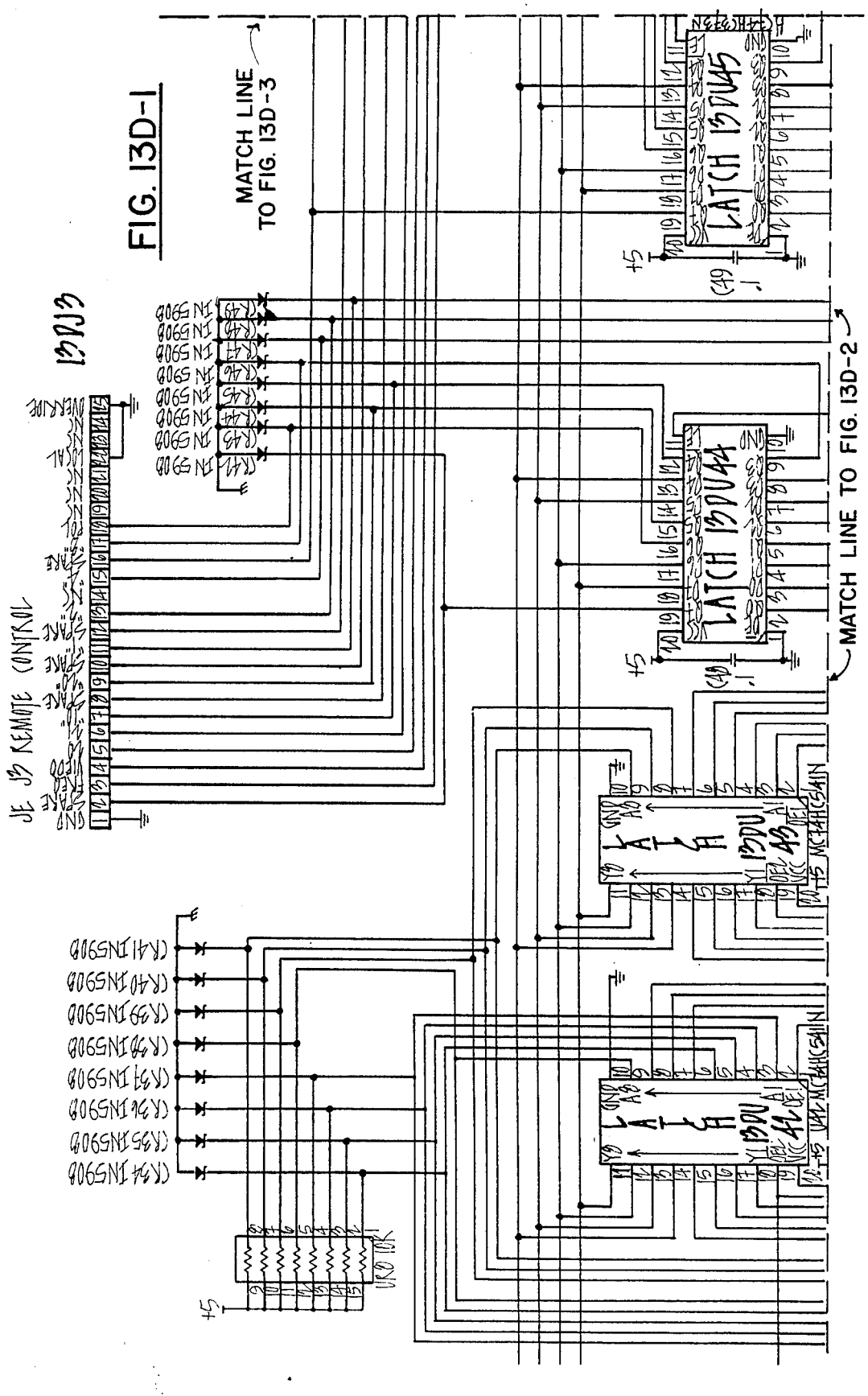
Figures 3, 13D:
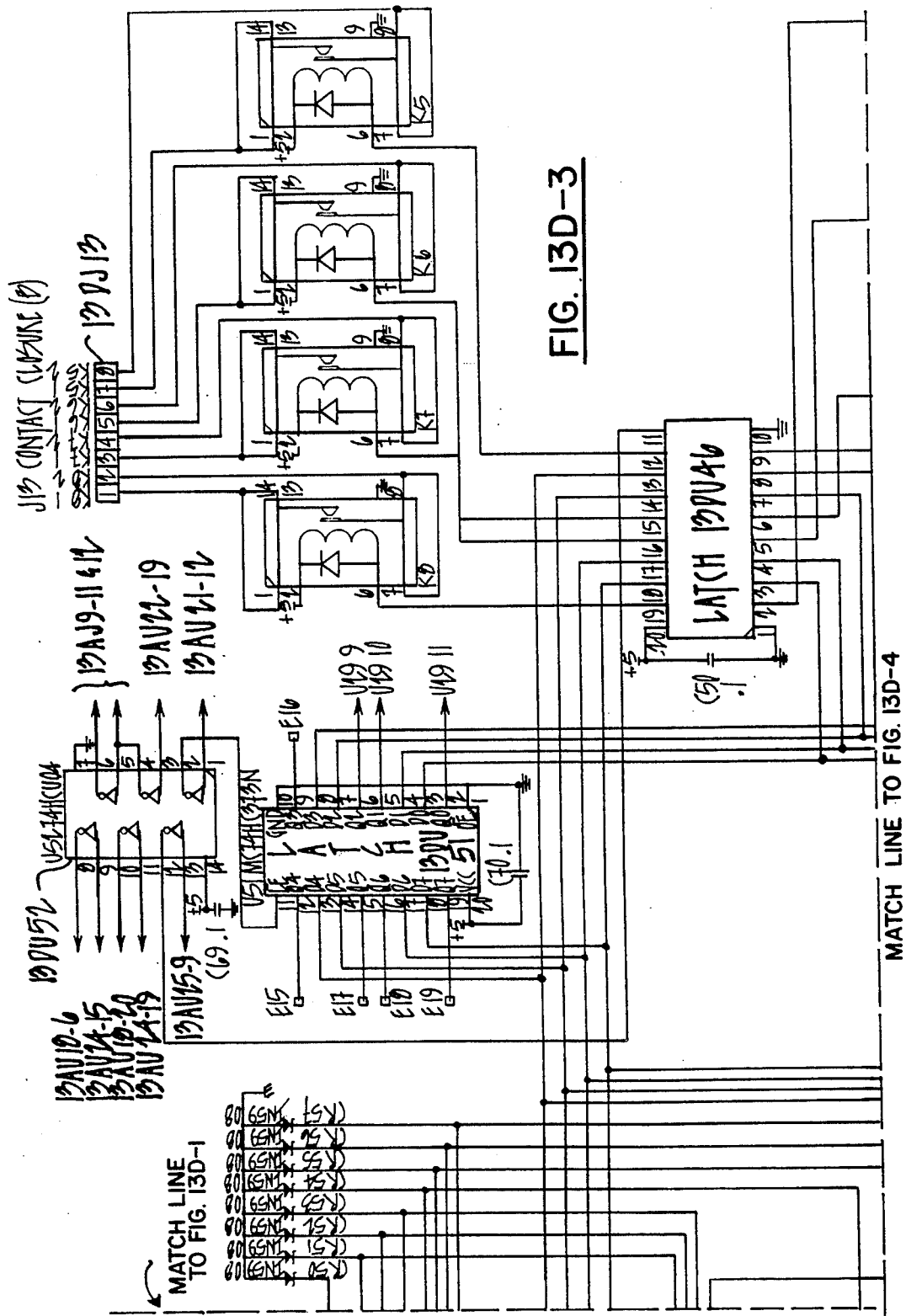
Figures 4, 13D:
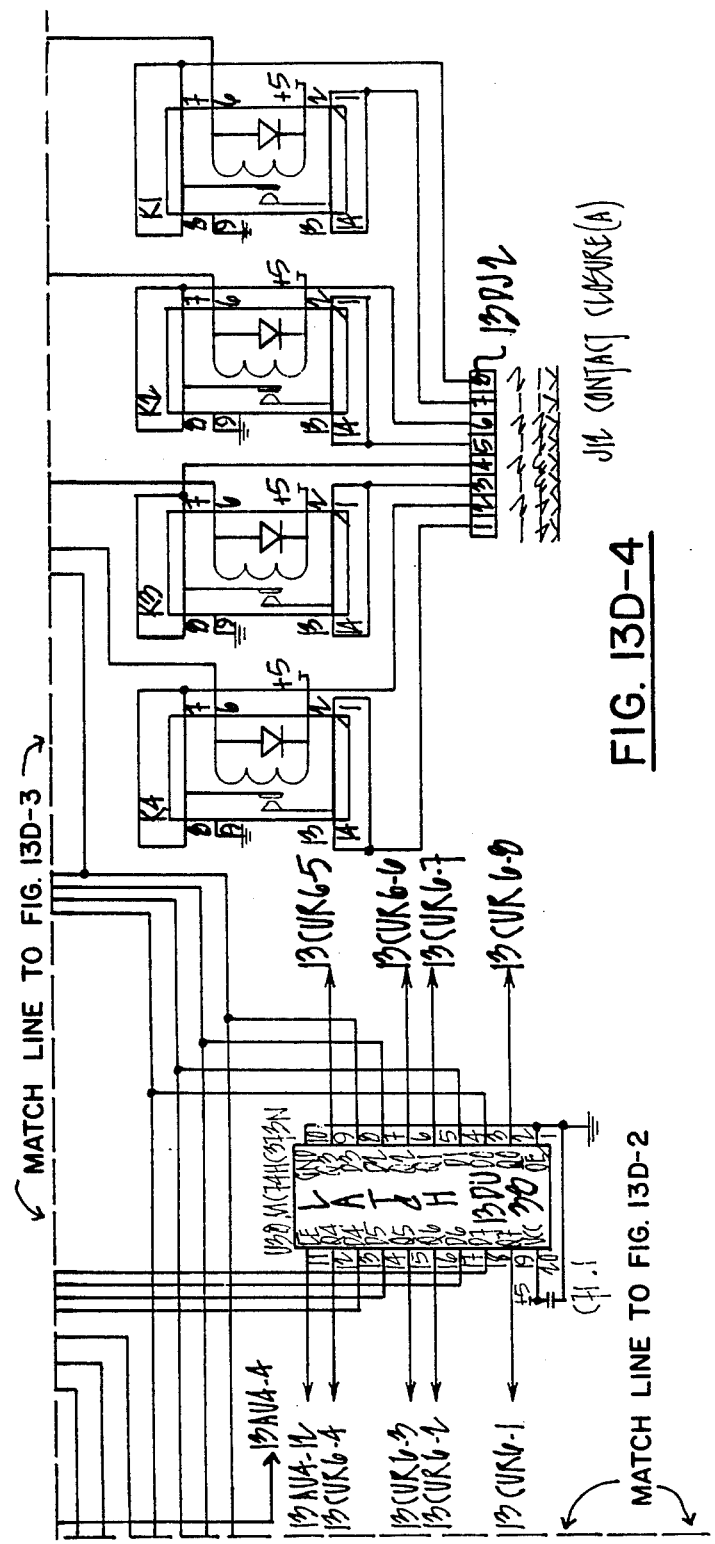

Referring now specifically to FIG. 13D and the latch 13DU38, it will be noted that it is connected to the data buses from the microprocessor and is used to control the motor for the antenna to cause the antenna to sweep either east or west, and where elevation control is employed to sweep up and down. As previously indicated the element 13DU38 is a latch which accepts information from the data bus, holds it, controls the motor at the appropriate time and then is subsequently cleared when the motor has achieved its desired position. The latch 13DU38, FIG. 13D feeds through a resistor pad 13CUR6, FIG. 13C to light emitting diodes of the optical devices 381 and 382 to switch the light sensitive resistors into appropriate on/off condition to cause the motor to rotate in one direction or the other as will be indicated when directly discussing the motor control.

Figures 1, 15:
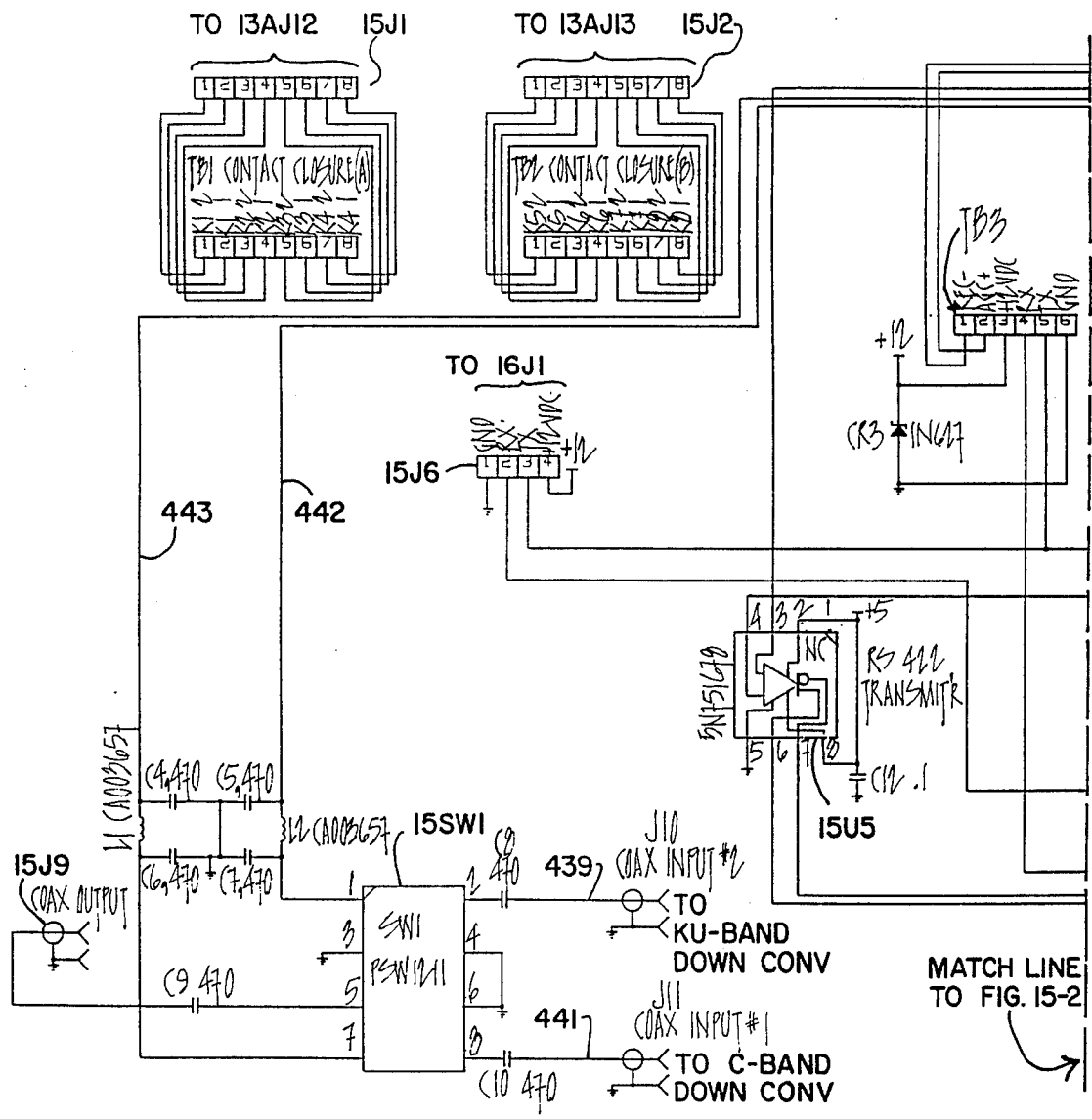
FIG. 15 is a schematic of the rear panel control board of the antenna control unit.
Figures 2, 15:
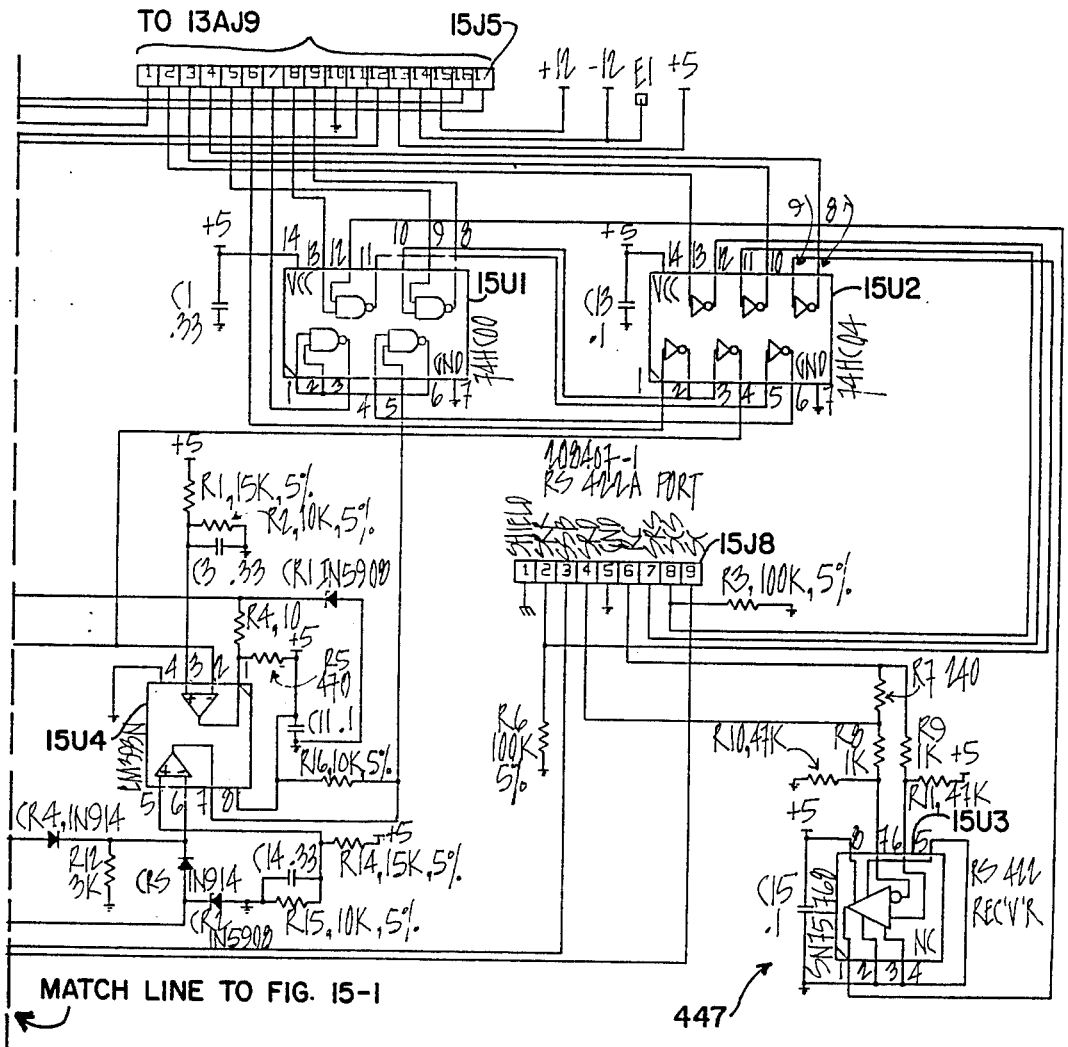

It will be noted again in FIG. 13C, that the supply to the AGC pins 5 and 6 of connector 13CJ2 is derived from pins 1 and 2 of connector TB3 of FIG. 15. The output on pin 1 and the input on pin 3 of amplifier 388 are tied together through a resistor in resistor bank 389 and the uppermost variable resistor in a bank of potentiometers 391. The reason for this is to provide common mode rejection of noise. In order to calibrate the AGC circuit to provide common mode rejection for prevention of noise interference with a signal, the two leads, designated by the reference numeral 396, which bring the AGC from a receiver, are connected together and five volts are applied thereto relative to ground. The uppermost resistor of the potentiometer group 391 is adjusted for zero output from the amplifier on pin 1 of the chip 13CU32, the output of the designated amplifier 388. The system is now set for common mode rejection and therefore low noise operation on the AGC circuit.

The microprocessor and various chips will not accommodate signals of greater than ±5 volts whereas the AGC from a receiver can be as high as 10 volts. In order to calibrate the system such that the voltage output from the AGC circuit from a given receiver does not cause the circuits to exceed ±5 volts the quad solid state relay 13CJ36 is employed. There are four resistors associated with this circuit, 13CR18, 399, 13CR21 and 402. In order to calibrate this system, a program is brought up out of the ROM and under control of the program the relay 13CJ36 adjusts the gain on amplifier 400 of the quad amplifiers 13CU32 until the output from 388 falls within the proper range. This calibration is discussed more fully in the discussion of the program. When the calibration procedure is complete, the calibration word is stored in the EEPROM for future use. Even though the apparatus can control four different receivers the AGC of only one is being looked at since all four receivers must be looking at the same satellite even though they may be responding to different transponders. If the particular receiver which is providing the AGC for control is changed then the calibration routine must be repeated. In the calibration routine, the system goes to a known transponder on a known satellite and then the routine is started so that in effect a known quantity, that is a known transponder, on the known satellite is being used for the calibration.

Another amplifier chip 13CU27 identical with the chip 13CU32 utilizes four of the five potentiometers in the potentiometer stack 391 and provides various inputs to a multiplexer 13CU29 for purposes to be described subsequently. The MUX 13CU29 which feeds the analog-to-digital converter 13CU37 through the lower right-hand amplifier of the amplifier chip 13CU32 to pin 3 of the analog-to-digital converter 13CU37.

The ±5 volts required for operation of the various components of this system is generated generally in a device designated by the reference numeral 406 which utilizes an amplifier chip 407. Zener diode 408 provides a 6.8 volt reference which is supplied to a pot 409 adjusted for 5 volts on pin 3. On pins 1-2 appears the 5 volt reference which goes to pin 14 of the connector 13CJ2; the 5 volts for the high side of the antenna potentiometer. The output from pin 1 is also fed to pin 6 of the right hand amplifier of the chip 407 which is operated as an inverter to provide the −5 volt reference. It should be noted that if the 5 volts changes for any reason, the changed voltage out to the pot is also changed to the same degree at the analog-to-digital converter 13CU37 so that the two elements track.

Referring now specifically to FIG. 13D it will be noted on the right side of the drawing that there are two sets of relays generally designated by the reference numerals 411 and 412. These relays (a total of eight) are normally open and are connected to the connectors 337 in FIG. 12 (see also FIG. 15). The relays are controlled by a latch 413 driven from the microprocessor; the latches controlling the relays 411 and 412 in accordance with the microprocessor program. An inverter 13DU52 is utilized to provide the NOT function to various chips about the board such as the chip 353, the peripheral adapter 13AU22, etc. with inputs derived from the latch 24, the decoder 21 and the peripheral interface adapter 13AU22.

There is also provided a latch 13DU51 connected to the microprocessor data bus to control the gating of information from the multiplexer 13CU29 to the analog-to-digital converter 13CU37. Elements 13DU42 and 13DU43 are latches controlling the output to the terminal 13DJ7 of FIG. 12 to provide input for remote control of the control unit and one receiver. These latches are controlled by the decoder 13AU18, pins 9 and 10.

Remote control of the receiver may be accomplished through connector 341, see FIGS. 12 and 13D. Frequency, video, polarity and override controls appear on pins 3, 4, 18 and 25, respectively with 1s, 2s, 4s, 8s, 10s and 20s (BCD) appearing on pins 11, 13, 15, 17, 7 and 9, respectively. These signals are directed from the microprocessor to latches 13DU44 and 13DU45. These latches are controlled via the inverter 13AU4 of FIG. 13A from the decoder 13AU25.

Figures 1, 14:
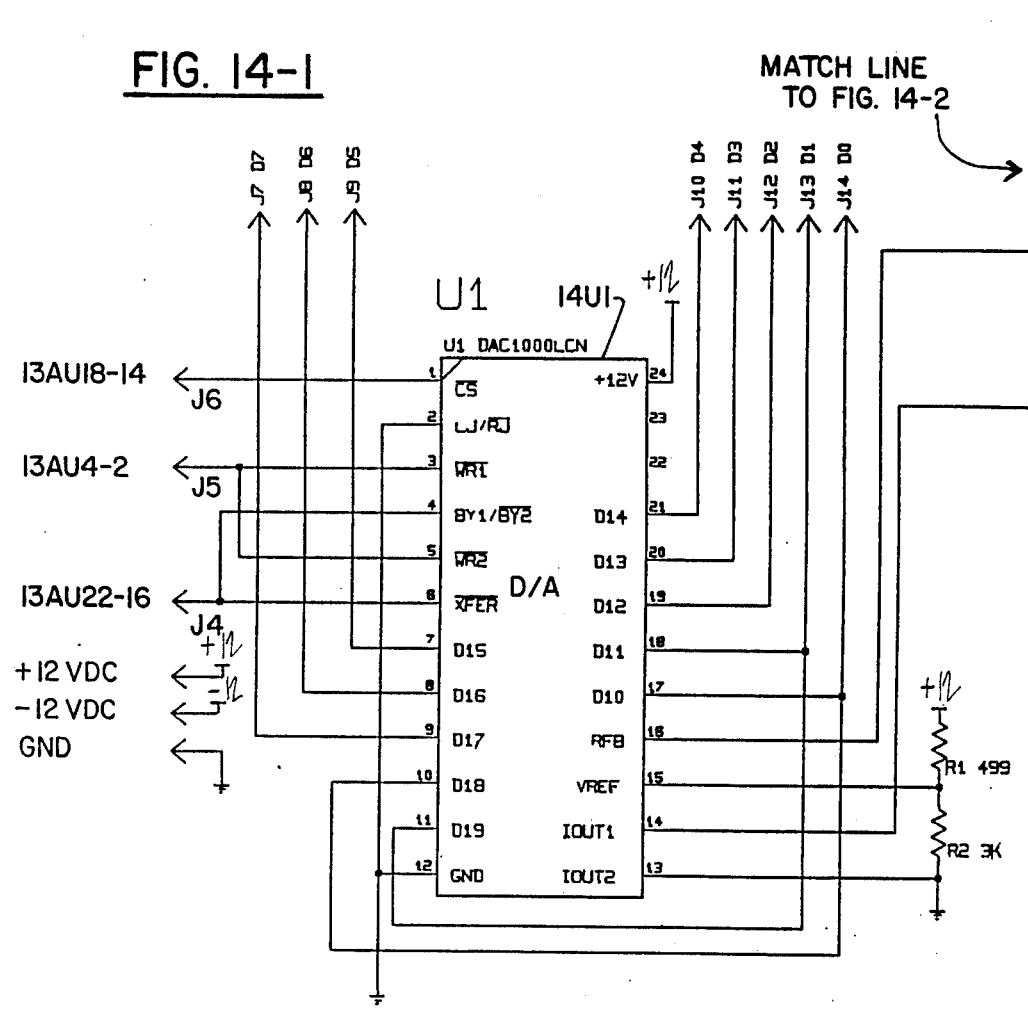
FIG. 14 is a schematic diagram of the polarization control board of the antenna control unit.

Reference is now made to FIG. 14 which is a schematic diagram of the polarization feed control panel. As previously indicated this panel is a separate plug-in because polarization designations and manipulations change with time and the board may have to be replaced. There is provided a digital-to-analog converter 14U1 which is connected to the data bus D0–D7 to receive polarization amplitude data. The digital-to-analog converter its analog output signal feeds its analog output signal into an amplifier 427 of a group of four operational amplifiers 14U2 on a single chip LF347DN. This operational amplifier is operated as a current sensor and actually completes the digital-to-analog conversion. The amplifier 427 feeds a further amplifier 430 having its input, pin 10, connected via lead 429 to relay 13CJ36 (FIG. 13C) pin 7 which serves as a switch controlling polarity reversal. As a result of the operation of that switch the amplifier 430 operates as an inverter or a non-inverter; thus the output voltage from amplifier 430 is either plus or minus with an amplitude that varies with the displacement of the polarization control motor from its desired position. The output from the amplifier 430 is fed to a further amplifier 431 which operates as a divide-by-two circuit to produce ±5 volts for application to other chips which cannot accept voltages ranging as high as 10 volts.

The DC motor controlling polarization of the feed is fed via a lead 432 to pin 13 of the connector 13CJ2 of FIG. 13C. The control signals for control of C band polarization by ferrites (not employed herein) appear on leads 433 and 434 to pins 11 and 12 of connector 13CJ2. For purposes of housekeeping, it should be noted that when the switch 13CJ36 is closed the amplifier 430 becomes an inverter so that the voltage output is a minus. As indicated, the output voltage on lead 432 operates a DC motor whereas the output on leads 433 and 434 operate a ferrite control of the polarity when used. A plug-in board is used for polarization control since at any given time the manufacturers of the dual feeds may change the particular type of control on each of the feeds, either to DC motor or ferrites or whatever becomes available in the future. It will be noted that the drive for the leads 433 and 434 is through amplifier 436 from the amplifier 430, the feeds being complimentary as a result of the use of the NPN and PNP transistors 437 and 15SW1, which are provided with heat sinks in an abundance of caution.

Reference is now made to FIG. 15 of the accompanying drawings, the rear panel board of the control unit 17, and specifically to the circuitry for providing the C and Ku band signals to the receiver. In the lower left-hand of the drawing is a switch 15SW1 which receives signals from the downconverters Ku band on lead 439 and C band on lead 441. Depending upon whether receipt is to be Ku or a C band a pin diode switch 15SW1 gates one or the other of the signals through terminal 15J9 to the RF input to the receiver. Input control of the switch 438 is via leads 442 and 443 which are connected to pins 11 and 12 of connector 15J5. These pins are connected to pins 5 and 6 of the inverter 13DU52 in FIG. 13D. Control of the inverter is from the peripheral interface adaptor 13AU22 in FIG. 13A which is programmed from the microprocessor which therefore selects the Ku or C band through the switch 15SW1.

There is provided the RS422 transmitter designated by the reference numeral 15U5 and the RS422 receiver designated 15U3. As previously indicated the RS422 transmitter is controlled directly from the microprocessor while the receiver is routed to the microprocessor through inverter 15U2. NAND gate 15U1 controls whether transmission is to be to the RS422 or RS232 buses, this again being controlled directly from the microprocessor. The chip 15U4 controls communication between the front panel 12A4 and the rear panel 12A3 so that a remote front panel may be employed.

Figures 1, 16:
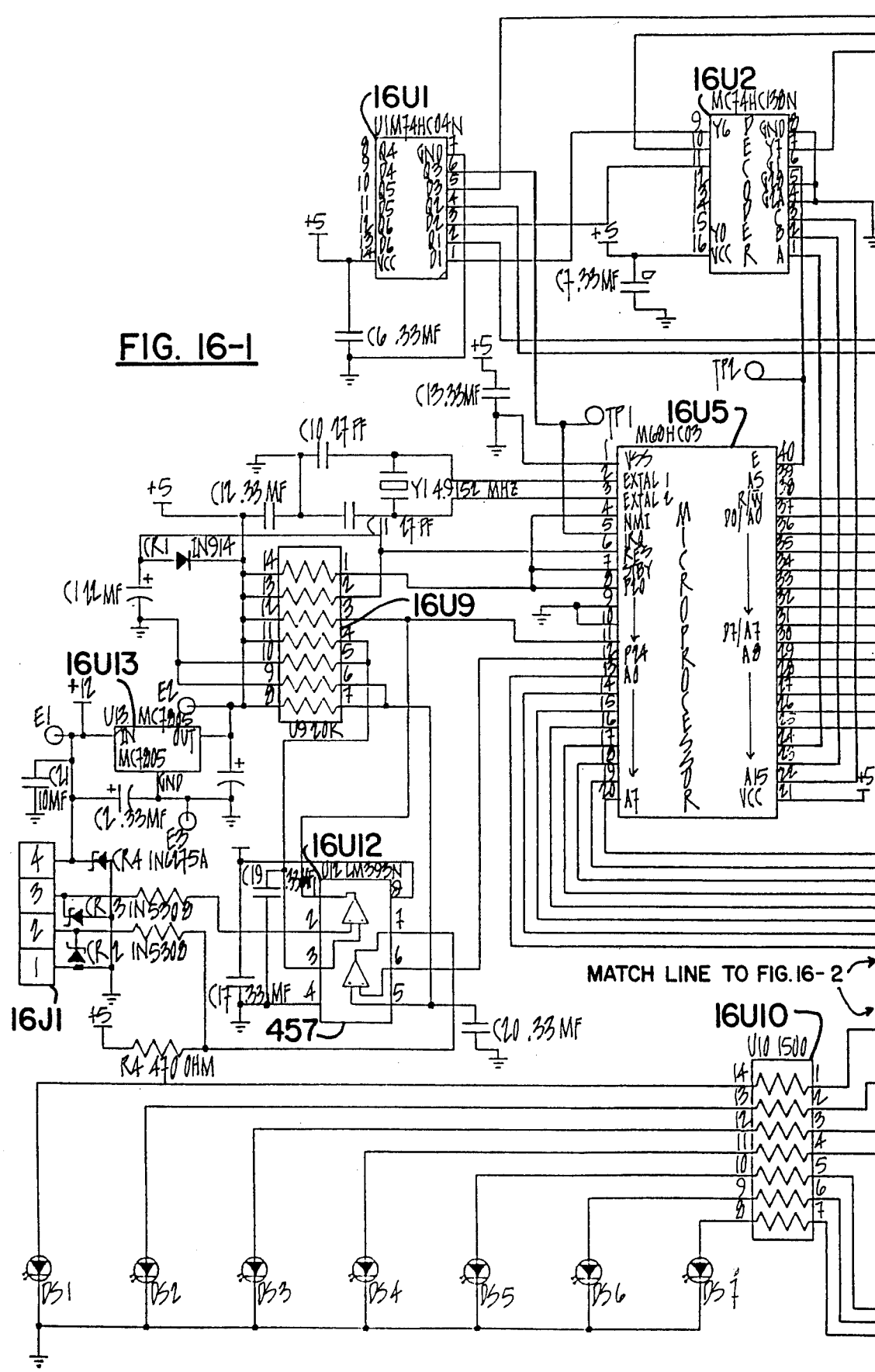
FIG. 16 is a schematic of the front panel control board of the antenna control unit.
Figures 2, 16:
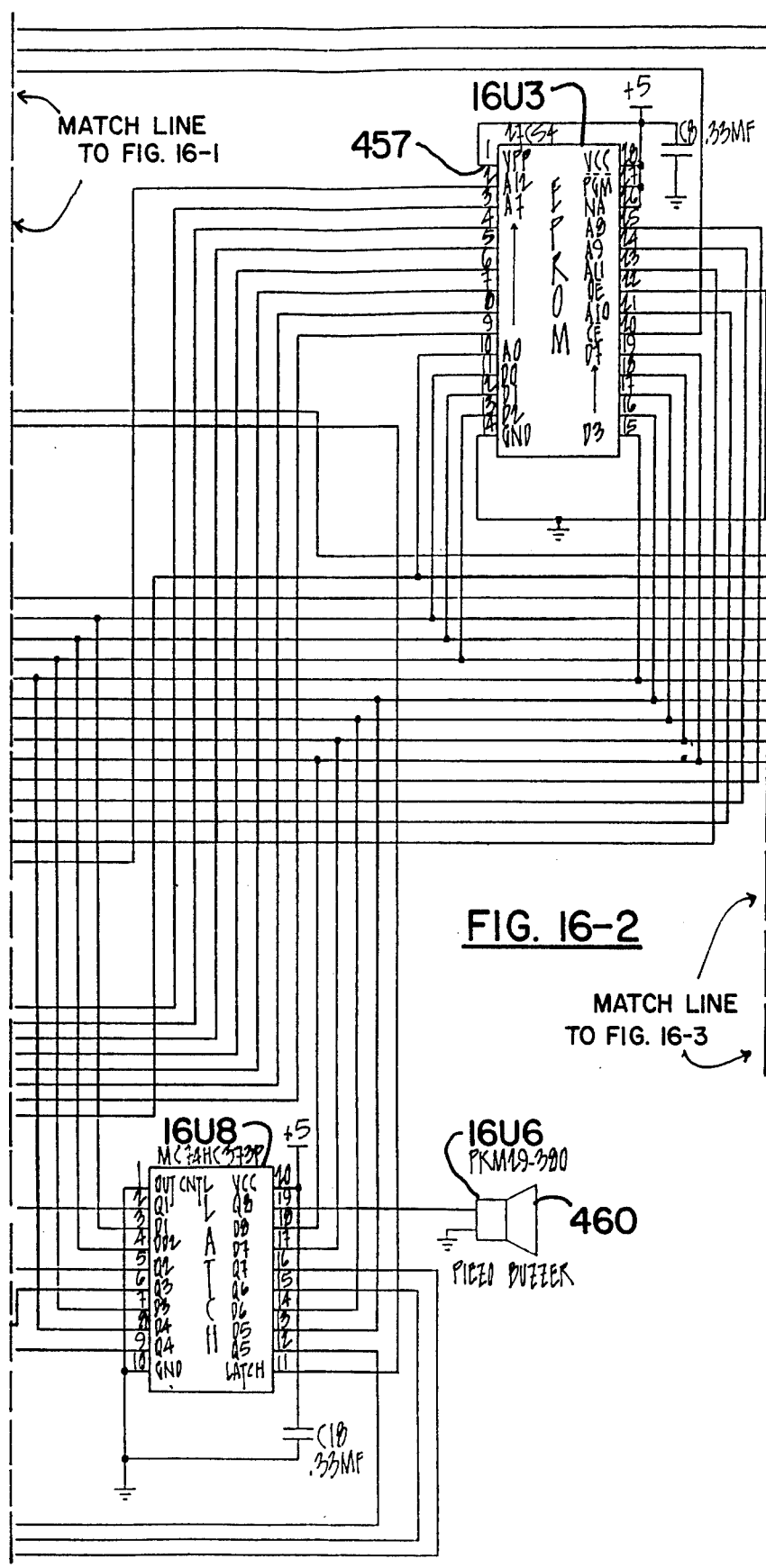
Figures 3, 16:
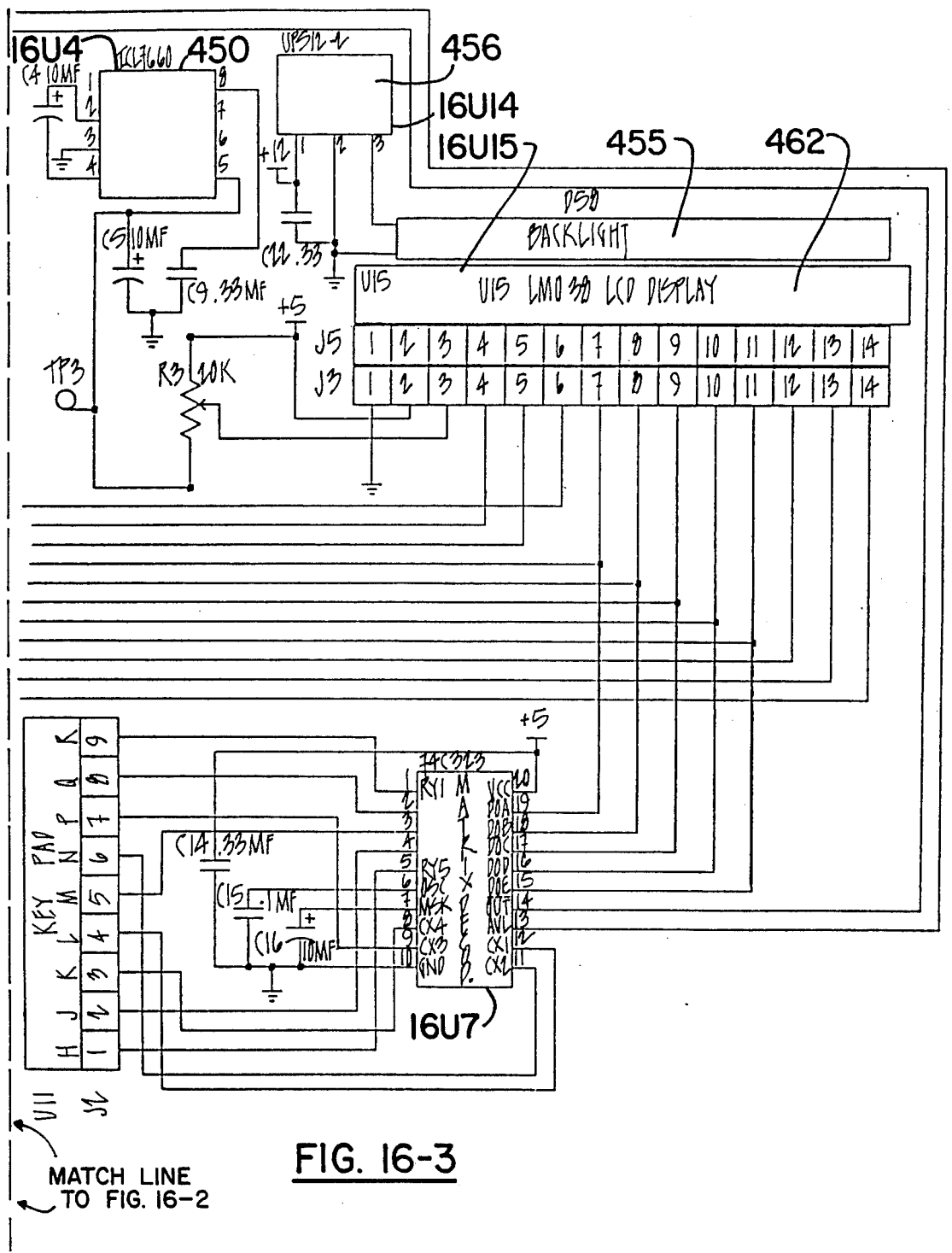

Referring now specifically to FIG. 16, the front panel board has provided a microprocessor 16U5 which is identical to the microprocessor 13AU19 of FIG. 13A. Its functions are quite limited by program relative to the main microprocessor. The front panel communicates with the remainder of the system through a terminal 16j1 which has RX and TX terminals, ground and +12 volts which connects to terminal 15J6 on the rear panel. A regulator 16U13 is provided for taking the standard 12 volts and converting it to 5 volts for internal use, that is for use in the circuitry of the panel. The 12 volts is also utilized in inverter 456 which uses the 12 volts to back light the the front panel display; the output being on the pin 3 of the inverter.

Returning for the moment to the terminal strip 16J1 there is provided a dual comparator 457 which interfaces between the RX and TX terminals and the microprocessor 16U5. The transmit drive is from the pin 12 of the microprocessor and the receiver drives into the pin 11 of the microprocessor. It should be noted that the microprocessor is also provided with a 4.9152 MHz crystal providing the same frequency for direct interface with the internal circuits of the controller unit. The microprocessor is controlled by a program residing in an E-PROM 457 circuit.

Figure 11:
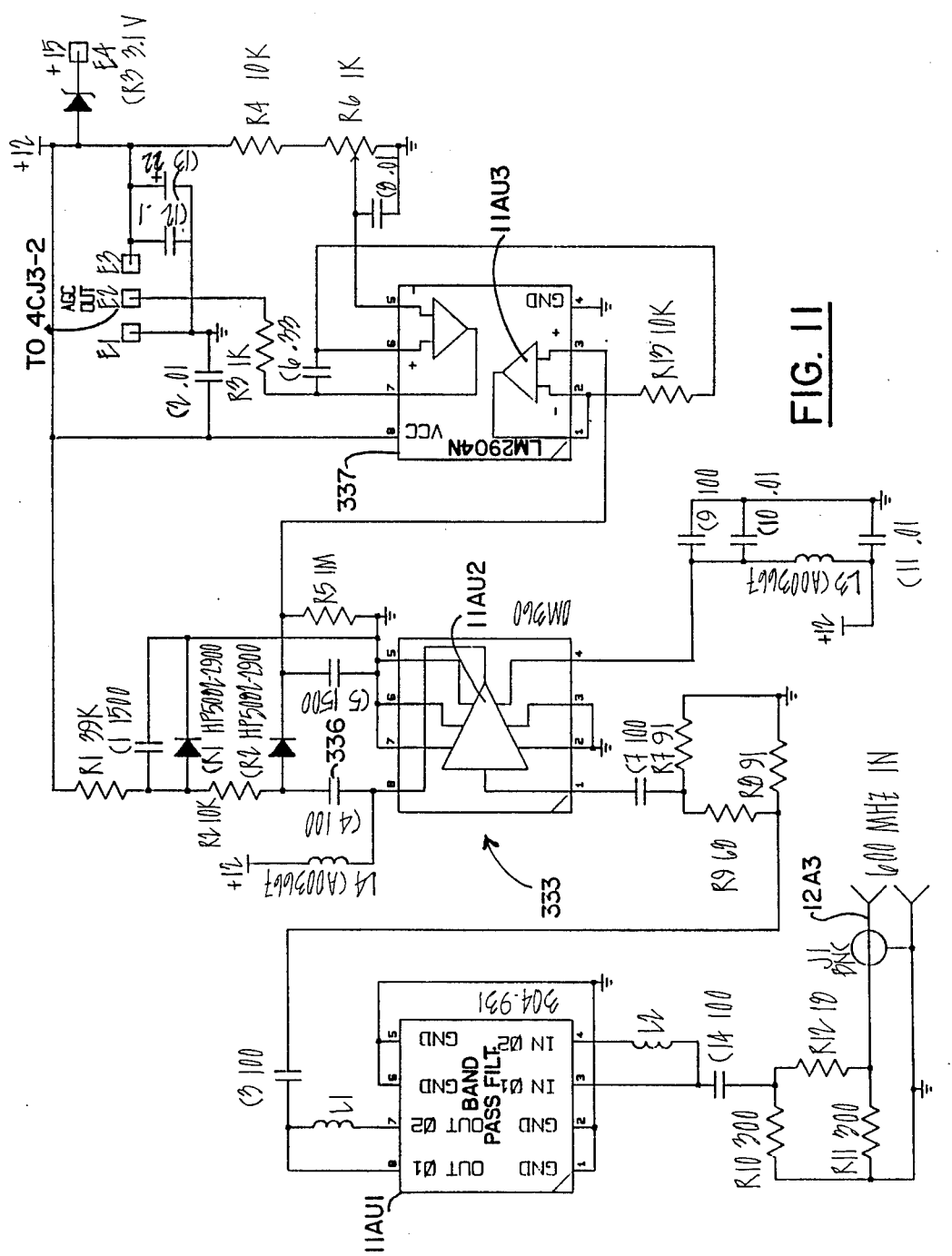
FIG. 11 is a schematic electrical diagram of the external narrow band AGC circuit of the system.

The keys of the keypad as seen from FIG. 11 are arrayed in a 5×4 matrix with the 5 across part of the matrix feeding pins 1-5 and the 4 down array feeding pins 8, 9, 11 and 12, of matrix decoder 16U7. Thus if key ABC-1 is pressed then pin 1 and pin 12 receive input signals and the chip designated by the reference numeral 16U7 decodes the matrix and provides data on the pins 15-19. A data available signal is sent from pin 13 of decoder 16U7 to the microprocessor over a lead 459 through inverter 16U1. The output on pin 6 of the inverter 16U1 is applied to pin 5 of the microprocessor 16U5 which is the request for interrupt, IRQ. The decoder 16U7 provides a signal on a data line indicative of the key struck and this information is passed to the microprocessor 13AU19 of FIG. 13A where the final decoding is achieved, i.e., whether a key has been struck once or twice or whether an "A", "B" or "C" is desired, etc.

LCD display 462 is driven from the data buses directly from the microprocessor 16U5. A latch 16U8 is employed to drive the seven front panel, light emitting diodes providing the off satellite display 326 and the displays at the left side of the front panel as illustrated in FIG. 12A, for clockwise, counterclockwise, east and west and up and down; the up and down not being used in this particular system but which can be used if a nonpolar antenna mount is utilized and latitude adjustment is required. A buzzer 460 is also controlled via pin 19 of latch 16U8. This device is used for warning purposes and also to provide audible feedback whenever a key is depressed. Finally a chip 16U2, which is a decoder, controls the operation of various of the elements for instance on pin 7 appears the chip enable for the E-PROM 457, the output trigger to the matrix decoder 16U7 for the keyboard is on pin 10 of the matrix decoder.

Referring now specifically to FIG. 17 of the accompanying drawings there is illustrated the antenna control box which in FIG. 1 is designated by the reference numeral 13. The controller is provided with two solid state relays 476 and 477, the former for turning the motor so as to rotate the antenna in a westwardly direction and the latter for rotating the antenna in the eastwardly direction. The control voltage for rotating in the eastwardly direction comes in on a lead 478 and for the westwardly direction on a lead 479. The motor is an AC motor and if the solid state relay 476 is energized the motor rotates in the westwardly direction and if the solid state relay 477 is energized the motor is provided with an AC voltage to cause it to rotate it in the eastwardly direction. The motor is provided with circuit breakers 481 and 482 used for overload protection.

To complete the antenna control box description, a potentiometer 483, which is included in the gear box of the motor drive, provides an output voltage across the three leads designated as a group by the reference numeral 484.

Figure 18:
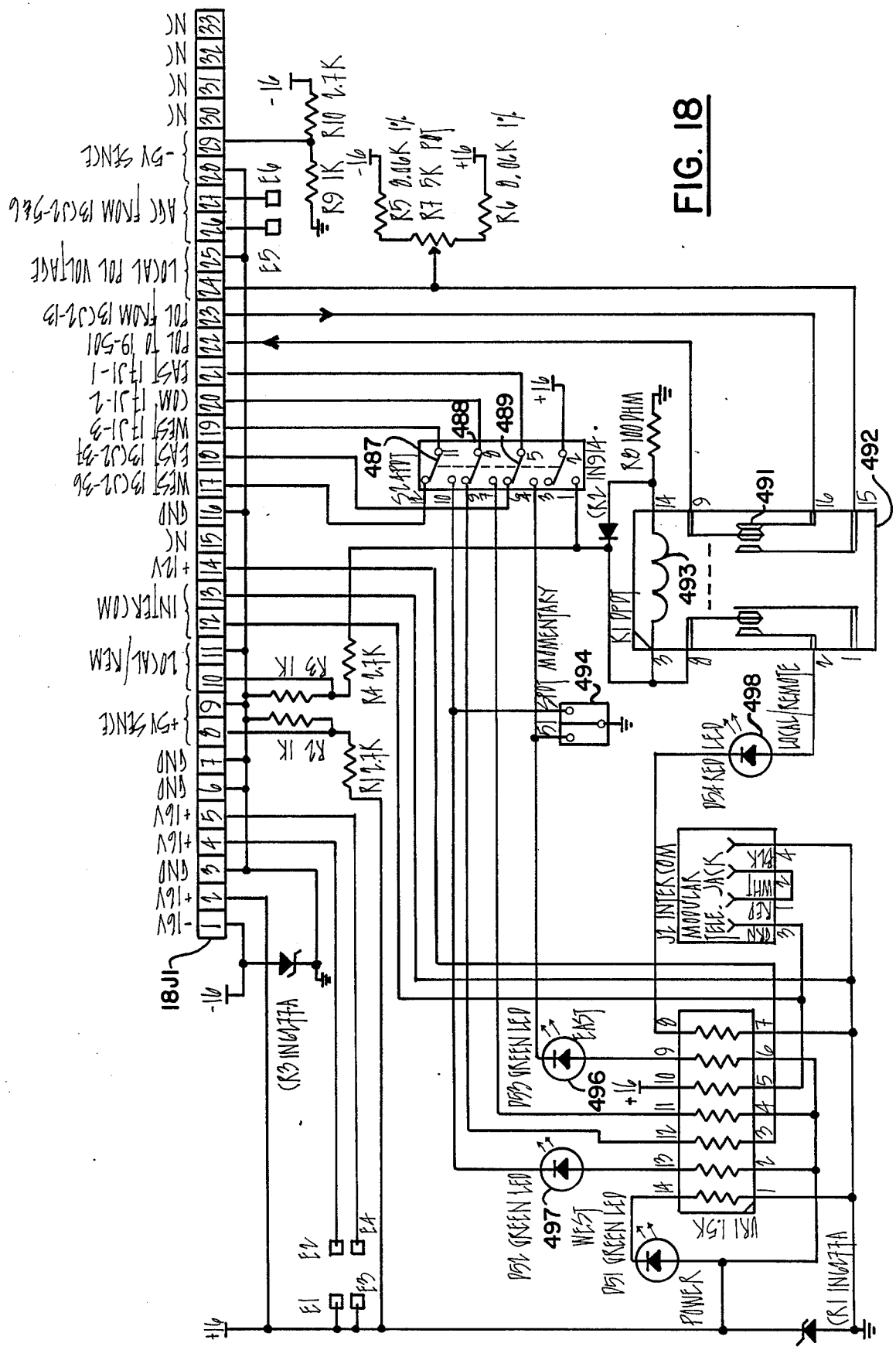
FIG. 18 is a schematic diagram of the antenna motor control.

As indicated in FIG. 1, the antenna control box is under the control of a antenna motor control illustrated in FIG. 18 of the accompanying drawings. The antenna motor control receives a west control signal on a pin 17, of its input connector 486 from pin 36 of connector 13CJ2. This signal proceeds through a normally closed set of contacts 487 of a switch box 488 to pin 19 of the terminal 486 which goes to pin 3 of the input connector of the antenna control box of FIG. 17. The east control from the main antenna control unit comes in on pin 18 proceeds through normally closed switch contacts 489 which places the signal on the pin 21 that connects to the east control solid state relay in FIG. 17. Thus the control from the main antenna control unit is coupled directly to the motor control box unless there is local operation to interrupt this control. Also it should be noted that the polarity control comes in on pin 23, proceeds through a set of normally closed contacts 491 of a magnetically operated switch 492 and provides an output on pin 22 for purposes to be described subsequently. The switch is operated by a coil 493 connected from ground to pin 10 of the connector 486 for providing local or remote control of the polarity voltage.

It is noted that when the coil is energized the movable contact of the switch 491 engages the left contact so that the polarity control, out on pin 22, is derived from the left contact and receives a voltage from pin 24 which is the local polarity voltage control. At the same time all of the contacts on switch 488 are poled to their lower or down position so that a switch 494 may control movement of the antenna to the left or right. Various light emitting diodes signal to the front panel of the motor control that various of the operations are taking place, for instance, an LED 496 indicates rotation of the antenna to the east while 497 indicates rotation of the antenna to the west and lamp 498 indicates whether control is local or remote. As previously indicated in discussing the master control unit 17, the AGC from that unit appears on pins 26 and 27 of the terminal 486 to provide test points so that a local operator can see whether the AGC is being peaked.

Figure 19:
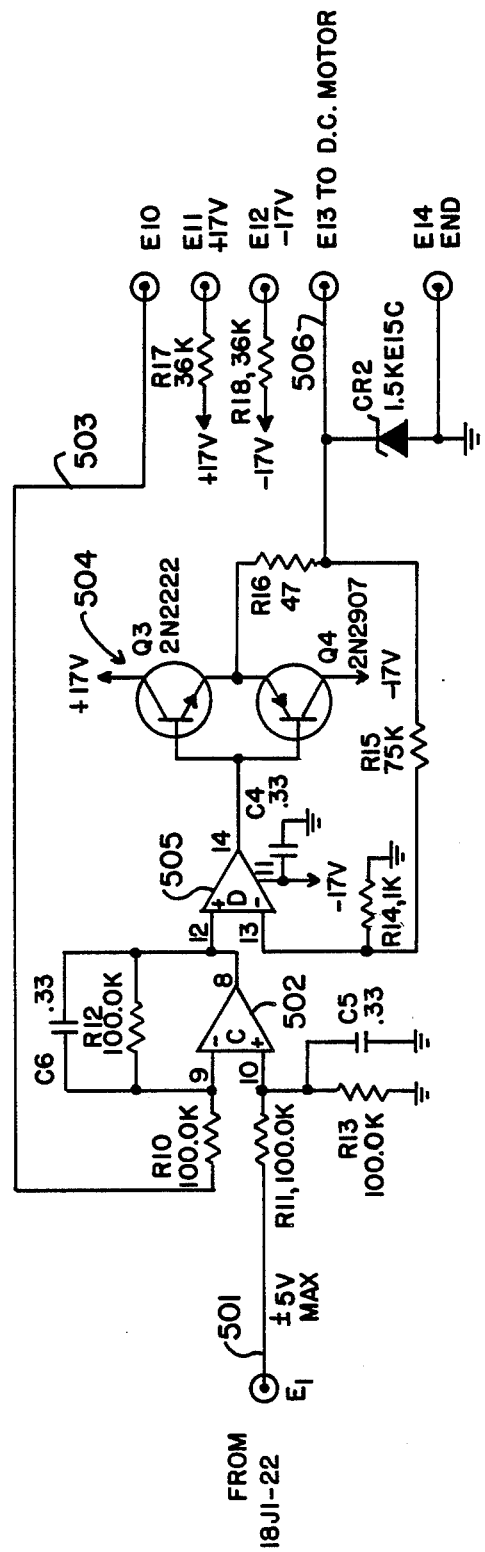
FIG. 19 is a schematic diagram of the servo control for the Ku band polarization control.

Referring now to FIG. 19 of the accompanying drawings, there is illustrated the servo control for the DC motor that drives the polarization control. A signal for actuating the control comes in on a lead 501 from pin 13 of connector 360 of the antenna control unit. The signal is applied to a differential amplifier 502 where it is compared to a signal from the polarization potentiometer on lead 503; the polarization potentiometer being illustrated in FIG. 17 as reference numeral 483. The differential amplifier drives transistor driver, generally designated by the reference numeral 503, through a further amplifier 504. The output signal to the DC motor appears on a lead 506. Specifically, the voltage appearing on the input lead 501 varies between plus and minus 5 volts indicating the direction in which the polarization motor is to be driven. The input from the potentiometer on 483 lead 503 is compared with a signal on lead 501 and when the signals are equal in magnitude there is zero output from the differential amplifier 502 and the motor stops. The value of the voltage for output of the potentiometer is stored in a setup in the EE-PROM of the control unit 17 so that in the future when a setup is called the polarity control will automatically proceed to the desired position. The voltage on lead 501 varies continuously $+5$ to $-5$ thus providing control at any position within the permissible range, which is roughly 180°.

The printout of the program included in the microfiche appendix and identified as HDR Microprocessor Control Program is stored in the ROM of the receiver microprocessor 4CU16, a Motorola 6805T2 microprocessor HMOS chip. This program runs the microprocessor controlling the receiver.

The processor 4CU16, as illustrated in FIGS. 2 and 4C is comprised of fine main areas, the MPU, program ROM, accessible RAM, a frequency divider and a phase detector. Within the HDR is a VCO 26 with a range of approximately 900 MHz to 1180 MHz, the output of which is divided by a prescaler of 256 and then channeled into the phase detector portion of the 6805, 4CU16. A feedback from the 6805 through a comparative amplifier external to the chip is utilized to control the frequency of the VCO 26 in programmed digital steps as the value of N of the frequency divider varies. Therefore, as the value of N is increased or decreased in discrete steps of 1, the frequency of the VCO 26 is controlled proportionally in steps of 0.5 MHz.

In the configuration of the receiver for the Antenna Control Unit (ACU) of the present invention, the microprocessor of the receiver is always configured to operate in the remote mode.

The value of N for the frequency divider is generated by the program. Frequency values are provided by the frequency controller and stored in EEPROM 49 in one of 48 locations accessed as two storage areas of 24 locations each, distinguished as format 3 or format 4. The processor 4CU16 communicates with the EEPROM 49 to access present frequency data.

The microprocessor 4CU16 interacts with an AFC loop, FIG. 4D, which provides an analog input to the serial A/D converter 40. The input corresponds to the frequency tracking of an IF detector and local oscillator feed from RF input. The A/D converter 40 provides the microprocessor 4CU16 with information regarding signal drift from its designated frequency. This information is utilized by the microprocessor 4CU16 to control the value of N to allow the receiver to more closely track the signal.

The receiver program first runs through an initialization routine, lines 50–340 and then begins the main executive routine at line 360. The executive routine lines 360–1700 is a continuous loop from which branches and jumps are taken as needed to perform the receiver tasks. The program includes a transmit routine for intercommunication between processor 4CU16 and EEPROM 49 or the frequency controller. The frequency table routine FTAB for loading of frequencies corresponding to selected transponders is not utilized while the receiver is in the remote mode as it remains for the ACU setup.

The information from the serial A/D converter 40 is processed by processor 4CU16 through the portion of the program identified as the A/D routine. The A/D converter 40 is clocked on pin 2 from pin 9 of processor 4CU16 to cause the flow of information from converter 40 to processor 4CU16. A 128 bit word representing an input voltage to converter 40 between 0 and 5 Volts on pin 5 generated by the AFC loop FIG. 4D, is transmitted out of pin 4 of of converter 40 to pin 24 of processor 4CU16. The word is received and processed by the A/D routine and causes the reception set frequency to be altered correspondingly.

Converter 40 is sampled only once every 2 to 3 seconds to prevent unnecessary adjustment of reception frequency thereby providing a smoother tracking of frequency drift and avoidance of small scale signal jitter. The A/D routine after checking the absolute value of the input, makes a determination of whether to add or subtract a bit for the phase-lock-loop circuitry. Regardless of the amount of deviation from the nominal 2.5 Volt signal indicating precise frequency tracking, the program will only increment the phase-lock-loop by 1 each time the A/D is interrogated until the proper frequency correction is achieved, again to avoid sudden frequency shifts.

The frequency of the phase-lock-loop will change in 0.5 MHz (500 KHz) for each 1 bit change. If the data from the A/D converter 40 represents the nominal voltage of 2.5 then the RF setting of the loop will remain unchanged, otherwise it will be incremented or decremented by 0.5 MHz per bit. The A/D converter 40 will also be disabled by an input of +5 Volt or an input of 0V, thereby disabling the tracking input of the frequency controller.

The A/D routine will first check to determine if the A/D converter 40 is being supplied 0 volts on pin 5, if so, the A/D routine will terminate and flow will return to the executive loop. A similar situation will arise when +5 Volt is supplied to pin 5 of converter 40, wherein the A/D routine will abort and therefore not provide any frequency change commands.

The Read routine, lines 3420–3960, enables the processor 42 to read the frequency stored in the EEPROM 49 by the frequency controller to set up the receiver frequencies. The Write routine, lines 3970–4380, which ordinarily performs the storage of transponders in the EEPROM 49 when keyed in from the front panel of the receiver is not utilized by the receiver when configured in the remote mode as it is for the ACU. In the remote mode all frequencies for the EEPROM are provided externally, for the ACU by the frequency controller, and therefore the frequency controller writes to the EEPROM utilizing the routine TRANSMIT, lines 1900–2490.

The EEFREQ routine provides the processor 4CU16 with the location and value of the frequency stored in the EEPROM 49 which is currently needed. The storage location of the frequency is derived from two inputs. The first input indicates the format 1–4 which is an identifier designating one of four storage areas. The second input is an address location from 1 to 24 within the designated storage area. The format binary number 1–4 is provided on pins 22 and 23 of processor 4CU16, the address within the format location is provided internally from a software routine for formats 1 and 2 or on pins 12–17 of processor 4CU16 for formats 3 and 4 when in remote mode.

Since the receiver is always held in remote mode while utilized by the ACU, formats 3 and 4 will be utilized except in transponder mode in which format 1 is used. Therefore the processor 4CU16 will look to pins 22 and 23 for formats 3 or 4 and will look to pins 12–17 for the address from the frequency controller. The address provided by the frequency controller will correspond to the address utilized by the frequency controller to store the relevant frequency. The frequency controller will continuously cycle through the storage location from format 3 address 1 to format 4 address 24, stepping up one address each time a frequency is changed.

The FTAB routine is utilized for retrieval of fixed stored frequencies in EEPROM 49 for formats 1 and 2. These are set frequencies within the EEPROM 49, but are only utilized during transponder mode operation.

The EEADDR routine, lines 5180–5410 is a housekeeping routine which properly monitors, when necessary, the current address of the microprocessor 4CU16 in which information is being placed or from which information is being extracted.

The TRASMIT routine is utilized to establish and control communication between processor 4CU16 and EEPROM 49, converter 40 or the frequency controller. Processor 4CU16 can communicate with the microprocessor of the frequency controller in the same manner it communicates with EEPROM 49, for transfer of information between the receiver and the frequency controller for operations such as "TALK" and "TALK BACK" discussed below.

The remote mode is triggered by holding pin 2 of processor 4CU16 low.

The program listing included in the microfiche appendix and identified as HFC Microprocessor Program for HDR Control, is utilized by the microprocessor MC6803, 256 of the HFC to read and interpret the status of the front panel switches of the frequency controller to receive data from the ACU Controller and to send RF and video control information to the receiver for proper reception of the desired satellite. The program listing as illustrated in the attached appendix is a direct printout of the program as stored in EEPROM 302, shared by both microprocessors 256 and 301 of the frequency controller. The execution of the program begins at line F000.

The program has an executive loop comprised of lines F000 through F0CS where the program idles while waiting for an input either from the front panel or through the RS 422 port from the ACU. When a front panel key is pushed or a data message received, the program will jump to the appropriate subroutine to process the key.

The front panel of the frequency controller is comprised of ten keys or switches, seven of these keys cause a response in the video frequency controller microprocessor 256 Control program, the remaining three keys, (the audio keys) are processed by the second Audio microprocessor 301. The "ROW" key will cause a jump to a subroutine, lines F0F0 through F14F, which will allow one of the digits of the RF frequency setting to be increased or decreased by the "UP" or "DOWN" key. Successive depression of the "ROW" key will allow the next digit to the right of the digit to be changed. Upward incrementation of a digit past "9" will cause the digits to its left to increment appropriately. The program controls the slewing of all digits within the limits of 3.7–4.2 and 11.7–12.2 MHz.

Depression of the "XPDR FREQ" key will cause the program to jump from the executive loop at line F045 and enter a subroutine from line F180 through line F300. This key allows the operator to select operation of the receiver in either a transponder mode or a frequency mode. The receiver is capable of operation in either mode, the receiver has built in fixed channels of 1–24 frequencies which operate to receive a signal from the appropriate transponder of a satellite when supplied with the transponder identification number instead of a specific absolute frequency. Transponders of a satellite operate at frequency intervals of 40 MHz, the receiver is capable of being set, in the frequency mode, in frequencies intervals of 0.5 MHz.

When the "VID REV" key is depressed the executive loop will exit to the subroutine located at F630 to process the command. This routine enables correct interpretation of a video signal which has been scrambled or inverted in transmission of the video raster.

The "POL REV" key is processed by the subroutine located at line F0B8. This routine allows change in directional polarity reception along perpendicular axes of the satellite microwave signal.

The "½ XPDR" key is processed by the routine at line F660. This routine allows the receiver to operate at half the normal channel frequency of a given transponder of a satellite.

All of the present status settings are stored in EEPROM 261 so that in the event of loss of power, the present status can be restored to the receiver when power is returned.

The Antenna Control Unit serially communicates with the microprocessor 256 of the frequency controller to control the receiver. The serial message for frequency control is comprised of the following information:

---

FREQUENCY CONTROL

| STX | F | Add MSD | M S D | D | D | D | D | LSD | POL | VR | 1/2X | EOT |
|-----|---|---------|-------|---|---|---|---|-----|-----|----|------|-----|

STX — Start-of-transmission character.
F — ASCII character indicating a frequency message.
Add — identifies the address of the frequency controller, 1–4, to which this frequency is to be sent.
MSD-LSD — 6 digit frequency with fixed decimal point between second and third digits from left.
RANGE: C Band 3.700–4.200 GHz.
KU Band 11.700–12.200 GHz.
POL — single ASCII character to indicate desired polarization
0 - vertical
1 - horizontal
VR — single ASCII character indicating video reversed or not reversed
1 - reversed
2 - not reversed
1/2X — single ASCII character indicating half or full transponder mode
0 - half transponder
1 - full transponder
EOT — ASCII character indicating end of frame of word message.

---

A local lock-out (LLO) message comprised of 5 ASCII characters is also sent to disable the front panel switches of the frequency controller while the ACU is scanning or communicating with the frequency controller. The LLO message is comprised of the following:

---

LOCAL LOCK - OUT

| STX | F | Add | L/R | EOT |
|-----|---|-----|-----|-----|

STX — start character
F — frequency message
Add — address of frequency controller desired (1–4)
L/R — ASCII character instructing the particular frequency controller to start LLO mode or to return from LLO mode
11 - start LLO - L
01 - return from LLO - R

---

A SCAN message can be set which will direct the frequency controller to scan a frequency band either C or KU beginning at the low end of the band and continuing until the top of the band is reached or and END message is received. The SCAN and END messages are comprised as follows:

---

SCAN

-continued

| S   | A   |     | E   |
|-----|-----|-----|-----|
| T   | Fd  | S   | O   |
| X   | d   |     | T   |

S - ASCII character 53, indicating scan.
END

| S   | A   |     | E   |
|-----|-----|-----|-----|
| T   | Fd  | E   | O   |
| X   | d   |     | T   |

E - ASCII character 45, ending scan.

A "TALK" message is sent by the ACU in order to interrogate the status of the frequency controller. A "TALK BACK" message is returned by the microprocessor MC6803 256 of the frequency controller to indicate current frequency and status of possible frequency controller setting for the receiver. These messages are comprised as follows:

TALK

| S   |     | A   |     | E   |
|-----|-----|-----|-----|-----|
| R   | F   | d   | T   | O   |
| X   |     | d   |     | T   |

T - ASCII character 54, indicating a talk, request.
TALK BACK

| S | A  | M  |   |   |   |   | L  | P | V | 1/2 | E |
|---|----|----|---|---|---|---|----|---|---|-----|---|
| T | d  | S  | D | D | D | D | S  | O | R | X   | O |
| X | d  | D  |   |   |   |   | D  | L |   |     | T |

The elements of the TALK BACK message closely parallel those of the FREQ CONTROL message.

A second microprocessor 301 is utilized by the frequency controller for control of the audio frequencies. This microprocessor also controls the audio synthesizer and demodulator which sweeps the audio band from 5 MHz to 9 MHz. This microprocessor 301 also receives commands from the ACU Controller on the RS-422 bus between the ACU and the frequency controller for separate control of audio reception. The audio microprocessor is also controlled by the three frequency controller front panel keys utilized to alter and set the audio frequencies.

The series of messages from the ACU to the audio microprocessor 301 are similar to the messages for the video processor 256 but differ in the aspects illustrated below:

AUDIO CONTROL

| S |   | A  | M  |   |   | L  | M  |   |   | L  | E |
|---|---|----|----|---|---|----|----|---|---|----|---|
| T | A | d  | S  | D | D | S  | S  | D | D | S  | O |
| X |   | d  | D  |   |   | D  | D  |   |   | D  | T |
|   |   |    | 1  |   |   |    | 2  |   |   |    |   |

A - ASCII character 41 indicating an audio message
MSD1-LSD - Audio subcarrier for Freq. #1; 4 digits with fixed decimal Range 5.000 MHz–9.000 MHz
MSD2-LSD - Audio subcarrier for Freq. #2; 4 digits with fixed decimal Range 5.000 MHz–9.000 MHz
LOCAL LOCK OUT

| S   | A   |     | E   |
|-----|-----|-----|-----|
| T   | A   | d L/R | O |
| X   | d   |     | T   |

TALK

| S   | A   |     | E   |
|-----|-----|-----|-----|
| T   | A   | d T | O   |
| X   | d   |     | T   |

TALK BACK

| S | M  |   |   | L  | M  |   |   | L  | E |
|---|----|---|---|----|----|---|---|----|---|
| T | S  | D | D | S  | S  | D | D | S  | O |
| X | D  |   |   | D  | D  |   |   | D  | T |
|   | 1  |   |   |    | 2  |   |   |    |   |

Once a frequency has been provided to the frequency controller a calculation is performed on the frequency to arrive at a value to be provided to the receiver. The calculation performed depends on the band of the frequency. The two formulas utilized by the frequency controller to perform the calculations necessary to transform a front panel frequency value (FPFV) into receiver usable form (N) with front panel frequency values in MHz are as follows:
For C Band:

$$N = [(5150 - FPFV) + 600]2$$

For KU Band:

$$N = [(FPFV - 10750) + 600]2$$

The result, N, of the appropriate equation is converted to binary code and sent to the receiver. These frequency values are utilized by the phase locked loop internal circuitry of the receiver to control the reception of the receiver at the proper frequency.

If the frequency is inverted the appropriate equations become:
C Band:

$$N = [(FPFV - 2,750) + 600]2$$

KU Band:

$$N = [(13.150 - FPFV) + 600]2$$

The frequency controller also sends the status of the video reverse, polarization, half transpoders and transponder/frequency selection switches to the receiver. The frequency controller/receiver intercommunication portion of the program is comprised of lines E100 through E27F and accomplishes the necessary handshaking as well as data transmission.

The ACU program identified in the microfische appendix as Mat System Master Control Program and comprising 3 fische, is utilized by the main microprocessor 13AU19 of the ACU. Pages 1–5 contain initialization instructions which define the system. This is at power-on, defining the variable address locations for the program.

The first nine lines of printed code in set up software addressable locations for the microprocessor 13AU19, or HD63A03 chip. For example, line 1 establishes the address for port 1 in the microprocessor as address 1, allowing the program to call port 1 in order to address the pin of chip 13AU19 attached to address of hexadecimal value 0002.

Line ten, DAC 0400 is defining the physical hardware location of the D to A converter 14U2 at the address 400.

Any time the program is to store something out to the D/A converter or load something from D/A converter, a hexade is placed out into the address bus, selecting the D/A converter Lines 11-25 establish the address locations of the pins of the Real Time Clock referring to the register inherent in the timer chip, 13AU8. The Clock has several different registers in it, second, minute, hour, day of week, day of month, year.

Control registers A, B, C and D, in the Real Time Clock are utilized to establish interrupts at specified chronological times.

The timer has fifty bytes of RAM, the very top location is for the RAM inherent to the timer 13AU8 is defined at initialization.

The next four lines, lines 26-29, define addressable location for the Peripheral Interface Adapter 13AU22 port registers. The A to D converter 13CU37 software addresses are then established as are the Interrupt Requests, Azimuth interrupt request, motor drive and relay latches.

The portion of the code identified as MATS Constants defines the start of the transmit and receive buffers in the microprocessor RAM, the starter location in 13AU19. This establishes the hexidecimal location for the serial communications interface of the microprocessor 13AU19.

The section of the text of the program identified as MAT RAM Map defines the variables that were assigned to the RAM locations inside the microprocessor 13AU19. The microprocessor has an internal RAM from locations 80 hex to FF hex and this portion of the code defines the RAM locations. The first one 0080 is a pointer location used to point to the current location in the receive buffer.

The receive buffer pointer gives the location of where to put the next character received into the ACU. The quantity of bytes defined for each variable is indicated to the right of the comments.

NUMCHAR is a variable defining the number of characters to send out.

TEMP 2 is a temporary data register, utilized as a scratch pad. FLAG1 is a section of RA that has several flags signaling the program to perform specific operations upon receipt. DRIVE, is a register to keep track of the antenna motor drive 7 status. The data bits exactly as written out to the motor latches, to turn on the motors are stored here. FLAG2, is a combination of flags.

TEMP and TEMP1 are temporary index holding registers. The index holding registers are utilized for temporary storage of the index register that is part of the programmer's model for the microprocessor. To make sure that, if the index register is changed through operation of the program, a copy of the current index register is maintained for backup. A duplicate copy of two index registers, may be necessary in which event these locations are used for temporary storage of these.

NUMFLG is a flag that is used mainly in the keyboard input/output routine to allow the processor to know how many characters have come from the keyboard.

SATFLG provides information for satellite ID input. Any of these flags can be used for dual purposes, if necessary, for a routine.

DOUBLE is a 16 bit register starting at 8E and ending at 8F. Two temporary registers TEMP 5 and TEMP 6, an Azimuth count register and another temporary register TEMP 7 are defined in lines 0092-0097.

The ALANUM is a register utilized for one of the 32 timed move operations in the ACU system. When an interrupt is received from the timer that indicates a timed move, this register will identify which one of the 32 moves is causing the interrupt.

NUMDIG 5 is a temporary number register. HICNT is a two byte register used in the peaking. It allows detection of the highest count or the highest potentiometer value. Two more temporary registers TEMP 8, TEMP 9 and a previous register PREV which is used in the peaking, to show the previous value before making comparison, are defined at lines 009E-00AO.

STPOINT is used in several routines again as a temporary index register for making memory moves.

DUMPMASK is used in the timer when setting up stored times and as a check to prevent duplication of a time.

Timer count is used to count the Number of Timer Interrupts.

Two more temporary registers TEMP A and TEMP B are defined at lines 00A7-00A8. Register ADDRESS is utilized to contain the current address of the two receivers utilized by the MAT system. The frequency controller/receiver combination can be addressed anywhere from one to four and this register will keep the address number of the current receivers being used, be it one, two, three or four.

NUMFLG 1 is a temporary flag.

FLAG 4 is a packed up flag, comprised of eight flags packed-in for different purposes.

NUMDIG 1-NUMDIG 4 is a temporary storage.

TEMP C-TEMP F are temporary registers. FLAG5 is another group of flags.

MESSAGE, is a flag that indicates a character interrupt from the keyboard.

The MESSAGE FLAG is set due to an interrupt. When a character from the keyboard display unit gives an interrupt, that character is put into the receive buffer at B0 and then the message flag is set. The executive routine or any of the other routines will wait while constantly checking the MESSAGE FLAG if the routine needs an input. As soon as the flag is set, the routine knows that information was received and it proceeds to process the information or command.

For example, a particular routine may need information from the keyboard, it will send a display prompt to the keyboard and wait for a character coming back. The routine will constantly monitor the message flag "MESSAGE" until it is set. Once an input is received from the keyboard the message flag is set, and the routine monitoring the flag will break out of the loop and read the character that came in through the receive buffer.

STXTEMP is a temporary holding register.

IRQHOLD is an interrupt request used mainly to make a copy of an interrupt register from one of the devices, e.g. the timer 13AU8.

BHOLD is for temporary storage of the contents of the B register of the microprocessor. In the programmer's model various delays are generated by decrementing, putting a certain value in the B register or the A register and then decrementing it. So a copy of the contents of that register is made and stored in BHOLD at the entry of that routine. After the delay sequence the value of the A or B register is restored to avoid destruction of something that may be necessary to another routine.

CALDIG 0-CALDIG 4 are calibration digits used for calibrating the receiver and AGC voltage.

LED indicates the front panel LED.

CALDI 0-CALDI 3 utilizes the RAM of the timer 13AU8 defined by the Real Time Clock RAM.

HFC ADDR is the address of the selected frequency controller, currently in communication.

RF 1, RF 2 and RF 3 contain the current frequency set for the selected frequency controller. The last frequency sent to the frequency controller is stored in those registers. The registers are also used for frequency slewing. The contents of these registers provides the frequency controller with a reference for detection of changes from current frequency settings.

VIDREV, POLAR, AUDFRQU1, AUDFRQ2, CMDREG and HXPDR comprise a set of variables indicating frequency controller selectable option settings.

Band indicates the selection of C or KU. SEEKCNT defines the desired antenna location, as a potentiometer voltage in digital form. HFC POL indicates polarization. XPDR MSD and XPDRLSD, the transponder most-significant-digit, respectively indicate by number, a specific transponder. THRSHOLD is part of the receiver calibration routine defining the signal recognition level.

The next section of the code, identified as MAT EEPROM Map, defines the EEPROM, 13AU9, locations and the organization of the data stored in 13AU9. The layout of the EEPROM, 13AU9, is stored in ROM 13AU10 accessed through the microprocessor 13AU19.

An Avocet XASM-68 software assembler for the Hitachi Motorola 6800 family is utilized in conjunction with a standard IBM PC to assemble the source code into a machine language hexidecimal code for storage in ROM, 13AU10. The hexidecimal file resides on a 5 ¼ inch floppy disc. The file is then downloaded from the IBM PC into an ROM programmer, such as the model 884 produced by Digilect, and the program is loaded directly into the ROM 13AU10 from the programmer.

With the MAT EEPROM Map, variables are defined for the assembler, to correlate with variable names in the program.

SATTOP is instructing the assembler that the top of the satellite table is going to reside at 4,000 hex in the ROM and it will end SATSTOP, at 4,618 hex.

ALARMTOP and ALARMEND are defining the table for non-repetitive ACU system alarm times.

WEEKTOP and WEEKEND define the hexidecimal locations for the start and end of the week storage locations.

SAT MSD, SAT 2, SAT 1 and SAT LSD define in the EEPROM 13AU9, the location of the current satellite longitude. A four digit satellite longitude, like 100.0, is utilized for location. The four variables define the satellite longitude's most significant digit, second digit, first digit from decimal and least significant digit, respectively.

The most significant digit through the least significant digit of the heading is not utilized by the polar mount of the ACU system. The AZSTO register is also not utilized. The combination of the characters stored in SATID1 and SATID2 will show the identifier of the current satellite, such as "F4".

ELVOLT and DIPFLG are not utilized for the polar mounted antenna since the elevation is fixed. The THLEVEL is utilized to set the AGG threshold level for receiver calibration of the frequency controller. THLEVEL is the voltage level determined from a video receiver whether there is a signal or not.

AGCG gain defines the value needed for the particular receiver for the gain loop in the hardware. The threshold and gain changes with each receiver, if receivers are exchanged, a new threshold and gain are necessary. A receiver calibration routine is run to establish these values.

FAC1, FAC2, CALANG1-CALANG4 and CALPOT are storage areas necessary to store calibration factors for the polar mount. The response of the polar mount potentiometer is not linear, therefore FAC1 and FAC2 are necessary. CAL angles 1-4, are temporary registers utilized in calibration of polar mount settings. CALPOT is also used to store potentiometer voltage values for the calibration routine.

CALANG1-4 store the four significant digits of the polar angle. A polar angle valve is calculated and temporarily placed there. through physically orienting the antenna 7 at that angle and, reading the potentiometer 8 value. The potentiometer value read is stored in CALPOT. Once these values are established, the registers are read as needed. The set of valves are stored in the EEPROM to correspond to the identified satellite.

POLVAL, this register in the EEPROM will always store the current value in the D to A converter 14UI for the polarization drive. This register will always define the location of the polarization angle.

PCAL1 and PCAL2 are utilized to store a differential voltage in the EEPROM required to move the polarization motor 90 degrees.

SETTOP indicates the first memory location for the start of the setup table, This table contains all 200 of the storage setups for the ACU system. SETSTOP is the end storage location for this table.

ANGTOP to ANGSTOP are the locations of a table in the EEPROM 13AU9, that has all the satellites listed by hour angle, from least to greatest.

The comments on page 5 of the program listing detail the storage of the tables established earlier, specifically the set table, the satellite table, the Angle table, the alarm table and the week table. For instance, the SAT defined locations 4,000, the very beginning of the EEPROM to 4,618 hex, reserved a big block of EEPROM for the satellites. Location data for up to 260 satellites is stored in that location. Each satellite requires six bytes. In byte 1 is the most significant bit of the satellite longitude. Byte 2 has the least significant bit of the satellite longitude. Bytes 3 and 4 will have the satellite antenna potentiometer voltage. This voltage is derived from feedback from the antenna mount, after orientation of the antenna in the direction of the satellite. And bytes 5 and 6 are the satellite reference polarization, the first time a satellite reception is achieved, a polarization is determined and stored.

The SETUP table is organized, having 200 setups that have two receivers with dual audios each, and each setup requiring 25 bytes. Bytes 1 and 2 are indicating the desired satellite for the setup. Bytes 3, 4 and 5 indicate the RF frequency for the first receiver. Bytes 6, 7, 8 and 9 are the audio frequencies for the first receiver. The 8 bits of the miscellaneous byte 10 combine things, like the receiver addresses, the polarization reverse, the half transponder information, video reverse and desired satellite band (C or KU).

Bytes 11-18 are duplicates of 3-10 for a second receiver, if there are two receivers. Bytes 19 and 20 are the polarization values. Bytes 21-24 comprise an alphanumeric name, four character. Byte 25 will be the setup of eight relays through utilized for setting up equipment.

The next table is polar angle storage for 232 possible satellite memory locations in polar angles, six bytes for each. Bytes 1 and 2 are the potentiometer voltages corresponding to the polar angles. Bytes 3-6 indicate the actual hour angle, and band, C or KU. The alarm Table has 16 non-repetitive alarms that each require seven bytes of storage. Byte 1 is the setup number, indicating which setups will be selected upon activation of the alarm. Byte 2 is the alarm month, byte 3 is the alarm day, byte 4 the year, byte 5 the hour, byte 6 the minute and byte 7 the day of the week.

The first 33 lines of the program, i.e. lines 8000-8047 comprise an iitialization sequence. The initialization begins by initially setting the interrupt mask to ignore any initiated interrupts.

The stack pointer is set by a command required by the particular microprocessor to the very last location of RAM from which it works backwards.

A hexadecimal value of FF is stored in MOTOR by lines 8004-8006 to turn off all the motor drives.

Port 1 of the microprocessor is initialized to define the inputs and outputs of the microprocessor port 1. PORT 1 on the microprocessor is used for the control lines of the RS-422 interface, and also for the control lines of the RS-232 interface. This sequence (lines 8009-800F) defines the bits of the ports as inputs or outputs.

Lines 8011-801C clear all RAM in the microprocessor.

The next portion of the initialization routine, lines 801E-8024, causes jumps to three subroutines PIAINIT, SETSCI and CHDATE. PIAINIT, found at lines 80E7-80FF, initializes the peripheral interface 13AU22. Next SETSCI, found at 80CC-80D9 establishes the serial communications interface. This establishes the baud rate and other communication protocols for the communications link. Next subroutine CHDATE is executed to check for valid date data. CHDATE is found at lines F24A-F2AA on Page 213 of the Appendix.

The CHDATE subroutine reads the values stored in the real time clock registers established earlier to determine their validity. The hour's value should not be above 12, the seconds and minutes should not be greater than 59 etc. If an invalid data is found an automatic reset will default the clock to 12:00 A.M. Jan. 1, 1986.

The interrupt holding register is read and cleared in line 8027. Next the gain for the AGC circuit is set. Next, the polarization value is stored to the D to A converter 14U1 for the polarization feed.

The pin diodes switches rear panel for C or KU band are set through subroutine SETBAND. The initialization next loads up the last relay setup from the EEPROM and writes it it out to the relay latches. Next, the interrupt mask is cleared to enable the start of processing. Then after a delay of approximately a second and a half, a display prompt, generated by the subroutine PROMPT, displays "MAT" and "OFFSAT" or "ONSAT", on the front panel of the ACU, depending on whether the system is directed toward a satellite. This signals the end of the initialization.

Upon completion of the initialization, the program enters the Executive loop. The Executive loop is a constant loop which cycles continuously pausing upon detection of an interrupt. The Executive loop comprises lines 804A-80C9.

Upon detection of an interrupt or flag the executive loop stops at that point, performs whatever function or operation the interrupt calls for, and returns to the exit point and continues the loop.

As the Executive routine is running, it is checking certain flags. An interrupt, produced for instance by a character from the front panel, will set an appropriate message flag. The Executive routine will check that flag and if it determines that flag is set, it will now force a jump out of the Executive routine into a subroutine to process that flag.

At the start of the Executive routine, the MESSAGE flag is checked if it is not equal, meaning a message is present, the processor performs a jump to process it. If not, then port 1 is interrogated. The first bit of port 1, which is our RS-232 interface, is checked to determine if the request to send is high indicating that an external device on port 1 is requesting sending data through the RS-232. If not, then line 8052 will return flow up to START2 at line 804A. So if nothing is active, the executive loop cycles between lines 804A and 8052.

the message flag, when checked, indicates that a message or interrupt has been received, the processor will now jump to the location START2B, line 807E, calls up routine PROMESS to process the message.

PROMESS is an actual jump, it is not a subroutine jump, so it will not come back to the jump point. The program flow will return to START2A, line 808B, where, at the termination of all routines, reentry into the executive loop is accomplished.

Upon detection of a message the program jumps to line 807E START2B, which is still part of the Executive routine, establishing an exit from the Executive loop . START2B jumps the program to the subroutine PROMESS. This subroutine handles keyboard inputs. Upon completion of subroutine PROMESS flow returns to the executive routine at START2A, LINE 808B.

START 2B, START 2D and START 2E are different possible routes out of the executive loop to perform necessary functions.

Once the program flow returns to the executive loop at START 2A, line 808B, it comes through and, checks to determine if the microprocessor was in the process of scanning for an frequency controller frequency when the program flow left the Executive loop. If so, there are a few necessary housekeeping routines to be performed. If the system was in the middle of moving to a timed move when aborted, there are also a few housekeeping routines.

At line 808D the program checks a flag to determine if the frequency controller was in the middle of a scanning operation when the Executive loop was left.

Scanning is a feature of the ACU system where the RF frequency of the frequency controller/receiver combination scans up or down. If the program aborted during the scan mode of the frequency controller the microprocessor needs to terminate control of the frequency controller. To accomplish that, a jump to START2D to call subroutine FCH3 to finish the handshaking by sending a termination-of-scan message to the frequency controller, is necessary.

The frequency controller goes into a special mode when it is scanning or slewing frequencies. The frequency controller is switched into that mode through a keyboard sequence processed by subroutine PROMESS. For instance, if the frequency controller was in the middle of scan and an operator activated the clear key, then it would abort out of that operation. A check is made in the Executive routine at the returning point to make the determination to inform the frequency controller, by sending it a message, that indicates that the frequency controller should cancel the special mode. To accomplish this, a flag is set, which causes the program to branch up to START2D. Line 808D checks bit A the scan flag and if it is set, line 808F BNE (Branch Not Equal) will cause the program flow to jump to line 808I causing a jump to subroutine FCH3. Subroutine FCH3 terminates the scan mode of the frequency controller and clears the scan flag. Flow then returns to START2A, line 808B. As flow progresses from line 808B the SCANFLG will be checked again but this time will not be set and so flow will progress to 8091 where the TIMEFLG will be checked.

The Time Flag, flag 4, is the one that has several flags in it. The processor checks to see if a timed operation has begun, e.g. that the executive routine was exited because the timer went off. The processor would have moved to set up, come back, and this timer flag is set.

When a set TIMEFLG is detected, flow jumps up to START2E, line 8084, to clear the flag and set up the next alarm time, by jumping to subroutine NEXTALA, line 8088. NEXTALA will only set an alarm if another alarm has been programmed to be set.

Flow then proceeds through START 2A again and checks the SCAN and TIME flags. All the flags are now clear, therefore, the program flows through a delay sequence, lines 8095–809A.

Next the program will check FLAG3 and if it is set the program will execute lines 80A3 and 80A5 to send a hexidecimal "D" character to the front panel to reset the front panel. If flag 3 is not set the program will jump to line 80AB and begin subroutine PROMPT.

Subroutine PROMPT resets the prompt to display "MAT" etc. on the front panel. The flow then pauses and resets the stack pointer to hexidecimal FF (256) the highest RAM location.

The program then checks the TRMFLG to determine if the processor is in the terminal mode. Terminal mode is when a dumb terminal is hooked up to the RS-232 port, the ACU system can then be controlled through that dumb terminal. If the TRMFLG is set it indicates that the processor was controlled by a dumb terminal on the last operation. If the TRMFLG is not set flow returns to the top of the Executive routine, START 2, line 804A. If the flag is set it must be cleared, because the terminal mode is entered operation-per-operation, therefore the flag is cleared to indicate that operation is no longer in the terminal mode.

After the TRMFLG is reset the processor resets port 1, which controls all the RS-232 and RS-422 lines. Flow then jumps to subroutine LOCAL. LOCAL is a subroutine that tells the front panel it is now active. The communications port baud rate is reset if it was changed due to the dumb terminal being linked at a different baud rate than the front panel. Subroutine PROMPT is run again and then flow returns to the beginning of the Executive loop START 2, line 804A.

That is the general overview of the flow of the Executive loop from initialization through processing a keyboard entry and back into the Executive loop.

The remainder of the program listing is comprised of a set of subroutines all of which are accessed from the Executive loop described above. Each of the subroutines has a specific function and is accessed through identification of the proper interrupt message at line 807E or by an indication that information is incoming on port 1.

This first subroutine, lines 80CC–80D9, SETSCI is for initialization of the serial communications interface of the microprocessor. The baud rate is set at 72.6 kilobits, K-baud, it also gives the microprocessor an interrupt when it receives a character. The subroutine then commands the processor to internally put the receive buffer pointer to the start of the buffer, and then returns to the Executive loop.

Subroutine WAIT is a delay loop that can be called by different routines needing a delay for any reason.

Subroutine PIAINT initializes the peripheral interface adapter, and configures both of the ports for outputs. The ports PA-0 through PA-7, lines 2-9, and PB-0 to PB-7, lines 10-17, are configured for outputs. The input lines are established by automatic default.

Next is the interrupt 1 subroutine IRQ1. This is a hard-wired interrupt from the outside world that comes into pin 5 of the microprocessor. The ACU system as configured does not utilize that interrupt from the outside world. Coming after that a DELAY 5 subroutine is a 5 millisecond delay used particularly for writing to the EEPROM. When writing data to the EEPROM a delay for 5 milliseconds is required prior to further interaction with the EEPROM 13AU9.

Interrupt 2, IRQ2, handles all the serial communications from the microprocessor from pins 11 and 12. Pin 11 is the input, TX, pin 12 is the output, RX. All data in on pin 11 or out on pin 12 will go through the IRQ2 interrupt routine. IRQ2 will respond to a character from the front panel, a character from the RS232 port or a character from the RS-422 port. IRQ2 is utilized to initiate a microprocessor response to an appropriate input or output.

The transmissions are done on an interrupt basis. A character to be transmitted is placed in the appropriate shift register and the microprocessor is set to give an interrupt once it is finished transmitting (shifting) the character. The interrupt is internal to the microprocessor 13AU19. When data or a signal comes in on pin 11, it sets the internal interrupt directly, once one full character has been received.

Upon entry of the subroutine, IRQ2, the control register in the microprocessor is interrogated for the serial communications control register. This register will indicate the interrupt origin, e.g. was the interrupt caused due to a character coming in, indicating that the receive buffer in the micro-processor is full, or that the transmit buffer is empty, meaning that another character can now be sent out. The control register will also indicate errors in communications, e.g. improper character format, incorrect baud rate, parity error, etc.

In response to a "clear" key activation on the front panel keyboard, a character comes into the microprocessor 13AU19 on pin 11. The serial communications control register is read, line 8114 calls for the receive routine portion of the interrupt routine. If the receive register is full, it causes a jump to the portion of the interrupt routine IRQ21, line 8121. A couple of flags are then checked to determine if the system is in a special mode like frequency scan for the frequency controller or the terminal mode.

When the necessary flags have been checked, the program will load the receive pointer which indicates the receiver buffer location for placement of the character, lines 81B3–81DC. The processor after determining where to store the character, then stores it in the receive buffer. Then a count of the number of characters received is incremented. Next the processor sets the message flag, line 8193, and returns to the Executive loop, line 8195. This is the flag in the Executive routine that is checked to determine when a character has come in.

As flow progresses through the Executive loop, the MESSAGE flag will be checked and if set, indicating an input character is stored in the receive buffer, the message is processed by entering the subroutine PROMESS. If the key depressed is "clear" then flow returns to the Executive routine. The function of the clear, is to terminate any current operation of the system, e.g., the middle of a move and returns flow to the Executive routine in an idle state.

Once a "MESSAGE" flag was set in IRQ2 it indicates that a character has come in, therefore flow exits the interrupt routine. In the Executive routine, the message flag is read and a jump to routine PROMESS reads the input character out of the buffer. The character read from the buffer must be an active, valid character which begins the execution of a function. If, for example, the "move" key is actuated, flow will be directed from the Executive loop to the IRQ2 interrupt routine, where that character is accepted from the communications buffer of the microprocessor and stored in RAM in the receive buffer of the processor. The message flag is set and then flow returns from the interrupt.

Flow continues back to the Executive routine. The Executive routine now checks the message flag. The Executive routine will determine that the flag is set and will jump to PROMESS to process the message. PROMESS, line 8224, will read the receive buffer to determine what key was depressed.

The PROMESS subroutine has a table hardcoded in it comprising the keyboard input codes. The front panel has keys 0–13 hexidecimal, i.e. a 20 key keyboard. The routine has defined calling addresses for the different keys. The number keys 0–9 do not initiate any process. The "MOVE" key #17 in the series or hexidecimal 10 will initiate action for example.

If "MOVE" had been the key depressed earlier, a hexidecimal 10 would have been loaded into the memory RAM at BOKEY. The processor clears out the message flag to indicate the processing of the key. Then reads the buffer at B0 for the first key key code, e.g. the hexidecimal 10 from "MOVE".

First the processor compares the key code value to determine that the key code is not out of range. If the value is valid it is processed according to the program line corresponding to the key code, in this case line 8259, to determine the assigned X-register pointing location in our table. With the index register pointing down to the location 8259, the value at 8259, which is 8261, is placed in the X index register of the microprocessor. The next instruction initiates a jump to 8261 for the routine MOVE. The first portion of the move routine; the processor clears the MOVE flag to indicate that the processor has read the "MOVE" code and will soon initiate the move. The processor also clears other flags for housekeeping, speed control, polarization, etc.

Then a section of code loads up a prompt and sends it to the front panel. The prompt is established at the code line 826D and sent to the front panel at code line 8275. The prompt displayed on the front panel display is "MOVE?".

This display informs the operator that the processor has recognized the fact that the move key has been depressed and that the processor requires more information to execute the move procedure.

At this point the routine enters a short closed loop (hard loop) between lines 8275 and 8277. The message flag is loaded and checked to see if it is clear, meaning that we do not have a character, in which case it will loop back up to MOVE1, line 8275. Next time an interrupt, due to a receive character is detected, the interrupt routine will get the character and place it in the buffer at B0 and set the message flag. The program flow will come out of the loop, load up the character and do a comparison. This new character is analyzed to determine if it is a "SAT", "ARROW" or "SET" key. These are the three valid key entries to follow a "move" key entry.

If the processor determines that the second character entered is an "ARROW" key, the processor will initiate the appropriate routine to manually move the antenna in the appropriate direction. If the second key was "SAT" or "SET" the processor will require more information in order to properly implement a move. The "MOVE"-"SAT" sequence allows the operator to direct the antenna toward a satellite, leaving all other parameters unchanged, e.g. receivers, polarization, etc. "MOVE"-"SET" allows the operator to specify a pre-established set of setup specifications, e.g. frequencies, satellite position, polarization, etc. through entry of an assigned setup name.

Once the "move" key message has been processed and flow is in the "move" subroutine main loop, the processor constantly monitors the message flag at line 8275. When a second key is depressed the message flag is set and the processor now loads up the key code, which is at B-0 in the RAM. The microprocessor clears the message flag and does a comparison of this key code. Checking to see if it is equal to a hexadecimal F which would mean that the SAT key was activated, line 8280. The comparison is continued to determine if the "set" key or an "arrow" key has been depressed, lines 8282-8292.

An appropriate call to the appropriate sector of the move program is made upon identification of the second key was depressed. For example, if the key depressed was "SET" a hexidecimal B is stored and a jump to MOVE1C line 82B9, where an "X" character is stored as the polarization variable is performed followed by a jump to routine MOVESET at line 90DF.

MOVESET is the particular subroutine which will compile the controls necessary to reposition the antenna, and reset the frequency controller to the selected set conditions. MOVESET sends a prompt out to the front panel "setup number ?", requiring the operator to respond with the desired setup number from 001–200. The setup number must be three digits, therefor a portion of the set routine is utilized for entry storage and saving of each digit.

These digits are stored in the number digit buffer. This section of code gets a character in, echoes that character back to the display and stores that character in one of the temporary storage registers NUMDIG 1 or NUMDIG 2, depending on which digit it is. The three digits are stored in NUMDIG 1 and NUMDIG 2 in BCD form, the first two digits are stored in NUMDIG 1 and the third in NUMDIG 2.

Once the SETUP input routine is complete flow returns to line 90E2, MOVSET 5 which jumps to subroutine MOVESET A. This subroutine gets the move started. At this point the setup number is in, and the procedure for moving to this setup is begun.

First a calculation is performed to determine where to acquire the corresponding information from the EEPROM. A determination must be made as to where in the setup table the particular data for a setup of a given setup ID number such as 017 actually resides. Lines 90EE-911B perform the necessary calculations to determine specific locations in the setup table in the EEPROM. The top of the table is at 4,700, hexidecimal as defined in initialization. Every storage setup requires 15 bytes of memory space. The first setup occupies from 4,700 to 4,70E, 15 bytes. Set-up 10 is 150 bytes away from 4,700 i.e. 4796-479F. The formula utilized to arrive at a setup storage location is to take the setup number, multiply it by 15 and add that to the top of the table to get the location in the EEPROM memory where the setup data resides.

Once the calculations are finished, flow will drop down to MOVESET 7 at 911D. The processor then loads up the first character of the appropriate line of the table, which is a satellite ID. The processor checks and makes sure that there really is data assigned to that setup.

If the setup number proves to be invalid, i.e. there is nothing or a 0 stored there, it will exit to the Executive routine.

If a valid satellite ID is found, the processor will first determine if the antenna is already oriented toward the satellite. If it is, then flow will default out of the antenna redirecting routine. If the antenna is not already oriented toward the satellite, the character from the appropriate table location is not going to match the current satellite ID data stored on the EEPROM. A jump to MOVESET7B, line 9139, to start initiating the move to the desired satellite, is performed. The processor, utilizing the new satellite ID, interrogates the corresponding portion of SAT table in RAM to obtain values for the satellite. The values are stored in the EEPROM identified by the appropriate variables, and indicate current satellite ID. Subroutine DELAY is utilized to read from and write to the EEPROM. The necessary data for the desired satellite is read from the look up table and written to replace the previous current satellite data. The desired satellite data will now reside in two places in the EEPROM, as the current satellite, and in the look-up table.

The processor now starts initiating changes at MOVESET7A, line 914F. The antenna location values are taken from SAT table, also the frequency values for the frequency controllers which are stored in temporary variables RF1, RF2 and RF3 which reside in the real time clock 13AU8. The 6 video frequency digits are stored as two digits in each of the storage registers. Beginning at line 915E the audio frequency is loaded and stored as is the band, the frequency controller polarity, the video reverse, the transponder, and the polarization setting for the selected satellite. All of these values are stored in the open access RAM portion of real time clock 13AU8, therefore, these values are handy when needed for transmission.

At lines 91A4 and 91A7 jumps are performed to subroutines, frequency FREQ 422 and audio 422, these routines look at the RAM in the real time clock 13AU8, for variables RF1, RF2 and RF3. Those variables are formatted into a message for the RF frequency and sent to the frequency controller.

The frequency controller address indicates which one of the up to four frequency controllers is desired to receive the setup with a particular MOVESET. Also the location of the pointer in the setup table is stored, at line 91A2 because the program is not finished with the information and will need access to the location later. This is all done prior to FREQ422 and AUD422. Subroutine FREQ422 transmits the RF frequency information to the frequency controller. After a MOVESET, the RF frequency of the appropriate frequency controller changes to a different value. Next subroutine AUD422 changes the audio frequency of the frequency controller.

After the Audio frequency is transmitted to the frequency controller, the program runs subroutine WAIT422 a delay loop. Then the ONCEFLG flag is checked to determine if the processor has been through this one time before, because, two receivers are set up by one "MOVE SET" operation.

If this is the first time through the flag is now set to indicate the routine is run once. Then the INDEX pointer stored earlier is loaded so that the processor is now pointing back toward the last previously accessed memory location, the location is then increased by six. The increment, the INDEX by SIX, shifts the pointer over in the table to the other storage information for the second receiver of the MOVESET operation. The program flow then jumps back up to MOVESET7A, line 914F and goes through the same FREQ422/AUD422 process again for the second receiver.

Each setup saved in the setup table contains a full set of data for two receivers to be set to separate frequencies or transponders of the same satellite.

After the second receiver is set up the "once" flag is checked to determine if it is set. In this case, it will be set, so a jump down to MOVE SET 9 is performed, since both of the receivers have already been set up. The INDEX pointer is loaded again, pointing to the next portion of data in the setup.

The processor next loads up further information out of the setup table, and puts it into temporary storage labelled CALDIG 0-3. This is a name of the setup e.g. ESPN, etc. This name is utilized for display as the front panel prompt, "ESPN". The processor next requires information for the relays setup. Subroutine RELUP is utilized to take that information and write it out to the latches, for the relays.

Subroutine called REL UP takes the values, comprising eight bits in the EEPROM. Each bit determines whether each relay is to be open or closed. The processor will next utilize subroutine SETBAND to set the reception band to C or KU dependant on operator selection. Then the polarization information is called from the setup table and subroutine DAUPDATE is utilized to reset the polarization of the antenna. The valve received from the EEPROM is written to the D/A converter Polarization Feed Control FIG. 14 in the ACU auxiliary board. The hexadecimal value pulled out of the EEPROM is placed in the D/A converter, 14U1. The D/A derives a voltage which feeds the DC motor 9 for the polarization. The value stored in the setup will produce a defined voltage for the polarization motor drive.

The polarization drive motor 9 is capable of travel in a complete circle. The polarization motor 9 will travel in a circle, while performing a comparison on the supplied voltage through an operational amplifier comparator on the motor. The second input of the operational amplifier comparator is supplied corresponding to the actual position of the motor. When comparison of the two inputs is equal, between −4 to +4 Volts, the motor stops.

Subroutine TABLOOK looks up the satellite ID stored at the beginning of the storage area allocated to a particular satellite, and very first finds the positional information for that satellite and commands the moves for the antenna. The antenna is positioned in the orientation discovered during installation where the signals from the desired satellite are strongest. This antenna orientation was stored as optimal in the setup table. Subroutine TABLOOK, line 88C1, first acquires the data necessary for a move from the satellite table.

First TABLOOK gets the satellite address from the address table. This process is very similar to the setup table. The program must first calculate where in the EEPROM the satellite information resides. The routine for calculation of the sat address, SATADD, is at line 88A8.

The antenna orientation information is not stored in the setup table, but is stored in the satellite table in the EEPROM 13AU8. In this manner the data for antenna orientation is stored separately from the receiver setup data so that the information can be accessed separately.

Once the EEPROM address for the antenna positioning information for the desired satellite has been calculated by SATADD, flow returns to TABLOOK at 88C4.

TABLOOK now has a pointer location in the EEPROM to enable the processor to know where to go to look for antenna orientation information. At 88C4 the first character is loaded and checked for valid data. If it is a zero, there is nothing stored there and a jump to TABLOOK 3 is performed, terminating the read of information from the sat table and beginning the provision of prompts for manual supply of satellite location data.

TABLOOK is a routine utilized for MOVE Set-ups, for MOVESAT and for auto acquisitions. It is one of the routines used for several different functions. If TABLOOK finds valid satellite information it will continue to read values from the sat table and position the antenna accordingly. If no valid sat information is stored for the particular satellite ID, the TABLOOK will provide prompts like "what is the satellite longitude?", and will start calculating polar angles, and try to move the antenna to the proper orientation.

If the data is valid, the processor checks flag 1 looked at when over in the MOVESET routine to determine if the antenna is already oriented toward that satellite. If so, the MOVE routine is unnecessary, the flag restored and a jump to TABLOOK2 returns to the EXEC routine.

If the SAT flag indicates a different satellite, the flow jumps to TABLOOK0 in order to load the antenna potentiometer 8 voltage corresponding to the new satellite, so that the processor knows what potentiometer 8 voltage should be detected from the antenna mount. This desired potentiometer reading is stored in SEEKCNT for reference. The flag "ONSAT" is cleared, because the antenna is about to move off of the current SATELITTE.

Subroutine AUTOAZ 847F, is then utilized to move the antenna to the potentiometer voltage contained in the register SEEKCNT. The first four lines of AUTOAZ cause an audible Alert mounted on the antenna to sound, indicating that the antenna is about to move. This warning signal is sounded to prevent an individual from being injured by the antenna motion. The signal will sound a sufficient period of time prior to the start of the antenna motion to allow individuals to move clear of the antenna.

Subroutine AUTOAZ first requires the present orientation of the antenna in order to redirect it to the desired orientation. A jump to subroutine READPOT is therefore performed to determine the present reading of the antenna potentiometer 8. READPOT utilizes the A/D converter, 13CU37, illustrated in FIG. 13C, through subroutine ADC, line 83AB.

At the start of READPOT, line 846C, a "1" is loaded into the microprocessor accumulator, a branch to READAD is performed and flow jumps to ADC. In routine ADC the first step is to store an "A" at location 6000. "A" is the input on channel one of the 8 input channels of the A/D converter 13CU37. Channel one was defined as the input, in this instance, by routine READPOT. The potentiometer 8 driven by the antenna orientation has its output connected to channel one of the A/D 13CU37. Therefore, when a voltage reading indicating antenna position is desired, channel one of the A/D must be specified.

Multiplexer 13CU29 is a digitally-controlled analog multiplexer, with one common output connected to the A/D converter 13CU37 from pin 3 of multiplexer 13CU29 through one amplifier of quadamp 13CU32 to pin 3 of A/D converter. There are 8 inputs or 8 channels into the A/D converter 13CU37.

Subroutine READPOT directs A/D to look at channel 1, which is Y1 of multiplexer 13CU29, pin 14. The voltage originates with the potentiometer 8 of the antenna. Pin 7 of the potentiometer 8 supplies a voltage dependant on the antenna orientation to a differential input operational amplifier 13CU27 which supplies the YI voltage for multiplexer 13CU29. The ADC routine needs this voltage in digital form from the A/D 13CU37.

Subroutine ADC, after a delay for voltage stabilization, prepares to read the digital output of the A/D corresponding to the potentiometer input voltage by writing a "0" out to the A/D over the data lines (16–23/37–30) or the microprocessor. Receipt of a "0" by the A/D commands the A/D to begin conversion of the analog voltage input from the antenna potentiometer 8 into binary form for the microprocessor 13AU19.

The A/D requires approximately 100 milliseconds to perform the appropriate conversion, therefore a delay of 120 milliseconds is allowed line 83B2.

The microprocessor 13AU12 then interrogates the A/D 13CU37 for voltage information. The A/D must be read twice to trnansfer all 12 bits of information. The first read, line 83B5 transfers the upper four bits to the microprocessor the second read line 83B8 transfers the lower eight bits. The upper 4 bits are stored in register A and the lower 8 bits in register B of the microprocessor. Flow leaves the ADC routine at this point and returns to line 845B in the READAD routine. The data from the A/D representing the voltage from the antenna potentiometer 8 is converted from a twos complement form as provided by the A/D into sign-magnitude number to enable direct comparison with the desired potentiometer voltage for the new antenna orientation stored in the timer RAM as SEEKCNT. After conversion the values are restored in registers A and B of the microprocessor.

The current antenna orientation voltage value is then transferred from the A and B registers to the index register of the microprocessor by subroutine EXCH, line 9960.

At line 8490 the microprocessor is making a comparison between the value in X the index register and the value of SEEKCNT the desired antenna orientation voltage supplied earlier. The result of this comparison will determine the next subroutine performed. If the values are equal a jump is made to TH at line 84C0, if the current voltage is greater than SEEKCNT a jump to EAST is made; if the current voltage is less than SEEKCNT, subroutine WEST is executed.

Routine EAST will move the antenna eastwardly and WEST will move the antenna westwardly. The antenna under polar mount conditions must always make its final approach to the desired stopping orientation from the east moving westward to achieve precise positioning by allowing for drive mechanism tolerances. Therefore, if the antenna is initially directed to move eastwardly it will continue past its intended stopping point so that it can approach from the east moving westwardly.

The first 3 lines of EAST add hexidecimal "10" to the value of SEECNT to establish the desired overshoot of eastward movement. Flag 2 is then set to indicate that the antenna is moving. Lines 84D9-84ES establishes a front panel message indicating eastward movement of the antenna by turning on the east front panel "EAST" LED.

At lines 84E8-84EA the command to begin the motor drive eastwardly is established and sent to the motor. The value 7D hexidecimal is loaded into the "A" register and then sent out to the azmuth motor drive latch. Once the motor 7 has been energized and the antenna is in motion the program flow enters a loop which constantly compares the present potentiometer voltage with the target voltage (SEEKCNT).

The loop, "EAST 1", lines 84ED-84FA, first loads the front panel "message" to determine if a key has been activated since the start of the move. If so, the key command is processed. All keys are ignored and flow continues through the loop except for the "clear" key. If the clear key is depressed, flow jumps to subroutine "ANTSTOPA" and the antenna motion is stopped.

After checking for front panel messages and detecting none, the loop reads the antenna potentiometer current voltage, READPOT. The value from the A/D is converted into usable form, EXCH, and compared to SEEKCNT. If the current potentiometer voltage is not yet equal to SEEKCNT flow will return to line 84ED "EAST1" while the motor drive continues, and the comparison is repeated. Once the voltages are equal, indicating that the antenna has been moved to the desired eastward orientation, the flow drops to line 84FC to stop the motor 7.

A 7F hexidecimal is loaded and sent to the motor control latch to stop the motor, lines 84FC-84FE. Then SEEKCNT is decremented by "10" in preparation for westward movement, 8501-8507. A branch is then made to WEST1, line 84AC, to begin westward movement of the antenna back to the final desired antenna-directed orientation.

At line 84AC, "WEST1", a 7E hexidecimal is output to the antenna motor latch instructing the motor 7 to move the antenna westwardly. The flow enters a loop "WEST 2" line 84BI-84BE which performs in substantially the same manner as "EAST 1", reading the present antenna potentiometer voltage and comparing it to "SEEKCNT". When the voltages are equal the flow drops out to line 84C0, routine "TH", the motor is shut off with an "FF" (which also shuts off the audible alarm), sent to the antenna motor latch and the front panel LED is shut off indicating termination of the antenna move.

If in lines 8490-8495 it has been determined that the antenna needed to be moved westwardly, then routine "WEST" line 8497 would have been performed and routine EAST would not be run through at all. "WEST" sets the flags and front panel messages as would "EAST" and then flows into "WEST1" and "WEST2" which perform as described above to move the antenna and detect when it has reached the proper orientation.

Once the repositioning of the antenna is complete flow leaves routine "TH" within routine AUTOAZ and returns to TABLOOK at line 88E4. After a delay the BANDFLAG is reset and the "onsat" flag is set to indicate that the antenna is now oriented toward the desired satellite. The polarization is checked and set if necessary, otherwise a branch to TABLOOK 2 is performed to exit from subroutine TABLOOK back to the "MOVSET" subroutine at line 91FA. A jump to subroutine BEEP to produce an audible signal from the front panel to indicate completion of an antenna move is performed. Then, line 91FD, flow leaves MOVSET and returns to the Executive routine.

The necessary audio and video frequency data is sent to the appropriate frequency controller by the ACU through utilization of subroutine FREQ422 and AUD422 accessed in MOVSET at lines 91A4 and 91A7 respectively. The routines are located at E172 and E254 respectively.

Routine FREQ422 compiles a message containing RF frequency, half-transponder, and video reverse information and sends this information message to the frequency controller. The routine clears the ACK flag at the start to prepare for information receipt verification. The check of flag 3, line E178, and the subsequent seven lines, are utilized only when this routine is utilized for frequency scan functions. When utilized for transmission of appropriate video frequency information to the frequency controller flow is directed to line E188 where a jump to subroutine XOFF is performed.

XOFF at line E3F2, is utilized to close communications between the microprocessor and the front panel of the ACU controller. This allows the microprocessor 13AU19 to communicate with the frequency controller without causing confusion within the front panel processor 16U5.

Upon return to FREQ422 at line E18B the microprocessor loads the transmit buffer which begins at C8 of the microprocessor 13AU19 RAM. The message for transmission to the frequency controller is then built up into the buffer. The message, illustrated below, is comprised of the characters identified and described as follows:

| S T X | F | A d d | M S D | D | D | D | D | L S D | P O L | V R | 1/2 T | S | E O T |
|---|---|---|---|---|---|---|---|---|---|---|---|---|---|

| | | | | | | | | |
|---|---|---|---|---|---|---|---|---|
| STX | | | | - start of transmission character. | | | | |
| F | | | | - character designating a frequency message. | | | | |
| Add | | | | - address of desired HFC to receive message. | | | | |
| MSD-LSD | | | | - 6 bit ASCII code frequency value. | | | | |
| POL | | | | - horizontal or vertical polarization bit. | | | | |
| VR | | | | - video reverse indication character. | | | | |
| 1/2T | | | | - half-transponder indication character. | | | | |
| S | | | | - ASCII character     X - for scan function. | | | | |
| | | | |                     0 - for no-scan. | | | | |
| EOT | | | | - End of Transmission character. | | | | |

The STX, F and EOT are standard characters built into the program, the remaining characters of the message are called up by name from storage in the RAM of the timer 13AU8 for assembling into the message. The STX, F and Add characters are supplied in lines E18E–E19B, a flag is then checked line E19D, to determine if a frequency value or transponder number is to be sent in the message. The setting of this flag will determine the remaining content of the message. If a frequency is to be sent a jump to routine FREQ422K line E1C4 is performed to acquire the appropriate frequency values, if a transponder number is to be sent flow continues at lines E1A3–E1.

FREQ422K first increments the buffer pointer by 3 because the start (STX) frequency (F) and address (Add) characters have already been supplied to the buffer. The processor then calls RF1, RF2 and RF3 from RAM storage in the timer 13AU8 and converts each one from BCD into ASCII code in sequence. Subroutine XFORM is utilized to convert the values and store the ASCII code into the buffer.

The frequency controller polarization character is utilized to direct the selection of either the vertical or horizontal input of the receiver. The HFCPOL flag is loaded, line E1DB, and dependent on its value, stored earlier, an "H" or "V" is supplied as the message bit 10.

A default of no-video-reverse is initially loaded into the message for the VR bit. A comparison against the VREV flag set earlier is performed and if they are equal, i.e. no video reverse desired the program flow is directed to line E1ED to begin routine FREQ422E. If the VREV flag indicates that video reverse is desired the no reverse default "X" is replaced by an "R" to select video reversal, line E2EB.

The half-transponder character is determined in the same manner where a default of no-half-transponder is originally stored and then compared against a flag and finally an "N" or an "H" is stored in the buffer, line E1F8, for bit 12 of the message.

The program next checks the scan flag, E1FA, to determine if the scan mode is desired and if not flow is directed to line E204. An ASCII "0" is placed in the 13 bit location of the message to indicate no-scan. If scan is selected then an "X" is placed in this position by operation of lines E200 and a branch is made to line E206. Following the scan indication character is an EOT to indicate the end of the frequency message.

Once the video RF frequency message is assembled in the buffer it is serially sent out pin 12 of the microprocessor 13AU19 and through the RS-422 bus Driver Rear Panel to the frequency controller. Lines E20C perform the necessary setup functions to prepare the microprocessor for serial transmission. First a "14" is stored in NUMCHAR to indicate the number of characters in the message. The 422 port is then enabled through enabling lines P-17, 18, 19 and 20 by placing a high signal on pin 20 of the microprocessor 13AU19.

A jump to subroutine XMIT is performed to accomplish transmission of the message to the frequency controller. Once transmission is complete the FREQ routine clears out and resets appropriate flags and then terminates at line E253 where flow returns to the Executive loop.

Subroutine AUD422 operates in the same manner as FREQ422 to assemble a message and transmit it to the frequency controller. The format of the message is different as illustrated below. The audio message is an eight bit message comprised of the following bits:

| S T X | A | A d d | M S D | D | D | L S D | E O T |
|---|---|---|---|---|---|---|---|

| | |
|---|---|
| STX | - start of transmission character |
| A | - character indicating audio message |
| Add | - address of desired frequency controller |
| MSD-LSD | - 4 digit audio frequency |
| EOT | - end of transmission character |

The PIAINIT routine, lines 80F0–8108, is for control of the Super Number Cruncher chip 13AU16 through setup of the peripheral interface adapter. The Super Number Cruncher 13AU16 utilized by the ACU is manufactured by National Semiconductor and communicates on National's "microwire bus" system, which is incompatible with the 6800 microprocessor 13AU19 bus. Routine PIA therefore emulates the bus sequence timing for the Super Number Cruncher 13AU16 through software techniques.

If during the setup of a MOVESAT the microprocessor determined that there was no data stored for that satellite in the setup table, a routine would have to be performed to calculate the polar angle of the desired satellite before an antenna orientation move can be made. The determination that no satellite has been stored is made at line 88C6 where the first character of the satellite address acquired in routine SATADD is a "0" indicating that it is not a valid satellite and initiating a jump to TABLOOK3 line 891F.

TABLOOK3 will start the process of acquisition of information relative to the new satellite. The longitude of the satellite is entered through a jump to routine LONG1 line 8575 which processes the keyboard entry of the satellite longitude values. Once the longitude has been entered it must be restored, therefore the SATFLG is cleared and a jump is made to TABLOOK4, line 8990. The satellite longitude information is stored in the EEPROM 13AU9 as SATMSD through SATLSD. Next routine HANGLE is then performed to calculate the polar antenna hour angle utilizing the earth station latitude and longitude and the satellite longitude.

Routine HANGLE utilizes the formula:

$$HA = A + ARC\ TANGENT\ [(COS\ B * SINA) / (6.611 - (COS\ B * COSA))]$$

where:
   A = Satellite Longitude – Earth Longitude
   B = Earth Latitude to calculate the proper orientation values for the polar mounted antenna.

Routine HANGLE first sends a prompt to the ACU front panel display to indicate that it is performing the calculation process. Next the chip 13AU16 is reset by loading a hexidecimal "2F" as a command to the chip. This command causes the Super Number Cruncher (SNC) 12AU16 to perform an internal master clear software reset.

Subroutine SNCCOM performs all of the communications between the SNC, 13AU16, and the PIA 13AU22 along data lines PA0-PA7. Routine HANGLE provides the appropriate inputs for the SNC via the PIA through implementation of routine SNCCOM. The SNC accepts values for such variables as satellite longitude, stores these in the SNC X register and then performs the appropriate arithmetic operations upon the values when appropriately commanded.

All commands are sent from the main microprocessor 13AU19 through the PIA and then with the proper handshaking and bus timing emulation, from the PIA 13AU22 to the SNC, 13AU16.

Routine SNCCOM at line 966B, utilized for formatting output to the SNC via PIA first establishes the output port A of the PIA, lines 2-9 of the PIA. In line 9670 an "FE" is loaded to the B register of the PIA to establish the chip-select pin 37 low on the SNC. This value is sent to register B of SNC by program lines 867B-867E. Once the chip-select is established, the SNC is ready for data transfer. The value loaded in HANGLE prior to the particular subroutine SNCCOM jump, e.g. "2F", is stored out to the PIA via port A, pins A0-A7 connected to the data inputs of the SNC, program lines 9680-968C. Next pin 7 of the SNC, the write line, is strobed low, line 968E.

The write line is then disabled, line 969D, indicating the data is sent. Then the chip-select is disabled, 96AB, and then flow enters routine SNCRED which monitors the SNC ready line pin 8 of the SNC connected to pin 40 of the PIA. When the ready line goes low it indicates that the SNC has completed operation on the last received data. Once a ready line low is detected flow returns to SNCCOM line 96B1 and a READFLAG is loaded to determine if the processor is waiting for return data from the SNC, such as the answer to a calculation.

If no answer is required, flow jumps to COMEND line 96F7 and returns to HANGLE at the point where SNCCOM was last called. If return data is expected, the read line from the SNC is enabled and data is transferred from the SNC to the microprocessor.

Routine SNCCOM supplies the SNC with data necessary to perform an operation such as reset, storage of a value or calculation of a cosign. Through operation of SNCCOM the data is input to the SNC via the PIA and the SNC then operates internally upon that data. The SNC will indicate completion of an operation through the SNC-ready-line-low on pin 8 of SNC, pin 40 of the PIA, and will return desired data to the microprocessor via the PIA and SNCCOM.

SNCCOM is called after each value and operation entry of the formula stored as variable inputs and program steps. The progression of the formula is detailed in comments beside appropriate code lines of the microfiche appendix program listing.

Once the polar hour angle has been calculated by the SNC, the value must be converted and sent to the microprocessor for utilization in antenna positioning. Subroutine SNCOUT line 96FA, reads the floating point output of the SNC and stores it in the microprocessor RAM in address locations 91-99. The hour angle out of the SNC has a sign, six digits to the left of the decimal and a digit occupying the tenths positions.

Upon completion of the HANGLE routine, flow returns to TABLOOK at line 8986 where the jump to subroutine HANGLE was performed. The hour angle produced is stored in the table of satellites and hour angles by routine STOANG. The RTS return line 89C2 sends flow back to TABLOOK 4 line 8990 flow continues to TABLOOK 1 where a satellite band request will be made and either C or Ku must be operator specified. Then the microprocessor enters a "thinking" mode again and outputs an appropriate response. Subroutines ADJUST and HAVOLT are next performed.

Subroutine ADJUST is utilized to compare the calculated hour angle with a set of ranks to determine which rank the particular hour angle is in. ADJUST will assign a certain number of millivolts per degree dependent upon the rank into which the hour angle fits.

Figure 20A:
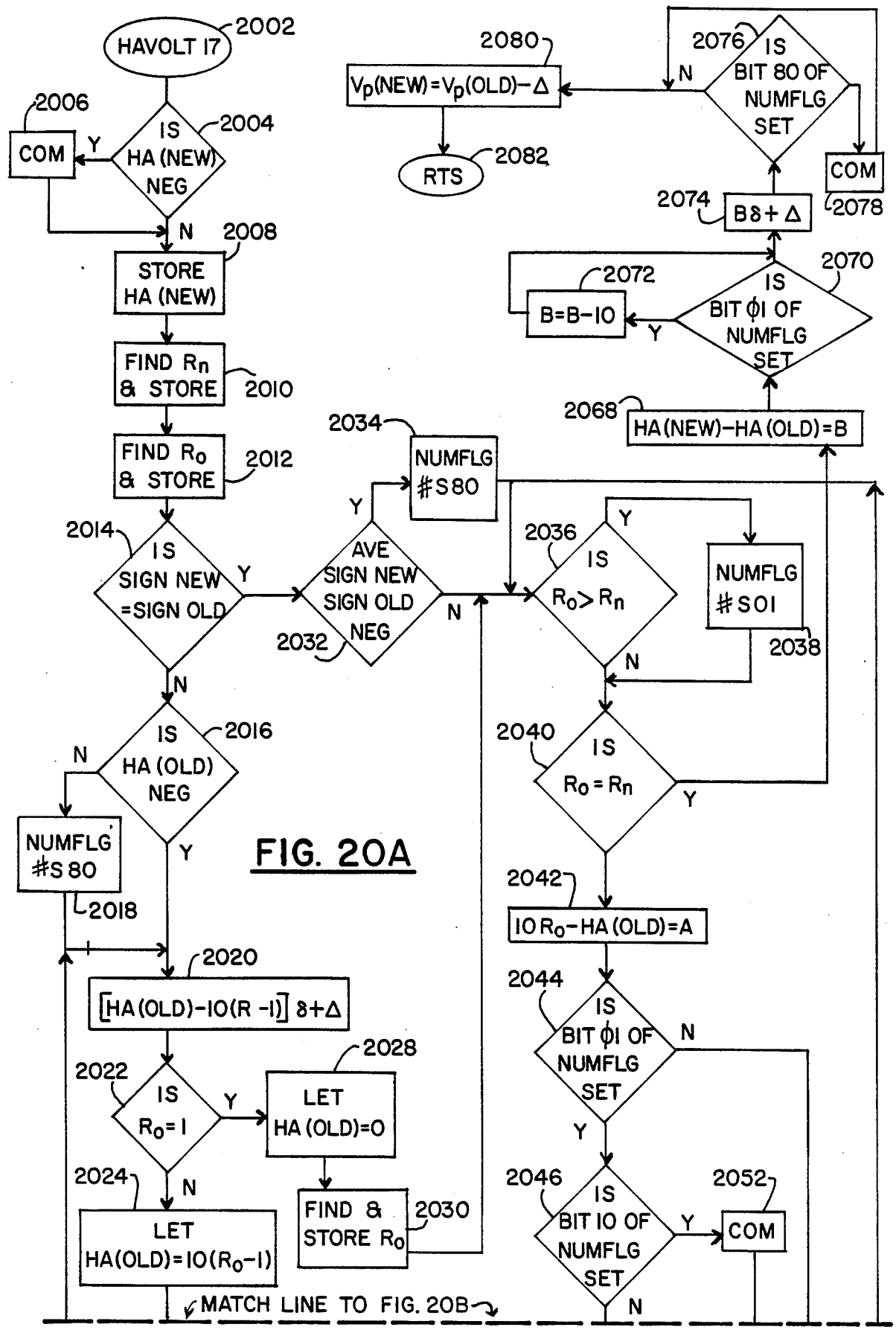
FIG. 20 is a logical flow diagram of Routine HA-VOLT and associated calculations utilized to calculate antenna potentiometer settings from hour angle values.
Figure 20B:
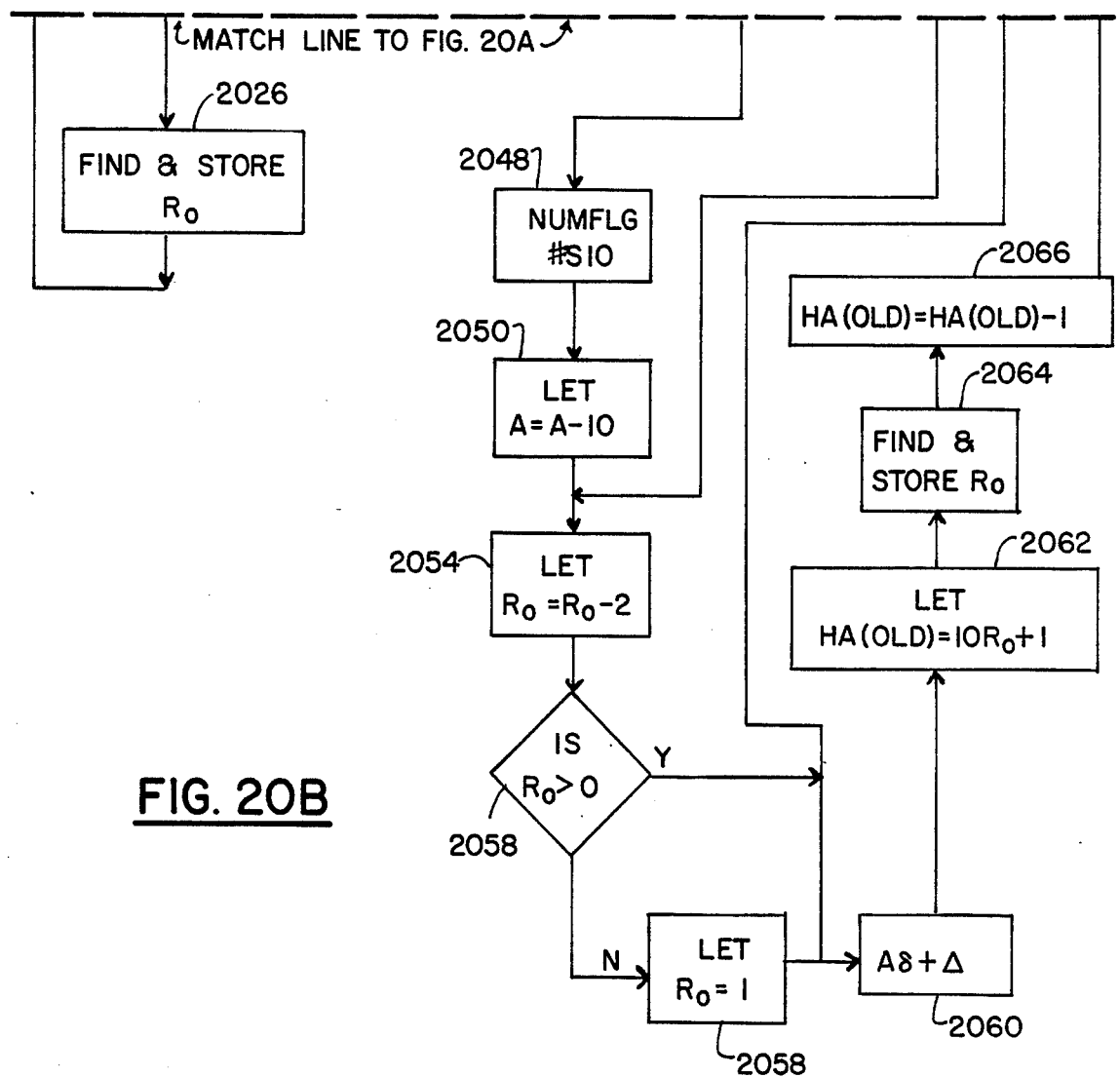

HAVOLT, a portion of which is illustrated in the flow diagram of FIG. 20, is utilized to derive the appropriate antenna potentiometer voltage from the calculated hour angle. The derived voltage can then be utilized in AUTOAZ to orient the antenna. HAVOLT starts at line 8B36 and continues to line 8F25.

HAVOLT first looks to an established table of satellite hour angles and corresponding potentiometer voltages. HAVOLT compares the new hour angle with the values in the table to determine surrounding satellites to establish a potentiometer voltage range for the new satellite. The potentiometer voltage for the new satellite is then derived by multiplying the difference in hour angles, by the number of millivolts assigned to hour angles in each region by ADJUST. This value is then added or subtracted, as appropriate, to the potentiometer voltage assigned to the known satellite.

Lines 8B36-8BAB of HAVOLT are utilized to determine relative table position of the new satellite hour angle. Flow then jumps to HAVOLT14, line ABAE, if the new satellite hour angle falls between to existing satellite hour angles or to HAVOLT 17, line 8CA1, block 2002, if the hour angle of the new satellite is further west or east than any existing satellites in the table.

The stack pointer of the old satellite to be utilized for reference calculation is stored. The hour angle for the new satellite is then read and stored in CALDIG0. The new hour angle is evaluated, block 2004, if the new hour angle is positive, flow is to HAVOLTN, 8CB3, block 2008, otherwise the value is converted to positive first, block 2006.

In block 2008, the hour angle value for the new satellite is stored. Then block 2010 subroutine ADJUST is called to determine the rank number for the hour angle of the new satellite and store it.

Routine ADJUST, lines 8FB9-900D is utilized to determine the rank or range into which a particular hour angle for the new satellite falls. Once the rank has been determined, a jump is made to the ADJUST table, lines 9012-902E to acquire the step size for the rank of the satellite hour angle. If the hour angle falls between zero and 10, it is in the first rank and therefore the step size is 5161. If the hour angle falls between 10 and 20, it is in the second rank and the step size 5322. This continues on to the eighth rank where hour angles fall between 70 and 80 and their step size is 4348. The step sizes represent millivolt values which are assigned to each degree change within the particular rank of degrees.

Next, block 2012, the same procedure utilizing routine ADJUST is performed to determine the rank of the old satellite and store that value. The original sign of the new satellite hour angle is compared to the sign of the hour angle of the old satellite, in block 2014. If the signs are the same flow continues to block 2032. If the signs differ, then flow is directed to block 2016.

In block 2016 the hour angle of the old satellite is evaluated to determine if it is negative. If the hour angle of the old satellite is not negative then NUMFLAG 80 is set in block 2018. Flow then continues to block 2020.

Blocks 2016-2030 are utilized to calculate that portion of the millivolts to be added or subtracted from the old satellite hour angle potentiometer voltage setting to obtain the new satellite hour angle potentiometer voltage setting which are required to go from an hour angle which is negative to a zero hour angle. Once this portion of the routine is completed, the conversion necessary for the positive portion of the difference between the new and old hour angles is computed by that portion of the flow diagram illustrated in blocks 2036-2066. Once this portion of the routine is completed, that portion of the routine illustrated as blocks 2068-2080 is utilized to find the final factor to be added or subtracted within the last rank which is the rank of the old satellite, and to determine if the change in potentiometer value should be added or subtracted. Then add or subtract that potentiometer value from the potentiometer value of the old satellite hour angle.

The routine change at the zero hour angle point is necessary because the same eight ranks are used for positive and negative hour angles which falls in the same hour angle range. Therefore, it is necessary to go through a set of ranks from the old hour angle to zero hour angle and then go from zero hour angle to the new hour angle.

In order to calculate the potentiometer voltage value for the new satellite hour angle, the closest known satellite hour angle potentiometer setting is determined. A total conversion factor $\Delta$ is determined which represents the difference between the known satellite hour angle potentiometer and the new satellite hour angle potentiometer setting. This value $\Delta$ is comprised of the sum of a set of little deltas ($\delta$) which represent the conversion factor within the ranks between the known hour angle and the new hour angle.

Block 2020 illustrates the formula utilized to find the little delta ($\delta$) conversion factor corresponding to the difference between the old hour angle and the edge of the current rank which is closest to the new hour angle. This will determine the conversion factor necessary to move the older hour angle one rank closer to the new hour angle. This step is repeated in this loop for every rank from the negative old hour angle setting up to the hour angle of zero. Once the rank of the old hour angle is determined to be equal to one in block 2022, then flow is to block 2028 where the hour angle of the old satellite is set equal to zero and its rank is then found utilizing subroutine AJDUST and its new rank is now stored in $R_0$. At this point flow proceeds to box 2036 to begin the calculation of the adjustment factor for the ranks above zero degree hour angle.

Until the hour angle reaches zero at block 2022, the old hour angle is decreased by ten to position the old hour angle at the edge of the next lower rank in block 2024.

The new rank for the new value for the old hour angle is then determined again through subroutine ADJUST and stored in $R_0$ block 2026. Flow then returns to block 2020 to calculate the next incremental change, little delta ($\delta$), to be added to the overall change, $\Delta$. Again, this loop, blocks 2020, 2022, 2024 and 2026, are repeated until the rank of the hour angle is equal to one in block 2022 at which time flow is directed as described above.

If at block 2014 it was determined that the sign of the new hour angle and the sign of the old hour angle are the same, i.e. both positive or both negative, then the loop for determining the negative portion of the transformation factor is unnecessary and flow is directed immediately to block 2032. In block 2032 a determination is made to determine if the sign of both the new and old hour angle is negative or positive. If the sign of both hour angles is negative then NUMFLAG 80 is set in block 2034; if not, flow continues directly to block 2036.

In block 2036 a determination is made to see if the rank of the old hour angle is greater than the rank of the new hour angle. If the rank of the old hour angle is greater than the rank of the new hour angle, this indicates that the hour angle conversion is approaching from a greater hour to a lower hour angle. Therefore, NUMFLAG 01 is set in block 2038, indicating that in the final evaluation of the final rank in which the new hour angle originally resided that the hour angle adjustment is approaching from above, not from below, so that the correct adjustment will be made in block 2072. If however the old hour angle rank is not greater than the new hour angle rank, flow is directed to block 2040 directly.

If in block 2040 the determination is made that the old hour angle rank and the new hour angle rank are the same, then the portion of the routine blocks 20422066 are necessary and flow is directed to block 2068 to make the final adjustment in the final hour angle rank. If the rank of the old hour angle and the new hour angle are not equal, then flow is directed to block 2042 for computation of the adjustment within the ranks on the positive side of zero hour angle.

At block 2044, a check is made to determine if NUMFLAG 01 has been set. If NUMFLAG 01 has not been set, then flow is to block 2060 where the step size ($\delta$) is multiplied by ten times the rank $R_O$ minus the old hour angle and the product is added to the total conversion factor $\Delta$. If NUMFLAG 01 is set, thereby indicating that the rank of the old hour angle is greater than the rank of the new hour angle flow is directed to block 2046. The first time through block 2046 NUMFLAG 10 is set and the difference between ten times the rank of the old hour angle and the old hour angle value is decremented by ten, block 2050, and then the rank of the old hour angle is decremented by two, block 2054. If at this time, block 2056, the rank of the old hour angle is still greater than zero, flow is directed to block 2060, which performs as before to add the newest portion of the conversion factor to the total conversion factor. If however the rank of the old hour angle is less than or equal to zero, the rank of the old hour angle is set equal to one because only ranks of 1-8 are valid.

Once the current rank conversion has been added to the total conversion the hour angle is incremented by ten, block 2062, and its new rank is determined by utilization of subroutine ADJUST, block 2064. This new hour angle is then decremented by one, block 2066, and flow returns to block 2036 to determine the factor for the portion of the next rank between the old hour angle new setting and the new hour angle.

Once the factors for all the ranks up to the last rank in which the new hour angle resides have been determined and added to the total conversion factor, flow is directed out from block 2040 to block 2068. In block 2068 the current value for the old hour angle which has been stepped up through the ranks to reach the rank of the new hour angle is subtracted from the new hour angle value to get the value B. Next, block 2070, NUMFLAG 01 is evaluated to determine the direction from which the new hour angle was approached. If the new hour angle was approached from a greater old hour angle then B is decremented by ten, block 2072; if not flow continues directly to block 2074 where the step size ($\delta$), of the current rank (the rank of the new hour angle) is multiplied by the factor B and the product is added to the total conversion factor, $\Delta$, to get the final total conversion factor.

Flow is then directed to block 2076 where an evaluation of NUMFLAG 80 is made to determine if both the new and old hour angles were negative. If they were both negative, then the sign of the total conversion factor, $\Delta$, is inverted, block 2078, and flow is directed to block 2080. If they were not both negative, the sign of the total conversion factor $\Delta$ remains the same and flow is directed to block 2080.

In block 2080 the conversion factor $\Delta$ is either subtracted or added to the potentiometer voltage value for the old satellite hour angle to get the potentiometer voltage setting $V_p$ for the new satellite hour angle. The subtraction or addition of the conversion factor is dependent upon the setting of NUMFLAG 80 as evaluated in block 2076, which is dependent upon the sign values of the new and old hour angles. Flow then returns to the program, block 2082, for storage of the potentiometer voltage setting value for the new desired satellite.

Next SNCCOM is utilized to obtain the remainder of the whole digits of the new hour angle. These digits are stored in CALDIG1 and CALDIG2 and also in AUDFREQ1 and AUDFREQ2. Subroutine ADJUST is then called and utilized on AUDFREQ1 and 2 to determine the hour angle rank of the new satellite. The rank value is then stored and held in register ADDRESS.

The location of the old satellite is then loaded into RF1, RF2 and RF3 as well as AUDFREQ1 and 2. The dual storage in the AUDFREQ register is for utilization in routine ADJUST. ADJUST is then utilized for determining the rank of the old satellite hour angle. This old rank is stored in HFCADDR. If the new and old hour angles are both on the same side of the center orientation of the antenna then flow jumps to line 8D0B. If not, adjustments are made and then flow proceeds.

After a jump to 8D0B a determination is made to determine if both hour angles are negative or positive. If negative, a flag #80 is set, if both positive, no flag is set and flow jumps to line 8D15. The ranks of the two satellites are compared. First, a determination is made as to the difference between the old hour angle and the end of its rank in the direction of the new hour angle. The correct factor is multiplied by the difference within the rank of the old satellite. The result is stored in the SNC.

The factors for the ranks between the old and new satellites are multiplied by "10" the full range of each rank. The product is again stored in the SNC. Finally, the difference from the location of the new satellite and the first edge of the new satellite rank is determined. This difference is multiplied by the appropriate factor for that rank and the product is stored in the SNC.

All the values are summed in the SNC to give a total antenna potentiometer difference between the old antenna hour angle and the new antenna hour angle. This difference is then either added to or subtracted from the potentiometer voltage corresponding to the old hour angle to get the new hour angle potentiometer voltage.

Line 922A is the start of the peaking routine PEAK. This routine is utilized to determine the optimal orientation of the antenna by detection of the peak reception of the satellite signal desired.

PEAK first calls READAGC which utilizes the A/D converter 13CU37 to read the AGC voltage. The voltage is taken off pins 5 and 6 and read by READAGC in digital form in two bytes stored in variable DOUBLE. This value DOUBLE is the starting AGC value.

The A/D is again utilized to determine the antenna potentiometer voltage through routine READPOT. This value is stored in HICNT. Variable HICNT is utilized to store the antenna location via the potentiometer voltage, at which the AGC is at the highest value or count. Therefore, as the antenna orientation is varied and the AGC monitored, if a better value for the AGC is detected the potentiometer voltage is read and restored in HICNT. If the values for the AGC detected as the antenna is moved are not better, the potentiometer is not read and no new antenna orientation values are stored.

A window of 24 is established about the original potentiometer value from 12 hexidecimal below to 12 hexidecimal values above. If the band is C, then the window is expanded to 22 below the original value and 22 above the original value. The lower range of the potentiometer values to be investigated is stored in TEMP, the upper end is stored in AZCNT.

Routine PEAK first moves the antenna to its extreme east location within the window while monitoring the potentiometer value to determine if the end of the window is reached. The antenna is then tracked back through the original position to the other end of the window as the AGC is monitored. The potentiometer voltage is sampled during the back track to detect when the other west limit has been reached.

If during the trackback, the monitored AGC indicates a better signal than already stored in HICNT, the potentiometer value is read and the new value is placed in HICNT, line 929A.

At the end of this routine, after the potentiometer voltage corresponding to the best frequency controller signal detected has been identified, the voltage value must be saved for future reference. 10 is added to the potentiometer value to allow for antenna drift after shutdown of the motor when approaching proper orientation from the east. This value is then stored in corresponding relationship with the antenna ID for utilization in antenna orientation routines.

Routine CMD422 is utilized to send the local lock out command messages to the frequency controller.

Routine TEST422, line ECF4, is utilized to obtain information from the appropriate frequency controller for utilization by the ACU controller. TST422 obtains information from the frequency controller by sending the TALK message, described earlier, to the appropriate frequency controller. This routine generates the different messages for both the video and audio TALK messages.

Routine STOSET is accessed prior to the start of TST422 to acquire, through front panel prompts, the pair address of the desired frequency controllers. The TALK message as described earlier is comprised as follows:

| S   |     | A   |     | E   |
|-----|-----|-----|-----|-----|
| T   | F   | d   | T   | O   |
| X   |     | d   |     | T   |

The band note of the message will be dependant on the flag 3 setting which indicates ACU front panel operation control or remote terminal control. The front panel operates at 76.2 kilobaud and the remote terminal input operates at 9600 baud.

As before with routines AUD422 and FREQ422 subroutine XOFF is utilized to prevent transmission to the front panel on the same bus as the frequency controller. The accumulator is loaded with an 84 hexidecimal to enable the data transmission lines routine XMIT to enable the microprocessor to transmit the TALK request from the ACU to the frequency controller. Once the TALK message is sent the program disables the port 1 lines with a 44 hexidecimal character and awaits a response, i.e., a TALK BACK from the frequency controller. The processor will only accept a "2" as the first message character in order for the message to be proper.

The processor will accept all of the data of the message until an end of transmission (EOT) character is received. Once the EOT is received flow jumps to ED80 to check flags and implement routine XON to reenable the front panel communications. The TALK BACK message is compressed from ASCII into binary and stored in the timer RAM as RF1, RF2, and RF3.

When line EDFD, "TST422I" is reached, a video TALK request has been sent and an answer received and stored. Flow returns to line ED0C "TST422" and at this time an audio TALK message is assembled and sent to the appropriate frequency controller. The audio TALK BACK message received will be compressed and stored as AUDFREQ1 and AUDFREQ2. After both video and audio data have been interrogated from the frequency controller, routine TEST422 is complete.

Subroutine RECALL at A95C is utilized to process the "store/recall" key on the ACU front panel. The message "RECALL" is displayed on the ACU front panel. A jump is made to subroutine OUTPUT to transmit the prompt to the front panel. The "RECALL" button must be depressed a second time to enter the "store" position of the routine at A973. A prompt then requests further input from the operator in the manner "store what?". The "set" key is then depressed to store a setup. This causes a jump to line ABF6 for subroutine STORES.

Subroutine STORES requires the input of the frequency controller address whose setup is to be stored. This request is again sent to the front panel as a prompt by subroutine OUTPUT. The message is received at line AC0A and checked for validity, i.e., an address between 1 and 4. The address is stored in memory called ADDRESS in the microprocessor RAM. Flow then jumps to AC71. Lines AC41 to AC6C are utilized for address entry if the address is supplied by a remote terminal and not the front panel.

Once an address pair is established, a program jump will be performed to routine 422A which will send TALK requests to the first frequency controller and will store the TALK BACK messages. Subroutine STOSET line C04E is utilized to transfer the setup data stored by 422A in the timer RAM into the EEPROM in the proper format. A request is then made of the second frequency controller of the pair and the data is stored in the EEPROM in the same manner.

Routine STOSET is utilized anytime it is desirable to store setup in the EEPROM, in the setup table running from memory locations 4700 to 55C5 and capable of storage of 200 setups of 19 bytes each. STOSET will interrogate the EEPROM to identify and locate the first empty memory location before establishing a new setup. The current satellite stored as NUMDIG1 and NUMDIG 2 are stored line C08B as the first and second byte. The polarization, horizontal or vertical, is next stored. The video frequency is stored. The audio frequency is stored, then the half transponder, polarization-reverse, receiver address, bond, etc. are stored.

The storage process can receive values from either frequency controller or from the front panel. If the front panel provides the input values, prompts will be sent out between each storage to indicate to the operator the desired input. If storage of a setup is being accomplished directly from a frequency controller, there is no need for operator interaction as the microprocessor will directly interrogate the appropriate frequency controller through utilization of the proper portions of the TEST422 routine.

Once the setup has been established, routine SETNAM is performed to prompt the operator to name the setup. The name will usually correspond to the signal received from the satellite on that frequency, e.g., CNN, ESPN, etc. This name is also stored in the setup table, at locations 8, 9, 10, 11. The setup number is displayed for operator information for identification reference.

To initiate a scan through the frequency controller the "receive" key of the front panel of the ACU is utilized. Upon activation of the "receive" key, the operator will be prompted to supply information to the ACU system. The operator will supply the frequency controller address, polarization, video reverse, frequency or transponder selection, C or Ku band selection, direct entry, manual or auto. In the autoscan mode a starting frequency is selected and then a scan is started where the frequency value continually changes in 1 MHz steps, in one direction. The ACU system will continually send different frequencies to the frequency controller and monitor the AGC signal. The frequency controller will continuously display the current frequency. When a strong AGC is received, the scan will pause. The frequencies sent from the ACU to the frequency controller are updated upon receipt of an acknowledgement signal from the frequency controller corresponding to the 17 millisecond delay of the AGC.

The routine RECKEY is utilized to process the activation of the "receive" key. This routine begins at line 9032. RECKEY secures the frequency controller address through subroutine HFCADD and obtains the status through subroutine TST422A. The routine then requests the other setup parameters, e.g., polarization, video reverse, etc., by utilization of the various subroutines. Once all the frequency data and parameters are established flow is at line E980 and auto acquisition begins.

Routine FCH1 sends a direct frequency to the frequency controller via the 422 bus, and FREQ422 routine. The scan flag is set here so that the frequency controller will be released from manual scan if the "clear" key is depressed by an operator.

A jump is made to the SCANBEG subroutine, line 9434, which will block all inputs from the front panel except for the up and down arrows and the "clear" key. The frequency controller is then placed in local lock out mode by loading accumulator A with a hexidecimal 11 by operation of routine CMD422.

At E9BF the front panel message is loaded and analyzed to determine if a scan up or a scan down is desired. If scan up is desired a jump is made to line E9E3 and from there to line E92C. This portion of the routine steps the frequency up by 1 MHz every 100 milliseconds. The microprocessor sends a video frequency message each time it receives an acknowledgement from the frequency controller, every 17 milliseconds because of the AGC delay. The string of frequencies sent remain constant for 100 milliseconds at which time the frequency is incremented by 1 MHz up or down, as appropriate. Once the up or down scan key has been activated, the ACU microprocessor will continue to command the frequency controller to scan until either "scan" key or the "clear" is depressed.

Routine FREQUP, line EA71, is utilized to add 1 MHz to the frequency value. Routine EAC7 is then utilized to determine if the new frequency is still valid for the given band. The detection of an invalid frequency will indicate that the end of the band has been reached if the proper flags are set as checked in FMA-NUP1, line E94D. Routine CHFREQ determines the band set, either C or Ku, and compares the frequency against the software defined ranges of 3.7000 to 4.2000 MHz for C band and 11.7000 to 12.2000 MHz for Ku band.

If the valid frequency flag checked at E94D indicates a valid frequency, a jump is made to FREQ422, line E172. This time upon entry into the FREQ422 routine the scan flag is set therefore the scan character of the frequency message sent to the frequency controller is an "X" instead of the "0" sent for non-scan messages. The scan message is not stored by the frequency controller as is the non-scan frequency message. The frequency controller will only store its current frequency upon receipt of a command directing the frequency controller to exit scan mode and return to local mode.

Flow exits the FREQ422 once an acknowledgement is received by the microprocessor, and returns to line E968. Lines E96B through E973 are utilized to determine which flag was set, the scan up/down flag or the acknowledgement flag. If the flag set is acknowledgement, flow is back to line E94A, FREQUP is again called and the process is repeated. This loop from line E94A to E977 is cycled incrementing the frequency each time until the end of the band is reached at which time flow jumps to E979, then to E9E6.

Subroutine SCANEND is run to terminate the front panel block, allowing all front panel keys to be active again. All flags are cleared, a standard non-scan frequency message is sent to the frequency controller by subroutine FREQ422 and then a go-to-local command is sent to the frequency controller by loading a "1" into accumulator "A" and sending it to the frequency controller by operation of routine CMD422.

The timer 13AU8 of the ACU is utilized by the ACU system for repetitive and non-repetitive timed operations. Non-repetitive allows a setup to be implemented at a specific time on a specific day once and then erases the storage of that time. Repetitive timed operations allows the same setup to be accessed repetitively at established times on a specific weekday at a specified time every week, week after week. The real time clock is initially set by routine RTCSET from lines 9B89 to lines 9DF7, and this operation is performed in a standard manner utilized for the setting of standard digital clocks.

Setting of non-repetitive alarm times is accomplished through utilization of subroutine ALARMSER, line 9FE7. The repetitive alarm is set through utilization of WEEKSER, line A538. The routine allows for 16 repetitive times. From line A538 to A54E a check is made of the alarm table in the EEPROM to determine what storage space is available. If memory space is available for storage of a new repetitive alarm, flow progresses to A553.

The setup number of the desired setup is entered through the keyboard by the operator in response to prompts from subroutine SETUP.

The three digit setup number between 1 and 200 is stored in NUMDIG1, NUMDIG2 and NUMDIG3. The setup number is stored into an empty stack position at line A5A1 thus completing the setup number input from lines A553 through A5A1. Within these program lines the setup number is echoed to the ACU front panel and converted from decimal to binary for storage.

The time entry begins at line A5A9 a jump is made to subroutine TIME located a A1FB. TIME accepts the keyboard entry of alarm time; hours, minutes, a.m., p.m., etc. These values are stored in NUMDIG1 and NUMDIG2 temporarily and are then converted binary and stored in EEPROM 13AU9 in locations for the alarm table.

Next the day of the week desired is entered starting at A5C4 with a jump to subroutine NEXT DAY. Subroutine NEXT DAY, line A619, displays the days of the week on the ACU front panel in succession until the desired day is selected. The repetitive alarm once set will be activated on the same day of the week at the same time week after week indefinately until the alarm is cancelled. Once the day of the week has been set, the program returns from line A5FF to routine WEEK6 for storage of the alarm day of week information in the EEPROM.

The set alarms are displayed on the front panel of the ACU in day of week and time of day. Routine CHTIME, line A6B2, is utilized to determine if two alarms are set to activate at the same, if so the alarms are cleared and a display indicates to the operator that the time was duplicated.

For storage of non-repetitive alarms, the process is similar except that a specific date is stored instead of a day of the week.

Once an alarm is stored, routine NEXTALA is executed to resort and reestablish alarm chronological order. This will establish the next alarm to be activated at the proper time and establishes the chronological order of the remainder of the alarm times set. This routine must be performed each time a new alarm is set to establish the chronological positioning of the new alarm with respect to the established alarms.

NEXTALA establishes a non-markable interrupt for the real-time timer clock 13AU8. The IRQ (interrupt request) pin 19 from timer 13AU8 is connected to pin 4 of the microprocessor 13AU19. Pin 4 of the microprocessor is the non-maskable interrupt line. Interrupts received on this line cannot be masked (ignored) by software programming. Therefore the real-time clock will establish an interrupt request on this line of the microprocessor when a preset alarm time occurs. The receipt of this interrupt will cause a microprocessor jump to FFFC to process the interrupt. This interrupt is distinct from the IRQ1 interrupt on pin 5 which can be ignored through proper software programming.

At line FFFC flow will be directed to routine NMI, line A898, for processing of the alarm interrupt. NMI will determine the alarm number of the alarm causing the interrupt. The number will identify one of the 16 repetitive or 16 non-repetitive alarms. The alarm is read, the desired setup is determined and routine MOVESET5A is utilized to reorient the antenna and frequency controller to the desired setup. Once the setup is complete and the timer flags reset, flow returns to the executive loop.

The program identified in the microfiche appendix as "Quicklink Control Program" is the software program utilized by the microprocessor 16U5 on the front panel board of the ACU illustrated in FIG. 16, for control of the front panel display and for conversion of front panel keyboard inputs into usable form for the main microprocessor 13AU19 of the ACU system. The keyboard of the front panel of the ACU is an X-Y matrix format. The key activation output of the front panel must be converted to hexidecimal format for input into the main microprocessor 13AU19.

The first portion of the program, pages 1 and 2 through line 009A comprise an initialization, definition of variable names and mapping of the internal RAM of the microprocessor 16U5. The executable portion of the program begins at E000. Lines 0000 through E01E perform an initialization procedure for the devices and interfaces of the ACU front panel. Routine SETLCD is for initialization of the 20 character LCD display on the front panel of the ACU. The initialization parameters are defined by the display utilized. The display can be initialized on power up or by this software routine. The LCD requires an indication of the number of bits utilized in communication from the microprocessor 16U5. SETLED turns off all front panel LEDs by clearing the LED register.

Subroutine SPCHAR at E43B-E4E7 defines special characters for the LCD display, i.e., non-standard, Alpha-numeric characters, e.g., up and down arrows. Flow continues to subroutine PROMPT to display the initial prompt on the LCD display of the ACU. The initial display will be M.A.T.

Lines E021 through E0A2 comprise the executive of the front panel control program. The executive routine is a continuous loop which is exited in response to interrupts and flags set by external inputs to the microprocessor 16U5, front panel.

The REMOTE flag line E021 indicates the connection of a remote terminal for control of the ACU. If a remote terminal is utilized for control of the ACU the REMOTE flag is set and therefore a jump to line E05F is performed. Lines E05F to E0A2 output a display of "TERMINAL MODE" to the ACU front panel. This display informs the operator that the ACU is controlled by a remote terminal.

If the system is not in remote mode then flow will progress from line E021 to E025. At line E025 a command for the front panel microprocessor 16U5 a Hitachi 6303 is read which causes the processor 16U5 to become dormant and to remain so until an interrupt is received. The microprocessor 16U5 will cease to read and process instruction lines once in the dormant mode, until an interrupt is received on pin 11 of the microprocessor 16U5.

Once an interrupt is received, flow will being again at line E026. The processor 16U5 will determine the origin of the interrupt as either from the front panel keyboard or from the main microprocessor 13AU19 of the ACU. Interrupts from the keyboard are processed by subroutine KEYCOM, interrupts from the main processor 13AU19 are processed by receipt of data from the main microprocessor 13AU19 and subsequent activation of the LCD display, through subroutine DISPT. Program lines E031 through E05D allow specified portions of a display to be blinked.

Keyboard activation is processed for display by the front panel microprocessor 16U5, by initial conversion of the keypad matrix input into hexidecimal output to the main microprocessor 13AU19. The main microprocessor 13AU19 then sends a desired output to the LCD display via the front panel microprocessor 16U5 in response to the depressed key.

Routine SETSCI, line E045, establishes the baud rates for serial communications of the microprocessor 16U5.

The interrupt routine for processing keyboard interrupts is located at E0FC, routine IRQ1. When the interrupt request line pin 5 goes low, a jump to routine IRQ1 occurs. Line E0FD causes a jump to routine KEYDATA, a routine which loads the keyboard data from the 74C923 keyboard encoder, 16U7. This process is performed for each key depression. The key data is stored in variable KEYCODE in the microprocessor 16U5 RAM. The key flag is set at line E106 indicating that the keyboard is active Lines E108 through E111 establish a delay to allow for key debounce stabilization.

Subroutine KEYCOM4 is then utilized to convert the code from the encoder 16U7 to a proper form for the microprocessor 16U5. KEYCOM4 utilizes a look-up table for comparison of the matrix input from the encoder 16U7 to obtain the appropriate hexidecimal equivalent, and restores it in KEYCODE. KEYCOM at E2B3 first utilizes routine TICK to produce an audible beep to indicate that a key depression was received.

KEYCOM then loads the key data as variable KEYCODE in hexidecimal form into the transmit buffer for transmission to the main microprocessor 13AU19, utilizing subroutine XMIT, E2E3.

Once the data for a single key depression is transferred to the main processor 13AU19, flow returns to IRQ1B at E11D and then returns to the executive loop. If a second key is activated in series, the processing begins again, ending in transmission of the second key code data.

Routine IRQ2 is utilized for input and output of charactors to and from the microprocessor 16U5 as serial data through the port dedicated to RX and TX pins 11 and 12, respectively. Lines E13F to E15B perform the necessary check to determine if the final character of a message was received to determine if the message is fully received and can be processed. When the end of the message is determined, PROREC is called to process and display the message.

The message from the main processor 13AU19 to the front panel is a 24 character formatted message comprised of the following characters:

| C | C | C | A N_1 | A N_2 | A N_3 | ... | A N_{18} | A N_{19} | A N_{20} | L E D |
|---|---|---|---|---|---|---|---|---|---|---|

C - three characters command code.
AN_N - alpha-numeric character for LCD display.
LED - hexidecimal number indicating configurations of LED displays.

The three character command code will supply the front panel with information as to special display features such as blinking characters or audible beeps. The alpha-numeric characters are in ASCII code and are therefore directed, unprocessed, to the LCD display with the front panel microprocessor 16U5 acting as a conduit only. The LED character is a single hexidecimal character indicating the configuration of the ACU front panel indicator lights.

The routine will also accommodate short command only messages sent from the main microprocessor comprised of the following characters:

| C | C | C | E O T |
|---|---|---|---|

This message is comprised of three command characters and an end-of-transmission character. These messages are also processed by routine PROREC.

PROREC, lines E1FD through E27E, first checks the three command characters. If the characrters are all 0 there is no special command to be processed and flow jumps to subroutine DISPLAY. DISPLAY clears the LCD display, and looks to the start of the 20 alphanumeric characters in the receive buffer. The characters are sent to the LCD display in order and unmodified. Flow returns to line E207, the LED characters is loaded from the receiver buffer, and the LED latches are set correspondingly.

If the three command characters indicate a special message, e.g., a command for an audible beep from the front panel, a jump is made from line E202 to line E212 for routine PROCOM. PROCOM will compare the ASCII character in the receive buffer with its hexidecimal equivalent and make an appropriate subroutine jump according to lines E212 through E232 and will execute the selected subroutine of lines E233 through E27E to perform the desired display function.

Routine BEEP performs the same function as TICK in activation of the front panel audible buzzer. BEEP oscillates the buzzer at a higher frequency than TICK and therefore produces a higher frequency audible indication. TICK is utilized for key activation indication whereas BEEP is utilized for indication of erroneous entries or other desired audible indication from the main microprocessor 13AU19 such as alarm time duplication combined with an appropriate LCD display message.

Program lines E3C0 through E3F6, identified as routine FAULT, are not utilized by the ACU.

DISMES E422 through E43A is utilized by routine PROMPT for display of the initial "MAPS-4" power on indication display of the LCD.

Other improvements, modifications and embodiments will become apparent to one of ordinary skill in the art upon review of this disclosure. Such improvements, modifications and embodiments are considered to be within the scope of this invention as defined by the following claims.

What is claimed is:

1. A system for acquiring and receiving signals from a satellite comprising moving antenna means for receiving C and Ku band transmissions, at least one receiver means for determining the frequencies of signals to be received by said receiver means from said antenna means, motor means for moving said antenna means to be directed at one of a plurality of different satellites, and controls means for controlling movement of said antenna means and controlling the frequency of reception of said receiver means, said control means having means for initially acquiring and storing units of information each defining the location of a different transponders of the satellite and the frequencies for reception of various signals therefrom, said means for initially acquiring and storing further including (1) means in said receiver means for producing an AGC signal and from applying said AGC signal from said receiver means to said control means and to said means for initially acquiring and storing, (2) means for initially directing said antenna means towards a desired satellite, (3) program controlled means for oscillating said antenna means until a peak amplitude AGC signal is developed, (4) a feed included in said antenna means having a polarization control means operatively associated therewith, (5) means for controlling said polarization controls means to maximize the AGC signal from said receiver, (6) means defining the frequency of at least one specific transponder on a satellite to be acquired, (7) means for storing information defining said frequency, (8) further including means for defining transponder- half-transponder and video reverse or non-reverse operation, and (9) means for selectively storing said information in said control means, said control means having means for at will retrieving the stored information and controlling said antenna means and said frequency determining means of said receiver to acquire a specified transponder on a specified satellite.

2. A system for acquiring and receiving signals from a satellite according to claim 1 wherein said means for at will retrieving includes a keyboard having means for keying said units of information into and acquiring said units of information from said means for storing, said control means responding to at will operation of said means for keying from causing movement of said antenna means in aximuth and elevation and for causing the antenna to receive a desired polarity signal.

3. A control means for a satellite receiving system comprising means for storing a plurality of setups each defining a complete set of parameters necessary for acquiring any one of a plurality of transponders on any one of a plurality of satellites, means for defining all of said parameters for each setup, and means for at will, selectively calling forth a setup for a specific transponder of a specific satellite and for transmitting control signals to external means to cause such satellite and transponder to be acquired, and input control means for defining information for each of a plurality of satellite-transponders desired to be acquired including satellite position, C or Ku band operation, transponder frequency, video and audio IF frequencies, half or full transponder operation in Ku band, video normal or reverse, means for storing a plurality of setups each including such information for each satellite-transponder pair, and means for calling forth each such setup and for generating signals for use by associated equipment to acquire the desired satellite-transponder and frequencies.

4. A control means according to claim 3 further comprising means for designating each setup by number, and means for at will designating each setup by a second identifier.

5. A control means according to claim 3 further comprising relay means for controlling external equipment, and means for including in said setup program information for controlling said relays.

6. A system for acquiring and receiving signals from a satellite according to claim 5 wherein said external equipment is an alarm.

7. A satellite receiving means with control means comprising, means to control polarization of signals to be received by said receiver, a mixer, a mixer means supplying said signals to said mixer, a local oscillator to supply signals to said mixer, a phase locked loop including a microprocessor for controlling the approximate frequency of said local oscillator to produce an IF signal from a received signal, an automatic frequency control feedback to said microprocessor to fine tune said local oscillator, said control means having means for defining and supplying to said microprocessor the frequency and polarization of the signals to be received, said control means further including, means for defining transponder-half transponder Ku band operation, automatic video level control means, and means for activating said automatic video level control means operation.

8. A receiver means for receiving signals from a Ku band transponder comprising means to define full and half transponder operation and means for automatically adjusting the video signal level to compensate half-transponder signals to attain substantially full transponder signal levels.

* * * * *

UNITED STATES PATENT AND TRADEMARK OFFICE
CERTIFICATE OF CORRECTION

PATENT NO. : 4,907,003

DATED : March 6, 1990

INVENTOR(S) : Darrell R. Marshall et al

It is certified that error appears in the above-identified patent and that said Letters Patent is hereby corrected as shown below:

On the first page of the Patent, under "Inventors" change the name of "Farid Mahani" to --Farid Mahini--.

Signed and Sealed this

Second Day of April, 1991

*Attest:*

HARRY F. MANBECK, JR.

*Attesting Officer*         *Commissioner of Patents and Trademarks*